United States Patent [19]
Dobbins

[11] Patent Number: 5,630,072
[45] Date of Patent: May 13, 1997

[54] RELIA PROCESS: INTEGRATED RELATIONAL OBJECT UNIT IDENTIFICATION AND LOCATION ADDRESSING PROCESSES

[76] Inventor: Larry D. Dobbins, 1319 Southern Hills Rd., Kingwood, Tex. 77339

[21] Appl. No.: 298,562

[22] Filed: Aug. 30, 1994

[51] Int. Cl.$^6$ .................... G06F 17/60; G06F 17/30; G06F 19/00
[52] U.S. Cl. .................. 399/222; 235/385; 364/222.6; 364/226.3; 364/468.01; 364/478.01; 364/DIG. 1; 395/65; 395/600; 395/208; 395/613
[58] Field of Search .................. 395/600, 157–161, 395/65; 364/403, 401, 402, 468, 478, 479, 222.6, 226.3; 235/385

[56] References Cited

U.S. PATENT DOCUMENTS

| | | | |
|---|---|---|---|
| 4,336,589 | 6/1982 | Smith et al. | 364/403 |
| 4,509,123 | 4/1985 | Vereen | 364/300 |
| 4,591,983 | 5/1986 | Bennett et al. | 395/65 |
| 4,639,875 | 1/1987 | Abraham et al. | 364/479 |
| 4,688,026 | 8/1987 | Scribner et al. | 340/572 |
| 4,920,488 | 4/1990 | Filley | 364/403 |
| 5,025,140 | 6/1991 | Varley | 235/385 |
| 5,119,307 | 6/1992 | Blana et al. | 364/468 |
| 5,307,261 | 4/1994 | Maki et al. | 364/401 |
| 5,334,822 | 8/1994 | Sanford | 364/403 |

*Primary Examiner*—Thomas G. Black
*Assistant Examiner*—Hosain T. Alam

[57] ABSTRACT

Automatic processes for relational identification and recording of object units and their locations, in conjunction with traditional Hierarchy Coded Location Addressing, to directly support tracking, configuration management of diversified hierarchical object unit systems and their components.

35 Claims, 50 Drawing Sheets

---

OLARF for Equipment using the Normalized Form of the ReliA Process
with Item Identifier and Item Description for reference

Origin Location Address Record File

Item Identifier and Item Descripton are not Part of OLARF. Shown for reference only

| [Unique Unit Identifier] OUUI | [Hierarchical Entity] Universe Based Origin Location Address | | | | |
|---|---|---|---|---|---|
| | Origin Based Hierarchy Level | | | | |
| | [UHL] UBL1 Area | [UHL] UBL2 Site | [UHL] UBL3 Str | [UHL] UBL4 Sui | [UHL] UBL5 Eqm |
| 2105 | 101 | 45 | 1 | 01 | 01 |
| 2869 | 103 | 32 | 1 | 00 | 00 |
| 2948 | 103 | 32 | 3 | 00 | 00 |
| 3478 | 101 | 45 | 1 | 01 | 02 |
| 3489 | 101 | 45 | 1 | 01 | 03 |

| Item Identifier | Item Description |
|---|---|
| TCB09 | Telecom Bay A |
| FB1230 | Building, Fiber-Concrete |
| 150HND | Generator Assy. |
| TCB08 | Telecom Bay B |
| TCB09 | Telecom Bay A |

Illustrating the OLARF utilizing the Normalized Form of the ReliA Process. This file supplements the OURF illustrated in Figure 1.

Notes:
1. Item Identifier determined by reference to the OURF with the OUUI.
2. Item Description determined by reference to an IMRF with the Item Identifier
3. The same OLARF applies to the Normalized Form of both the Component Positioning and Component Non-Positioning Addressing Methodologies

Figure 1 – OURF for Equipment using the Normalized Form of the ReliA process with the CPam Object Unit Record File

| Unique Unit Identifier | Item Identifier | ReliA Component Position Address | | | Other param-meters | Item Description | Previous HCLA |
|---|---|---|---|---|---|---|---|
| | | Guardian Ref - OUUI | CPA [CHL] GHL1 | [CHL] GHL2 | | | |
| 2105 | TCB09 | | | | ...... | Telecom Bay A | 101-45-1-01-01-00-00 |
| 2569 | PA0 | 3478 | 02 | 01 | ...... | Power Amplifier | 101-45-1-01-02-02-01 |
| 2614 | PA0 | 3478 | 02 | 02 | ...... | Power Amplifier | 101-45-1-01-02-02-02 |
| 2702 | MR15 | 3478 | 01 | 01 | ...... | Fan Assy - 75 CFM | 101-45-1-01-02-01-01 |
| 2754 | BAT12 | 2105 | 04 | 01 | ...... | Battery 20V | 101-45-1-01-01-05-01 |
| 2761 | TX5 | 3489 | 07 | | ...... | RF Tx Filter | 101-45-1-01-03-14-00 |
| 2841 | MR15 | 3478 | 01 | 02 | ...... | Fan Assy - 75 CFM | 101-45-1-01-02-01-02 |
| 2869 | FB1230 | | | | ...... | Building, Fiber Concrete | 103-32-1-00-00-00-00 |
| 2871 | TCB09 | 2869 | 03 | 01 | ...... | Telecom Bay A | 103-32-1-03-01-00-00 |
| 2946 | AL29 | 3653 | 04 | | ...... | Alarm - Trans B | 103-32-3-01-01-02-04 |
| 2948 | 150HND | | | | ...... | Generator Assy | 103-32-1-03-00-00-00 |
| 2954 | DC10 | 2871 | 02 | | ...... | DC Power Control Assy | 103-32-1-03-01-02-00 |
| 3018 | DCM3 | 2954 | 01 | | ...... | DC Power Meter Assy | 101-32-1-03-01-02-02 |
| 3195 | BAT12 | 2105 | 04 | 01 | ...... | Battery 20V | 101-45-1-01-01-05-02 |
| 3215 | DCM3 | 3653 | 02 | | ...... | DC Power Meter Assy | 101-45-1-01-01-02-02 |
| 3244 | TRX | 3489 | 10 | | ...... | TRX Trans/Rcv Filter | 101-45-1-01-01-08-00 |
| 3478 | TCB08 | | | | ...... | Telecom Bay A | 101-45-1-01-02-00-00 |
| 3489 | TCB09 | | | | ...... | Telecom Bay B | 101-45-1-01-03-00-00 |
| 3653 | DC10 | 2105 | 02 | | ...... | DC Power Control Assy | 101-45-1-01-01-02-00 |
| 3925 | TX5 | 3489 | 06 | | ...... | RF Tx Filter | 101-45-1-01-03-06-00 |
| 4150 | ACC3 | 2105 | 03 | 01 | ...... | AC Converter | 101-45-1-01-01-04-00 |
| 4167 | ACC3 | 2105 | 03 | 01 | ...... | AC Converter | 101-45-1-01-01-03-02 |
| 4218 | BAT12 | 2105 | 04 | 01 | ...... | Battery 20V | 101-45-1-01-01-05-03 |
| 4982 | AL28 | 3653 | 03 | | ...... | Alarm - Trans A | 101-45-1-01-01-02-03 |
| 5004 | 4SS | 3478 | 03 | 05 | ...... | Sig/Scan | 101-45-1-01-02-03-04 |
| | 40258 | 2948 | 03 | 45 | ...... | Bearing Front | n/a |
| | ALMT | 4982 | T2 | | ...... | DC Power Alarm Trans Unit | n/a |
| | CLX25 | 2948 | 01 | | ...... | Radiator, 2.5 Gal, Assy | n/a |
| | HND034 | 2948 | 06 | | ...... | Gen. Control Pannel Assy | n/a |
| | HND049 | 2948 | 03 | | ...... | Engine, Dsl, 35 Hp. Assy | n/a |
| | HND092 | 2948 | 04 | | ...... | Differential and Clutch Assy | n/a |
| | HND103 | 2948 | 02 | | ...... | Starter, Assy. | n/a |
| | MTRV5 | 3215 | M1 | | ...... | DC Meter, Voltage | n/a |
| | MTRV5 | 3018 | M1 | | ...... | DC Meter Voltage | n/a |
| | WHS056 | 2948 | 05 | | ...... | Gen Winding & Arm. Assy | n/a |

Not part of OURF. For reference or comparison only:

Illustrating Object Unit Record File, for Figure 3, 4, 5 and 6, where the HALA has been removed. The HELA (UBOLA) for the Origin OUs is stored in a separate file, the Origin Location Address Record File (OLARF). Origin OU records in the two files are linked by OUUIs. The linked OLARF file is shown in Figure 2.

Figure 2 — OLARF for Equipment using the Normalized Form of the ReliA Process with Item Identifier and Item Description for reference

Origin Location Address Record File

Item Identifier and Item Descripton are not Part of OLARF. Shown for reference only

| [Unique Unit Identifier] OUUI | [Hierarchical Entity] Universe Based Origin Location Address | | | | |
|---|---|---|---|---|---|
| | Origin Based Hierarchy Level | | | | |
| | [UHL] UBL1 Area | [UHL] UBL2 Site | [UHL] UBL3 Str. | [UHL] UBL4 Sui. | [UHL] UBL5 Frm. |
| 2105 | 101 | 45 | 1 | 01 | 01 |
| 2869 | 103 | 32 | 1 | 00 | 00 |
| 2948 | 103 | 32 | 3 | 00 | 00 |
| 3478 | 101 | 45 | 1 | 01 | 02 |
| 3489 | 101 | 45 | 1 | 01 | 03 |

| Item Identifier [1] | Item Description [2] |
|---|---|
| TCB09 | Telecom Bay A |
| FB1230 | Building, Fiber-Concrete |
| 150HND | Generator Assy. |
| TCB08 | Telecom Bay B |
| TCB09 | Telecom Bay A |

Illustrating the OLARF utilizing the Normalized Form of the ReliA Process. This file supplements the OURF illustrated in Figure 1.

Notes:
1. Item Identifier determined by reference to the OURF with the OUUI.
2. Item Description determined by reference to an IMRF with the Item Identifier
3. The same OLARF applies to the Normalized Form of both the Component Positioning and Component Non-Positioning Addressing Methodologies

Figure 3 - Suite of Telecommunications Equipment
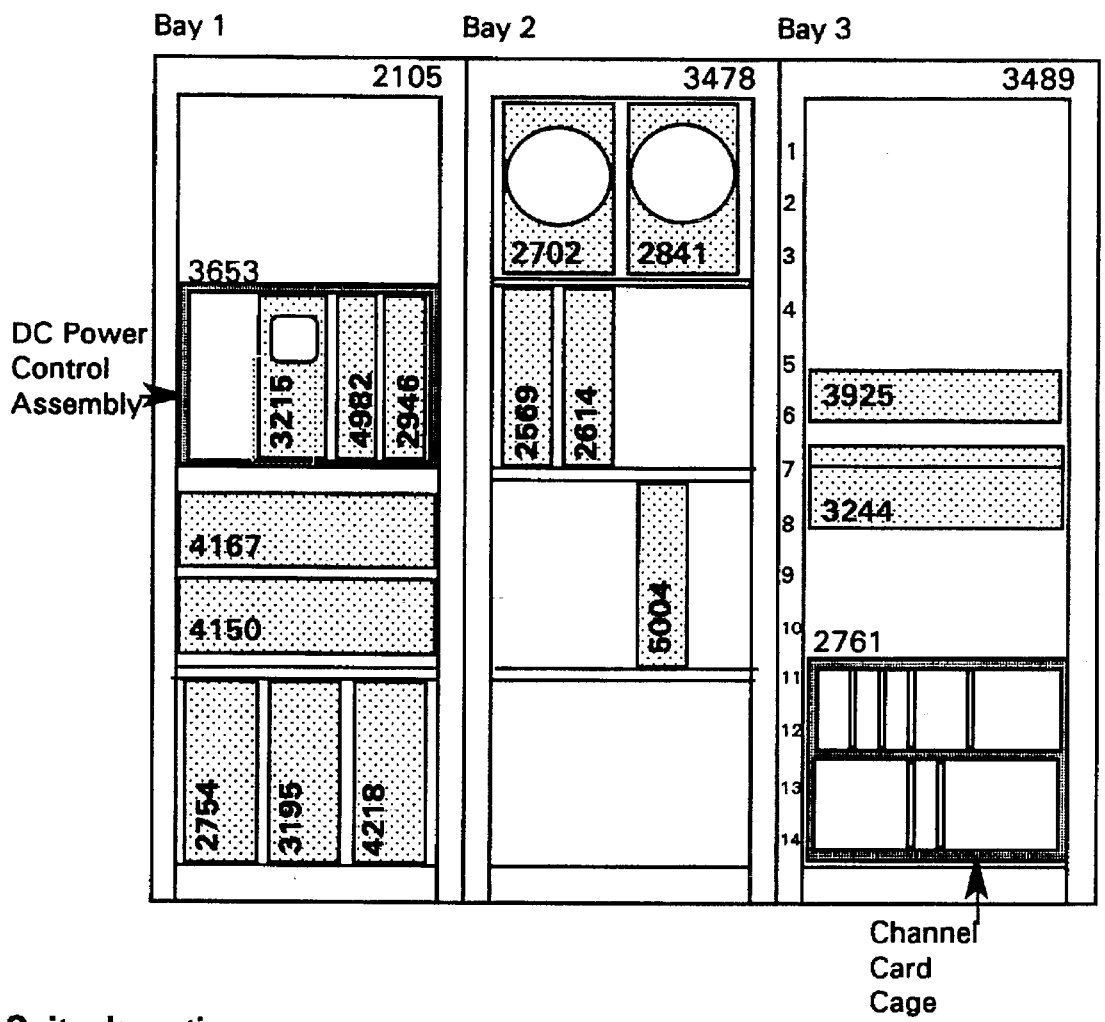
Suite Location
Original Address Schema: Area 101, Site 45, Suite 1
Modified Address Schema: Area 101, Site 45, Structure 1, Suite 1

Figure 4 - Telecommunicaitons Site Layout
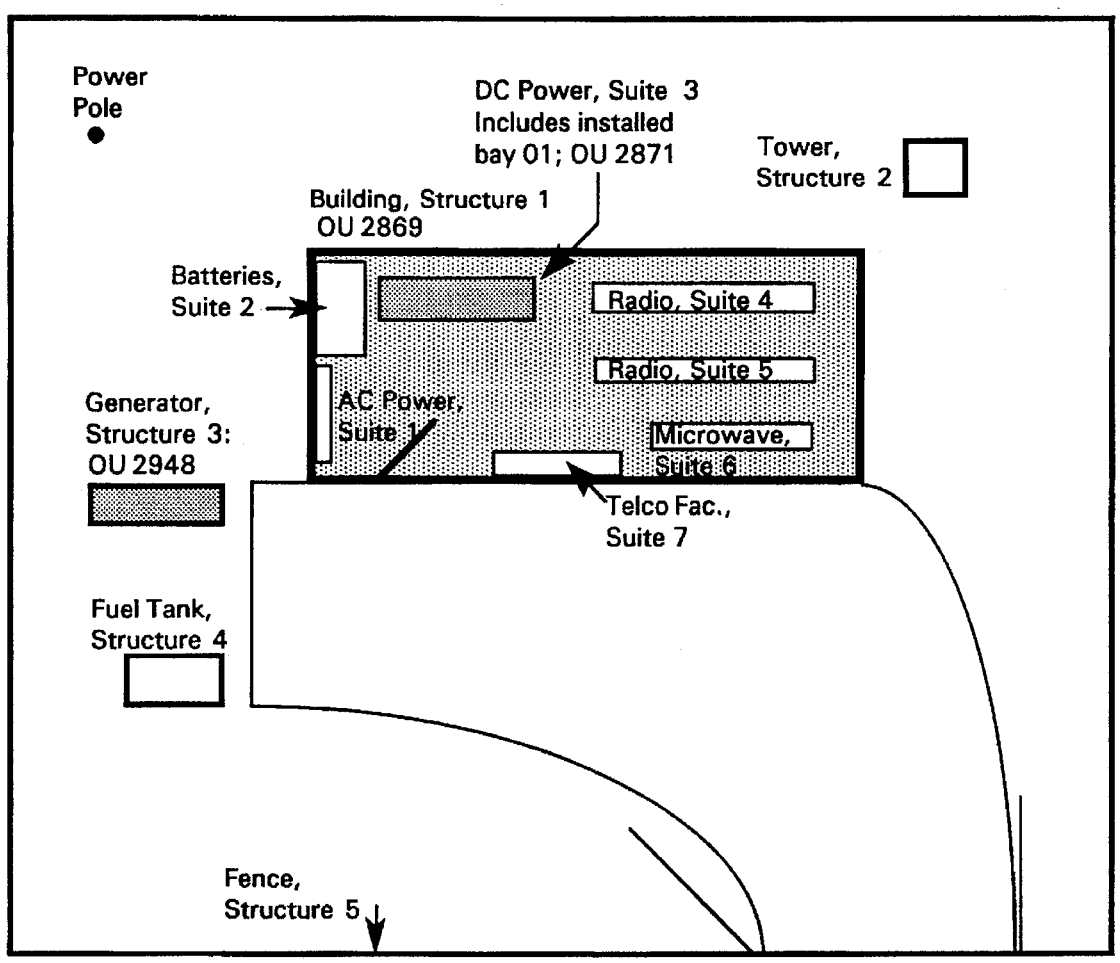
Site Location: Area 103, Site 32,
DC Power, Suite 3, is shown in detail in Figure 6[5].
Generator is shown in detail in Figure 5

Figure 5 - Generator
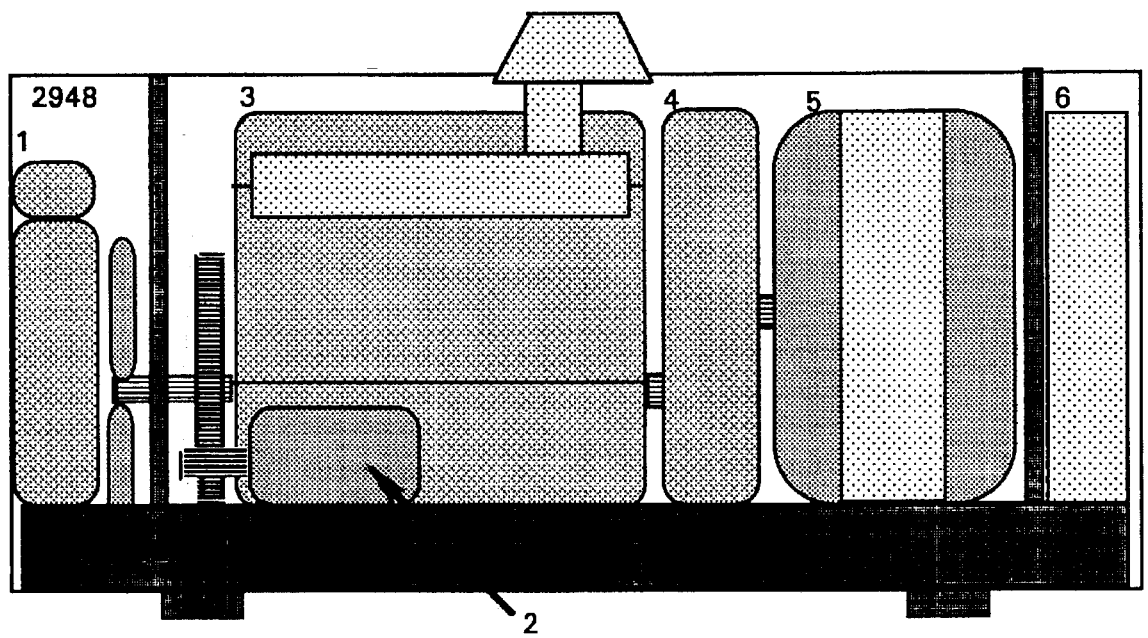
Generator Location
Original Address Schema: Area 103, Site 32, Suite13
Modified Address Schema: Area 103, Site 32, Structure 3, Suite 0
Generator Assembly
Key Systems With Position:
1 - Radiator
2 - Starter
3 - Engine,Gasoline
4 - Differential and Clutch
5 - Generator
6 - Control Pannel

Figure 6 — D.C. Power Suite - Partial
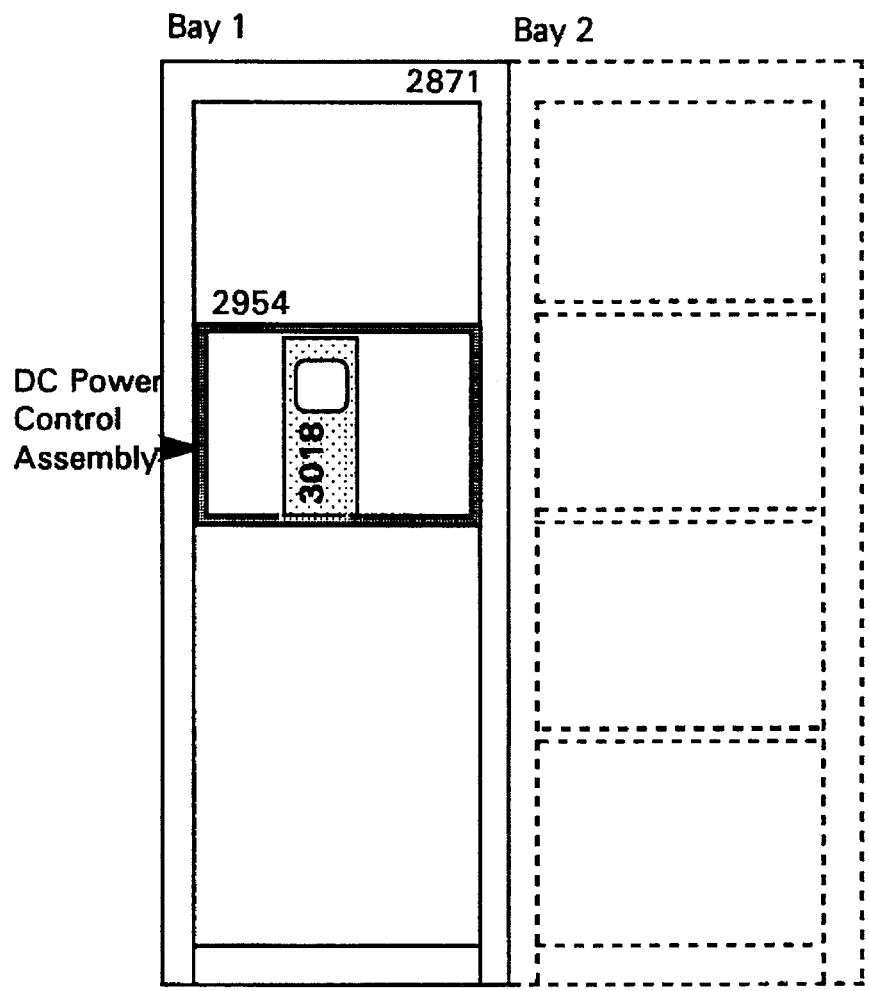
Suite Location
Revised Address Schema: Area 103, Site 32, Structure 1, Suite 3
DC Power Meter Assembly
Exlopded Board View
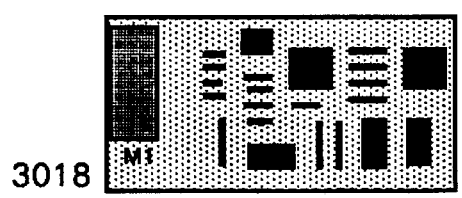

Figure 7 - Bay of Electronic Cards
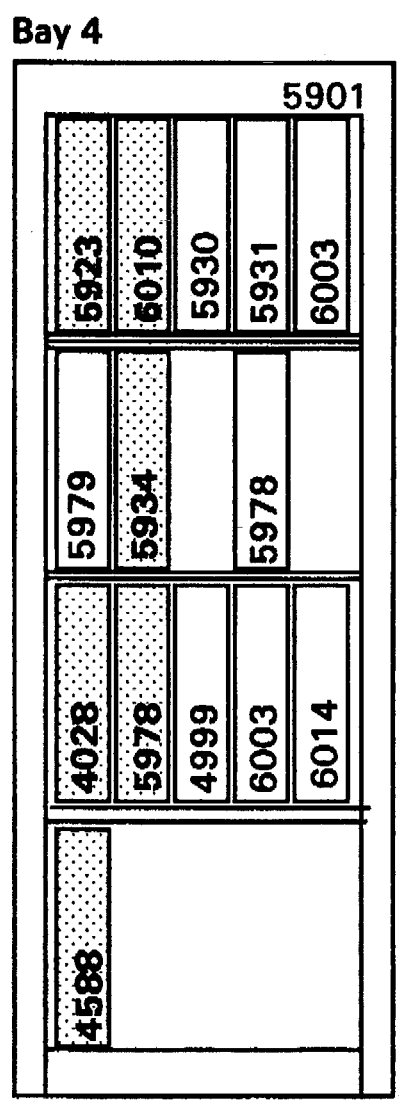

Fig. 8; Pg 1 of 3:
0100 - ReliA General Evaluaton Procedure Flowchart
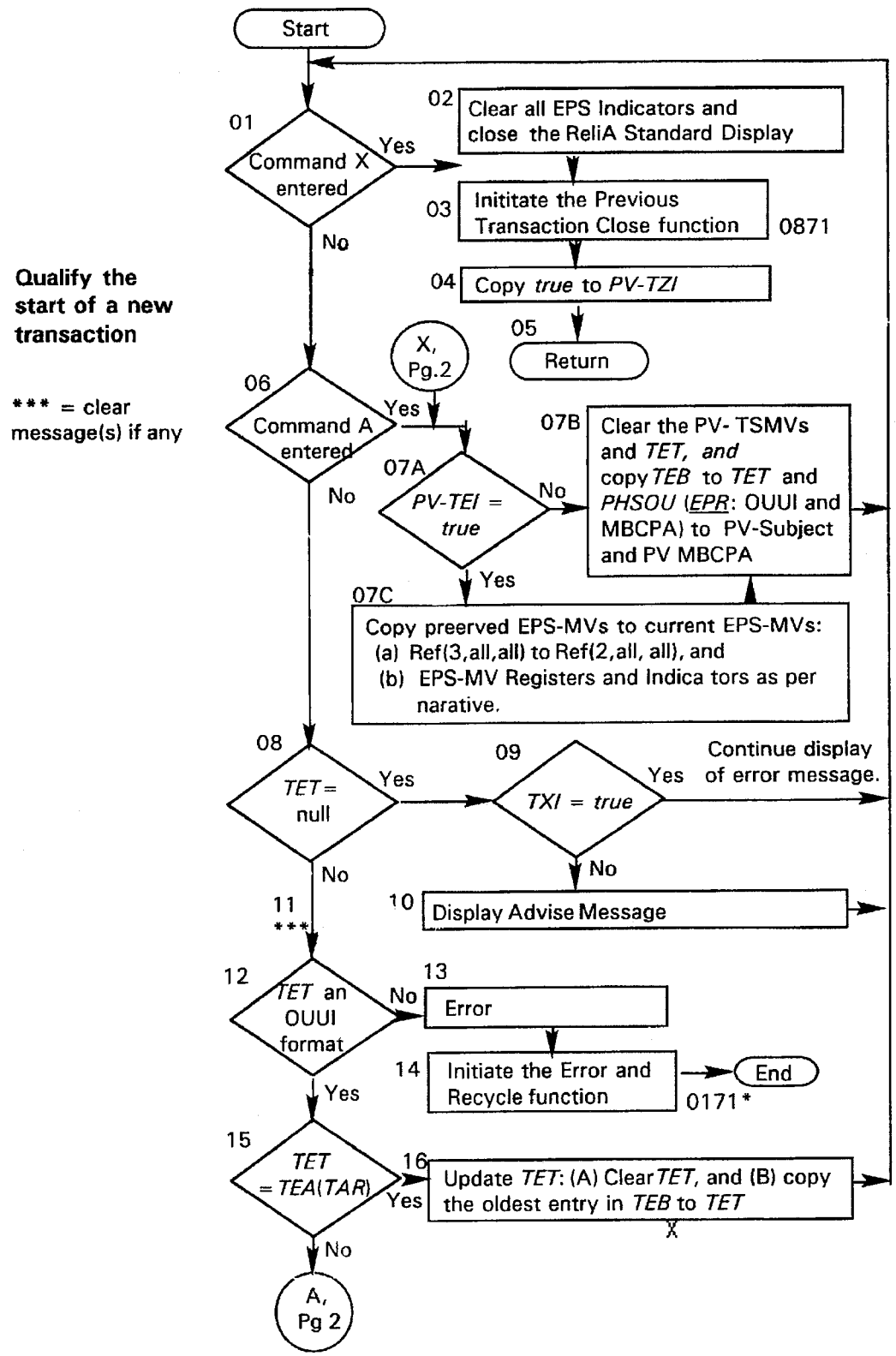

Fig. 9; Pg 2 of 3:
0100 - ReliA General Evaluaton Procedure Flowchart
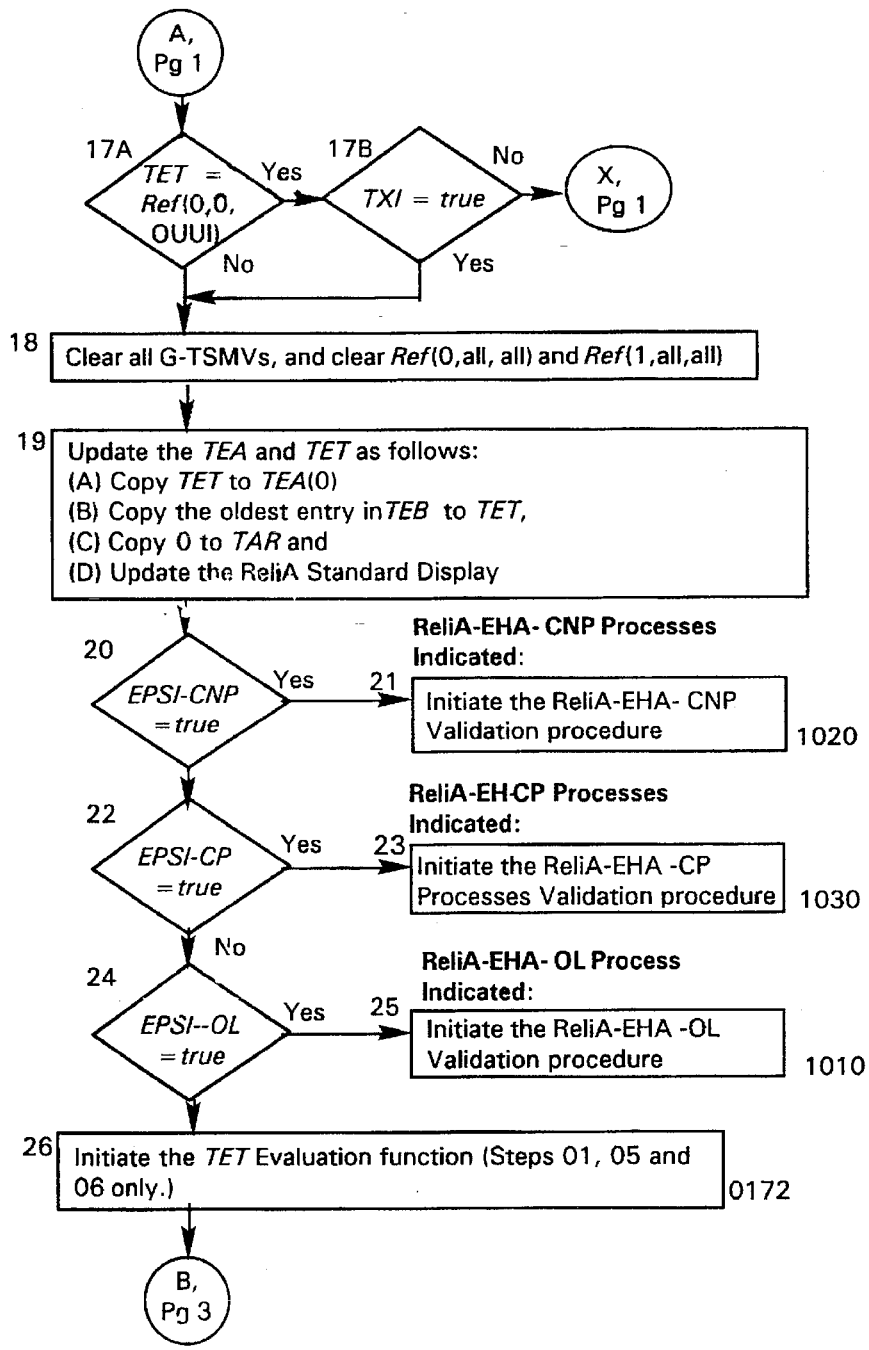

Fig. 10; Pg 3 of 3:
0100 - ReliA General Evaluaton Procedure Flowchart
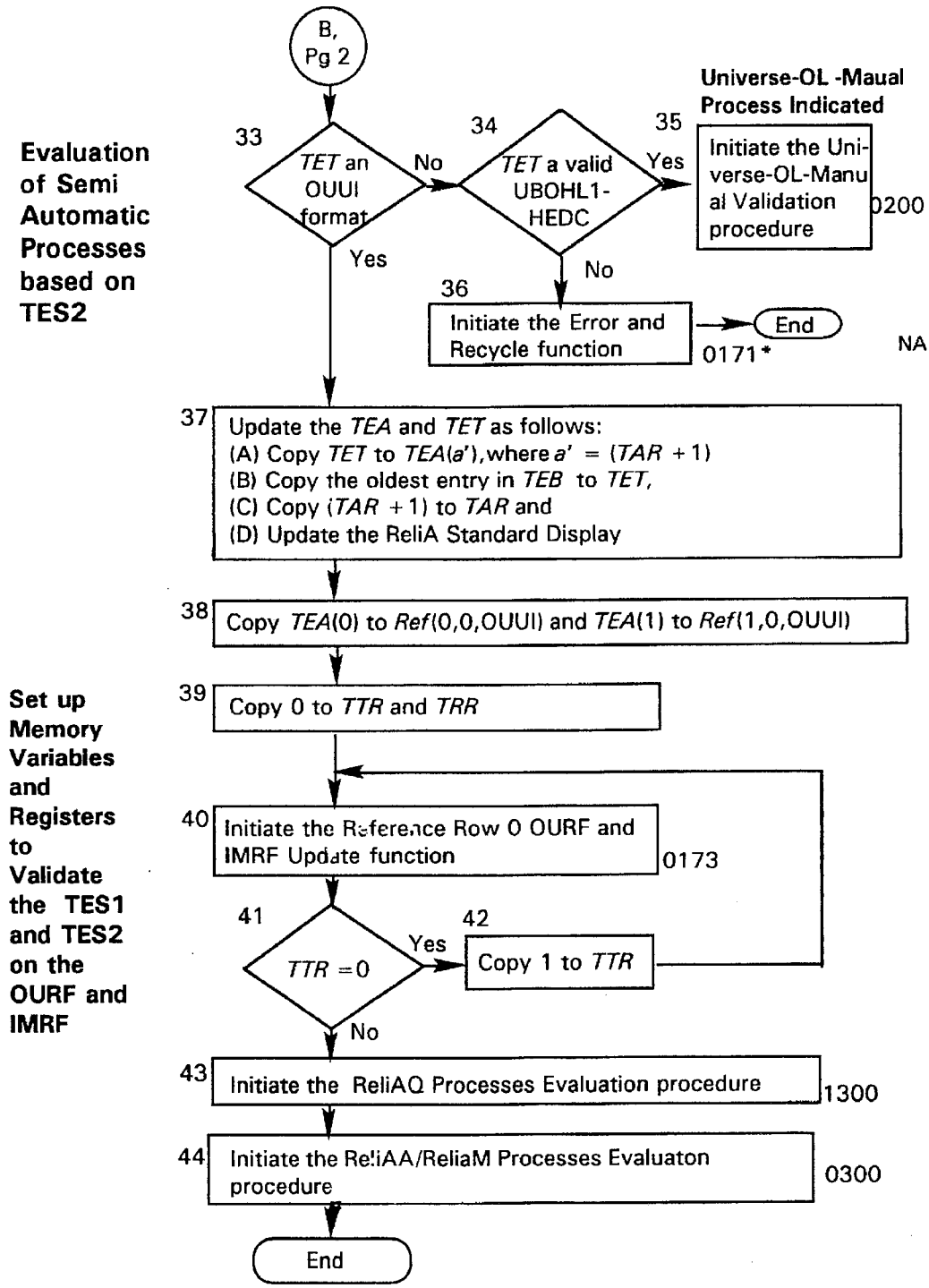

Fig. 11;
0172 - TET Evaluation Function Flowchart
For TET Evaluation function on a non-enabled ReliA process omit steps 02 and 07
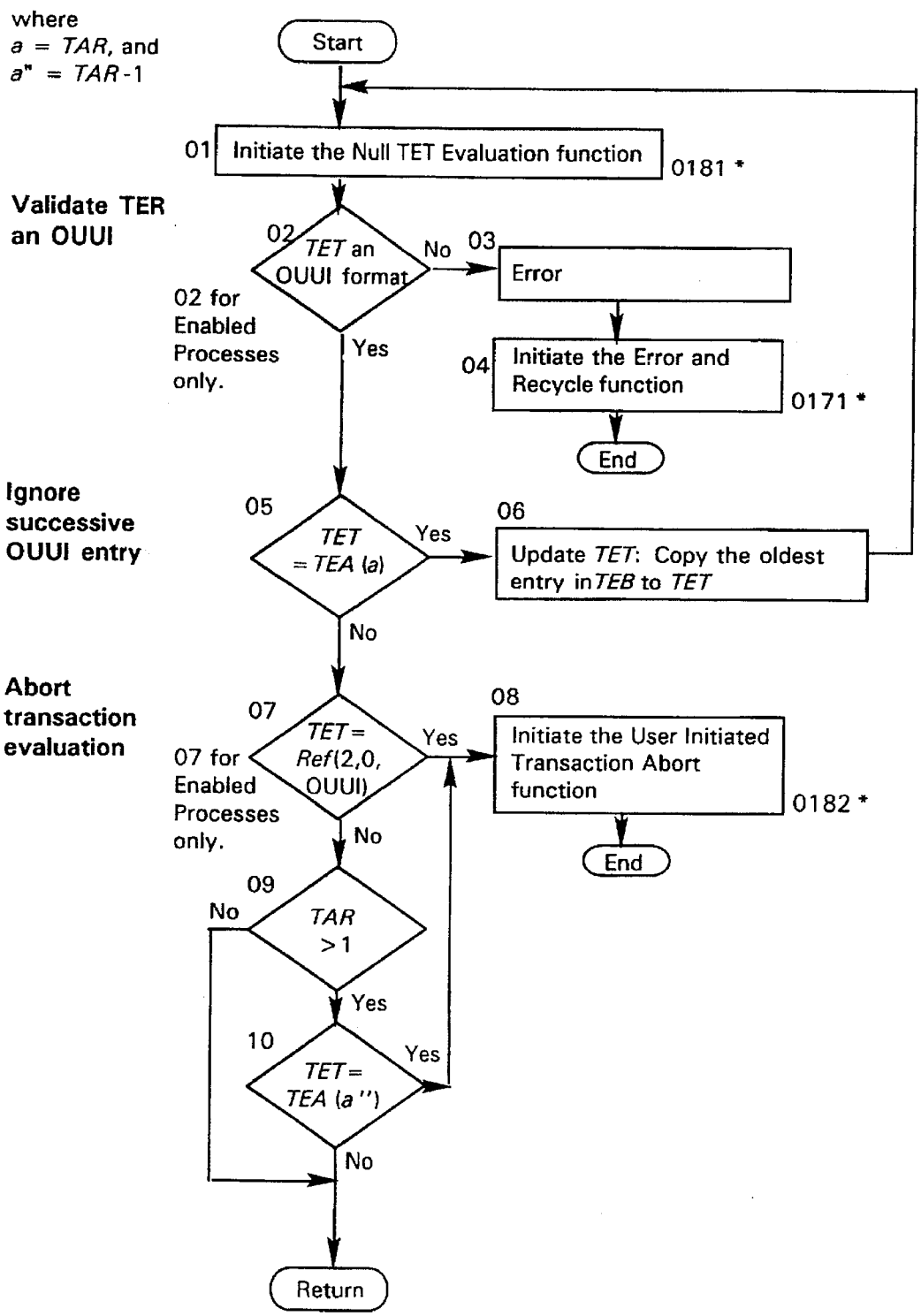

Fig. 12;
0200 — Universe-OL-Manual Validation Procedure Flowchart
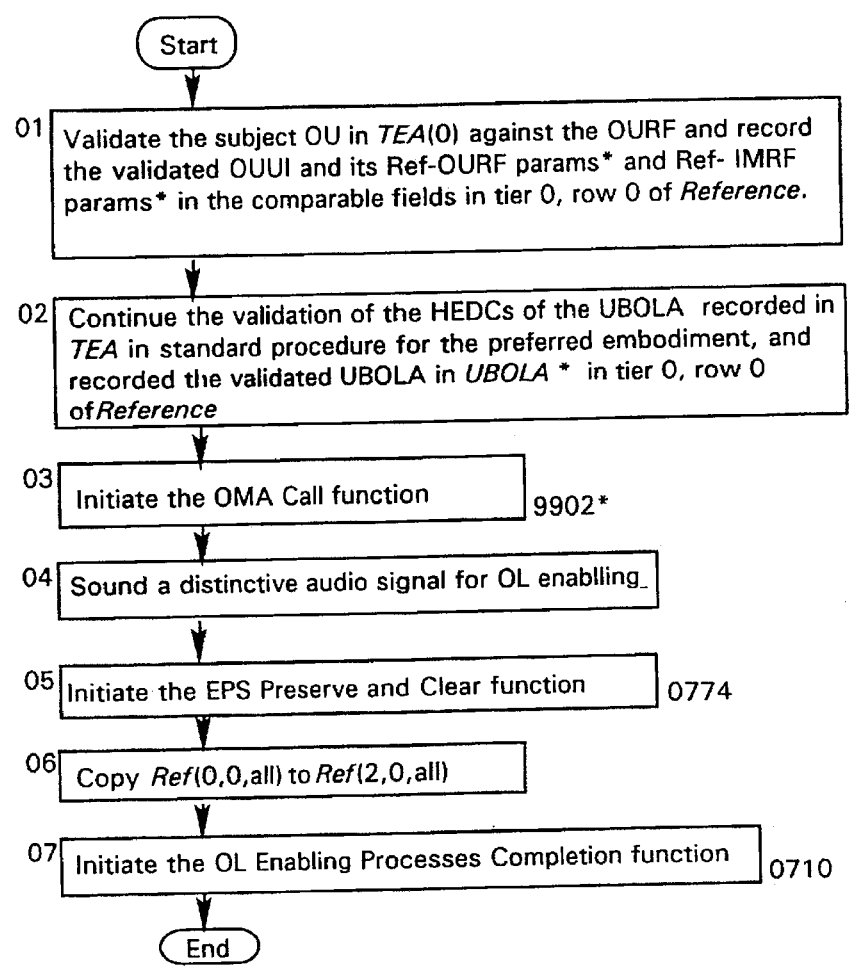

Fig. 13;
0300 — ReliAA/ReliAM Processes Evaluation Procedure Flowchart
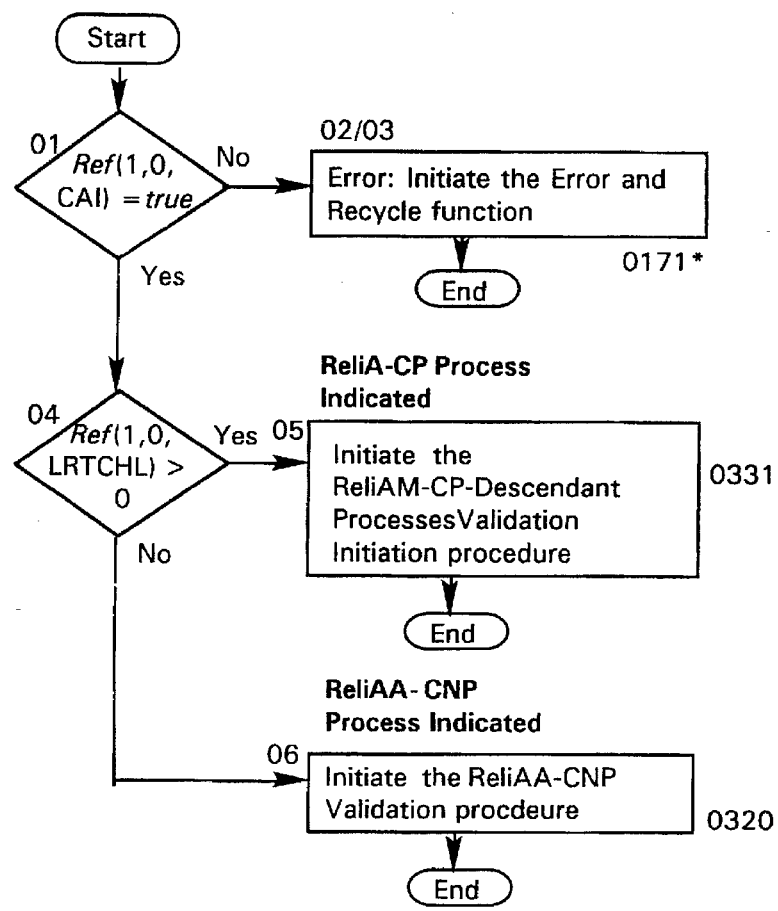

Fig. 14;
0320 — ReliAA-CNP Validation Procedure Flowchart
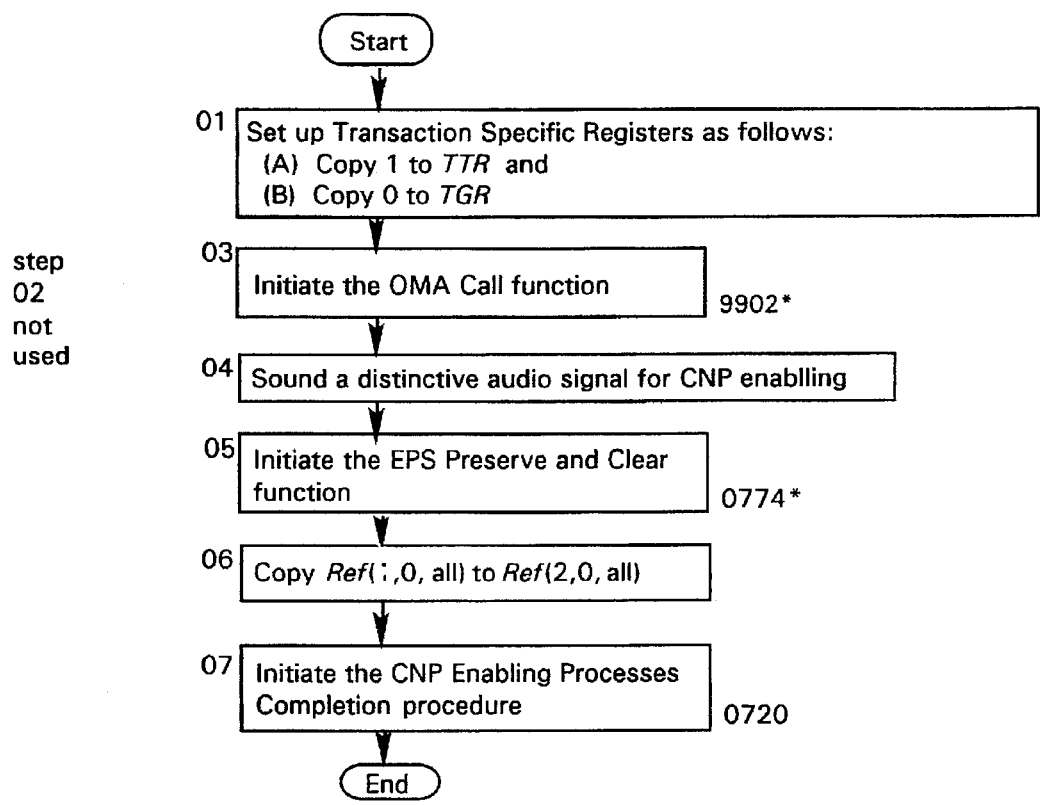

Fig. 15;
0331 — ReliAM-CP-Descendant Processes Validation Initiation Procedure Flowchart
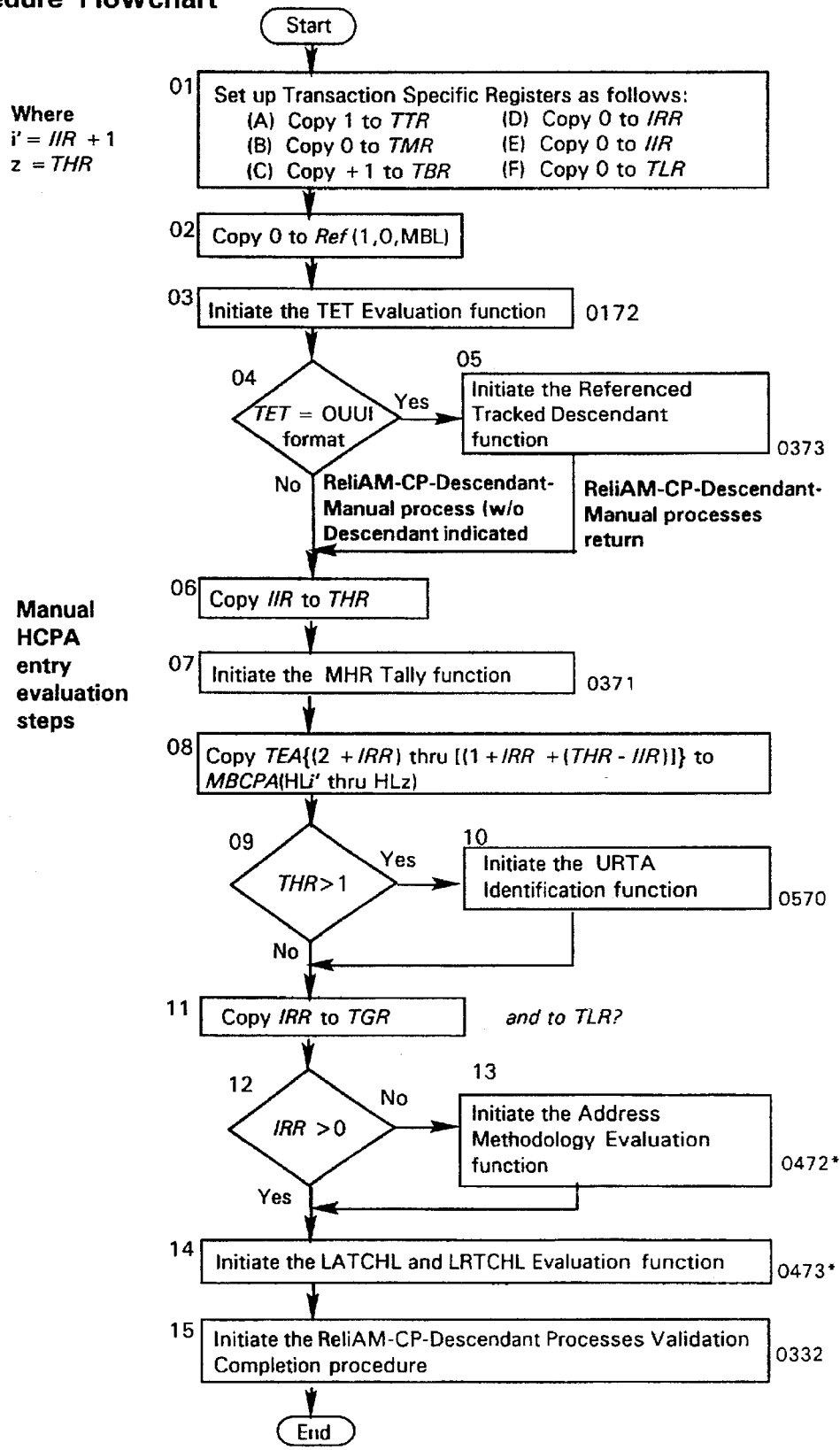

Fig. 16;
0332 — ReliAM-CP-Descendant Processes Validation Completion Procedure Flowchart
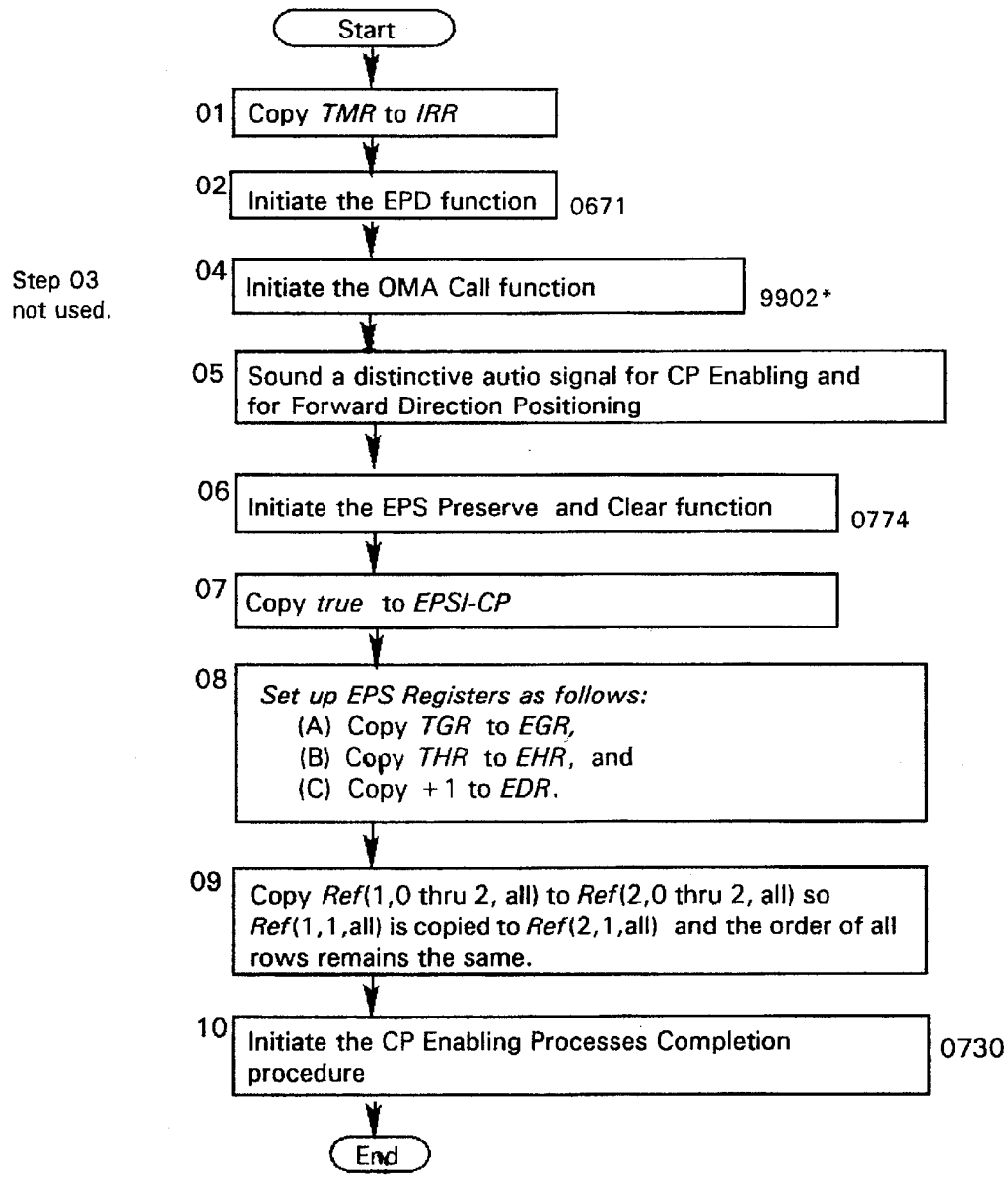

Fig. 17;
0371 — MHR Tally Function Flowchart
Validates HRPNs recorded as part of a HCPA and calculates and evaluates the HR of the HCPA recorded by the net change in *THR*.
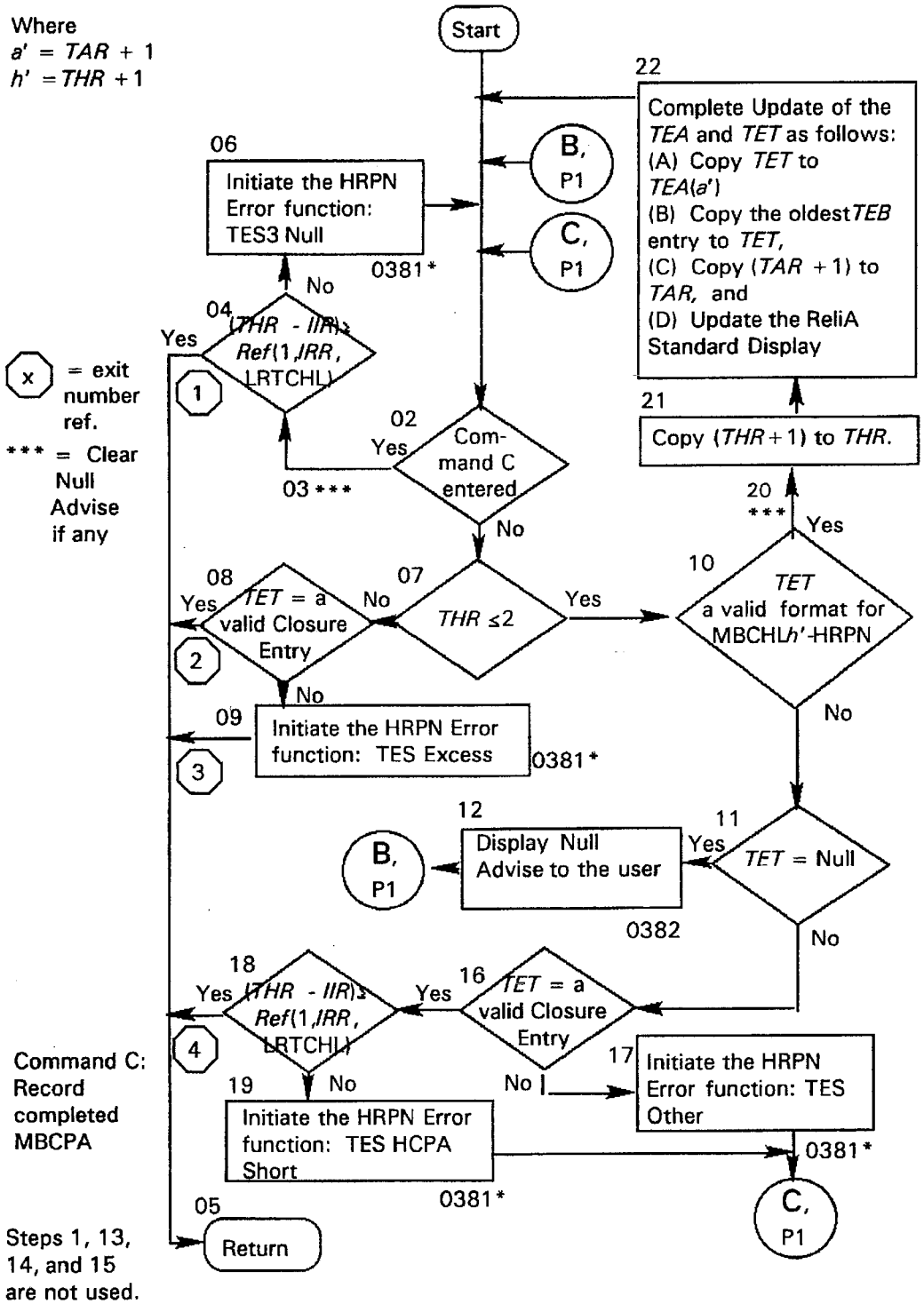

0373 — Referenced Tracked Descendant Function Flowchart

Fig. 19;
0383 - IIR, MBL, and MBCPA Update Function
Where
$t = TTR$,
$r = IRR$
$r' = (r + 1) = (IRR + 1)$
$u = IUR$
$i' = (IIR + 1)$
$iu = IIR + IUR$
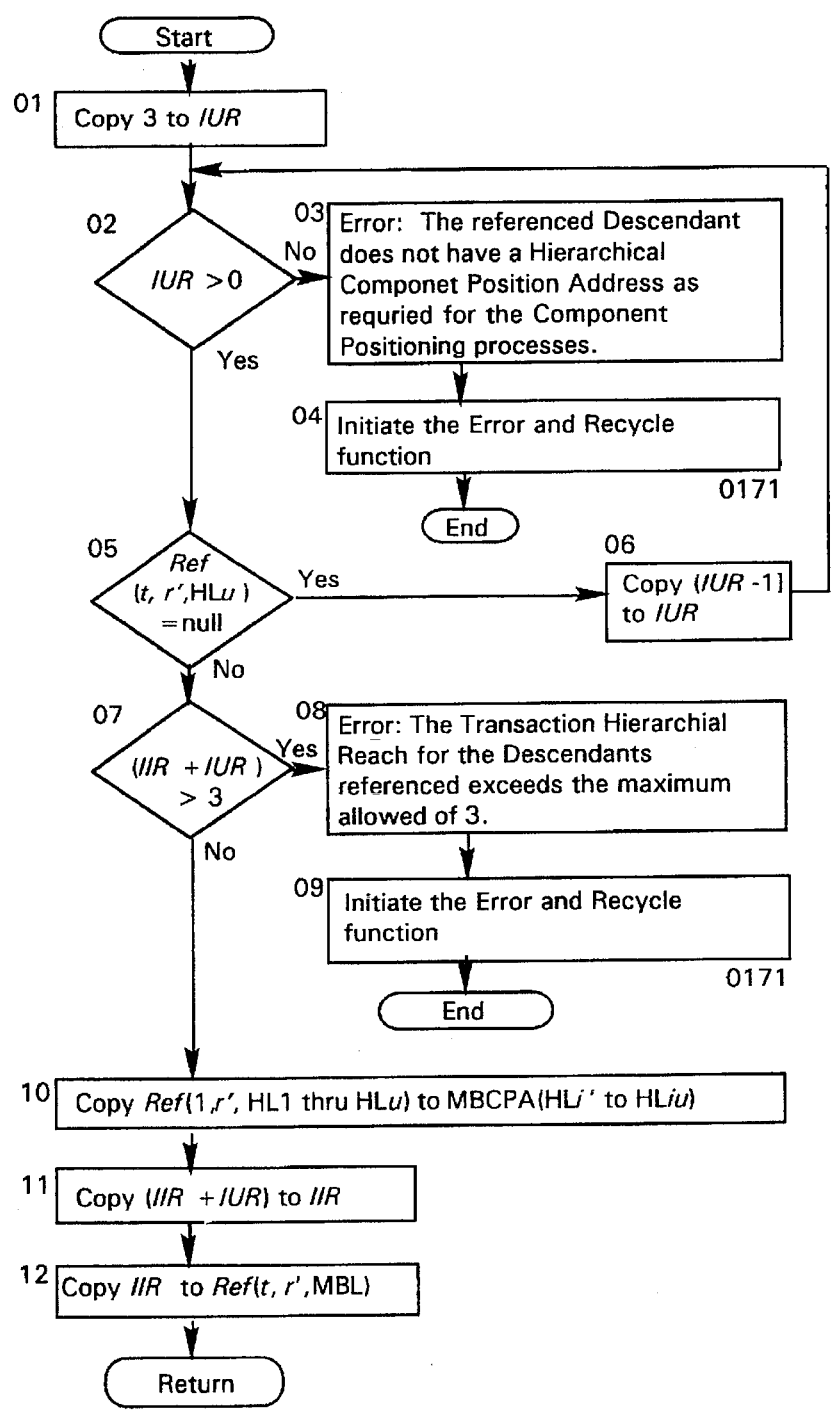

Fig. 20;
0570 -URTA Identification Function Flowchart
Identifies Unreferenced, Tracked Matriarch Descendant Ancestors in a Matriarch Based Component Position Address. A top down identification of tracked Matriarch Descendant Ancestors of the Subject OU based on congruent HieraRelational Positions.
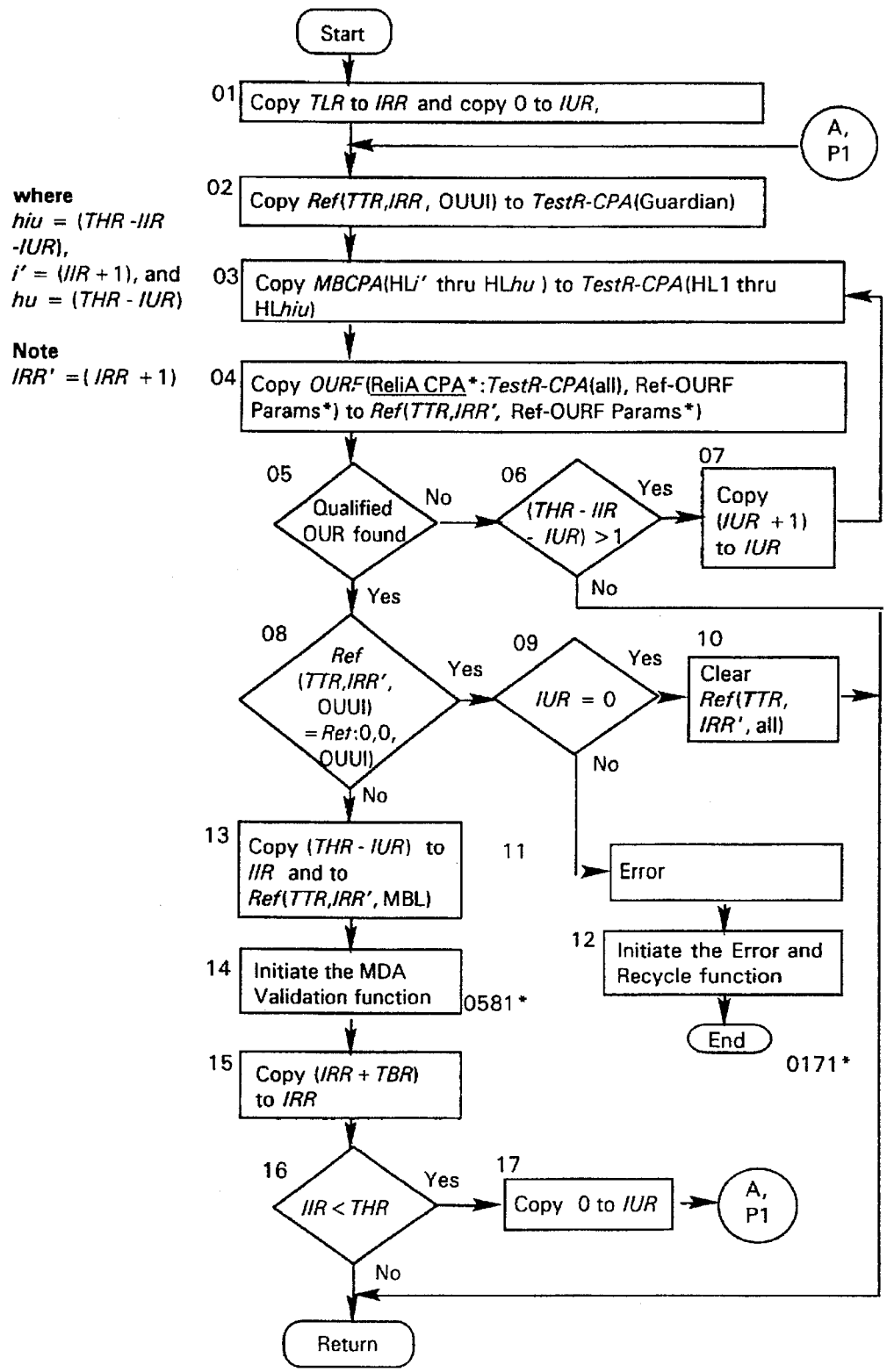

Fig. 21;
0671 -End of Parent Determination Function Flowchart
Where
v = TR1
w = TR2
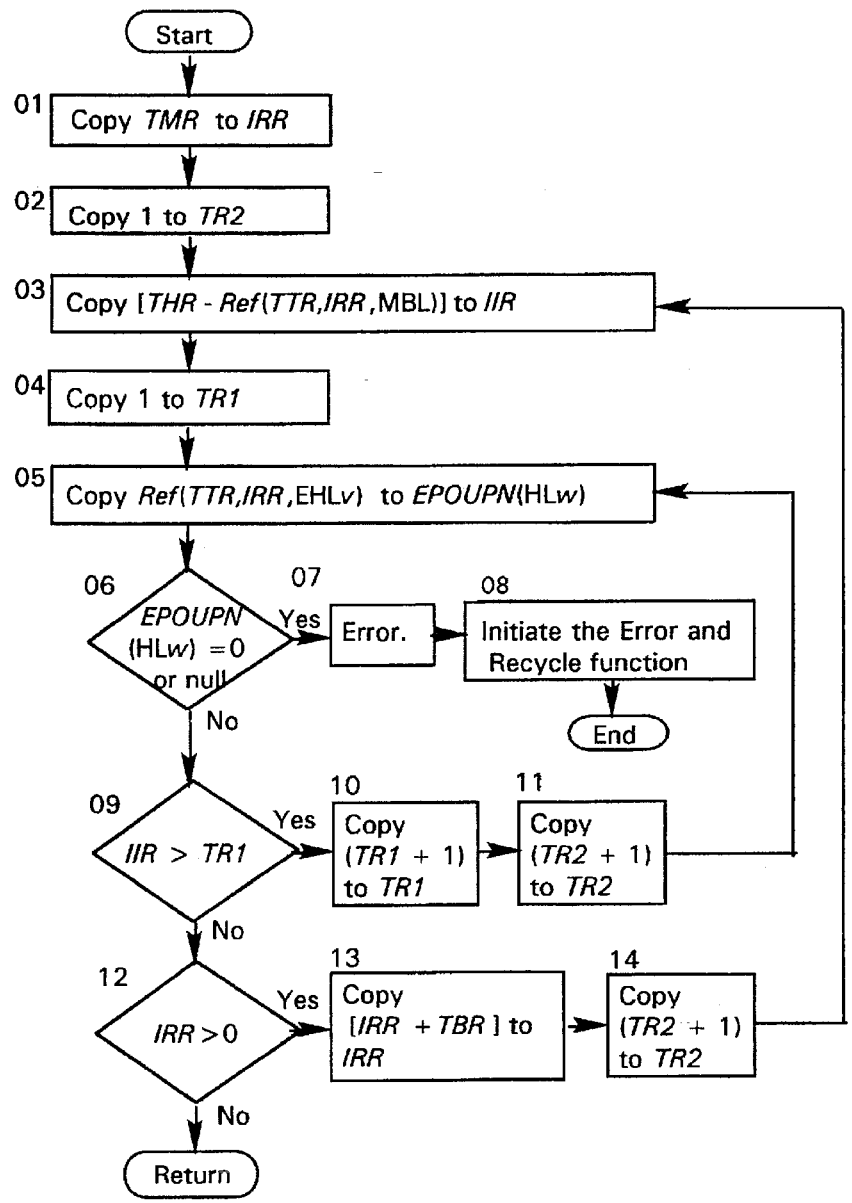

Fig. 22;
0710 – OL Enabling Processes Completion Procedure Flowchart
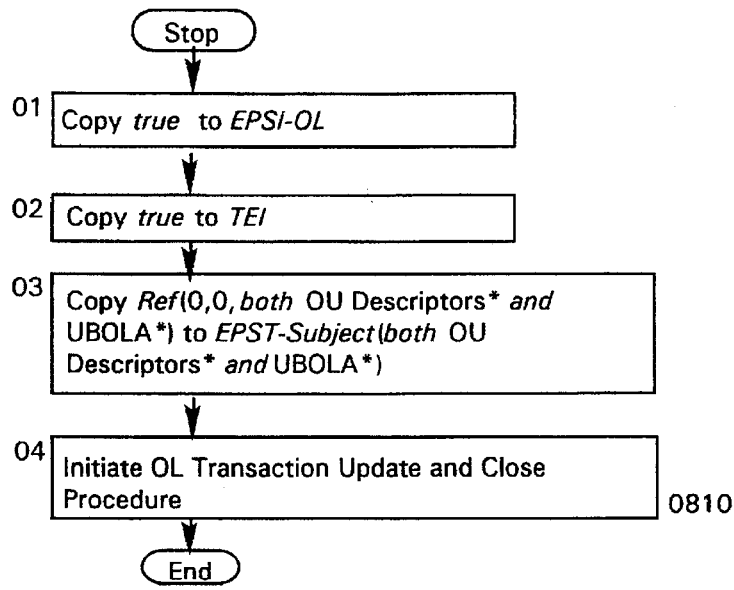
v.04, 08/06/94
0720 - CNP Enabling Processes Completion Procedure Flowchart
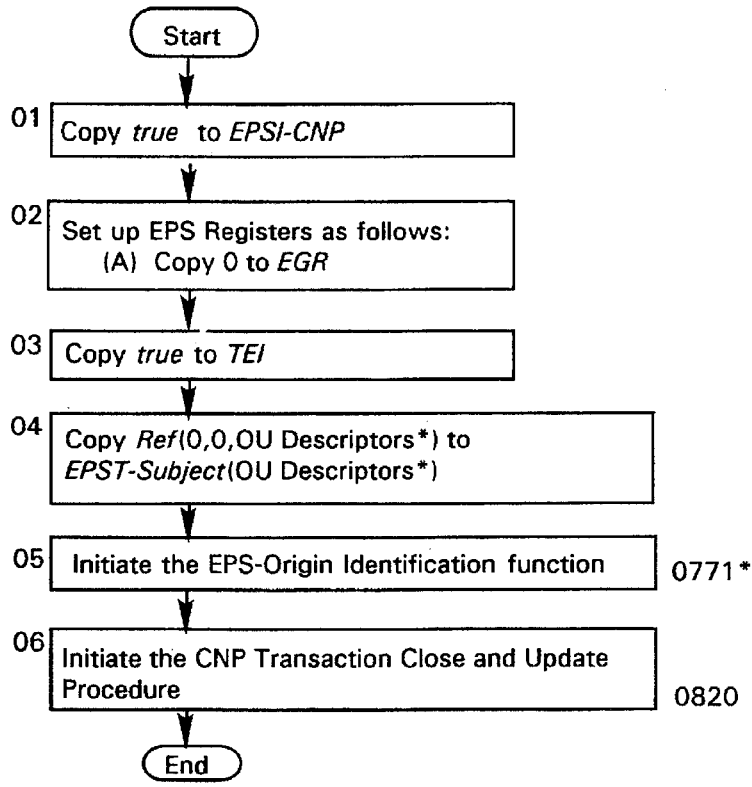

Fig. 23;
0730 - CP Enabling Processes Completion Procedure Flowchart
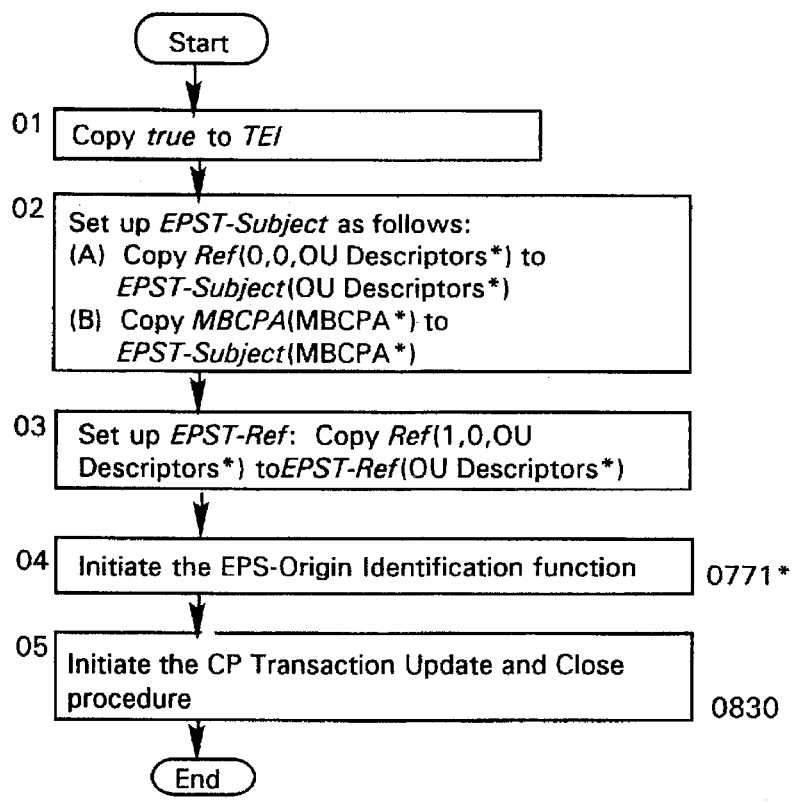

Fig. 24;
0810 — OL Transaction Update and Close Procedure Flowchart
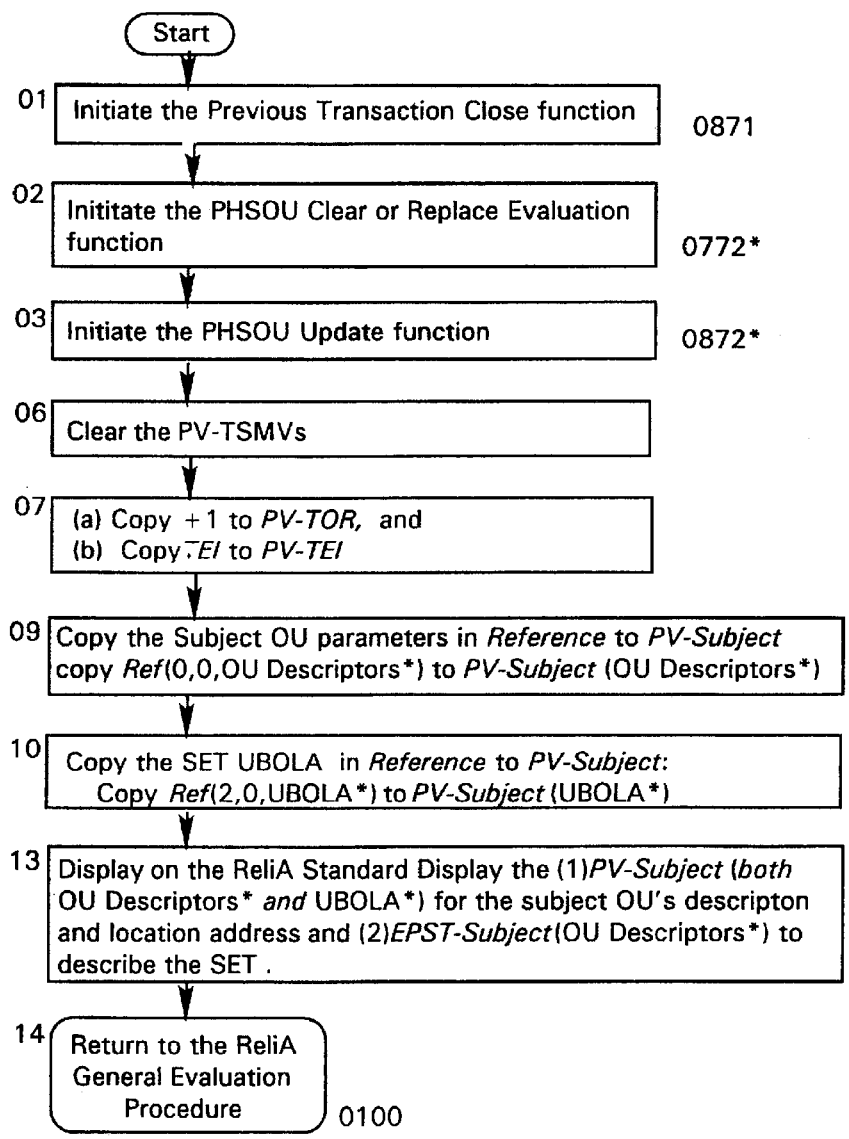

Fig. 25;
0820 — CNP Transaction Update and Close Procedure Flowchart
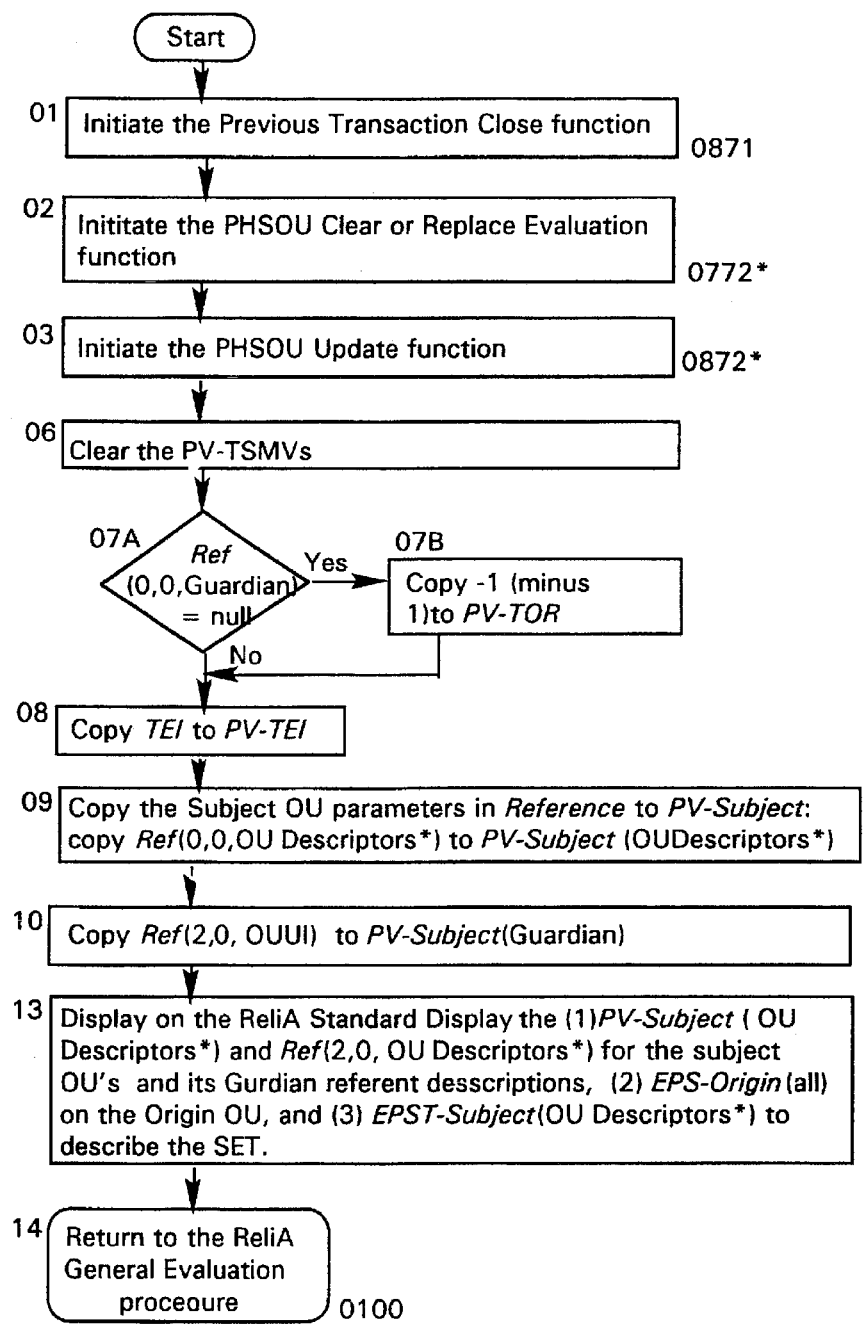

Fig. 26;
0830 — CP Transaction Update and Close Procedure Flowchart
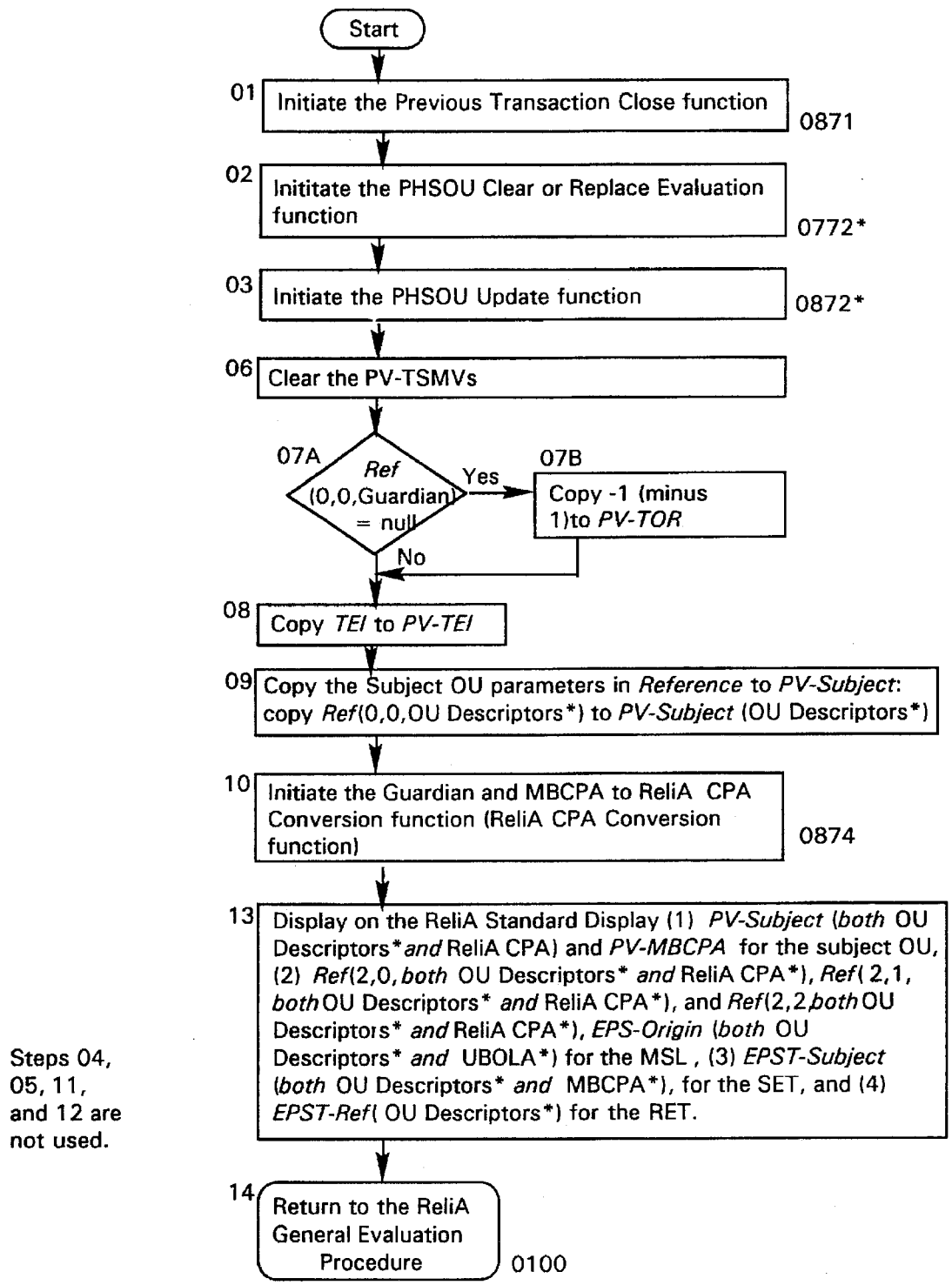

Fig. 27;
0871 — Previous Transaction Close Function Flowchart
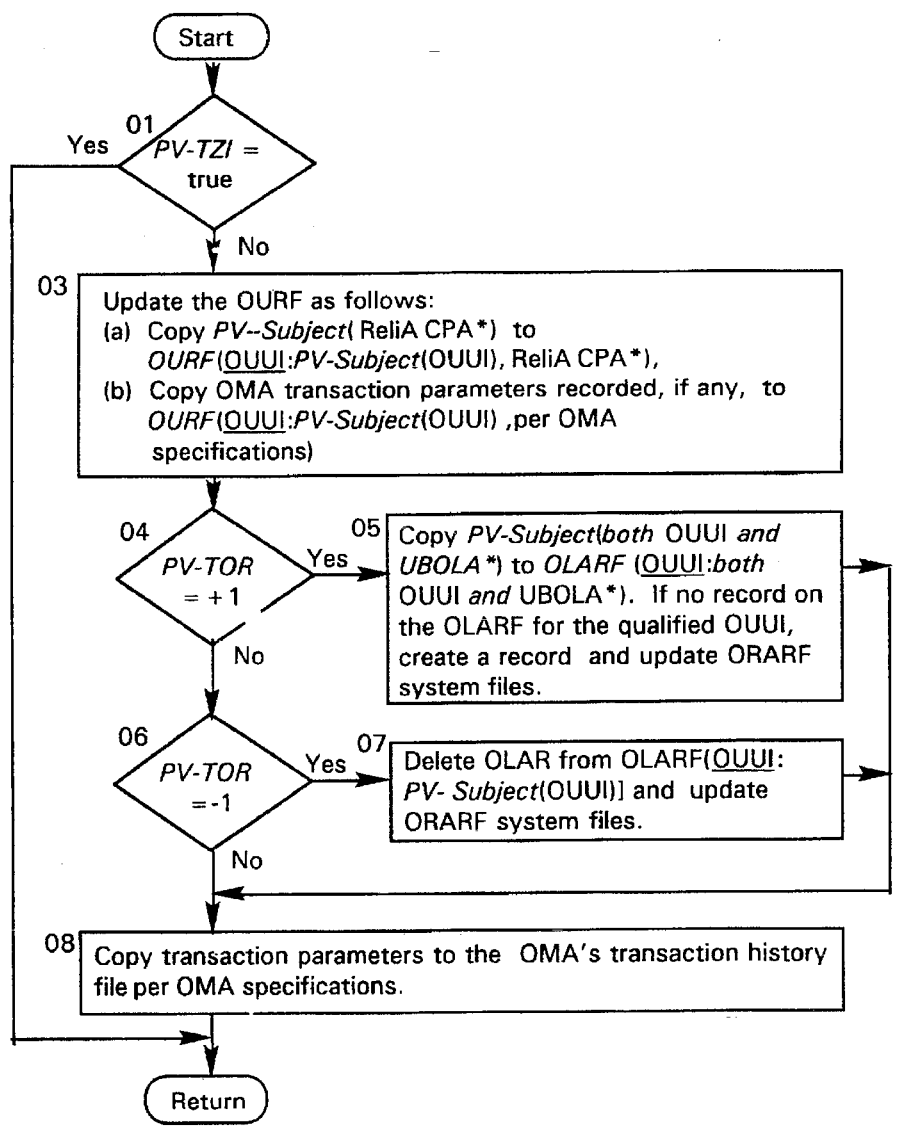

Fig. 28;
0874 — Guardian and MBCPA to ReliA CPA Conversion Function Flowchart
Converts a Matriarch Based Component Position Address for the Subject OU to a ReliA Component Position Address based on the indicated Guardian of the Subject OU.
where
$m' = [EHR - IIR) + 1]$,
$h = EHR$, and
$i = IIR$
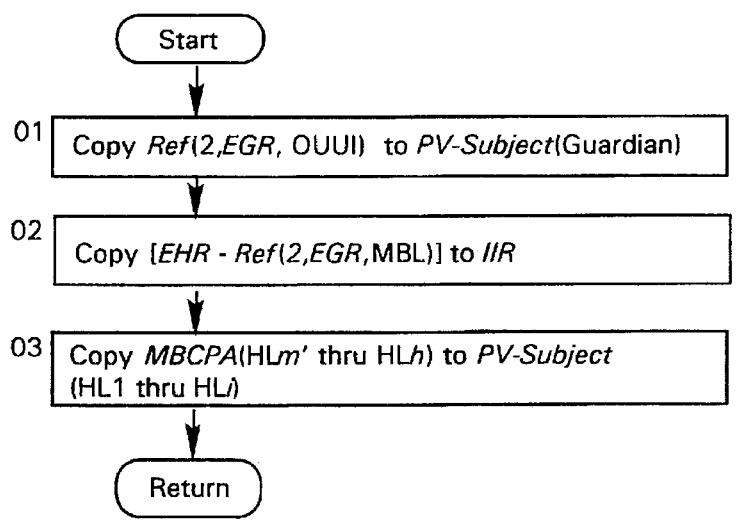

Fig. 29;
1010 — ReliA-EHA-OL Validation Procedure Flowchart
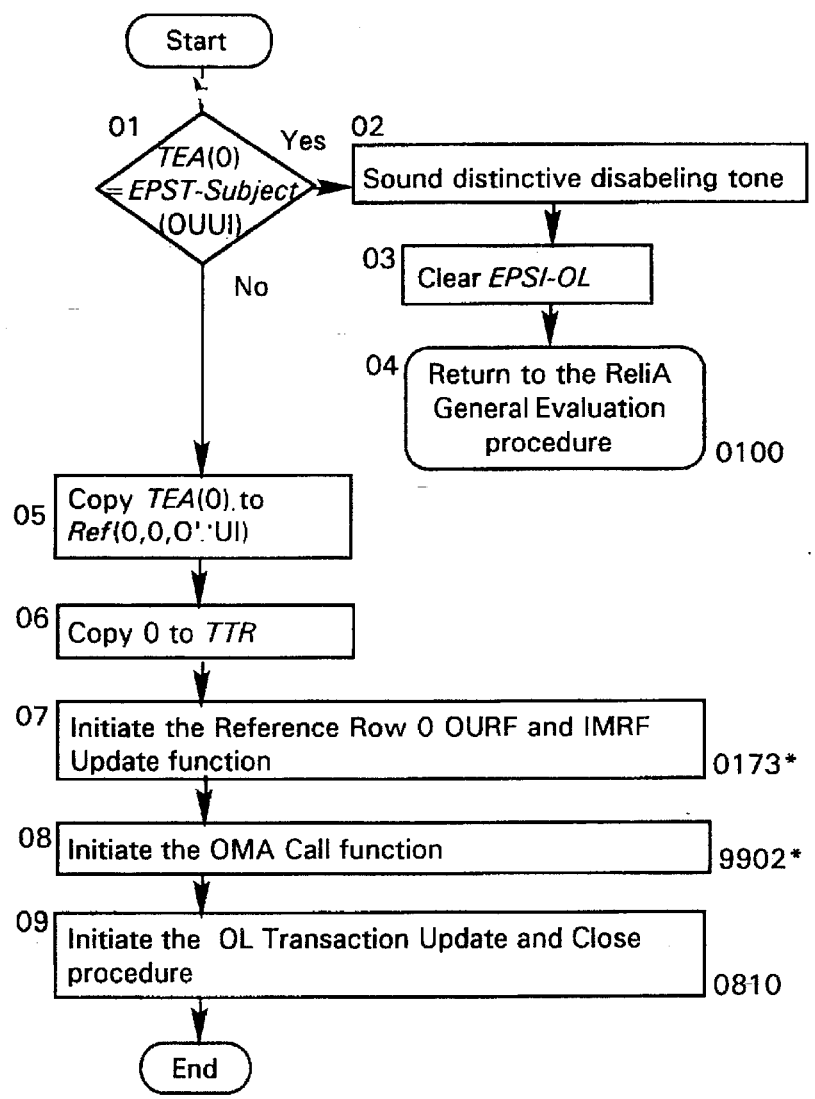

Fig. 30;
1020 - ReliA-EHA-CNP Validation Procedure Flowchart
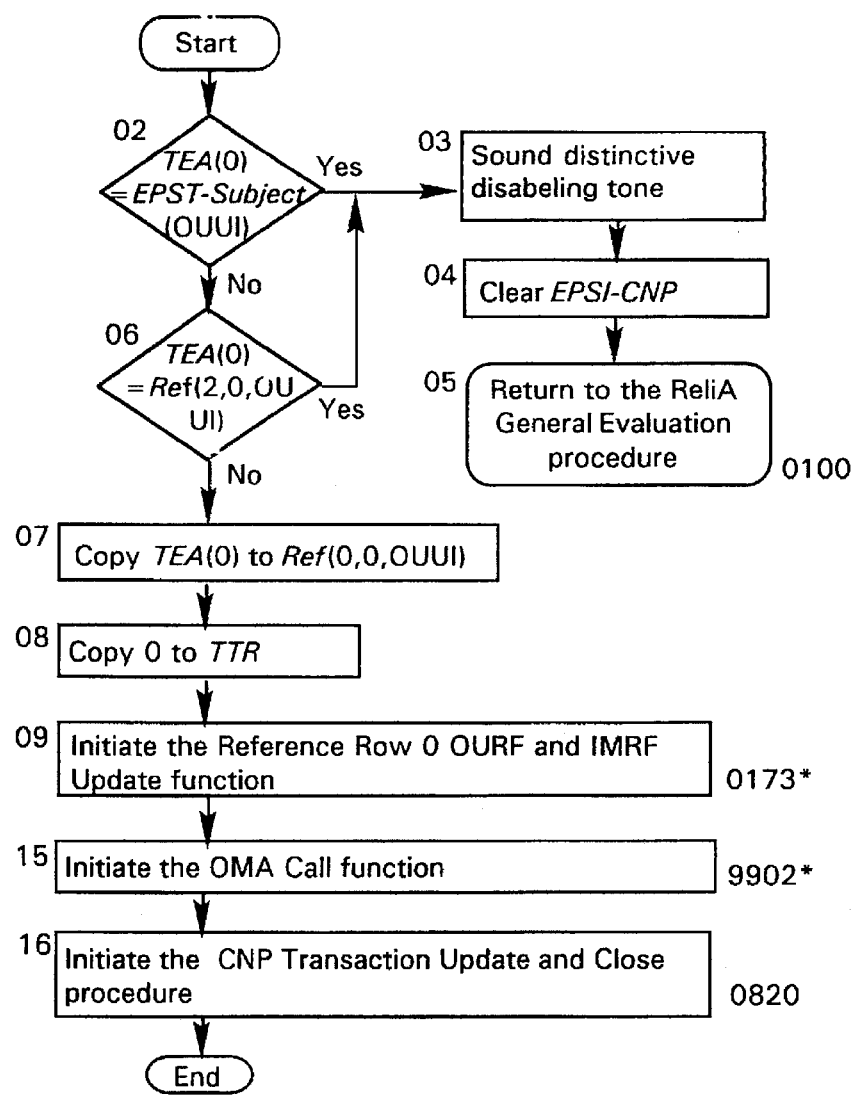
Steps 10 through 14 are not used.

Fig. 31; Pg 1 of 2
1030 - ReliA-EH-CP Processes Evaluation Flowchart
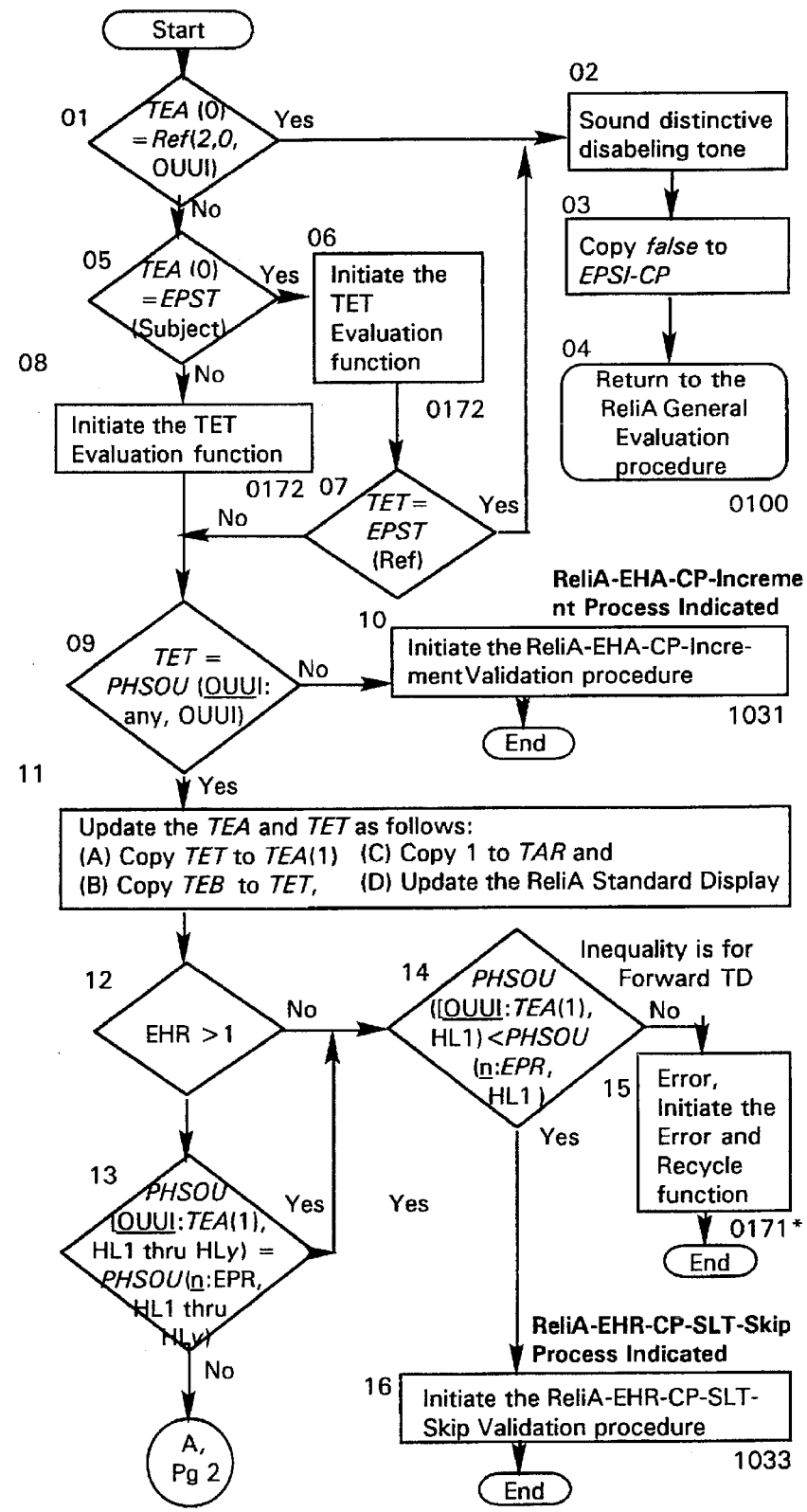

Fig. 32; Pg 2 of 2
1030 - ReliA-EH-CP Processes Evaluation Flowchart
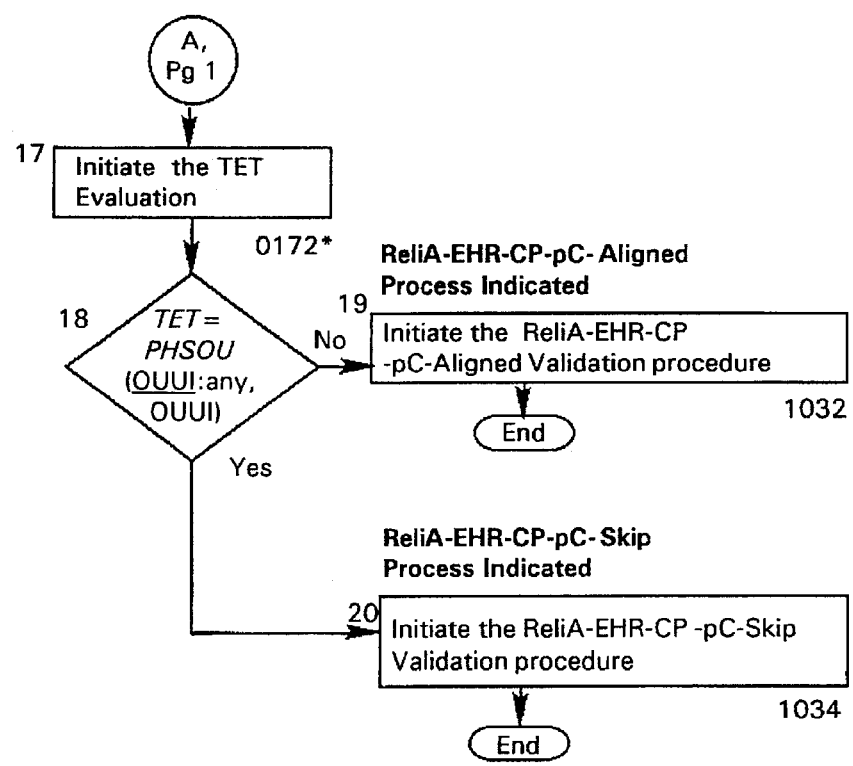

Fig. 33;
1031-ReliA-EHA-CP-Increment Validation Procedure Flowchart
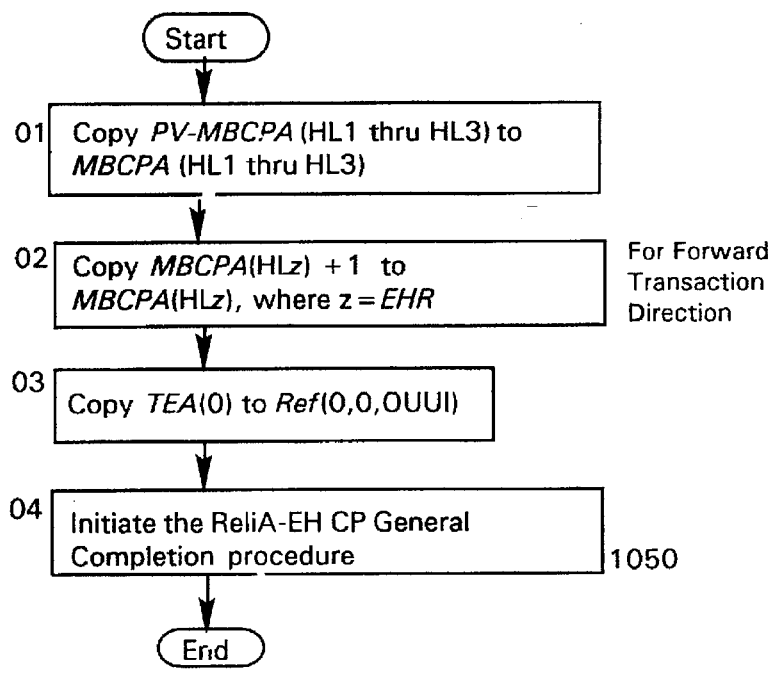

Fig. 34;
1032 - ReliA-EHR-CP-pC-Aligned Validation Procedure Flowchart
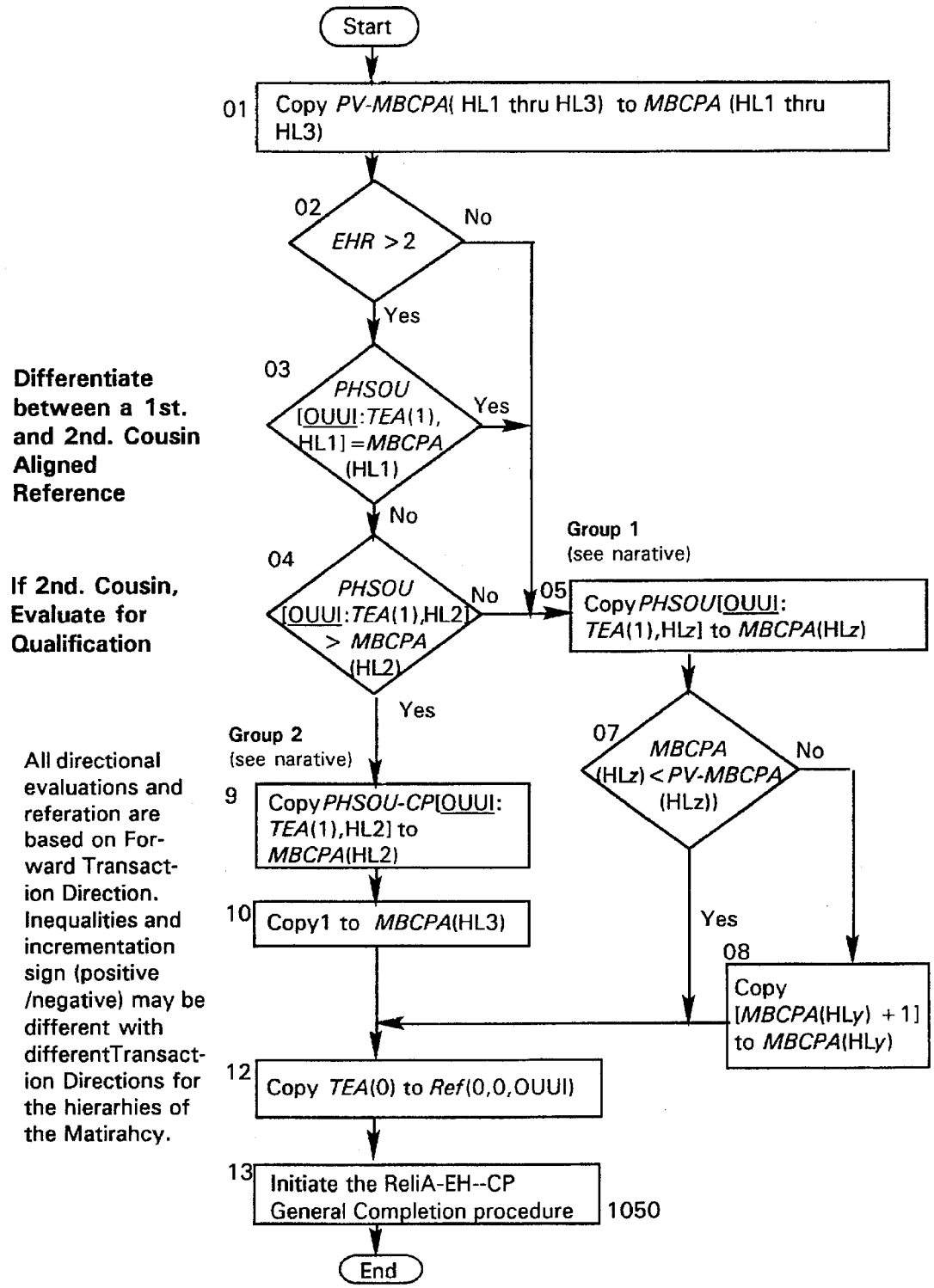

Fig. 35;
1033 - ReliA-EHR-CP-SLT-Skip Validation Procedure Flowchart
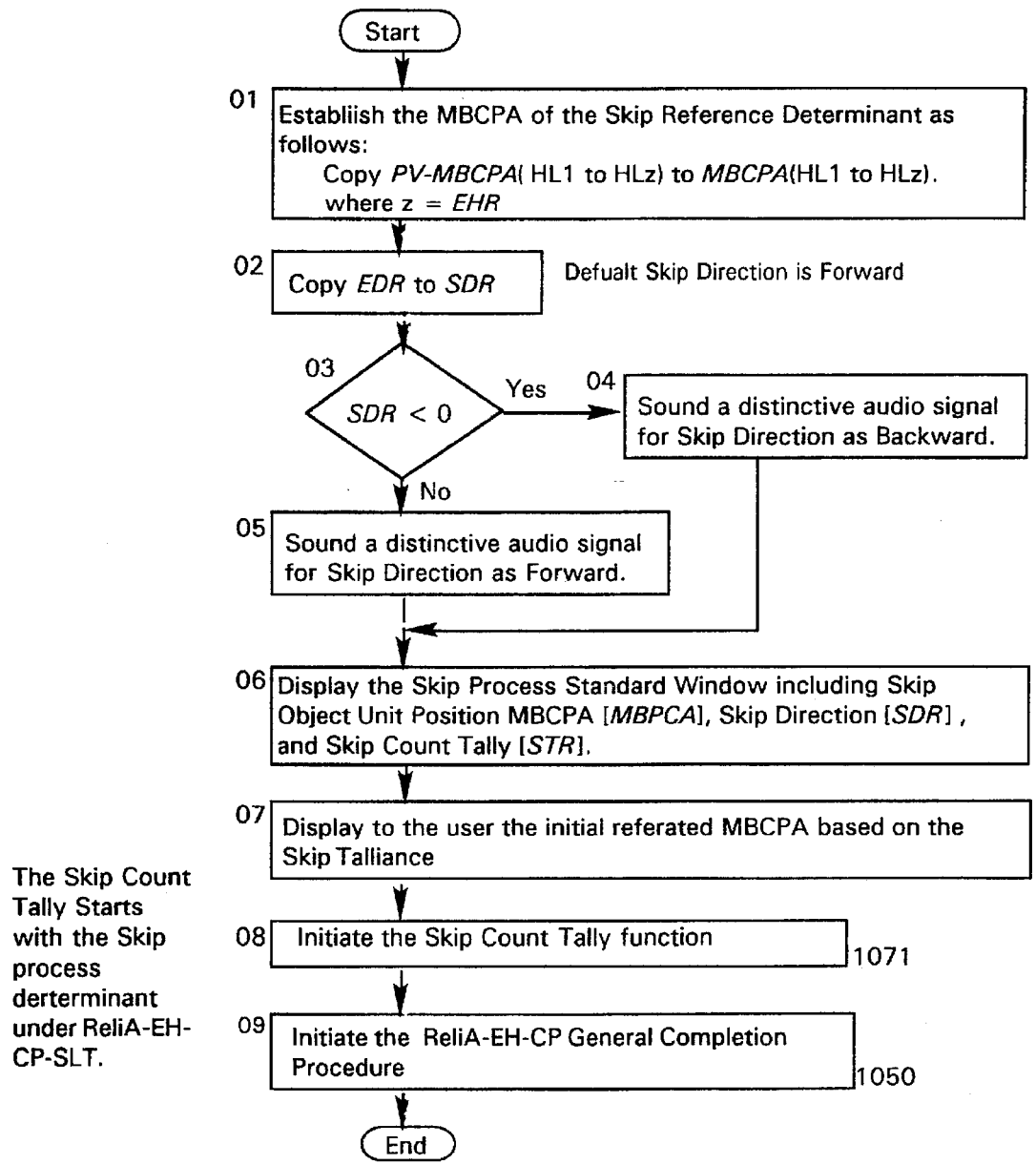

Fig. 36;
1034 — ReliA-EHR-CP-pC-Skip Validation Procedure Flowchart
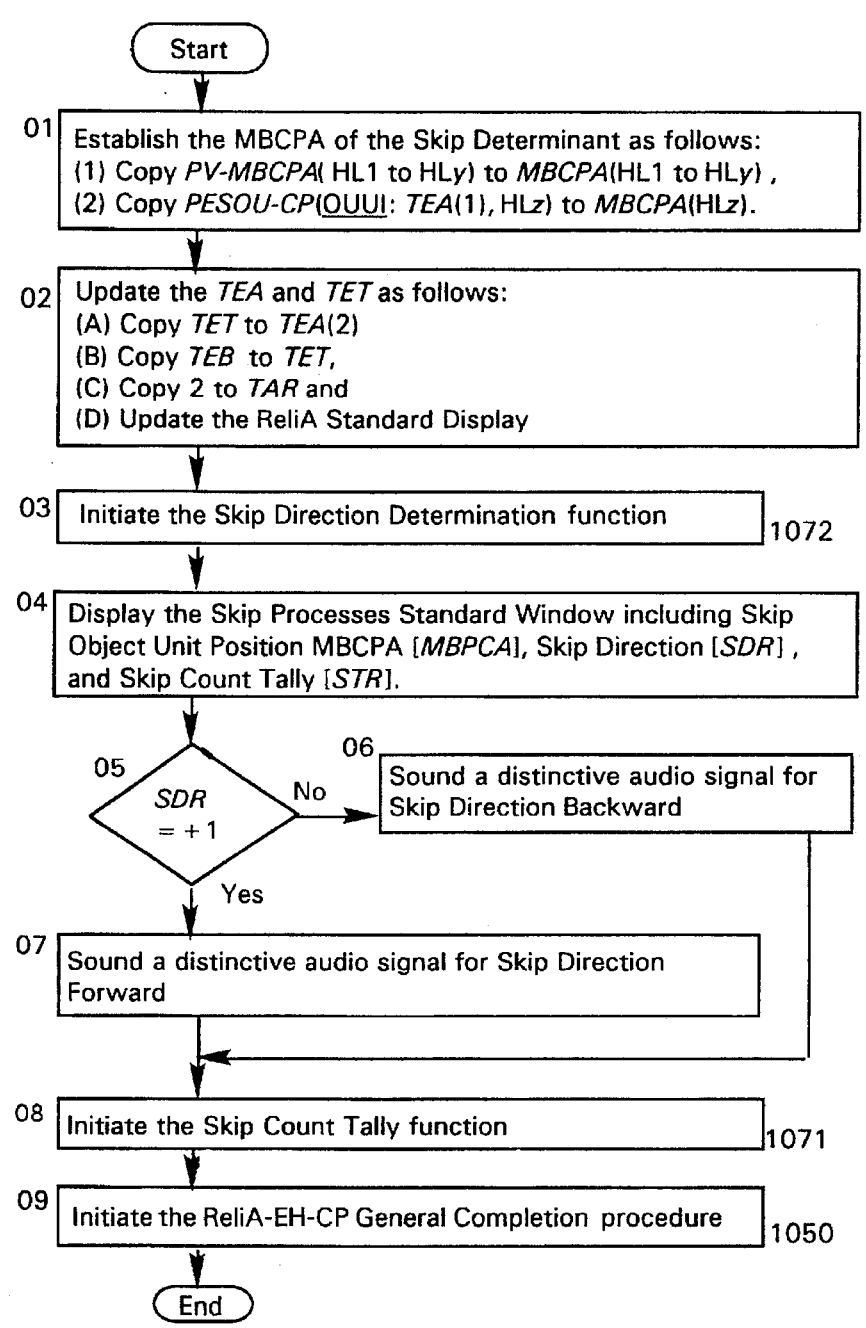

Fig. 37;
1050 — ReliA-EH-CP General Completion Procedure Flowchart
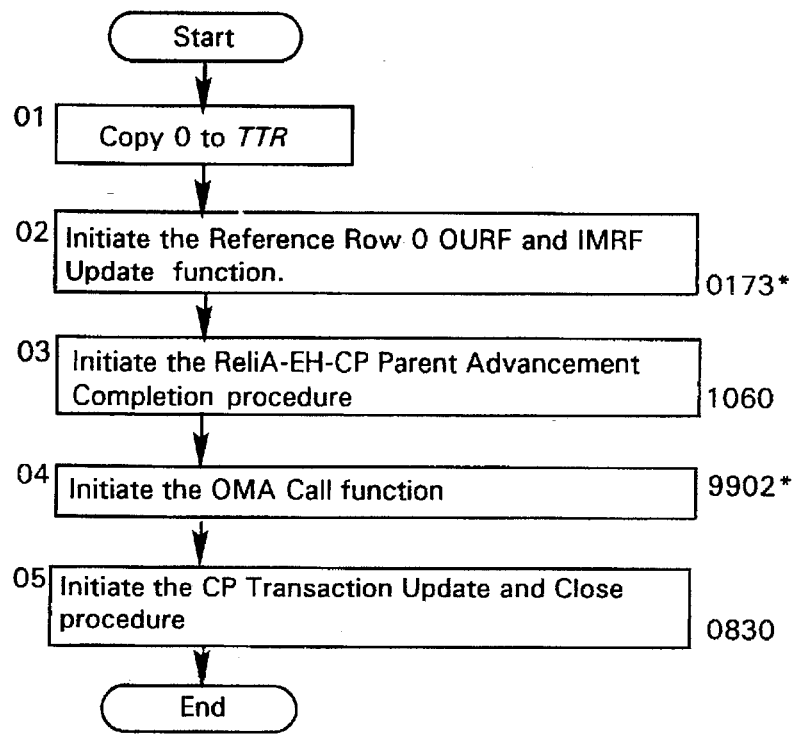

Fig. 38; Pg. 1 of 2:
1060 — ReliA-EH-CP Parent Advancement Completion Procedure Flowchart
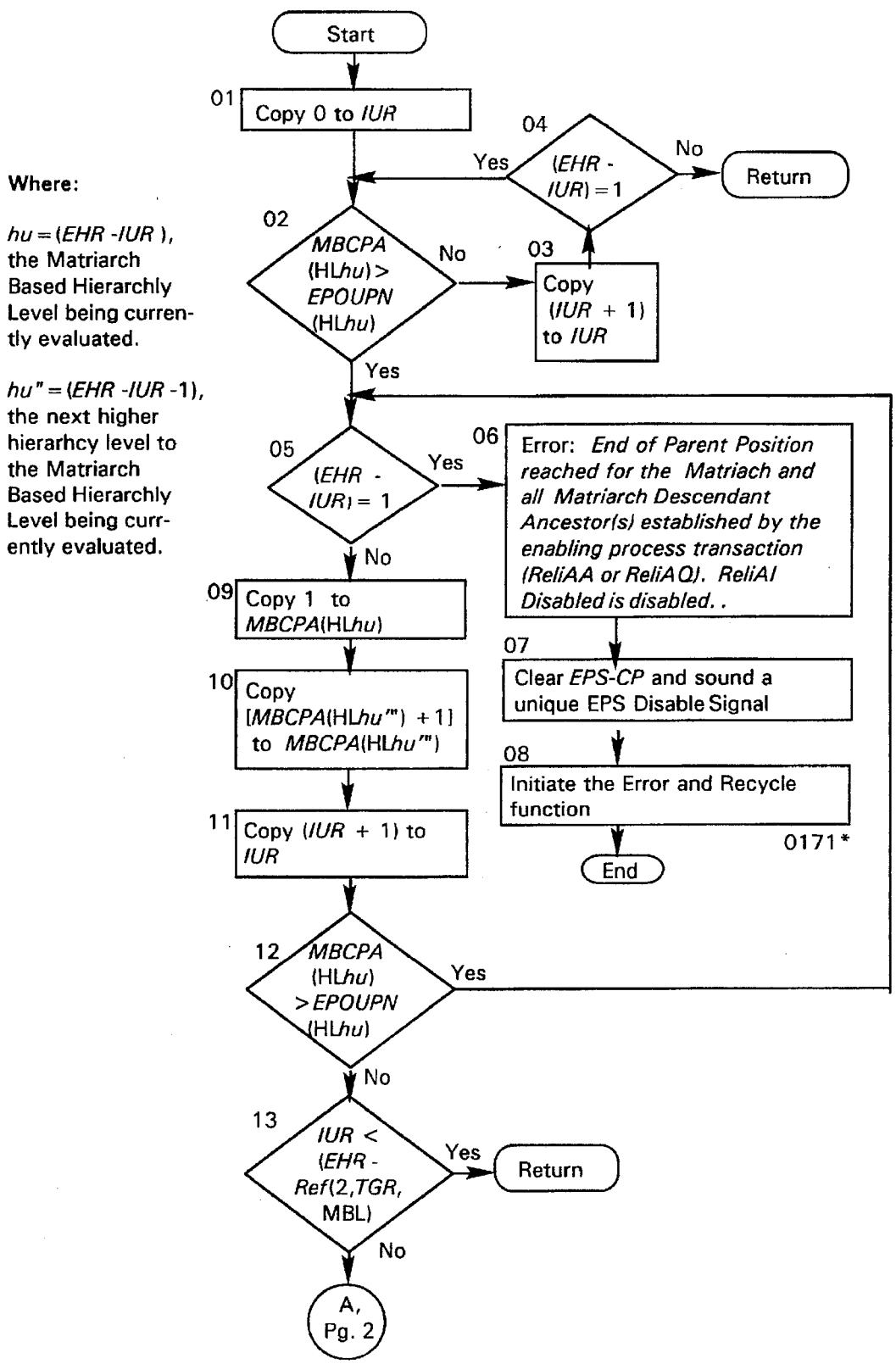

Fig. 39; Pg. 2 of 2:
1060 — ReliA-EH-CP Parent Advancement Completion Procedure Flowchart
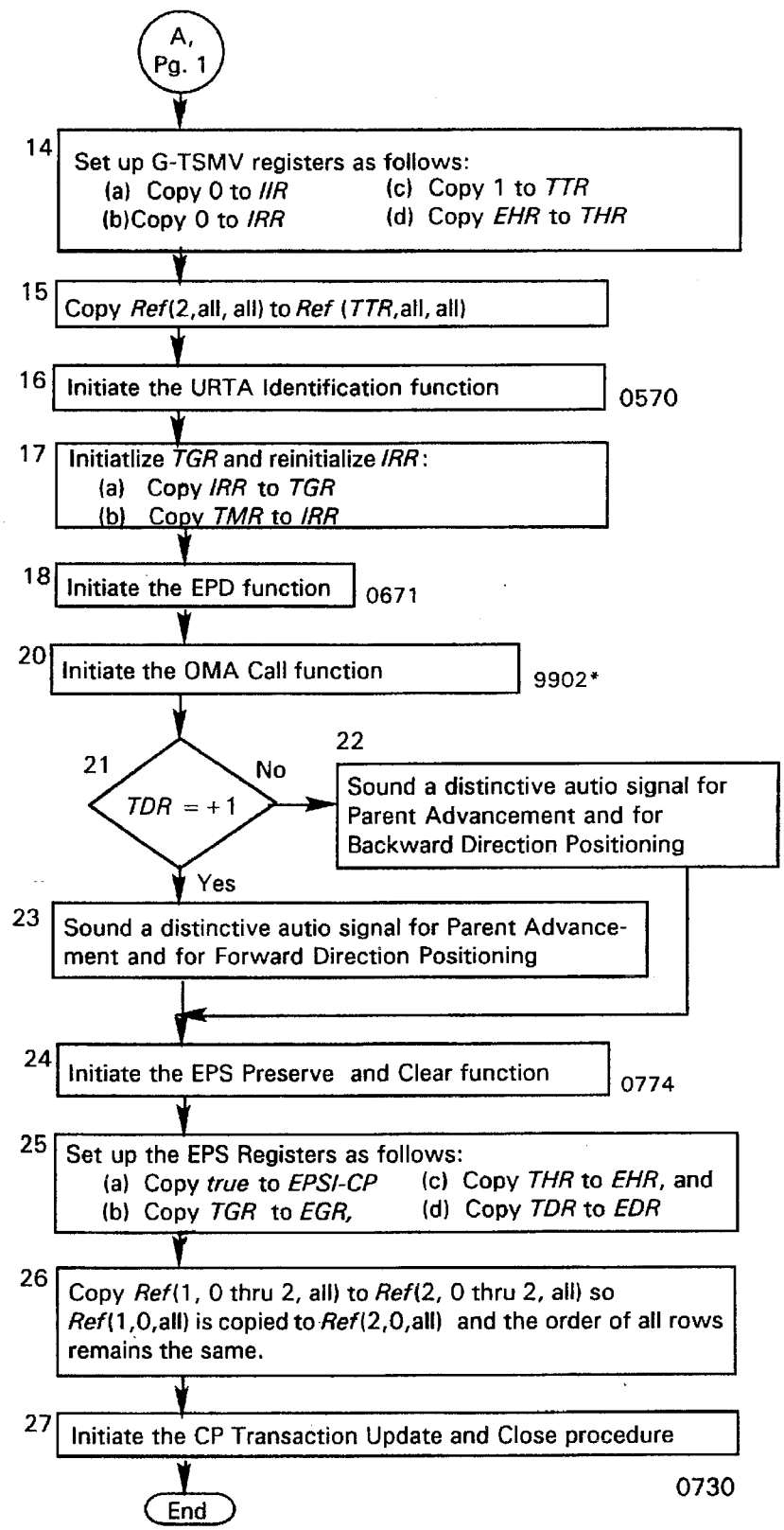

1071 – Skip Count Tally Function Flowchart

Where:
z = EHR
y = EHR -1 for EHR > 1

Step 02 not used

Fig. 41;
1072 — Skip Direction Determination Function Flowchart
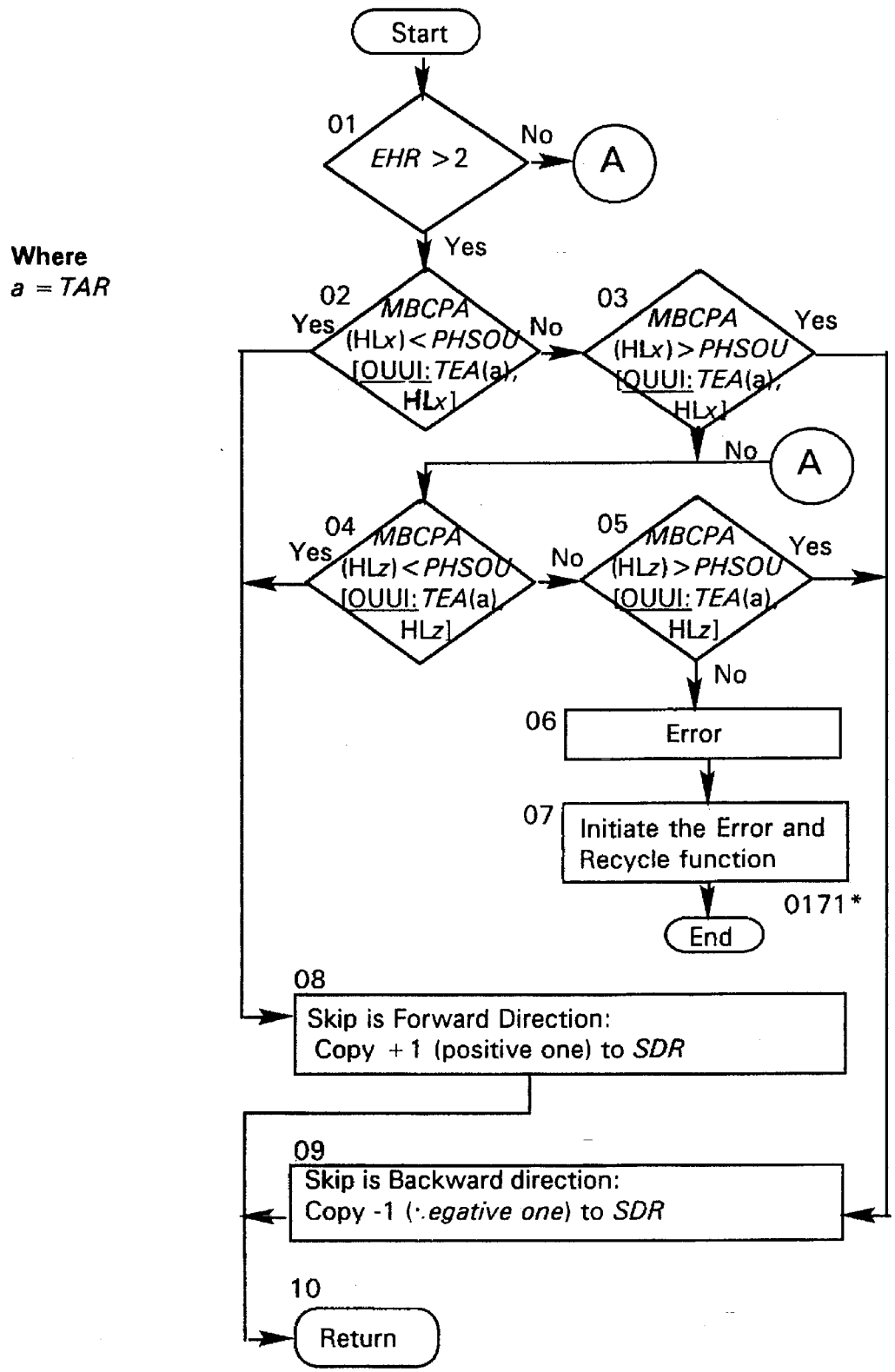

Fig 42; Pg. 1 of 2;
1300 - ReliAQ Processes Evaluation Procedure Flowchart
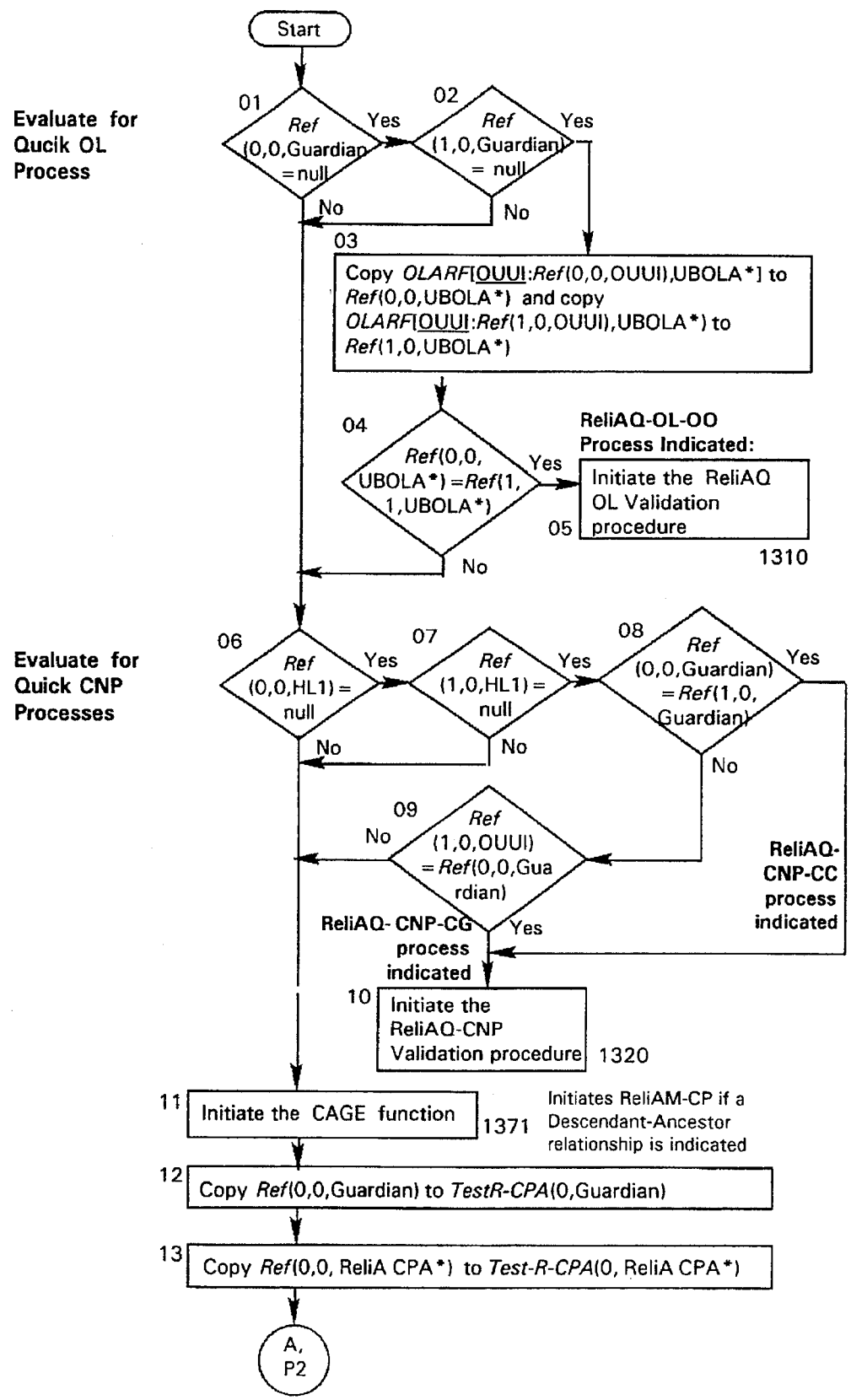

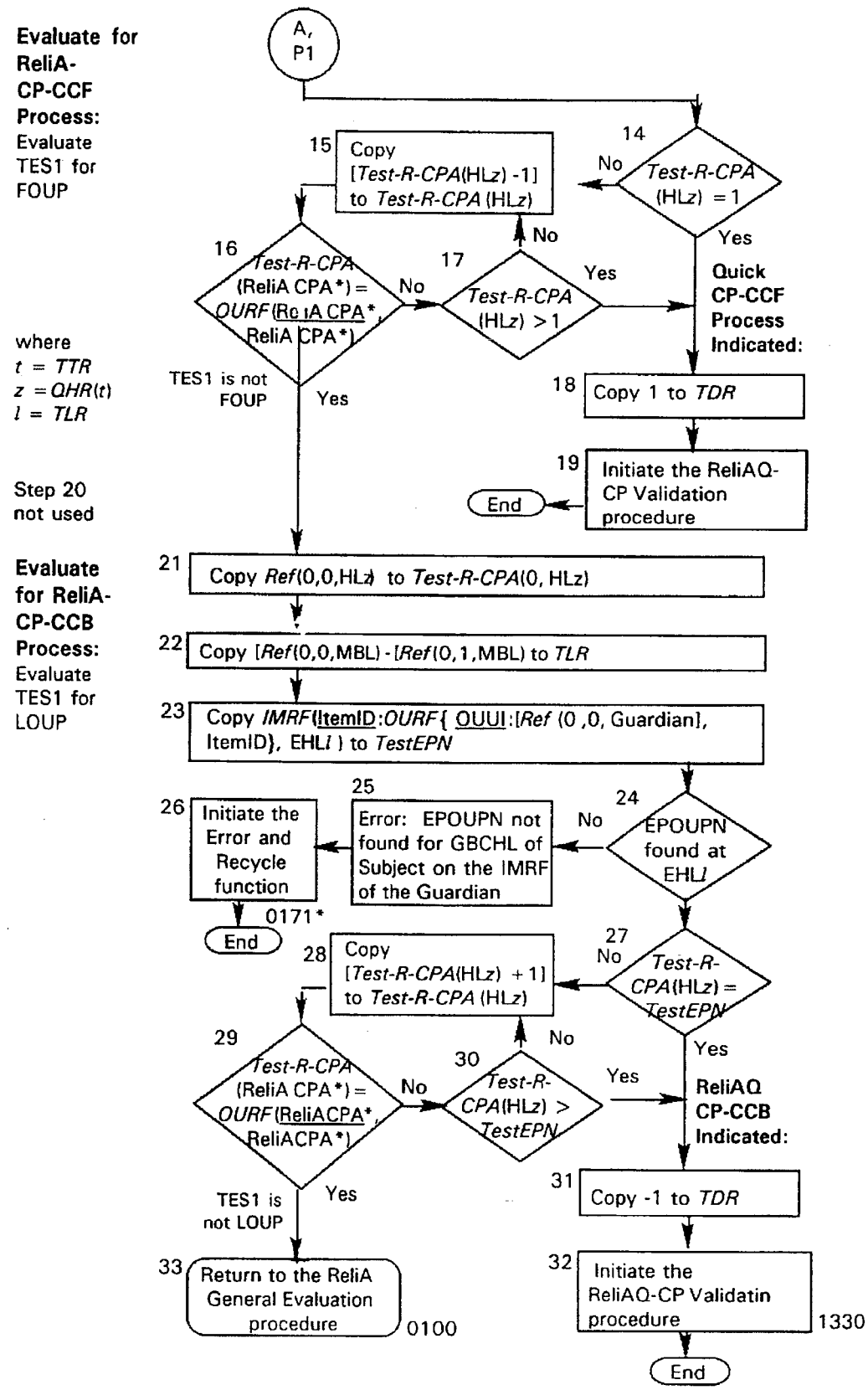
Fig 43; Pg. 2 of 2;
1300 - ReliAQ Processes Evaluation Procedure Flowchart Fig. 44;
1310 - ReliAQ-OL Validation Procedure Flowchart
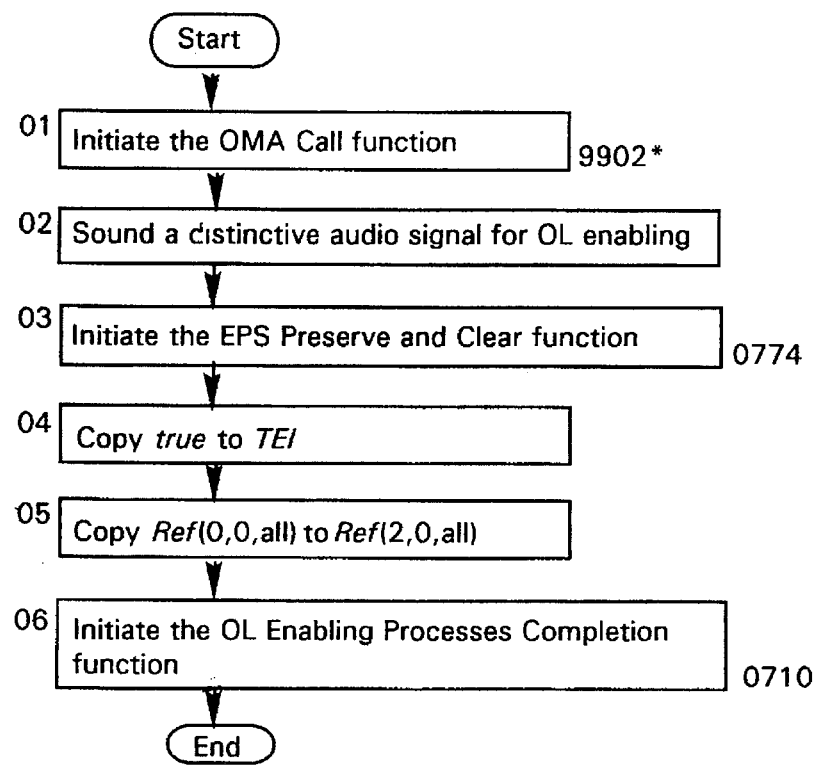

Fig. 45;
1320 - ReliAQ-CNP Validation Procedure Flowchart
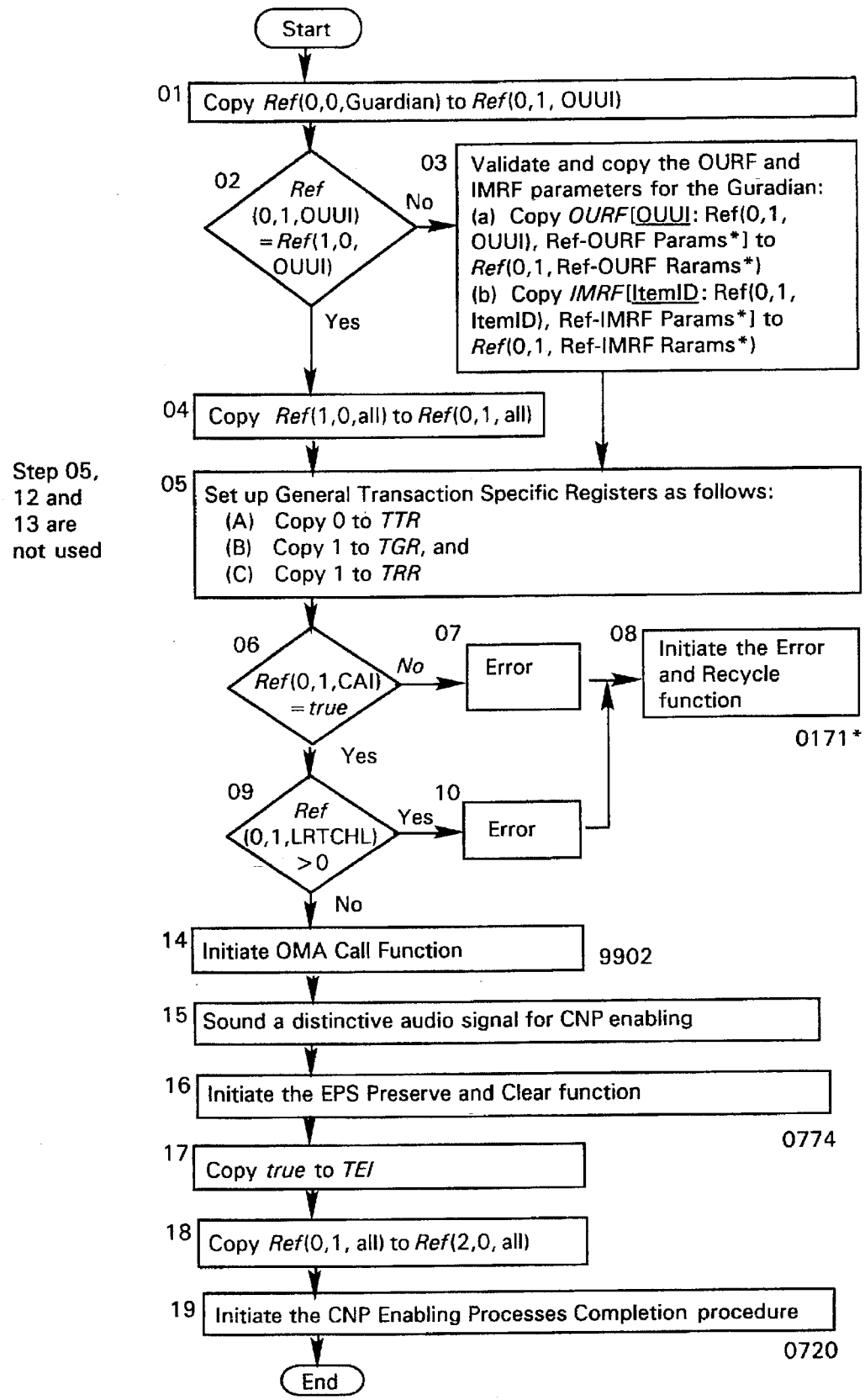

Fig. 46;
1330 — ReliAQ-CP Validation Procedure Flowchart
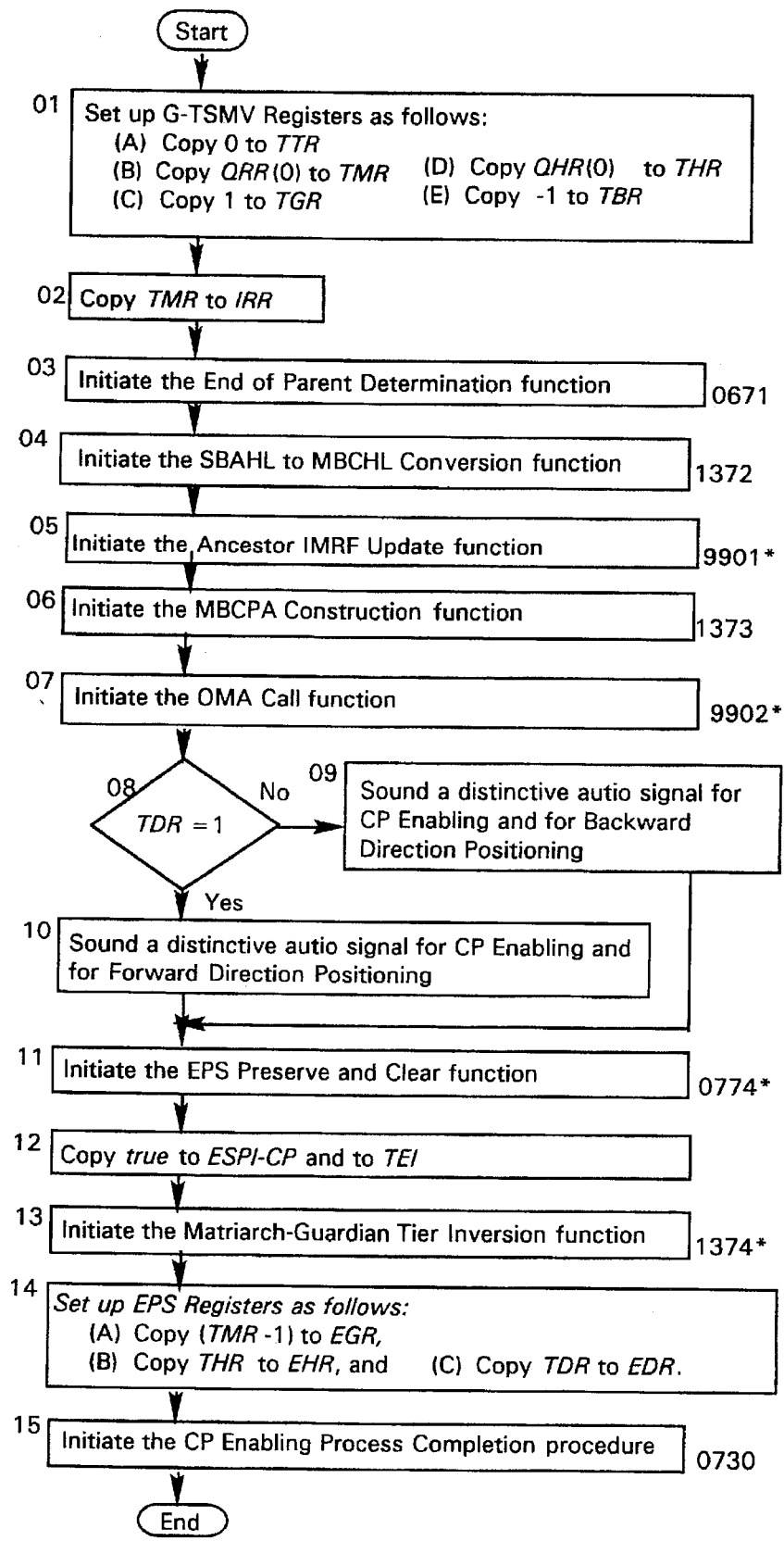

Fig. 47;
1371 - Common Ancestor and Generation Evaluation Function Flowchart (CAGE Function Flowchart)
Where
$t = TTR$,
$r = QRR(t)$,
$r' = [QRR(t)]'$
  $= \{[QRR(t)] + 1\}$
$l = TLR$
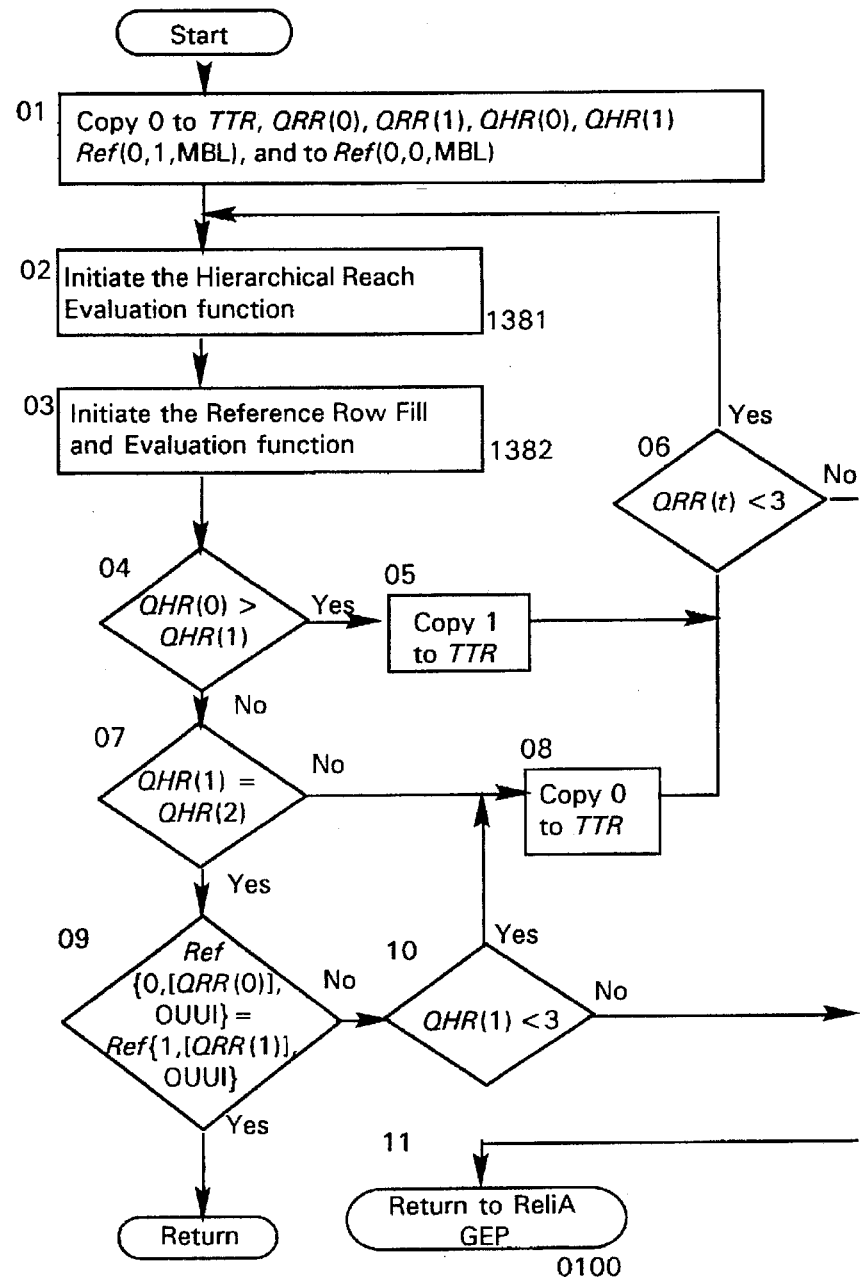

Fig. 48;
1373 - MBCPA Construction Function Flowchart

Constructs the MBCPA for the subject OU based on the GBCPA and their GBCHL of each referencing Descendant in the Matraich-Subject Lineage of the subject Object Unit

Where
- $r$ = IRR and
- $r'$ = $(r+1)$ = $(IRR+1)$
- $h$ = TR1 for the Guradian- referencing Descendant Hierarchical Reach of each referencing Descendant in the Matriarch-Subject Lineage
- $i$ = IIR the Interim Identified Matriarch Components Hierarchical Reach
- $i'$ = IIR + 1
- $ih$ = $(i+h)$ = $(IIR + TR1)$

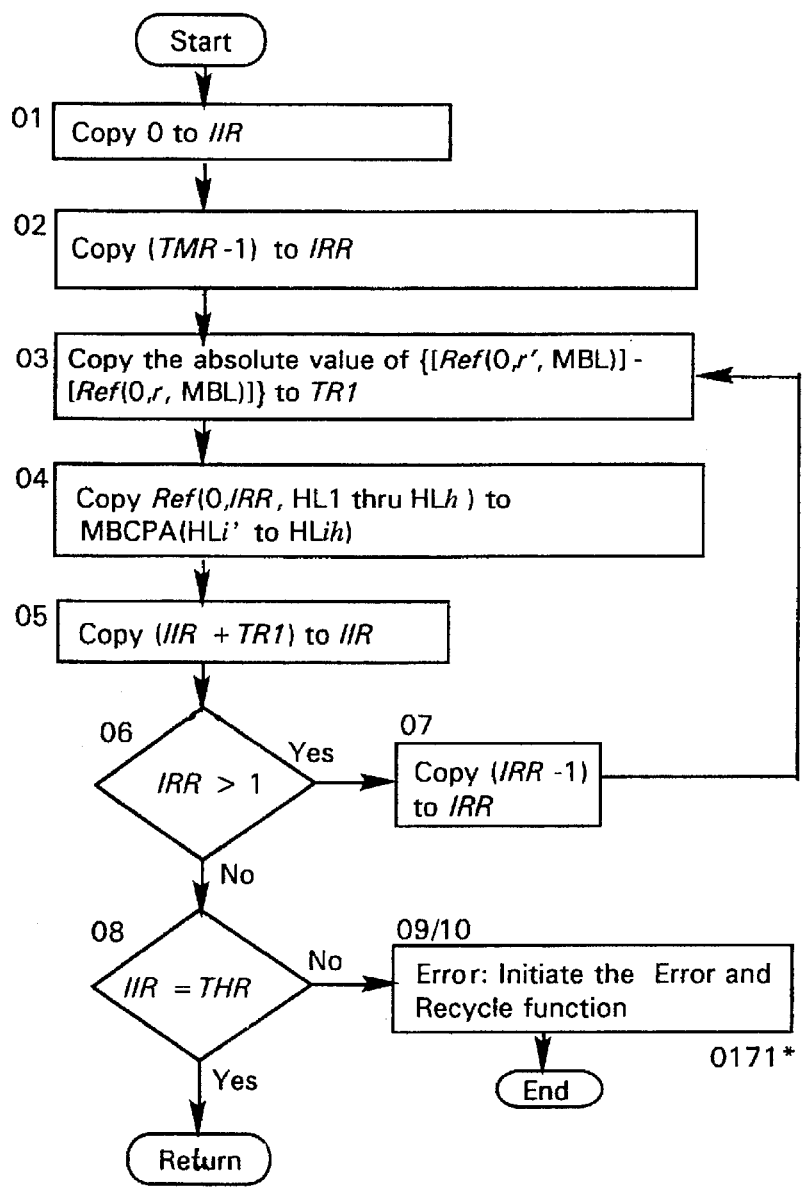

0171*

Fig. 49;
1381 - Hierarchical Reach Evaluation Function Flowchart
Where:
t  = TTR,
r  = QRR(t),
r ' = [QRR(t)]'
    = {[QRR(t)] + 1}
l  = TR1
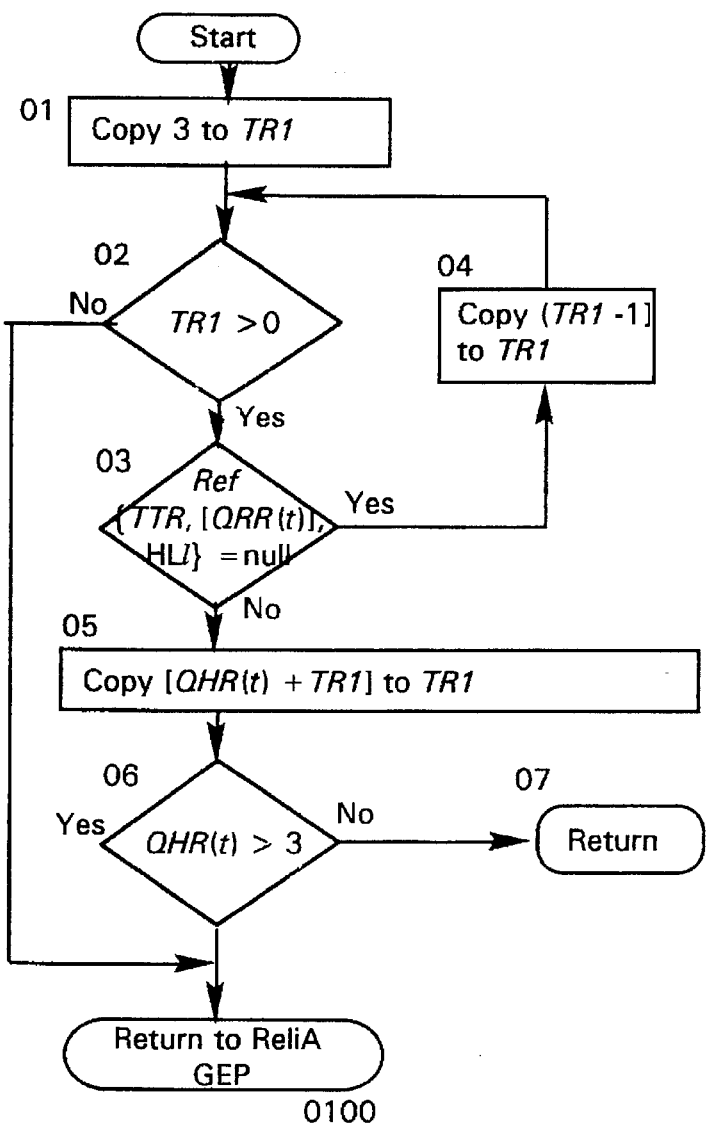

Fig. 50;
1382- Reference Row Fill and Evaluation Function Flowchart
Sets up and evaluates the Reference-OURF Parameters for Ref{TTR,QRR(t), Guardian}
Note in the CAGE function and its subsidiary functions, including this function:
$t = TTR$,
$r = QRR(t)$,
$r' = [QRR(t)]'$
$= \{[QRR(t)] + 1\}$
$l = TLR$
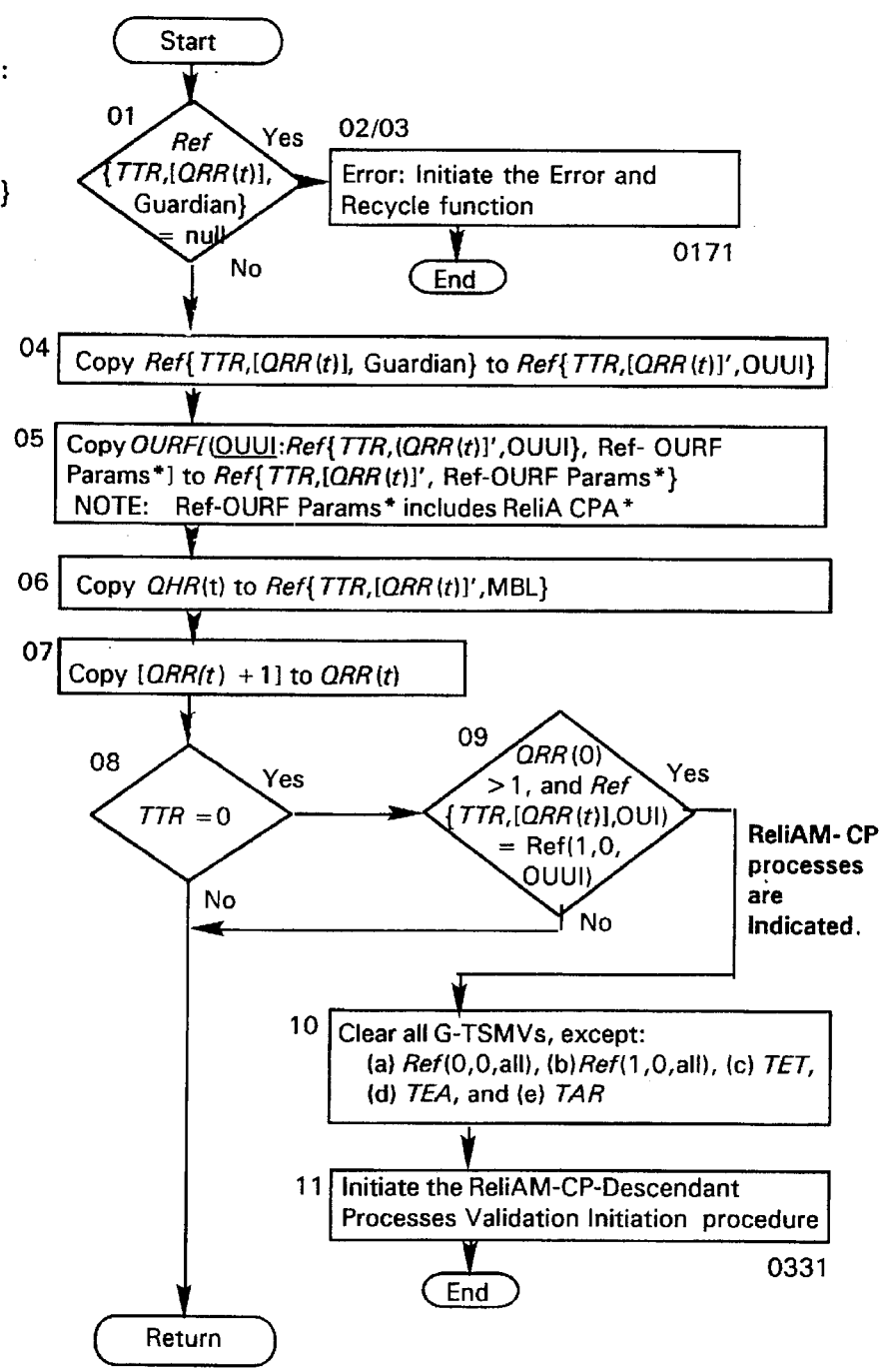

RELIA PROCESS: INTEGRATED RELATIONAL OBJECT UNIT IDENTIFICATION AND LOCATION ADDRESSING PROCESSES

FIELD OF THE INVENTION

The present invention is an innovative new process ReliA process for tracking and configuration management of object units in hierarchical systems and the systems they constitute. Through the use of relational information, the present invention provides an efficient, powerful process for such management of object systems. The present invention is applicable to all tangible, verifiable, and measurable object systems comprising equipment, inventory, documents, freight items, art work, antiques, and software. The relational approach facilitates the integration of control over hierarchical object systems by supporting high, low, and intermediate level views of the object system. This serves to integrate the planning, implementation, maintenance, and control of these systems by functional departments of an organization with divergent interest in the details of the system.

BACKGROUND OF THE INVENTION

There is a pressing need in the art for an efficient, user-friendly process capable of supporting all aspects of object unit life cycle management. Previously, low maintenance object unit management has been addressed with only partial success.

The present invention, when applied to inventory and equipment management, directly supports the testing, assembly, and shipping of equipment units in a manufacturing environment, the receipt, assembly, installation, testing, maintenance and repair in an operations environment, and the transfer object units shipped between a vendor and customer.

In the prior art, object unit location description and maintenance has been achieved by using a Hierarchically Coded Location Address (HCLA) where all elements of the address are hierarchically related to other elements of the address. Filley (U.S. Pat. No. 4,920,488) discloses a system and method for the inventory of physical assets wherein each asset is associated with its absolute geographic location expressed in terms of latitude, longitude and elevation, each to within one foot of accuracy. Filley, therefore, is limited by its methodology to objects that occupy at least one cubic foot of space and does not purport to use relational information.

In some instances, prior art makes use of relational information; e.g., the location of a box containing X is computed from the location of a box containing A, and the relational information that both X and A are in the same box. Vereen (U.S. Pat. No. 4,509,123) discloses an automated tracking process for items of manufacture and inventory in which each item and each grouping and location of items is tracked. The process relates an item to its container, a technique well-known in the art and widely followed in automated processes before 1985. Unlike the present invention, Vereen does not keep track of the location of the item in its container, and the location of a Vereen container cannot be defined until after the container is defined.

Varley (U.S. Pat. No. 5,025,140) defines an apparatus for receiving articles to be processed, storing them, and returning them to their owners. The receiving process creates a relationship between an empty container that will hold the article and its position. The issuing process identifies the location of the container holding the processed article so that the article can be returned to the customer. The article to be tracked or its container are not uniquely identified, only the location of the container is tracked whereas the present invention tracks the object of interest directly as well as its location.

Smith et al. (U.S. Pat. No. 4,336,589) discloses a warehouse product monitoring and control process that directs the distribution of a particular product that meets order requirements and then tracks the product to ensure that the order is filled.

Bennett et al. (U.S. Pat. No. 4,591,983) discloses a process for controlling a bill of materials created for filling customer orders for specially configured products to ensure that the components listed in the bill of materials are compatible with each other.

Abraham et al. (U.S. Pat. No. 4,639,875) discloses a process for checking the quantity and types of articles in racks in a vending machines. Inventory location detail is limited to the pre-defined locations in the machine. The present invention defines a process for maintenance of a perpetual inventory with detail down to the smallest physical unit whereas Abraham et al. discloses a process that supports only the inventory accounting of objects with fairly uniform characteristics and calculating net changes since the last physical inventory of the vending machine.

Finally, Schribner et al. (U.S. Pat. No. 4,688,026) discloses a process wherein energized radio frequency energy is used to identify locations and objects. Schribner et al. does not support tracking of objects as they move between locations and is limited to taking inventories.

An important objective of object tracking is accounting for inventory. Inventory management tracks descriptive information, comprising part numbers quantities, and location to the level of detail required for internal management accounting and reporting purposes. A significant enhancement in control in prior art was achieved by tracking an object unit with a unique descriptive number (e.g., manufacturer's serial number). Using a unique descriptive number for each object unit permits the maintenance of a record of the tracked object that contains the unit's descriptive information, as well as its location with coded hierarchical address schema, to the extent it can be detailed for management accounting applications. Thus, in prior art, lower level object units that were removed, repaired, and interchanged on a routine basis normally were either not tagged or not linked to a related higher level object other than by a common location address.

The lack of lower level location information in prior art management accounting processes renders said processes inadequate for most engineering and operations management applications which require more comprehensive and detailed information on the object systems they deploy, use and maintain than is needed for most accounting systems. Engineering and operations management applications require object unit descriptions on multiple hierarchy levels (HL) and maintenance of the relationships between the objects that comprise the object system.

To maintain the more detailed addresses required, a Hierarchically Coded Location Address (HCLA) has been continually expanded in prior art. Thus, to achieve the greater detail required for comprehensive management of object systems in engineering and operations applications, the HCLAs maintained on records of the object unit were simply extended. The integration of components relative to Parents, and Parents relative to components, was cumbersome and ineffective with high levels of maintenance involved.

In prior art, the complexity of using complete HCLAs substantially limited practical applications in engineering or operational environments. Complexity problems were overcome, but computing and data entry costs were prohibitive. Since communication of object unit location in prior art was achieved by a coded, detailed hierarchical address schema or hierarchical address, complete and accurate use of the hierarchical address schema to establish the complete HCLA of an object unit required either extensive counting from a beginning reference point or reference to complex tables, templates, diagrams, charts, or schematics for each level of the hierarchical address.

In prior art, a container was loosely referred to as a "parent" and the subject object unit was thought of as a "component." A parent meant any "ancestor" of an object unit that existed in a hierarchical scheme at a plurality of levels above the object unit. In the present invention, Ancestor refers to any related object unit that contains, holds, or physically controls a subject object unit. Ancestor is further specified hierarchically as any related object unit located at a higher hierarchical level than the subject object unit. Parent refers to the most immediate Ancestor that most immediately contains, holds or physically controls the subject object unit, the Parent being located at the next higher level in the hierarchy.

In prior art, referencing of an object unit was accomplished either by using an Ancestor's preaffixed address, a template, manually recording the hierarchical address, or a combination of the three. However, providing the hierarchical address codes to end users proved to be costly and complex. Reducing the number of steps needed to determine and record an Ancestor's address code by providing more complete hierarchical addresses for lower level object units increased the work of coders and labelers. Since the HCLA at each successive level contained the complete address for the previous levels in the hierarchy, a duplication of effort resulted that was unnecessarily complex and costly. Even when a combination of address and code was found that minimized the overall cost, the reference material needed by end users could fill a large volume.

One major unsolved problem in prior art that is solved in the present invention was that individual tracked object units had to be separately transferred within the hierarchy, even though object units at lower levels in the hierarchy might be physically moved in the same operation with its Ancestor.

INTRODUCTION OF THE PRESENT INVENTION

One purpose of the present invention is to provide a simple method of collecting, maintaining, and reporting the data necessary for readily referencing and locating object units by end users and others who regularly employ or install and maintain a class of object traits within an organization. End users generally know the Items they use, but relate to abstract location coding address schemes only to a certain point. The higher level hierarchical locations that are moe readily remembered or determined are retained in a coded format as the Hierarchical Entity Location Address (HELA). End users find specific, lower level locations easily and efficiently by using relational addresses based on items they know rather than unlabeled, obscure, and often confusing positon numbers of the lower level hierarchy level codes. The details of a lower level object unit's location are incorporated as a relational address. The HELA together with the relational address for lower level locations provide the complete location address for an OU.

The disclosed processes comprise integrated administrative and software processes that function interactively with a user in a consistent manner to support tracking and configuration management of sets of objects and tracking of these component objects. The administrative activities comprise data input for the inventive processes implemented by the software.

The present invention has the capability of tracking and managing the configuration of hierarchical object unit systems using unique unit identifiers on the tracked object units. The present invention is highly innovative and useful in that it (1) supports the consistent tracking of object units at any hierarchy level using in a variety of addressing methodologies and a number of alternative, integrated sub-processes that allow the user to consistently record the location address of a subject OU depending on the types of relationships occurring between the subject object unit and the related object unit in the object unit system. Moreover, the present invention is highly innovative and more useful because the invention automatically interprets the alternative sub-processes being employed by the user, so the user does not need to overtly indicate which of the alternative, integrated sub-processes is being employed to record the location address of the subject object units for a specific transaction object units The present invention provides hierarchical location addresses for the higher level breakdowns of an organization's geographic/operating map, thereby supporting management accounting requirements. It also provides relational addresses for detailed description of OUs' locations, thereby satisfying engineering, maintenance, operations and other users' needs. The present invention achieves these flexible results using a single data base and location address schema.

The innovative use of the physical relationships that occur between object units to greatly facilitate determination and recording of the location address of subject object units is worthwhile. The numerous physical relationships that occur in most object systems support a number of alternative sub-processes. The user generally defines the location address of a particular object unit by employing a reference to some other object units in the system in a qualifying relationship between the referenced and subject object units that indirectly defines a particular sub-process of the invention. Supporting software of the invention using the location address of record for the referenced object units and other reestablished information to determine the particular sub-process being used and the location address of the subject object unit. The most basic of these allow, and in some cases require, the entry of hierarchical codes. The most advanced allow the user to record only the object unit identifier to automatically record its location address. Thus, the user can readily switch from one alternative sub-process to another as the available relationships for successive subject object units relative to other object units in the system change from transaction to transaction.

Provision of a reliable, cost effective, and comprehensive data that can be used in turn to provide reliable, cost effective, and comprehensive information on the performance of object unit systems and their Components provide a sound basis for comprehensive life cycle management of object unit systems, thereby supporting effective, reliable operation and upgrading of the systems as desired. This invention provides a fast, easy process for the tracking and configuration management so that reliable, cost effective, and comprehensive data, prerequisites for this goal, can be achieved.

The present invention therefore provides a comprehensive, easy, and efficient method of recording the location address in a manner that meets the combined needs of operations, engineering, and accounting. The measures employed by management to preserve and ensure good use of object systems and the organization resources can be more efficiently executed through the enhanced management achieved by integrating the views and interests of operating, engineering, and accounting in the management of said systems, enabling the organization to provide flexible, reliable, competitively priced products and services to its customers.

EXAMPLE 1

Leader Corporation has found that having information on the identity, configuration, reliability, performance and life-cycle cost of machines and their associated and descendant equipment systems is important to ability to be cost competitive and reliably achieve delivery and quality commitments to customers. Key parameters associated with transactions on the machines and in many cases several generations of its component systems are collected to provide said information.

Tracking the location and status of the machines, their component systems, and the spares that back them up support ready use and proactive management of the resources. Production tracks the service status and location of the accessories needed for manufacturing operations. Accounting track at the top level of said systems to support effective financial controls. Manufacturing Engineering uses tracking to upgrade the machines as needed and the interchangeable accessories that serve to expand the functional capabilities of other machines and to establish the configuration of the equipment system. Maintenance uses tracking for maintenance of the machines and of the component systems in the machines and the location, performance, and history of the accessories and key maintainable or repairable components as they are moved from machine to machine.

With the data established by these transactions, Leader Corporation can thus proactively maintain its machines and effectively upgrade and add new machines as the need arises based on the interchangeability of existing accessories and the major components of the existing machines with the new machines and the historical performance, and reliability of existing equipment in service by the manufacturers of new machines being considered.

EXAMPLE 2

A purchase agreement to buy such machinery is maintained by the Legal Department in a folder of related agreements with the vendor. The Contracts that govern the purchase agreements with the vendor are tracked in similar folders. The vendor folders are in turn tracked in one or more jackets.

New material is constantly added. Some material is moved to archive storage. Jackets are routinely advanced from shelf to shelf and cabinet to cabinet. By recording the changes in location of the documents related to folder, jackets, shelves, cabinet, and attorney or secretary, the employees can quickly locate what they need. The tracking can also maintain a record of document access and the configuration of current agreements for each vendor.

The object units tracked are individual occurrences of an item that have or are expected to have at least one special characteristic or association that distinguishes or will distinguish them from otherwise like items. The independent variable of the present invention is the Object Unit also referred to as an "entity. "Object Unit"(OU) more specifically refers to an individual tangible, measurable, or observable object, with special characteristics that are either assigned or are internal to the object, and that distinguish one occurrence of the object from otherwise similar objects. Said similar objects are Items) "Entity" as used herein defines OUs more generally and describes geopolitical units and other high level divisions thereof in which the position of each unit is not generally separable from the unit itself. Entity names and designated codes are characterized as being non-unique except by reference to all of its Ancestors.

In the present invention, therefore, an OU is differentiated in practice from an entity by the requirement that an OU be described by a Unique Unit Identifier (UUI) or be a Descendant of another OU. Object Units (OUs) are therefore defined as tracked, uniquely identified entities and their components.

UUIs allow objects with inherent or assigned special characteristics to be readily distinguished from otherwise similar objects. UUIs were sometimes referred to as Asset Tags or Manufacturers' Serial Numbers in prior art, and their use is well established. The present invention presents an innovative use of UUIs to effectively communicate the location of other OUs.

SUMMARY

The present invention tracks entities comprises OUs in systems with N hierarchies, where N is a positive integer. In what follows, the hierarchy of a particular entity being discussed is I (I=1, 2, . . . , N). An "Ancestor" of an entity is in hierarchy J (J<I) with an address that is identical to the first J hierarchical address positions of the entity. In prior art, a "Parent was a physical container of an OU without regard to the number of HLs that separate an OU and its Parent. In the present invention, Ancestor refers to any entity located at a higher hierarchical level than the subject entity, and Parent refers to the Ancestor at the hierarchical level immediately before (above) the subject entity. Therefore, as used herein, a Parent of an entity is an Ancestor located in hierarchy I-1, a "Grand Parent" (GP) is an Ancestor in hierarchy I-2, a "Great Grand Parent" (GGP) is a Parent of a GP in hierarchy I-3, etc. In prior art a Parent was any Ancestor (Parent, GP, or GGP).

In the present invention, a Sister is an entity in hierarchy I that has a common Parent with the subject entity. A "Cousin", not used in prior art, is also located in hierarchy I, has a common Ancestor with the subject entity. For example, a first Cousin is located in hierarchy I, has a common GP, but does not have a common Parent with the subject entity. The kth Cousin is located in hierarchy I, shares a Grand Parent with k "Greats" but no common ancestor.

Relationships comprising "Aunt", "Grand Aunt", "Great Grand Aunt", are fully defined by the relational concepts introduced above. For example, an Aunt is located in hierarchy I-1 and is a Sister of the Parent of the subject entity, a Grand Aunt (GA) is in hierarchy I-2 and is the Sister of the GP of the subject entity. In general, a Grand Aunt with k "Greats" (GGA GGGA, etc.) is in hierarchy I-k-2 and is a Sister of the Grand Parent of the subject entity with k "Greats." Thus, referencing a subject entity through its GA is equivalent to referencing it through its GP and its GP's Sister.

EXAMPLE 3

The relationship between the terms in the prior art and those used herein can be illustrated using a simple example.

Consider a set of containers, more specifically described as cabinets, each with eight "shelves," each shelf divided by eight "trays," each of which is further divided from front to rear into eight "places." The 512 places in any cabinet can be identified by a 3-dimensional 8×8×8 matrix containing 1s through 8s representing object unit positions within the Cabinet an its defined Ancestor-Descendants. Using the convention that the shelves are at hierarchy I-2 (GPs), the trays are at hierarchy I-1 (Parents), and the places are at hierarchy I, then the top, left-most, front position is 1,1,1, the top, left-most, rear position is 1,1,8, the top, right-most, rear position is 1,8,8, and the bottom, right-most, rear position is 8,8,8. Assume that a uniquely identified OU of the Item class Insecta can fit into any one of the 512 places in any of the cabinets (GGP). Assume further, that a cabinet with UUI 66666 is located in Houston, Tex. in BioSupply Corp.'s building (GGGGD) at 1313 Commerce Blvd., in Suite 201, in bay 06 of that suite. BioSupply has operations in major cities across the U.S.A. Assuming there is only one building at 1313 Commerce Blvd., the cabinet location information might be coded into an address location using the codes:

| Hierarchy Level(HL) | Description | Code |
| --- | --- | --- |
| 1 | TX | 04 |
| 2 | Houston | 01 |
| 3 | Building at 1313 Commerce Blvd. | 02 |
| 4 | Suite 201 | 201 |
| 5 | Bay | 06 |

The codes used in the table describe the position of the described entity within its Parent. The collective codes of all the Ancestors of any one entity constitute the Hierarchical Entity Location Address (HELA). These codes, as applied to entities in general, such as employed in prior art are assumed to be non-relational. In contrast, the prior art does not address the situation where there are a plurality of HLs, so the Parent is always simply the "container". In its rawest form, the HELA for the cabinet might be represented for computational purposes as 04010220106, or in a more readable form, as 04/01/02/201/06 where the slashes represent field delimiters.

In the prior art, a Sister might have been on the same shelf or on a different shelf, in the same tray or in a different tray, whereas in the terminology of the present invention, a Sister must be in the same tray and on the same shelf as the subject OU.

Where an OU is included in the lineage of another OU the hierarchically coded HELA of the Descendent OU is more generally termed as a complete Hierarchically Coded Location Address (HCLA), an address location schema where all elements of the address are hierarchically related to other elements of the address.

Some types of relational information are applicable to any OU system. For example, if the location of an Ancestor at Hierarchy Level (HL) J is known, the location of all its Descendant OUs is also known down to HL J. Instead of needing a complete HCLA for each Descendant OU, one needs to know only the HELA for the prescribed Ancestor and the N-L lower order codes for the OU. As a consequence, fewer entries need to be entered and saved in memory, yielding substantial resource savings. The address elements are generally represented by codes HieraEntity Division Code (HEDC), or HieraRelational Position Number (HRPN). The most general form of code included in an HCLA is termed herein as a HieraEntity Division Code (HEDC), codes or names that generally describe the geopolitical division of a Parent entity.

In the prior art, an OU of a specified class of Item is simply related to an OU of another specified class of Item. Where a specified container is related to another type of container, as for the garment manufacturing Patent, a plurality of HLs was not used.

In the present invention, a first Cousin is the prior art equivalent of a Sister on the same shelf but in a different tray, and a second Cousin is the prior art equivalent of a Sister in the same cabinet but on a different shelf. The concept of Cousin, therefore, greatly facilitates computations using relational information about OUs with a common Ancestor. To generalize the above concept of Sisters and Cousins as members of a common generation, the term "Homogens" is used to describe the relationship between OUs on the same hierarchical level that share a common ancestor. The term Homogen by itself refers to an OU, other than the subject OU at the hierarchy level of the subject OU. Homogens of the subject OU (.i.e. hierarchy level I). A Parent or an Aunt at HL I-1 is a Parent Hierarchy Level Homogen (PHL Homogen)

A common relationship between OUs in a hierarchical object system is the subject-Sister relationship. The position of a subject can be determined from the position of a Sister whose position is already known, if the positions re ordinarily related, by incrementing its lowest order HEDC by one. When the successive positions within a parent OU are described ordinally in this manner so that the relationship of OUs in consecutive positions can be described as contiguous OUs, the HEDC formed is a HieraRelational Position Number (HRPN).

Unlike Sisters, Cousins can occupy the same lowest level hierarchical position, occupying otherwise identical positions in different Ancestors. The complete HCLA for an OU that occupies an identical position to a Cousin in a different Ancestor can be computed from the complete HCLA of the Cousin, the positional relationship, and the degree of generations removed of the Homogen relating the two OUs by decreasing the second Cousin's HRPN at HL I-1 by one.

EXAMPLE 4

The power of using the Cousin concept in the present invention may be illustrated by the example wherein each of 512 different OUs in Example 3 are in identical positions in a plurality of cabinets, with HEDCs at HL 5 designated as 01, 02, . . . , 99. Then the complete HCLAs of 50,688 subject OUs can be computed from the known addresses of their 512 Cousins.

The relational concepts of Ancestor and Sister or Ancestor and Cousin could be combined. The present invention combines the HELA with the lower order HRPNs of the address of an OU to completely address the OU. Enormous computational savings, memory economy, and reduced input costs result from allowing the user OU to establish the HELA and reference a Sister or Cousin OU to establish the lower order HRPNs. Three hierarchical levels for the lower order HRPNs within the cabinet. When the HELA is entered and stored by a single reference, and the lower order HRPN is established by a reference to a single Sister or Cousin, the total number of codes that must be entered and maintained is reduced to two, yielding an impressive 75% resource savings. In many cases, the number of entries that must be recorded may be reduced to just one entry increasing the resource savings to 87%.

Once the location address is established for an OU within a HELA, the subject OUs and location address at a subsequent contiguous OU can be established by recording the OU's Unique Unit Identifier simplified to Object Unit Unique Identifier (OUUI) of the subsequent OU and incrementing the lowest HL of the location address of the previously established location, establishing the location of the subsequent OU based on the sister relationship between the two OUs. Thus, the subsequent transaction and ⅞ of the OUs can be recorded with a single reference, yielding an 87.5% resource savings on 87.5% of the OUs. Six hundred forty references could record all OUs in OU 66666 versus 4096 references under prior art. This is an impressive 84% overall labor resource savings and a 75% storage space savings.

The location address for the OU at the beginning of each Parent does not have to be reestablished if each tray is known to have 8 places, and each shelf is known to have 8 trays positions. A "sister" OU initially computed as being in position 9 of its Parent can be automatically recomputed to the first OU in the next PHL Homogen when the next PHL Homogen has been established. Thus, only the first OU in the first tray of the first shelf has to be recorded with two entries. The other 511 OUs can be recorded with one entry. Thus, 514 entries can record 512 OUs in OU 66666, an impressive 87.5% labor savings.

Not all Object Unit Positions (OUPs) may be occupied in OU 66666. If a position is unoccupied, a subsequent contiguous sister relationship will not exist for the subsequent OU. The subsequent OU can be recorded by referencing an aligned 1st Cousin in OU 66666, recorded in the transaction by entering the OUUI of the aligned 1st. Cousin. Because such an OU can be readily identified the special reference can enable an alternate relation that would record the subject OU based on the location address of its Parent and HRPN of its lowest HL of the 1st Cousin referenced.

References to 2nd Cousins can enable ether special relationships. Referencing combinations of previously recorded OUs can enable still other computations to compute the location address of a subsequent OU. The computation of an HCLA for a subject OU based on a relationship between the subject OU and one or more Referents established in the current or a previous process is termed referation.

The ReliA process provides a number of sub-processes. Some of the sub-processes support the establishing of and accomplish the location address of the first component OU recorded within an ancestor. Some of the sub-processes support, once the first component OU in the Ancestor has been established, highly efficient processes for recording consecutive contiguous OUs within a Parent and advancing the recorded position when the position would lie outside of the Parent. Other sub-processes support the efficient recording of subsequent OUs when it is not contiguous with the last recorded OU. In addition, there are three similar AMs that can be employed in a single object system. Each AM requires certain variations on the sub-processes. The integration of the AMs is necessary to support the needs of different levels of address detail for different kinds of object systems, and for objects in an object system.

Importantly, the ReliA process includes a supporting sub-process that automatically determines what primary sub-process is being employed when alternative sub-processes are being used without necessitating that the user overtly signal what primary sub-process is being used. This supporting sub-process is termed the ReliA Integrated Evaluation process.

TITLE OF BRIEF DESCRIPTION OF DRAWINGS

Figures List

| FIG. | Description |
|---|---|
| 1 | OURF for Equipment using the Normalized Form of the ReliA Process with the CPam |
| 2 | OLARF for Equipment Using the Normalized Form of the ReliA Process. |
| 3 | Suite of Telecommunications Equipment |
| 4 | Telecommunications Site Layout |
| 5 | Generatort |
| 6 | DC Power Suite — Partial |
| 7 | Bay of Electronic Equipment |

Flowcharts List

While the invention is susceptible to various modification and alternative forms, a specific embodiment thereof has been shown by way of example in the drawings and will herein be described in detail. It should be understood, however, that it is not intended to limit the invention to the particular form disclosed, but on the contrary, the intention is to cover all modifications, equivalents, and alternatives falling within the spirit and scope of the invention as defined by the appended claims

| | Flowchart | Title |
|---|---|---|
| FIG. 8, 9 and 10 | 0100 | ReliA General Evaluation Procedure Flowchart (GE procedure) |
| FIG. 11 | 0172 | TET Evaluation Function Flowchart |
| FIG. 12 | 0200 | Universe-OL-Manual Validation Procedure Flowchart |
| FIG. 13 | 0300 | ReliAA/ReliAM Processes Evaluation Procedure Flowchart |
| FIG. 14 | 0320 | ReliAA-CNP Validation Procedure Flowchart |
| FIG. 15 | 0331 | ReliAM-CP Descendant Processes Validation Initiation Procedure Flowchart |
| FIG. 16 | 0332 | ReliAM-CP-Descendant Processes Validation Completion Procedure Flowchart |
| FIG. 17 | 0371 | MHR Tally Function Flowchart |
| FIG. 18 | 0373 | Referenced Tracked Descendant Function Flowchart |
| FIG. 19 | 0383 | IIR, MBL, and MBCPA Update Function Flowchart |
| FIG. 20 | 0570 | Unreferenced Tracked Matriarch-Descendant Ancestor Identificaton Function Flowchart (URTA ID function) |
| FIG. 21 | 0671 | End of Parent Determination Function Flowchart (EDP function) |
| FIG. 22 | 0710 | OL Enabling Processes Completion Procedure Flowchart |
| FIG. 22 | 0720 | CNP Enabling Processes Completion Procedure Flowcharts |
| FIG. 23 | 0730 | CP Enabling Process Completion Procedure Flowcharts |
| FIG. 24 | 0810 | OL Transaction Update and Close Procedure Flowchart (OL TU & P procedure) |
| FIG. 25 | 0820 | CNP Transaction Update and Close Procedure Flowchart (CNP TU & P procedure) |
| FIG. 26 | 0830 | CP Transaction Update and Close Procedure Flowchart (CP TU & P procedure) |
| FIG. 27 | 0871 | Previous Transaction Close |

-continued

| Flowchart | Title | |
|---|---|---|
| FIG. 28 | 0874 | Function Flowchart Guardian and MBCPA to ReliA CPA Conversion Function Flowchart |
| FIG. 29 | 1010 | ReliA-EHA-OL Validation Procedure Flowchart |
| FIG. 30 | 1020 | ReliA-EHA-CNP Validation Procedure Flowchart |
| FIG. 31 and 32 | 1030 | ReliA-EH-CP Processes Evaluation Procedure Flowchart |
| FIG. 33 | 1031 | ReliA-EHA-CP-Next Validation Procedure Flowchart |
| FIG. 34 | 1032 | ReliA-EHR-CP-pC-Skip Validation Procedure Flowchart |
| FIG. 35 | 1033 | ReliA-EHR-CP-SLT-Skip Validation Procedure Flowchart |
| FIG. 36 | 1034 | ReliA-EHR-CP-SLT-Skip Validation Procedure Flowchart |
| FIG. 37 | 1050 | ReliA-EH-CP General Completion Procedure Flowchart |
| FIG. 38 and 39 | 1060 | ReliA-EH-CP PA Completion Procedure Flowchart |
| FIG. 40 | 1071 | Skip Count Tally Function Flowchart (SCT Function Flowchart) |
| FIG. 41 | 1072 | Skip Direction Determination Function Flowchart |
| FIG. 42 and 43 | 1300 | ReliAQ Processes Evaluation Procedure Flowchart |
| FIG. 44 | 1310 | ReliAQ-OL Validation Procedure Flowchart |
| FIG. 45 | 1320 | ReliAQ-CNP Validation Procedure Flowchart |
| FIG. 46 | 1330 | ReliAQ-CP Validation Procedure Flowchart |
| FIG. 47 | 1371 | CAGE Function Flowchart |
| FIG. 48 | 1373 | MBCPA Construction Function Flowchart |
| FIG. 49 | 1381 | Hierarchical Reach Evaluation Function Flowchart (HR Evaluation Function) |
| FIG. 50 | 1382 | Reference Row Fill and Evaluation Function Flowchart |

Procedure or function references with an asterisk (*) are described only in the narrative.

GENERAL DESCRIPTION OF THE INVENTION

The Normalized Location Address

It is fundamental to hierarchical address schema based on a complete HCLA that the address of an OU fully contains the address of its Ancestors. An HCLA of all tracked OUs in a universe of OUs, as defined by a user organization, is normally maintained on an Object Unit Record File (OURF), a permanent record file of the OUs in the defined Universe. Therefore, OURFs, maintaining the full address of the Ancestor entities and the full address of its Descendants contain redundant information. When a series of HEDCs are identical for two or more HCLAs and both series are based on the same Universe, the location address as represented are deemed the same. In this case the UUI of the OU represented at the common location address can be substituted for identical higher level series of HEDCs of the Descendant OU.

EXAMPLE 5

If OU 00881 in Example 3 is located in the bottom right front space of the cabinet 66666 with HCLA 04/01/02/201/06, the complete HCLA for the Descendant OU is 04/01/02/201/ 06/08/08/01. An HCLA consisting of the HEDCs of the first five HLs of OU 00881 equal the HCLA of its cabinet, OU 66666.

Since the HEDCs for cabinet 66666 and the HEDCs for the Ancestor (GGP), i.e. HL1 through HL5 are identical, the location address of OU 00881 can be described as 66666/ 08/08/01, where the UUI 66666 of the Ancestor is substituted in the HCLA of the subject OU for the HCLA off the Ancestor, 04/01/02/201/06.

When in the present invention the OUUI of the lowest tracked Ancestor of a subject OU can be substituted for the equivalent HEDCs of the HELAs of the subject OU the resultant location address is a "Normalized Location Address" of the subject OU.

EXAMPLE 6

The OUUI and location address for OU 00881 in the bottom right front space of the cabinet in Example 5 is OU 00881, can be depicted in normalized form as 66666/08/08/ 01[1]. Where the subject OUUI is listed first, then the tracked Ancestor, and then the HCLA of the subject relative to the referent tracked Ancestor.

[1] With Subject First Convention described later.

The slash marks delimit the successive entries of the subject OUUI and the elements or fields of a location address[2] or the subject OUUI and location address on the OURF.

[2] The Transaction Entry Schema as described later.

The portion of the location address in a Normalized Location Address that describes just the location address of a Component OU rather than the location address of its lowest tracked Ancestor is termed a ReliA Component Position Address (ReliA CPA). The ReliA CPA comprises an Ancestor referent for the subject OU, and an Ancestor Based Component Position Address (ABCPA), a HCLA for the position of the subject OU relative to its Sisters in the Ancestor referent. A Component's HL can be expressed relative to its Ancestor rather than the Universe. A Component HL relative to its Ancestor is termed its Ancestor Based Component Hierarchy Level (ABL). The Ancestor's ABL is zero or ABL0. Successively lower ABLs of the Ancestor are designated as ABL1, ABL2, ... , ABLn, where n is the number HPRNs included in the ABCPA of the referencing Descendant.

The highest level tracked OU in an Object System is termed an Origin OU. The HELA of an Origin OU is termed as a Universe Based Origin Location Address (UBOLA). The UBOLA, as will be explained later, is a Normalized Location Address for all Origin Ous. The successive hierarchies of entities within the UBOLA are often designated as Universe Based Entity Hierarchy Levels (UBLs). Thus a UBOLA comprises the fields UBL1, UBL2, ... , UBLm, to represent the HLs, where m is an integer and represents the organization defined Transition UBL (defined later) and where UBL0 represents the universe of the user organization. The HEDC for a particular UBL is identified as UBL1-HEDC, UBL2-HEDC ..., UBLm-HEDC represent the HEDCS in the successively lower hierarchy levels of the UBOLA.

EXAMPLE 7

The Origin Location Address for the Origin OU 66666 can be depicted as 04/01/02/201/06. The Origin OU 66666 is at UBL5 and the HEDC at UBL5 is represented as UBL5-HEDC which equals 06 in the UBOLA.

The resource savings associated with the normalization of the HCLAs of OUs is accomplished by splitting the two forms of location address into two separated files. In the preferred embodiment of the present invention, the UBOLAs of Origin OUs are maintained in a supplemental file termed the Origin Location Address Record File (OLARF). The ReliA CPA and other parameters associated in an Object Management Application(OMA) are maintained in the OURF. Records for all OUs are maintained on the OURF, while only the Origin OUs needs to have a record in the OLARF so as to maintain the UBOLA. The net storage saving in fields, or columns, in a file or table, where an individual OUUI or HEDCs are maintained in individual columns, is decreased by the fields required for the tracked Ancestor referent. In addition, the objective of maintaining addresses in normalized form is to eliminate maintenance of duplicated location addresses. This improves both reliability of the data and performance in accessing the data.

When a non-Normalized Location Address is maintained, incongruity in a Component's address may occur because the Component's address was derived from its Ancestor referent when it was first located in the Ancestor, but not updated when the Ancestor was moved. If complete HCLAS are maintained on the OURs of Components of Ancestors and they are not updated when their Ancestors are transferred, the OURs would show a Component that is at one location based on its HCLA, but its actual location would be within the location address of its transferred Ancestor. When an OU and its Components are moved simultaneously, a separate transaction must be recorded for each tracked Component as well as the Ancestor OU because the Components are not linked to the Ancestor. If the higher order HEDCs of a non-normalized location address is derived from its Ancestor, the order in which the transactions are recorded, as well as each transaction's accuracy, can affect the accuracy of the OURs after the transactions.

The transfer of the components of an OU should not always be entirely automatic. If an OU is left behind when its Ancestor is moved, it ceases to be a Component of that Ancestor and its address may no longer correspond with the HELA of the transferred Ancestor. If transferring Components with an Ancestor OU is the norm non recording of the transfer of the Components should be the default process. Otherwise a Component transfer policy should be determined and a transfer policy flag established for each Item that may contain tracked Descendant OUs to ensure that the transfer of tracked Descendant OUs is accomplished as necessary. Where the default for a Item is transfer of all Components with the item, and a Component is not transferred with its Ancestor OU, then the non-transferring Component should be separately transferred to a higher Ancestor, an other tracked OU, or transferred as an Origin OU to its UBOLA.

A Parent OU may not always be a tracked OU. When a Parent is not a tracked OU it cannot be referenced as a tracked Ancestor. When a subject Component OU's Parent is a non-tracked OU, the Component's referent based address is established by using the lowest level tracked Ancestor of a subject OU. The lowest level tracked Ancestor of a subject OU is termed its Guardian. The Ancestor OU referent included in a ReliA CPA is therefore more specifically termed a "Guardian". A Guardian may be separated from its subject OU, its referencing Descendant, by one or more hierarhcy levels. A Guardian separated from its referencing Descedant by two or more hierarchical levels is called a Hierarchically Detached Component. A Guardian OU can be the Parent OU of a referencing descendant and is not necessarily hierarchically detached from its referencing Descendant. The ABCPA of a subject OU relative to its Guardian is termed a Guardian Based Component Position Address (GBCPA).

A Component HL relative to its Guardian is termed herein as its Guardian Based Component Hierarchy Level (GBL). The Guardian's GBL is zero or GBL0. Successively lower HLs of the Guradian are designated as GBL1, GBL2, . . . , GBLn, where n is the number HPRNs included in the GBCPA of the a referencing Descendant. The number of GBLs or HPRNs in the GBCPA of a referencing Descendant is termed the Guardian-referencing Descendant Hierarchical Reach (GrDHR) of the GBCPA. The number of GBLs in a ReliA CPA is, therefore, the GrDHR of the GBCPA, in the ReliA CPA. In addition to counting the number of HLs (generations) or HPRNs included in the GBCPA of the ReliA CPA, the GrDHR can be recomputed as the difference between the GBL of the Guardian, GBL0 and the GBLn of the referencing OU.

EXAMPLE 8

The GrDHR of the ReliA CPA of OU 00881 is 3 in Example 6.

The GBCPA of a Component of a Parent Guardian OU can be represented by a single HRPN to represent the position of the subject Component at GBL1 (GBL1-HRPN). The GBCPA of a Component of a Guardian OU that is not a Parent must be represented by additional HRPNs. A HRPN must be included in a GBCPA for each GBL below the Guardian referent. Therefore, the total number of HRPNs that must be included in a GBCPA equals the GBL of the subject OU. Ira subject Component OU as a referencing Component of a Guardian OU is at GBL3, the GBCPA must include GBL1-HRPN, GBL2-HRPN, and GBL3-HRPN.

Intermediate Tracked Ancestors

A subject OU may also have a plurality of intermediate tracked Ancestors between the Origin OU and the subject OU.

EXAMPLE 9

In practice, OU 00881 in Example 5 could be referenced to a different Ancestor if the lowest level tracked Ancestor in its lineage were different. If the bottom shelf of cabinet OU 66666 is established as a tracked OU with an OUUI of 77777, the relevant OLARF and OURF records for the subject OU, OU 00881, and its tracked Ancestors are as follows:

| OLARF | | | | | | OURF | | | | |
| --- | --- | --- | --- | --- | --- | --- | --- | --- | --- | --- |
| OUUI | UBL1 | UBL2 | UBL3 | UBL4 | UBL5 | OUUI | Guardian | GBL1 | GBL2 | GBL3 |
| 66666 | 04 | 01 | 02 | 201 | 06 | 77777 | 66666 | 08 | | |
| | | | | | | 00881 | 77777 | 08 | 01 | |

Whether or not intermediate level tracked Ancestors are present, the subject OU of each record of the OURF is linked to the record of its lowest level tracked Ancestor OU (Guardian OU) by the tracked Guardian included in the ReliA CPA of the OUR for each subject OU included in the Normalized Location Address file. And the Origin OU is linked to the UBOLA in the OLARF.

An Ancestor referent plus the lower level position address of a subject OU, comprise the information needed to compute the complete address of a subject OU. Thus, the complete HCLA of the lowest Component is established by collecting the codes (HEDCs or HRPNs) from the Normalized Location Address of each successive tracked Ancestor. More specifically, the complete HCLA, as well as the identity, of any OU can, therefore, be computed by chaining up through the successive Guardian referents of a subject OU to identify the Origin OU. The series of Ancestor OUs that link a subject OU with its Origin OU is termed its Origin-Subject Lineage(OSL). As the Origin OU does not have an Ancestor referent, the UUI of the Origin OU itself is used to link the OUR of the Origin OU, and its tracked Descendants to an Origin Location Address Record(OLAR) of the Origin OU in order to determine the UBOLA of the Origin OU. The complete HCLA of the OU is established by successively combining the GBCPA of each of the OUs identified in the OSL to the UBOLA of the Origin OU.

Conversely, the location as well as the identity of all Component OUs in an Origin OU or lower level Descendant OU can be computed by repetitively chaining down and collecting the identities of each Descendant that reference an Ancestor which is the subject OU until no more Descendants are referenced in this manner.

The Ous in OUPs within a Parent OU with definable ordinal positons or measures for the OUPs create relational definable OUPs. Each successive Parent OU creating the same. The OUPs of one Parent therefore relating to OUPs in another parent, so as to create potentially a multidimensional matrix of relationally describable OUP with a series of Parent and PHL Homogens Ancesotrs of the Parent and the PHL Homogens. The multidimensional matrix of relational describable OUPs can be similarly related to its lowest level track whole in the OU defined as the Guradan. All OUPs within a Guradian, therefore, are presumed to relationally define the position of the subject OU relative to the Guardian OU. The HEDC within a Guadian are not only entity division codes but real numbers that represent consecutive, ordinal, and therefore, relational, position values within their Parent entity. Said HEDC in a Parent and Guradian OU are a termed HieraRelational Position Numbers (HRPN). An GBCPA, or an ABCPA more generally, is deemed to be relational because it comprises HRPNs.

A location address constructed from Normalized Location Address (NLA) in which the HCLA of each Guardian OU replaces the Guardian OUUI of the successive Descendants in the OLARF and OURF is simply a complete HCLA. A more useful location address is to leave the Guardian referents in the constructed and displayed location address so the Guardian can be a reference for the user in locating the subject OU. To achieve the more useful location address the HCLA of the Guardian OU should supplement Guardian OUUI of the successive Descendants in the OLARF and OURF that are Ancestors of the subject OU; the Guardian OUUIs are shown in the complete HCLA at the universe based hierarchy level of the Guardian OU with GBCPA of it's referent. Said constructed location address with the Guardian referents of each tracked OLA is termed the ReliA Normalized Location Address Display (ReliA NLAD). The successive descendants that are Ancestors of the subject OU in the OSL are termed Origin Descendant Ancestors (ODAs)

If the subject OU is an Origin OU, the ReliA CPA, the second part of the NLA and the ReliA NLAD will be null. If the Guardian OU of a subject OU is an Origin OU, the second part of the NLA and the ReliA NLAD for the OUR of the subject OU will not have a GBCPA. When there is more than one tracked Ancestor in the OSL, the ReliA CPA of each ODA in the OSL and the ReliA CPA of the subject OU make up a successive occurrences of the second part of the NLA and the ReliA NLAD for the said successive OUR in the OSL.

The GBCPA establishes the position of the subject OU within its Guardian. Note that a subject OU can have a non-tracked Parent, a non-tracked GP, or an even a more distant non-tracked Ancestor that will not be its Guardian.

EXAMPLE 10

If in Example 9 the Parent OU, the tray, is established as an intermediate tracked Ancestor with an OUUI of 88888, the complete ReliA NLAD will change. The ReliA NLAD for OU 00881 with an intermediate tracked Ancestor of tray 88888 will be:

04/01/02/201/06 (from the OLARF) for OU 66666 66666108 (from the OURF) for OU 77777 77777/08 (from the OURF) for OU 88888 88888/01 (from the OURF) for OU 00881

The complete HCLA of OU 00881, of course, remains unchanged.

General Comments About the HCLA, HELA, and the UBOLA and the Data Elements and Data Structures Required Address Methodologies Certain similar ReliA sub-processes are often classified by the location address form supported by the process. The various ReliA sub-processes that support a particular form of location address share certain common issues and employ some common procedures and functions with dissimilar ReliA sub-processes that support the same address form. The address forms knows as Addressing Methodologies (AM or AMs), are presented in three versions.

The AM that supports the transfer of a Component OU with a ReliA CPA, including GBCPA, is the Component Positioning Addressing Methodology (CPam or CP). The AM supporting transfer of Component OUs without an GBCPA (only a Guardian referent) with or without a ReliA CPA in the OURF, is the Component Non-Positioning Addressing Methodology (CNPam or CNP). When transferring an Origin OU, only the UBOLA needs to be established for the subject Origin OU's location address. The AM supporting transfer of Origin OUs is the Origin Locating Addressing Methodology (OLam or OL).

Addresses are split into the address of an Origin OU and a series of relational addresses for each of its tracked Descendants. The tracked ancestor and its address have a special significance to the ReliA process by the definition of OUs presented earlier. The highest level OU in an object system is an entity that is uniquely described by a UUI. Because Descendants of an OU do not necessarily require a UUI, entities that are OUs are further classified as tracked and non-tracked OUs. The address of an Origin OU is significant because its Ancestors are entities, that are not specifically stipulated or maintained as a uniquely described or identified entity. Because an Ancestor entity of an Origin OU is not uniquely identified, a position within an Ancestor entity cannot be uniquely identified by reference to such an Ancestor entity by itself. The location address of an Origin OU, therefore, can be uniquely designated only by including the successive HEDC of each Ancestor entity relative to its Parent in the location address that comprise the HELA of the Origin OU.

The HELA of the Origin OU is comprised of HEDCs which do not necessarily describe a relationship between for the entity represent relative to its sisters at the same hierarchy. Based on the foregoing, the use of a HELA is limited HELA of Origin OUs will generally comprise a number of HEDC that, because they are non-relational HEDC, cannot be used as referents to establish the location address of other OUs. Because of its limited, but unique, application in the present invention the HELA of the Origin OU is primarily a organization universe based location address for the finer location addresses that can be achieved by this invention. Because of its uniqueness and special role the HELA of the Origin OU is termed a Universe Based Origin Location Address (UBOLA).

The number of fields required for the HELA is a function of the UBL of the Origin OU. The value of a NLA would be negated if the UBOLA had enough UBLs to record a complete HCLA for the OUs at the lowest UBL of the organization. The UBOLA of an Origin OU will have fewer UBLs than that of a complete HELA of a Descendant OU of the Origin OU. The UBOLA needs only enough UBLs so that OUs that will normally or reasonably be used as an Origin OU can be fully described by the UBOLA. The lowest UBL adopted by a using origination in an instantiation of the invention for inclusion in the UBOLA is the Transition Hierarchy Level (Transition UBL). The Transition UBL, or number of HLs included in the UBOLA, of each organization using the present invention must therefore provide sufficient HLs that it can fully describe the HEDCs of all OUs that will normally or reasonably be used as an Origin OU. The location address of all OUs that function in operation as an Origin OU are intended to be recorded as Origin OUs by the UBOLA. Any OU that has not been recorded as a tracked Component will be an Origin OU. Therefore, many OUs that will normally be Component OUs may temporarily be an Origin OU until installed or put away. Recording Origin OUs at a UBL below that of the first or second UBLs of the HCLA schema of an organization is desirable.

One advantage of using an Origin OU as an Ancestor referent is that modifications of the address location schema above the Transition UBL do not affect the operation of the process. Changes in location address schema above the Origin OU do not affect any of the processes.

The Supra Transition Hierarchy Level

Origin OUs are not restricted to the Transition UBL. An Origin OU can be recorded at an HL in the UBOLA that is higher than the Transition UBL of the organization. When an Origin OU is higher than the Transition UBL, the Origin OU is termed a Supra-Transition Origin OU. A Component of a Supra-Transition Origin OU cannot be recorded with a UBOLA. Thus, even though a Component of a Supra-Transition Origin OU exists at or above the Transition UBL, its location address must be recorded the same way any other Component OU in the OURF would be recorded if the Component is a first generation Descendant with a Guardian referent to the Origin OU (in this case the Supra-Transition Origin OU). All UBLs of the UBOLA for the Supra-Transition Origin OU below the UBL of the Supra-Transition Origin OU must therefore be zero or null with zero being preferable to signify that the HL code is not omitted unintentionally.

In general, if an Ancestor OU above an Origin OU becomes a tracked Ancestor OU, the original Origin OU loses its status and receives an Ancestor Referent to the higher level tracked Ancestor(s).

EXAMPLE 11

Assume for BioSupply Corp. that UBL 5, designated as the bay level, is the Transition UBL. Assume also that the suite and bay contain non-tracked OUs. If the building housing the cabinets is established as a tracked OU with OUUI 60013, then the cabinet, OU 66666, would cease to be an Origin OU. In this case ReliA CPA, with the CPam, of the cabinet would become 60013/201/06 where 201 represents the Ancestor position suite and 06 represents the Ancestor position bay of the suite. The Building as a Supra-Transition Origin OU would have the UBOLA of 04/01/02 or the equivalent 04/01/02/000/00.

Application to Systems

The invention serves to determine and record the unique identity and location addresses for OUs as part of recording transactions to support the management of the OUs. In practice, associated parameters will often need to be collected and the recorded, so there must be provision for the collection of the associated parameters. Thus the present invention will often need to work within a broader and encompassing Object Management Application (OMA). The OMA can call the ReliA process as it initiates it's procedures each type Specific Business Function Transaction Type (SBFTT) to support identifying the subject OU and determining and recording the location address for the subject OU of successive transactions of the same type and allow the OMA to collect any additional parameters required.

The OU systems to which the present invention may be applied are too numerous to be listed. However, some requirements for application of the present invention should be clearly understood:

1) A hierarchical location address system is defined for OUs that will be tracked in an instantiation of the invention as well as non-OU entities that may define part of the complete location address for a tracked OU. Where two or three elements of a location address define positions on a two or three dimensional plane or space the elements must be ordered to establish a hierarchy schema for describing the plane or space.

2) The tracked OUs that will be tracked in an instantiation of the invention should be identified by a Unique Unit Identifier (UUI) which may have to be permanently affixed to the OU.

3) There should be an Object Unit Record (OUR), a Data Base Management System (DBMS) record containing the parameters of an OU that are unique to the OU, for every OU that will be tracked by an instantiation of this invention and the location address on the OUR must be accurately maintained. An UUI on the OUR should correspond with the UUI attached to the OU described by the OUR.

4) There should be at least one file that can be electronically controlled to maintain the OURs. In the present invention, this file is called an Object Unit Record File (OURF). An OURF is a DBMS file of OURs for all tracked OUs. In some cases, the records in the OURF may be split, with some information kept in one part and other information kept in another part. Each file used should be structured to support the basic fields required.

5) There should be a data base engine that tracks the OURs.

6) An embodiment of the present invention should communicate with a database engine to control the processing of various data elements collected with each OMA transaction and to interact with the user for each OMA query or report.

The Data Elements and Data Structures Required

The permanent files that comprise the DBMS required to support this invention when Normalized Location Addresses are used will consist of (1) an OURF to maintain the records of all tracked OUs in the using organization environment and (2) an OLARF to maintain the UBOLA for each Origin OU. Additionally, certain sub-processes need to maintain specific parameters common to all OUs representing an Item. These common parameters related to an Item are normalized by the addition of (or inclusion of) an Item Master Record File (IMRF).

Object Unit Record File (OURF)

The OURF comprises the following—minimum, basic fields:

1) The OUUI of the subject OU. An OUUI must be distinguishable from UBL 1-HEDC and from GBL1-HPRN.
2) The ReliA Component Position Address (ReliA CPA) comprises:
   i) The OUUI of the Guardian referent (or Guardian OU).
   ii) The Guardian Based Component Position Address (GBCPA), if the CPam is employed for OUs included in the Universe, comprising fields, address elements, or codes, termed herein as HPRNs for each hierarchy level that will be allowed in the GBCPA. GBL1-HPRN must be distinguishable from all OUUIs and from all UBL1-HEDCs.

In addition, the following fields may be included if desired or required by particular subprocesses of the ReliA process.

3) The Item Identifier (Item ID) if required to provide an item identity to OUs or link the OUR to normalized parameters common to all occurrences of the OU Item in an IMRF.
4) Other OU parameters unique to OUs as opposed to their Item IDs are described in the preferred embodiments of this invention or as included by the using organization to support an OMA using this invention.
5) Item Descriptions and associated parameters if required and not maintained in an IMRF. These are described under the IMRF.

Origin Location Address Record File (OLARF)

The OLARF comprises:

1) The OUUI of the Origin OU.
2) The UBOLA comprising a fields, address elements, or codes termed herein as HEDCs for each HL of the user organization's HCLA schema down to the Transition UBL of the organization. UBL1-HEDC must be distinguishable from all OUUIs and from all GBL1

Item Master Record File (IMRF)

The IMRF, while not required for the invention, is described in some examples and employed in the preferred embodiments of the invention. Moreover, some Item related parameters that are required for some of the sub-processes must be maintained on the OURF in a non-normalized manner if not maintained on the IMRF. Item IDs and Item Descriptions, collectively termed Item Descriptors, when displayed with an OUUI generally help the user to identify objects and to locate objects and their Descendants more readily than can be achieved by an OUUI alone. Item Descriptions, however, are not essential to the operation of any of the sub-processes of the invention described herein. Item IDs serve as unique identifiers of an Item Master Record (IMR) on the IMRF.

The basic elements of the IMRF that are described in the sub-processes are listed below. A more complete list of the data elements that might be employed is included in the Data Dictionary for the Preferred Embodiment. Any data elements described herein as residing on the IMRF could be maintained on the OURF in a non Normalized form.

1) An Item Identifier (Item ID).
2) An Item Description
3) An Component Allowed Indicator (CAI), an indicator that a tracked Component of the Item (or OU) is allowed in the Item (or OU)—to reference an OU of the Item.
4) A Component Positioning Required (CPRI), an indicator that controls when the Component Positioning Addressing Methodology (CPam) is required for a referencing Descendant of the Item (or OU).
5) End of Parent Object Unit Position Numbers (EPOUPNs or EPPNs), a value for the End of Parent Object Unit Position (EPOUP or EPP) of each successive HL of an Item (OU) that may be occupied by a non-tracked Component. The individual fields of the EPPNs comprise EHL1-EPPN, EHL2-EPPN, ... ,EHLm-EPPN where m is an integer and describes the maximum number GBLs included in the GBCPA of the ReliA CPA.

Additional data structures and data elements that are required to support specific sub-processes of this invention are further described in the presentation of the sub-processes, the preferred embodiment, and in the Data Dictionary for the preferred embodiment.

Integration of Prior Art Process With ReliA Processes via Enabling Using The Universe-OL-Manual Process For certain Items it may not be necessary to determine or maintain the lower order elements of an OU's location address to describe its position relative to certain of its Ancestors. In the extreme case, only the higher order elements of a HELA are maintained. In this case, the location address with only a HELA corresponds to prior art. HELAS generally are used to meet accounting, mail distribution, and other organization needs for consistent coding of the various geographically positioned operating locations and divisions of an organization and the facilities or cost centers therein. These high level codes describe the general location of entities at or above the Transition UBL and are generally easy for users to remember.

As practiced for some Items in the prior art, even the lower order hierarchical elements of the UBOLA may not be necessary or used.

EXAMPLE 12

The Sales Managers of BioSupply in Houston uses an office at Suite 130 in the building at 1313 Commerce Blvd., in Houston but his responsibility is for the entire state of Texas. His accountability is at the organization level represented by the HELA 04. Arthropod has the policy of tracking company automobiles to the level of accountability of the custodian for the automobile. If his company car is identified as OU 40898 it's UBOLA would be recorded as 04/00/00/00/000/00 or its equivalent 04/.

OUs of many items that will normally be Descendants of Origin Items will from time to time be transferred to an entity without designating a tracked Ancestor in the transfer. Such transfers without a tracked Descendant may occur because an OU has been removed from its location address of record but its destination address, while known as an UBOLA is not known in terms of a tracked OU. Thus, a transferred OU that is not normally an Origin OU will need to be recorded as an Origin OU.

EXAMPLE 13

If in Example 3 two trays of butterflies, identified by OUs 61048 and 61059 are hand carried to the lab in building 02, suite 215 for special analysis by one of the employees. The employee records the transfer of the trays but knows only the HELA of the lab. The employee records the transaction for the first tray OU 61048. The employee records the transfer by recording the OUUI and the HELA of the lab, 04/01/02/201 in accordance with the prior art. Thus, the trays, normally Components of a shelf and cabinet becomes an Origin OU.

When the employee arrives at the lab with the trays an employee of the lab can store the trays in a tracked, Ancestor OU or leave the location address as originally transferred.

Successive transfers to the same location address must be entered in the same manner or the address must be copied, manually or automatically. Prior art provided for automatic prompting (shadowing) of the same location address for successive OUs. The user could reference a successive subject OU and record a keyboard or other preestablished, fixed command to close the transaction with the prompted location address that equaled that of the Subject of the Last Transaction (SLT) or record a new address for the current transaction.

Three different Addressing Methodologies (AMs)are supported in the present invention. When only an UBOLA needs to be established or maintained by one of the ReliA sub-processes, (as opposed to maintaining a Guardian OUUI or even a ReliA CPA), the AM employed is termed herein as the Origin Locating Addressing Methodology(OL or OLam).

Certain novel sub-processes are included in this invention that further simplify the prior art for Origin OUs. These simplifications require that the process employed in the prior art be modified to enable the simpler process in subsequent transactions. The prior art process that supported the OLam is extended in the present invention to enable certain sub-processes of the invention. The crux of the enabling for the OLam is to establish and maintain a location address for the SET that allow the location address of subsequent transactions to be determined from the maintained address and the additional parameters. When conditions are established for a specific AM, certain ReliA sub-processes that are simpler and more efficient than the enabling processes can often be used. Enabling processes based on such conditions, alone or in conjunction with other enabling determinants, are a key concept in the ReliA Integrated Evaluation process. The existence of such location address and other parameters and determinants enable other ReliA sub-processes to be employed by the user to record more efficiently a particular transaction or set of transactions. A means to disable the enabled process should also be established. A subsequent reference to the SET can be established as a trigger to return ReliA to the non-enabled process state. If the OUUI of the Subject of the Enabling Transaction (SET) is to be used as a Disabling Reverable (DRb) the OUUI of the SET must be maintained as part of the parameters and determinants required to establish the enabled processes. The enabled state created by said enabling procedure is termed an Enabled Process Session (EPS). The EPS supporting the OLam is termed EPS-OL.

The other enabling parameters and determinants will be different with each AM. More generally, the location address or ancestor referents, parameters and pointers required for an EPS of an AM, the alternative ReliA sub-process available with that EPS, and the DRbs of the EPS that are specially maintained for the EPS or the next transaction are collectively termed the EPS Determinants Record(EPS-DmRd).

If an indicator is employed to track when prerequisite conditions have been met for the EPS of a particular AM for subsequent transactions, the indicator is termed an Enabled Process Session Indicator (EPSI). When an EPS-DmRd or EPSI is used and maintained, a user can return under some circumstances to the recording of transactions that may have been disrupted and resume processing in the enabled state.

Thus, certain alternative sub-processes are indicated from an a priori non-EPS enabled state. In general, these sub-processes can automatically enable other alternative sub-processes by setting up an appropriate EPS. If a transaction is recorded when an EPS is off (false), it may be evaluated and processed according to a different set of evaluations and validations than when the EPS is on (true).

The prior art process extended to support such enabling is sometimes termed herein as the Universe-OL-Manual process. This process incorporates the prior art to record the subject OUUI and a HELA and provides for the enabling of the EPS for the OLam. The Universe-OL-Manual process itself is enabled from a non a priori enabled state.

A series of sequential address determinants entries comprising OUUs, HRPNs, and HEDC that must be recorded by the user to effect a particular ReliA sub-process for a transaction and enable the ReliA sub-process to identify the subject OU and its location address for the transaction is termed the Transaction Entry Schema (TES).

The Universe-OL-Manual process calls for the user to record the UUI of the subject OU and the HELA of the subject OU. When the Subject First Convention (SFC) is employed the UUI of the subject OU is recorded first in TES1, the UBL1-HEDC is recorded in TES2, and successive HEDCs are recorded in successive TES fields. The TES is closed with the SFC by recording the maximum number of HEDCs for the UBOLA, or by a TES Closure Entry (explained later). When the Subject Last Convention (SLC) is employed the UBL1-HEDC is recorded in TES1 and successive HEDC are recorded in successive TES fields. The TES is closed by recording an OUUI for the subject OU. Other than the subject OUUI the TES entry elements recorded for the Universe-OL-Manual process correspond to the data elements recorded on the OLARF for the OLam.

The Universe-OL-Manual and all ReliA sub-process validate the UUI of the subject OU, any referents, and HEDC or HRPN and validate any additional transaction parameters required as per prior art. The process also calls for recording the UBOLA of the subject OU in the OLARF, clearing and ReliA CPA address that may have existed on the OURF for the subject OU, and establishing a the and the OUUI of the transaction in its EPS-DmRd. Where a DRb is to be included to disable the process this must be recorded in the EPS-DmRd. Conversely when a ReliA-CPA is computed the ReliA-Sub-process must clear any record of the subject OU on the OLARF as wll as record the ReliA-CPA on the OURF.

EXAMPLE 14

The Facilities department of Leader Corporation has the policy of recording offices and cubicles as Origin OUs. The Facilities department wants to record the location address of all offices and cubicles in its Headquarters building. The UBOLA of the building is 001/CA/93005/01. The first office is assigned an OUUI of 92001. The transaction employing the Universe-OL-Manual process is recorded as: 92001/001/CA/93005/01. The process validates the subject OU and the UBOLA according to prior art and establishes the UBOLA in the OLARF for the OU. It also establishes the in the EPS-DmRd for the EPS-OL for the CPam so subsequent transactions can be processed as the more efficient forms of the OL processes.

If a subsequent transaction is recorded when an EPS is enabled, or on, it is evaluated and processed, potentially indefinitely, according to a special set of evaluations and validations. Accordingly, an EPS must be disabled when the last transaction to be recorded at a particular UBOLA or under the same Ancestor referent[3] is completed. If a process is not provided for disabling the EPS of an enabling process the EPS should not be created. In this case the "enabling"

process becomes just a stand alone transfer process. In general, the disabling of the EPS should be performed by the user. The user can effect disabling of the EPS by referencing a DRb, entering a keyboard or other specialized, fixed command in accordance with prior art. The DRb can be generally pre-defined for each AM. The Drb for the Olam could be any previously recorded OU in the EPS. The preferred embodiment restricts the DRb for the Olam to the SET and uses the SLT as a Reversal Referable. Because, DRbs can be provided for all processes, but an EPS may not be disableable by a DRb processes before a second tranaction is recorded in some cases. Therefore, a Fixed Command process for disabling any current EPS should also be provided. The keyboard or other preestablished, fixed command can be used as well as an alternative disabling method. Specialized, fixed commands as established in the prior art and executed without reference to an OUUI to effect the command are sometimes termed herein as Fixed Commands. In the preferred embodiment of the Universe-OL-Manual process, the DRb is the SET, the subject OU of the transaction in which the current ESP was established.

[3] Later defined as a Matriarch, an automatic Ancestor referent for EPS-CNP or EPS-CP processes.

EXAMPLE 15

If OU 92001 in the last example is the only OU to be recorded at the UBOLA, the EPS is disabled, or turned off, by referencing the SET, the subject of the just completed transaction in this case, OU 92001. Thus EPS-OL is disabled by recording simply:92001. Alternatively, the currently enabled EPS can be disabled by entering a Fixed Command. In either case EPS-OL is turned off, so a subsequent transaction will be evaluated from a non a priori enabled state. The Component Non-Positioning Addressing Methodology and the Ancestor-CNP Process In many cases it will be unnecessary or temporarily impossible to track OUs at the lowest HLs at which they could be potentially tracked, although it is necessary to track OUs with more precision than afforded by the Origin Locating based processes. The Universe-OL-Manual process in support of the OLam allowed OUs, under certain conditions, to be tracked as Origin OUs that would normally be tracked as Component OUs. It should be obvious to those familiar with the art that tracking OUs only as Origin OUs in many cases partially or fully defeats the purpose of tracking in the first place. A location address based on only the lower level tracked Ancestor referents, without an ABCPA, may be the preferred location address.

Even though an Ancestor address, by itself, does not provide a detailed position address of the subject OU, it can be used effectively by itself. Users can sometimes find the location of something very easily by describing a series of closely related references, especially when a good description of the reference can be provided. For example, if you are trying to find my office and are familiar with Kingwood, a location described as a cross form the elevator on the second floor of the "Texas Commerce Bank Building" in Kingwood Place may be preferable to a street address and suite number, because the Texas Commerce Bank Building in Kingwood Place is big and easier to see than street signs, and street numbers on the buildings. This is especially so when there is no street sign, the general case with OUs of non labeled addresses.

When the detailed position afforded by an ABCPA is not required, but detail greater than the UBOLA is required, only a Guardian referent is required to establish a more detailed location address. In general, the location address required for a subject OU will be established by its Guardian OUUI or its Guardian Item alone needs to be collected. When only a Guardian referent is needed for the location address for the subject OU of a transaction the AM employed is termed the Component Non-Positioning Addressing Methodology (CNPam or CNP).

OUs with a Guardian OUUI location address established by the CNPam are linked to their Origin OU previously described. Thus, a subject OU location address recorded by a CNPam process will have the higher ordered HELA provided by the address of the referent Guardian. More generally, where an GBCPA is not established for a tracked Ancestor OU in an OSL (i.e. the Ancestor OU was recorded by an OLam) the HRPN for any HLs in the lineage that would otherwise have established a GBCPA for the OU will not be included in a complete HCLA established for the subject OU. Thus an effective location address for a subject OU may not be established without reference to the Ancestor referent recorded by CNPam.

When the CNPam is employed for any tracked Descendant OUs in an OSL, the location address is termed a incomplete HCLA meaning the HELA may not completely describe the position at all HLs in the OSL, but relational references can fill part of the void with the ReliA Normalized Location Address, albeit without CPAs.

If maintenance of the incomplete HCLA is allowed by the user for all OUs included in the universe of OU tracked by an organization using an instantiation of the present invention, the GBCPA can be excluded in OURF for the instantiation. In this case, the ReliA NLAD will consist of the UBOLA for Origin OUs and a Guardian referent for each tracked Ancestor in the OSL.

EXAMPLE 16

The subject and location address on the OURF of OU 00881 in Example 9 can be described using the CNPam as 00881/77777 without an GBCPA. This describes the location address of the subject OU with still less specificity. The complete address when only the shelf is used as a Guardian is 04/01/02/201/06/08 with only six HLs. The GBCPA of 00881 relative to 77777 will not be available.

Referential integrity dictates that the tracked Ancestor referent used in this Methodology is the lowest tracked Ancestor OU in the OSL.

EXAMPLE 17

If cabinet 66666 in bay 06 described in Example 3 has Descendant OUs identified without GBCPA as: 77300*a* shelf in cabinet 66666; OU 88320, a tray in shelf 77300; and OU 00321, an Arthropod in tray 22222. The data elements by file are as follows:

| I. | OURF: | | | | | |
|---|---|---|---|---|---|---|
| | Subject | | ReliA CPA | | | |
| | OUUI | Item ID | Guardian | GBL1 | GBL2 | GBL3 |
| | 66666 | CB | | | | |
| | 77300 | SL | 66666 | | | |
| | 88320 | TR | 77300 | | | |
| | 00321 | YB | 88320 | | | |

| II. | OLARF: | | | | | |
|---|---|---|---|---|---|---|
| | OUUI | UBL1 | UBL2 | UBL3 | UBL4 | UBL5 |
| | 66666 | 04 | 01 | 02 | 201 | 06 |

Descriptions for these HL codes are maintained separately as established in existing art.

III IMRF:

| Item ID | Item Description |
|---|---|
| CB | Cabinet |
| SL | Shelf |
| TR | Tray |
| YB | Yellow Butterfly |

To find the location address using the CNPam for the OU 00321, this embodiment of the present invention would use the tracked Ancestor referent for the subject OU 00321 to locate its Guardian OU 88320, use the tracked Ancestor referent for OU 88320 to locate its Guardian OU 77300, use the tracked Ancestor referent for OU 77300 to locate its Guardian OU 66666, and then finding that the tracked Ancestor referent for OU 66666 is null access the UBOLA of OU 66666 on the OLARF. From this information the maximum amount of detail the present invention can display as a HCLA (incomplete HCLA) for OU 66666 is 04/01/02/201/06, the UBOLA for OU 66666.

Since the incomplete HCLA provides only the higher order hierarchical address elements of any given OU's location, it provides only the neighborhood for locating an OU. Based on prior art, however, the descriptions for HL codes of the UBOLA can be maintained as well as Item Descriptions for each tracked OU. (together referred to as lineage information). The lineage information can be presented together to the user to help the user find a specified OU. The location of the OU to the extent it is described by its UBOLA can be described by it its successive HEDCs in the UBOLAS and a description of the HEDC for each hierarchy of the UBOLA. In addition, the location of a tracked Component OU can be described more specifically by presenting the Item ID and the Item Description of the specified OU and each of its tracked Ancestors.

EXAMPLE 18

Using the information from Example 17 the following can be displayed by the present invention using the CPam.

| HEDC or HRPN | Description | Box 1 | Item ID | Guardian OUUI | |
|---|---|---|---|---|---|
| 04 | Texas | | | | |
| 01 | Houston | | | | |
| 02 | Building at 1313 Commerce | | | | |
| 201 | Suite | | | | |
| 06 | Frame | | FR | 66666 | |
| | Shelf | | SL | 77300 | Box 2 |
| | Tray | | TR | 88320 | |
| | Yellow Butterfly | | YB | 00321 | |

The HEDC (box 1) and successive Guardian Referents Location Addresses (box 2) that comprise this incomplete ReliA NLAD provide a UBOLA and successively narrowing referents of subject OU's location. This extra value ReliA NLAD provides over the UBOLA alone substantial. This is further enhanced by providing the Item ID if not the Item Description (shaded) to facilitate identifying the Guardian referents Cousin and Sister OUs cannot be reliably differentiated in the CNPam, because an ABCPA is not employed in this AM.

Its Sisters, and perhaps Cousins, are described with the same Guardian OUUI.

A ReliA sub-process that provides for collection and recording from a non a priori non enabled process state a CNPam location address, a Guardian OUUI, for the subject OU of transaction is sometimes termed herein as the ReliA Ancestor Component Non-Positioning process (ReliAA-CNP process). To effect the ReliAA-CNP process from a non EPS enabled state the user needs to record on the UUI of the subject OU and the UUI of the Guardian.

Because the ReliAA-CNP process collects and records a Guardian OUUI, it can also serve as an EPS enabling process for the CNPam processes requiting the pre-establishment of a Guardian referent. The EPS for CNPam is termed EPS-CNP. (An EPS for the CNPam is a different enabled state than the EPS for the OLam -EPS-OL). The Guardian OU whose UUI is preserved for this purpose is sometimes referred to herein as the Matriarch OU. The distinction between a Matriarch and a Guardian, other than its preservation as anoutomatic tracked Ancestor referent in a subsequent eanbled process will be made clear in the section Matriarch Referencing methodology. The EPS Drb in the preferred embodiment is the SET. The EPS-DmRd for the EPS-CNP comprises the Guardian OUUI required for EPS-CNP and the OUUI of the SET or other Drb if used in an instantiation of this invention.

The TES of the ReliAA-CNP process comprises the Subject OUUI, the Guardian OUUI. A Homogen OUUI can be included to test for a relationship between the two referents as a partial validation check. With the SFC the subject OUUI is in TES1, with the SLC the subject OUUI is in TES2 without the Homogen referent validation, or in TES3 with the Homogen validation. With a fixed number of TES entries either way the TES can be automatically closed after the last TES entry is processed and the sub-process is indicated. Other than the subject OUUI the TES entry elements recorded for this sub-process correspond to the data elements recorded on the OURF for the Guardian Referent Location Address, the Guardian in the ReliA CPA, for the CNPam.

The ReliAA-CNP process is enabled from a non EPS enabled state. When, more generally, an Ancestor-CNP process is employed in an instantiation of this invention with another non EPS enabled ReliA sub-process employing other AMs, an enabling determinant must be established to indicate the appropriate process. The enabling determinant within the TES for the enabling subprocesses is the format or identity of the first position determinate entry in the TES. This is termed the TES First Positioning Determinant Element (TES-FPDE). Where the subject OU is employed first in the TES, the SFC is employed, and the UBOLA is recorded in descending hierarchy sequence between the Universe-OL-Manual process and ReliA Ancestor processes[4] the enabling determinant between the Universe-OLManual process and ReliA Ancestor processes is the format of TES2. In the SLC the first positioning determining element of the TES is TES1. When the TES-FPDE qualifies as a Guardian OUUI a ReliA Ancestor process is indicated. When the TES-FPDE qualifies as UBL1-HEDC of the UBOLA, the UniverseOL-Manual process is indicated. The UUI and the UBL1-HEDC can be differentiated by the format (alpha numeric or numeric or length) of the two data elements using a Format File or by specific identification against the files/tables that can validate the data elements recorded as established in prior art. Said differentiation methodologies are termed herein as TES-ADE-Process Determining Format Entry PDFE (as opposed to TES-ADE-PDRE In the preferred embodiment the FPDE Differentiation methodology between the Universe-OL-Manual process and ReliA Ancestor processes is based on an UBL1-HEDC limited to three characters and an OUUI is limited to more than three characters. In addition, in the preferred embodiment the ReliAA-CNP requires the Ancestor Item have a true Component Allowed Indicator (CAI) to prevent the use of the Ancestor process when the OUUI should not have a referencing Descendant (i.e. any tracked Descendant).

[4] The other Ancestor process is the Ancestor-CP process described in the next section.

EXAMPLE 19

The contracts and other documentation as well as files in the Legal department of Leader Corporation described in Example 2 are addressed by the CNPam. The contracts and other documentation are Components of files, and files are Components of jackets. The discount purchase, buy-back, and warranty contract file with Automation, Inc., is identified by the UUI 34891. The amendments are maintained in separate flies. All of these related files are maintained in one jacket, OU 34905. The EPSs for all other AMs included in an embodiment of this invention are off. The jackets have the Item ID of Jacket, and the IMR for Jacket has an indicator for Component positioning that is off. Leader uses ate SFC in its instantiation of the present invention. The required Guardian or Matriarch is therefore recorded in TES2. The TES to record a transaction for the placement of the contract file with Automation, Inc., OU 34891, in the jacket, OU 34905, employing the ReliAA-CNP process is recorded as 34891/34905.

All EPS are contra-indicated because the EPS-DmRds for OLam is not complete for EPS-OL. Because TES2 as the Guardian OUUI was validated as an OUUI, a ReliA Ancestor process is indicated. Additionally, the process determines the Item ID of 34905, as being Jacket from its OUR, and that the CAI indicator on the IMR for Jacket is true. Thus, the ReliA Ancestor process can be used with OUUI 34905. The ReliAA-CNP process is therefore validated and the Guardian Referent location address (ReliA CPA for CNP) is thus recorded as 34891/34905 on the OURF and OUUI 34905 is established as the Matriarch in the EPS-DmRd.

The EPS for the CNP process is disabled by re-referencing the Matriarch after the transaction is validated[5], re-referencing the SET, or by entry of a disabling command or a fixed, directed command as established in the prior art.

[5] This must be recorded after the transaction is validated in the preferred embodiment because of the successive OUUI elimination feature incorporated in the preferred embodiment.

EXAMPLE 20

If OU 34891 is the only OU to be recorded as a Component of OU 34905, the EPS-DmRds for OLam cleared by re-entering the OUUI of the Matriarch, OU 34891. The disabling is effected by simply recording 34891. Alternatively, the currently enabled EPS can be disabled by referencing the SET, or a Fixed Command.

The Component Positioning Addressing Methodology and the ReliA Ancestor Component Positioning Process In many cases detailed positions of OUs in an Object System are required to support the management of the Components or their Ancestors. The detailed position is generally necessary for the description of the as-built design of an OU system. It is especially suitable for describing OU system configuration changes made in the field. Maintenance of a complete HCLA can also facilitate the diagnosis of any position related problems with the same Ancestor OU and Ancestor Item by maintenance personnel or operators.

The functional goal of this embodiment of the present invention is a process for creating and maintaining OUs in such a way that the complete location of another unit may be recorded cost-effectively and described in a manner that facilitates finding the OU.

The CNPam purposely does not maintain the lowest level, or perhaps even the second or third lowest levels, of the complete hierarchical address of the subject OU, When a detailed position is required, this can be achieved by the addition of the GBCPA for the subject OU. When detailed positions of an OU are required, relative to the Guardian or any higher level Ancestor, the GBCPA of all intermediate descendants of the Ancestor requiring the detailed GBCPA must be recorded, the CPam must be employed. The HCLA derived from an Ancestor will be incomplete for the component unless a position code is entered with the Ancestor/Guardian referent. When a complete HCLA is required for a particular OU, the GBCPA must be recorded for all Descendants of the Origin that are in the Origin-Subject Lineage (OSL). When an GBCPA is required to establish the detail required related to a Guardian or an Origin OU, the CPam must be employed for the subject OU.

When the GBCPA or ReliA CPA is maintained on the OURF in an instantiation of this invention the CNP and CPam can be mixed, even within a particular OSL When the CPam is employed for all tracked Descendant OUs in an OSL the location address is a termed a complete HCLA for the subject OU, providing a HEDC or HRPN for each Ancestor in the subject location address. When, however, the CNPam is employed for any tracked OU in an OSL, the location address is termed an incomplete HCLA.

If maintenance of a complete HCLA is desired by the user for any OU included in an instantiation of the present invention, the ReliA CPA, with GBCPA, must be included in the OURF and the second part of the NLA. It is important to point out that the inclusion of the ReliA CPA, and therefore an GBCPA, in the NLA does not require that the GBCPA be collected or recorded as part of the ReliA CPA on all records. The decision on when the GBCPA should be collected should be determined by the user organization policy as presented for CNPam in the previous sub-section).

When an GBCPA must be recorded the location address may have to be entered by some form of a manual process: by manual entry by the user of the HRPNs of the GBCPA or by collecting the GBCPA from a bar coded template with a separate preestablished GBCPA for a subject OU. Collecting the GBCPA represents additional work and, when compared to the simplicity and speed of using the CNPam based process, can be costly. As described above, this extra work may be reduced substantially if there are other OUs in suitable Sister or Cousin relationships. This of course, depends on the nature of Sister or Cousin Relationships occurring for a particular subject OU. Otherwise, manual determination of the information required by the GBCPA is necessary.

A ReliA sub-process that provides for collection and recording a ReliA CPA from a non a priori non enabled process state and no qualifying Homogen referents, to support the CPam for the subject OU of a transaction is sometimes termed herein as the ReliA Ancestor Component Positioning process (ReliAA-CP process). To effect the ReliAA-CP process from a non EPS enabled state the user needs to record on the UUI of the subject OU, the UUI of the Guardian, and the GBCPA for the subject OU.

Because the ReliAA-CP process collects and records a ReliA CPA, with GBCPA, it can also serve as an EPS enabling process for the CPam processes requiting the pre-establishment of a ReliA CPA. The EPS for CPam is termed EPS-CP. (Art EPS for the CPam is a different enabled state than the EPS for the EPS-OL and EPS-CNP). The Guardian OU of the Subject of the Enabling Transaction whose UUI is preserved as part of this requirement is termed the Matriarch OU. The EPS Drb in the preferred embodiment is the SET and the Matriarch. The EPS-DmRdfor the EPS-CNP comprises the Matriarch, the GBCPA of the subject, and any Drb s established.

The ReliAA-CP-Manual process gives the user full freedom to record the location address of the subject OU; the user is not constrained by having to have any Homogne OU referents in a particular relationship in order to record the location address nor will an error in a Homogern referents location address be perpetuated in the location address of the subeject OU. Because of the freedom afforded errors in recording the location address, however, are not likely to be detected.

The TES of the ReliAA-CP-Manual process comprises the Subject OUUI, the Guardian Referent UUI, and the successive HRPNs of the GBCPA, GBL1-HPRN, GBL2-HPRN, . . . , GBLn-HRPN where n represents the GrDHR of the ReliA CPA recorded. Other than the subject OUUI the TES entry elements correspond to the data elements recorded on the OURF for the ReliA CPA. With the SFC the subject OUUI is in TES1, Matriarch is in TES2, and the successive HRPN of the GBCPA are in successive TES entry elements, where the TES Closure entry in HPRN in GBLn when n=m, the maximum GrDHR allowed for the instantation. With the SLC the Matriarch is in TES1, the successive HRPNs of the GBCPA are in successive TES entries starting with TES2, and then the subject OUUI in the TES entry position after the entry of the last HRPN. In the SLC the subject OU entry is the TES Closure Entry.

The ReliAA-CP process is enabled from a non EPS enabled state. When, more generally, an Ancestor-CP process is employed in an instantiation of this invention with another non EPS enabled ReliA sub-process employing other AMs, an enabling determinant must be established to indicate the appropriate process. The ReliAA-CP process is differentiated from the Universe-OL-Manual just as the ReliAA-CNP process in differentiated. The TES Process Determinant Element (TES-PDE).between the two AMs of the Ancestor process is the HRPN entry in TES3 with the SFC and TES 2 with the SLC. When a GBL1-HRPN has been recorded in the TES-PDE of an Ancestor process the ReliAA-CP-Manual process is indicted, otherwise the ReliA-CNP process is indicated. The validation comprises a true CAI and a true Component Positioning Allowed Indicator (CPRI) on the Guardian Item. The CPRI provides for consistent usage of the CPam and CNPam within the Guardian OU. In the preferred embodiment the FPDE Differentiation methodology is based on HRPN limited to less than three characters.

Where a Component in the OSL is a Hierarchically Detached Component, the HL of the intermediate non-tracked Ancestor is not described in the processes described by the preferred embodiment, but can be described by adding a supplemental file to the IMRF (a Bill-of-Materials File) to describe non-tracked components of Guardian Items that allow detached tracked components Items.

It is well known in the art that determining the location for a given OU might not be easy. Thus, determining the GBCPA call be difficult. In the simplest situation, there is one place for each OU, so a user only has to count the OUs that are installed or the vacant places. If there are more places, however, an OU may be in place 6 while it actually occupies places 6 and 7.

Accordingly, the GBCPA assignment methodology should be standardized based on (1) the actual places, or (2) the actual OU. If based on actual OU, the methodology is unclear on how to count vacant positions.

EXAMPLE 21

FIGS. 1 and 2 illustrate the maintenance of the OURF and OLARF using a normalized location address for ReliA Tel Corporation. On the right of FIG. 1 the HCLA using prior art representation of the same OUs is included for comparison of the differences between the files maintained by the present invention and those in the prior art. These two files represent the site and equipment illustrated in FIGS. 3, 4, 5 and 6. FIG. 4 illustrates some Origin OUs, including Origin OUs above the Transition UBL, represented as OLARs in the OLARF in FIG. 2 as well as OURs in FIG. 1, and a bay of electronic equipment (further illustrated in FIG. 6) and a Supra-Transition UBL Origin Generator (further illustrated in FIG. 5) as well as the Supra-Transition UBL Supra-Origin Building. FIG. 6 illustrates of a bay of electronic equipment shown in FIG. 4 whose tracked OUs are represented as Object Unit Records (OURs) in the OURF described in FIG. 1. FIG. 5 illustrates a Generator as a Supra-Transition Level Origin OU represented as an OLAR in the OLARF, FIG. 2, and as a OUR in the OURF, FIG. 1, and its major, first level components represented as OURs as well in the OURF, FIG. 1

EXAMPLE 22

The occurrence of Origin OUs above the Transition UBL is illustrated by the building and generator at location 103, site 32 in the OLARF in FIG. 2 and illustrated in Figure. The building has a UUI of 2869, and the generator assembly has a UUI of 2948. The building is designated as structure 1 of the facility, and the generator is designated as structure 3 of the same site, site 32. Both of these OUs are Origin OUs and both units are at level 3 of the hierarchical location schema. Level 4 and 5 of the HELA for these two units is recorded as 00. Zeros in these fields mean the unit recorded on the record is at a higher level. Specifically, zeros mean that the unit is at the next higher level that is not zero. The next level that is not null is level 3 containing the values 01 and 03 respectively. Therefore, these units are at level 3 in the location hierarchy schema. If level 3 had been null or zero, the next level of the HCLA, level 2, with a value of 45 would have been taken as the level of the generator. If the generator was delivered to a site or facility before being stored or installed in a particular location within that site or facility, the level 3 code probably would not have been input and the value recorded in level 3 would be zero.

When a set of OUs together make up what is perceived to be a larger OU, the larger OU cannot be effectively tracked because it is divisible. The individual, OUs that constitute the larger OU should be tracked rather than the larger but divisible OU. relatively unimportant components of an encompassing OU may, however, not be tracked, the larger tracked component is described as comprising the unimportant components.

EXAMPLE 23

In the DC Power Suite, Suite 3, at location 103, Facility 32, see FIG. 6, is not represented by a unitized, established OU. The suite exists solely by joining separate OUs and, therefore, cannot be considered an OU on its own. However, the shelves are separate OUs encompassed by the tracked bays, but the shelves are not tracked by organizational policy. The relatively low value shelves are presumed to go with (track with) the tracked bay.4.

The addition of position codes to lower level addresses as they are derived from their Ancestors is necessary to supply the HieraRelational Positions for the lower levels.

EXAMPLE 24

The following illustrates the calculation of a complete HCLA where the CPam is used and contrasts this with the use of CNPam. The following information recaps the information in the equipment illustrated in FIGS. 5 and 6, their Item Ids, descriptions, Guardain Referent OUUI, and the complete HCLA from FIG. 1:

| Subject OUUI | Item ID | Item Description | Complete HCLA | Guardian OUUI |
|---|---|---|---|---|
| 2869 | FB1230 | Building, Fiber Concrete | 103/32/1/00/00/00/00 | |
| 2871 | TCB09 | Telecom Bay A | 103/32/1/03/01/00/00 | 2869 |
| 2954 | DC10 | DC Power Control Assy | 103/32/1/03/01/02/00 | 2871 |
| 3018 | DCM3 | DC Power Meter Assy | 103/32/1/03/01/02/02 | 2954 |

Assume that records for the equipment have been established on the OURF (and OLARF where applicable), but the location addresses of recorded are the locations from which the equipment is being transferred. First, the UBOLA for the building, OU 2869, is recorded and updated on the OLARF with the UBOLA: 103/32/1/00/00. Second, the ReliA CPA for the Telecom Bay A, OU 2871, in suite 3, bay 1 of OU 2869 is recorded and updated on the OURF as: 2869/03/01. Note that the fourth HL of the UBOLA, the suite reference, is not represented by an OU. The Telecom Bay is Hierarchically Detached from the Building. Because the suite does represent a hierarchical level the suite number, 03 must be included in the GBCPA before the position of the bay, its "Component", in the GBCPA of the Telecom bay. Third, the ReliA CPA for the DC Power Control Assembly, OU 2954, in shelf position 2 of OU 2871 is recorded and updated on the OURF as 2871/02. Finally, the ReliA CPA for the DC Power Meter Assy, OU 3018, is recorded and updated as 2954/02. Thus the complete HCLA of the DC Power Meter Assembly, OU 3018, is computed as 103/32/1 from the UBOLA for Origin OU 2869 plus /03/01 from the Ancestor OU 2781 plus /02 from the Ancestor OU 2954 plus /02 from the Subject OU 3018, or 103/32/1/03/01/02/02.

The location address was completely defined for three of the four tracked OUs in the OSL by referencing a Parent/Guardian referent and recording only one or two HPRNs as a GBCPA. In a manner analogous to the supplemental ReliA NPLA information display illustrated in Example 18 the following information can thus be displayed to the user to facilitate locating the DC Power Meter Assembly, OU 3018:

| HEDC or HRPN | Item ID | Description of HEDC or Item | OUUI |
|---|---|---|---|
| 103 | | Austin | |
| 32 | | UT | |
| 1 | FB1230 | Building, Fiber Bond | 2869 |
| 03 | | | |
| 01 | TCB09 | Telecom Bay A | 2871 |
| 02 | DC10 | DC Power Control Assembly | 2954 |
| 02 | DCM3 | DC Power Meter Assembly | 3018 |

EXAMPLE 25

If the GBCPA included in the ReliA CPA of each transaction recorded here had not been included in these transactions the complete HCLA would be only 103/32/1 and only the following information would be available:

| HEDC or HRPN | Item ID | Description of HEDC or Item ID | OUUI |
|---|---|---|---|
| 103 | | Austin | |
| 32 | | UT | |
| 1 | FB1230 | Building, Fiber Bond | 2869 |
| | TCB09 | Telecom Bay A | 2871 |
| | DC10 | DC Power Control Assembly | 2954 |
| | DCM3 | DC Power Meter Assembly | 3018 |

Thus, the HCLA of the DC Power Meter Assembly can be located only by the Item IDs, the Item Descriptions, and the OUUIs. (Note that the Suite is not included as an Ancestor in this case). Where the Origin OU and their Descendant OUs are fairly heterogeneous, as shown in this Example, this may be adequate The value of the CPam is especially valuable for items stored in homogeneous items.

EXAMPLE 26

In the case of butterflies in Example 17 where the Origin OUs and their Descendant OUs, other than the subject OU, arc fairly homogeneous only the information described in Example 18 would be available:

Thus with the CNPam the shelf, slot; or place HPRNs are not provided. The most detailed HCLA available for OU 0032 at UBL8 is the UBOLA of its Origin OU at UBL5. With the Guardian references the user would have to search potentially through 8 shelves to find shelf OU 77300, search potentially through 8 trays on the shelf to find tray OU 88320, and search potentially through 8 places in the tray to find the subject OU; on average search through a total of 12 OUs, but potentially a total of 24 OUs. If the intermediate Ancestors, the shelves and trays are not tracked the user would have to search potentially through 512 butterflies on 8 shelves to locate the subject OU.

EXAMPLE 27

Using the information from Example 10 the complete ReliA NLAD for OU 00881 can be displayed by the invention where the CPam is used for all tracked OUs in the OSL. Again display of the Item IDs, if not also the Item Descriptions, further facilitates locating the subject OU.

Thus both successive MBL-HPRNs and descriptive data on the tracked OU in the OSL are provided, so the user can use either sets of data, depending on user experience and preference, to locate the subject OU.

| HEDC or HRPN | Description Item | Item ID | OUUI |
|---|---|---|---|
| 04 | Texas | | |
| 01 | Houston | | |
| 02 | Building at 1313 Commerce | | |
| 201 | Suite | | |
| 06 | Frame | FR | 66666 |
| 08 | Shelf | SL | 77777 |
| 08 | Tray | TR | 88888 |
| 01 | Yellow Butterfly | YB | 00881 |

With this information a user looking for OU 00881 can refer directly to the third shelf rather than search all shelves for OU 77777. Similarly, the tray and subject OU can be found by referring to the successively narrowing hierarchical position without reference to the OUUI as required by the limited information available when the CPam is used.

Even when the Origin OUs and their Descendant OUs are fairly heterogeneous so Ancestors and their siblings can be readily distinguished, the maintenance of CPam can be important to the maintenance of the configuration of an Object System or analysis of position related issues for OUs. This is an important issue where component OUs in an Object System mechanically, chemically, or electrically interrelate with each other.

Note in Example 27 that the location address was completely defined for some tracked OUs in the OSL by referencing a Parent/Guardian referent and recording only a single HRPN as a GBCPA. The potential to define the complete HCLA for a component by only one additional address level is an important feature of the present invention. However, it should also be noted that the HCLA in Example 24 for the DC Power Control Assembly could have been computed as well by referencing the GP 2871, the Telecom bay, with two additional HRPNs: GBCPA 02/02. In general, the GBCPA could be any Ancestor referent with an HRPN for each successively lower HL.

The Transaction Entry Schema and Closure of a ReliA Transaction

The sequence of required or optional user entries that the user must record to identify and effect the various ReliA alternative sub-processes for a transaction is termed the Transaction Entry Schema (TES). The sequence the entries in the TES are recorded is important to determine the particular ReliA sub-process employed by the user for each transaction. The TES of a ReliA primary sub-process will include the subject OUUI. The TES of most primary sub-processes will also include one or more Address Determinate Elements (TES-ADE). The ADE comprise HEDC and HPRN as well as OUUI references (referents) which establish in whole or part the location address of the subject OU for the transaction. The order of the ADE relative to the subject OUUI will be an important determinate of the processes ability to close transactions automatically. The order the entries in the TES of a ReliA sub-process are recorded is important to distinguish one sub-process from another.

The TES-ADE of the alternative ReliA sub-processes vary in the elements they include and the number and order of these elements. A user will generally not need to overtly signal completion of entry of the TES for a transaction. The closure of a ReliA sub-process is indicated by a TES Closure entry. The TES closure entries for a transaction comprise a distinguishable last entry in the TES of a current transaction, a distinguishable parameter of the OMA SBFTT in completing the entry of other parameters for some SBFTTs, the recording of the number of TES entries required for the indicated sub-process, or the attainment by a maximum MHR, GHR or EEDCs allowed by the user set maximum number of hierarhcy levels for the AM. If an entry or maximum parameter internal to a sub-process or the OMA's SBFTT the TES Closure entry can be a TES entry of a successive transaction. If the subsequent transaction is not recorded some transctions will need to be closed by a Fixed Command. When the subject OU is recorded last in the TES a distinguishable subject OU can indicate the the last entry of the TES for all transactions. When the subject OU is recorded first in the TES some transaction the close variables become an issue. Over or manaul Fixed Command closure should be an issue only under when the subject is recorded first in the TES of a process requiring an external closure entry and a successive transction is not being recorded of the SBFTT.

When the OMA requires additional parameters beyond the subject OUUI and its location address for a SBFTT the entry of the additional, non-ReLiA entry, if of a format that is distinguishable from an HEDC, HRPN, and *OUUI* can be ReliA TES Closure Entry.

Using Positional Relations to Reduce the Tedium of Collecting Component Position Codes: The Homogen Processes Introduction and Benefits A set of semi-automated to fully automated processes for the determination of the location address of certain subject OUs are referred to as the Homogen processes. The Homogen processes can be used with more distant relationships as well as with simple sister relationships. Without support software, determining and collecting the GBCPA can be very tedious. Normally, address collection for an OU is done in two steps. The first step is to determine the address of the OU, and the second step is to record the address information. In practice, portions of the address may be determined by one process, and other portions of the address determined by another process.

In prior art a location address the location address of Component OUs was determined by counting OUs and OUPs form a zero reference point, by (1) counting OUs and OUPs from a zero reference point, (2) by reading the position code or address for each position off an Ancestor, or by (3) referencing a template, OU catalog for the Ancestor, or other tool, etc., thus requiring an additional device that must be carried and held by the user while recording and the advance design, production, and distribution of the template, OU catalog, or other tool. The template, OU catalog and the preestablished position code in the penultimate methods require to establish separate advance process to establish the position codes of each Ancestor OU. A fixed length part of the location address may have determined by one method and the remaining part by another method. The parts may have been determined in separate steps. The location address of the OU so determined may have been manually recorded for later transcription to permanent records or a computer data base or entered directly into a computer.

The Homogen processes use Homogen relationships to reduce the data collection to collecting UUIs only (the UUI of the subject OU and, if required, the UUI of a Homogen reference). The ability to collect OUUIs only is a significant accomplishment, because reference aids external to OUs are eliminated. Only the UUI that identifies the reference OU itself is needed and the UUIs are easily recorded. The Homogen process depend on the presence of at least one OU in an appropriate Homogen relationship relative to the subject OU for the user to reference. Depending upon different situations, one may choose between Ancestor referencing and Homogen referencing. Combined referencing is often desirable in the present invention.

Homogen Process Using the Origin Locating and Component Non-Positioning Addressing Methodology The OL and CNPams allow intermediate Parents to be ignored. Therefore, a Sister or a Cousin OU may be indistinguishable in the OLam and CNPam. A second generation descendant of a subject OU can be referenced directly to the subject OU without inclusion of a HEDC or HRPN for an intermediate Parent as long as the Parent is a non-tracked OU. Therefore, all references in a OLam or CNPam are deemed Sister referents.

The Homogen processes require user or program directed enabling before the process can be used. The ReliA subprocess employing the; Homogen process to support the OLam is termed the ReliA Enabled Homogen Origin Locating process (ReLiA-EH-OL process). The similar process supporting the CNPam is termed the ReliA Enabled Homogen Component Non-Positioning process (ReliA-EH-CNP process). The TES of the two processes for both the SFC and SLC are identical. This and the DRb used in the preferred embodiment are as follows:

| | ReliA-EH-OL and CNP processes | |
|---|---|---|
| TES | SFC | SLC |
| 1 | Subject OUUI | Sister OUUI |
| 2 | Sister OUUI | Subject OUUI |
| Closure Entry | Subject OUUI of next transaction or TES Closure Entry | Subject OUUI (TES2) of current transaction. |
| DRb for OLam* | SET OUUI | can be SET OUUI |
| Drb for CNPam* | SET OUUI and Matriarch | can be SET OUUI and Matriarch |

*in the preferred embodiment

The Enabled Homogen processes for the OL and CNP AMs comprise copying (referating with no Homogen relational parameters) the predetermined location address to a subject OU recorded as part of an enabling process. The EPS-DmRd for the Enabled Homogen-OL process comprise the HELA (UBOLA) of the SET and when used the Drb. The EPS-DmRd for the Enabled Homogen-CNP process comprise the Matriarch OUUI of the SET and when used the Drbs.

Homogen Process Using The Component Positioning Addressing Methodology

The basic Homogen process to support the CPam requires the user to collect the UUI of a Homogen OU in a single predetermined position relative to the subject OU. In addition to collecting the UUI of an adjacent or contiguous Sister, this often means collecting the UUI of the OU in the same position in an Aunt OU (e.g. a shelf or drawer of the place or slot) immediately above or below, or in front of or behind, the subject OU. Every position in a hierarchy with more than one position is either a Previous or Subsequent Contiguous Sister position, and every position in a hierarchy with more than one Parent with more than one position is either, or a Previous or Subsequent Contiguous Cousin position. Therefore, the Homogen processes allow relational references to any position in the hierarchy. The Homogen process may not be capable of relating to a particular OU, however because OUPs that represent these relationships may be vacant and non referable. When the UUI of a Homogen is referenced, the process can look up the location address of the referenced OU and establish the location of the subject OU by referation; that is, incrementing (or decrementing by incrementation with a negative value) the HRPN at the appropriate hierarchy level(s) of the ABCPA for the Homogen referent based on the specified positional relationship for an enabled Homogen process.

A common positional relationship encountered in OU systems is the contiguous Sister or contiguous Cousin relationships. A contiguous Sister may be a preceding contiguous Sister OU (H0P1OU) or a subsequent contiguous Sister OU (H0S1OU) and a contiguous Cousin may be a preceding contiguous kth Cousin OU (HkP1OU) or a subsequent contiguous kth generation Cousin OU (HkS1OU), with k=0, 1, 2, . . . , N–1. An H1S1OU is a reference to a first Cousin OU in the subsequent position next to the subject OU at the same HL, an H2S1OU is a similarly situated second Cousin, etc. More generally an Hk is a reference to a kth Generation Removed Ancestral-Sister-Descendant Homogen. This is termed a kth Generation Removed Homogen (kGRH).

In the basic Homogen sub-processes the appropriate level for referation is established by k in the Homogen relationship. A reference to a Sister at k=0 will increment the HRPN of the lowest hierarchy level of the GBCPA. A reference to a 2nd Cousin at k=2 will increment the HRPN of the third lowest hierarchy level of the GBCPA.

An essential element of a CPam Homogen sub-process then, is a reference point ReLiA CPA. The Ancestor referent and ABCPA that constitute the reference point ReliA CPA can, however, be established separately. Thus an Ancestor referent could be established by one process and the ABCPA could be established by another process.

The Homogen-CP processes require user or program directed enabling before the process can be used. Said processes using the CPam require a specific appropriate Homogen Relationship Parameters (HRPs) as a basis for referating the referenced Homogen. The HRPs comprise the kGRH relation and an appropriate Referent Direction (preceding/subsequent) and incrementation value. These parameters are in addition to the Matriarch OUUI. When these Relation Parameters are established the TES-ADE OUUI recorded can be interpreted as a Homogen referent, rather than as an Ancestor referent, and the HRPs used to referate the ReliA CPA of the subject OU from the Homogen referent.

The Homogen Relationship Parameters as well as the Matriarch can be defined by the enabling processes included in the EPS-DmRd. When a HRP are not defined by a enabling processes for the Homogen process, the HRP must be established in the Homogen process, by a user signal, program prompting, or a default process. If, however, the enabling process establishes different relationships in the EPS-DmRd and the Homogen-CP process interrogates the EPS-DmRd and adjusts the HRPs accordingly, the user can flexibly use the Homogen-CP process based on a relationship established in the enabling process.

An essential element of a CPam Homogen process is a reference point ReliA CPA. The Ancestor referent and ABCPA/GBCPA that constitute the reference point ReliA CPA can, however, be established separately. Thus an Ancestor referent could be established by one process and the ABCPA/GBCPA could be established by another process. Thus the Ancestor referent can be established by an enabling process for the EPS-CP for a plurality of successive transactions. A default reference point ABCPA or a Homogen referent, however, cannot be established for an EPS for the CPam. The reference point Homogen OU must be established for each individual transaction. Thus, an Ancestor referent could be established by an enabling process for CPam and the referent GBCPA could be established by successive transactions using an enabled Homogen-CP process. An Ancestor referent established by one process to serve as an automatic Ancestor referent for subsequent transactions using an enabled process is sometimes referred to herein as a Matriarch. When the Ancestor referent is a Guardian of an OU, Guardian Based Component Hierarhcy Level (GBL) is used instad of ABL and GBCPA is substituted for ABCPA. When the Ancestor referent is a Matriarch of an EPS and the Matriarch OU is also the Guardian OU of a specified OU, MBL is generally substituted for GBL and Matriarch Based Component Position Address (MBCPA) is substituted for GBCPA. A Matriarch and MBCPA for a subject OU are collectively termed a MatiA CPA.

If the required reference point ReliA CPA is established by an enabling process it can be used as the reference point ReliA CPA for the subsequent transaction. Thus the reference point ReliA CPA for a Homogen-CP process does not necessarily need to be established by a Homogen-CP process.

A Component OU referencing its Ancestor OU as a Guardian is termed a referencing Descendant OU, (i.e. a Descendant OU with a Guardian OUUI equaling that of a specified tracked Ancestor). If a Matriarch is established in one transaction and a separate transaction is subsequently recorded using a Homogen-CP process, the Homogen referent may have a Guardian of record that is different from the pre-established Matriarch. The OUUI referent recorded a Homogen process requiring a Homogen referent will be used as the basis for referating the GBCPA of the subject OU to establish the ReliA CPA recorded in OUR, whether or not the referenced is a referencing Descendant of the Matriarch. Preferably the Homogen-CP and -CNP processes controls errors by comparing the UUI of the Guardian OU of a referenced Homogen against that of the Matriarch. Moreover, if the referent in the Homogen process and the SET have different GrDHRs the referent is not a Homogen of the SET. When the UUIs of the two OUs are not equal or the GrDHR are unequal an error exists in the Homogen referent. When such an error occurs the Homogen-CP should report the error to the user and abort the transaction.

The Homogen process can be embodied as individual enabled processes or they can be incorporated as part of an enabling (stand alone) processes. When incorporated as part of an enabling process, the Homogen processes can be program enabled as part of the broader processes, or the processes can be enabled by a user using a command to provide prompts for entering the required data or it can be enabled by a combination of the two.

The Enabled Homogen CP Processes

The Homogen-CP process embodied as separate enabled alternative sub-process of the ReliA-CP processes are termed ReliA Enabled Homogen-CP processes (ReliA-EH-CP process). The TES of the ReLiA-EH-CP process for both the SFC and SLC and the DRb used in the preferred embodiment are as follows:

| | ReliA-EH-CP processes | |
|---|---|---|
| TES | SFC | SLC |
| 1 | Subject OUUI | Sister OUUI |
| 2 | Sister OUUI | Subject OUUI |
| Closure Entry | Subject OUUI of next transaction or TES Closure Entry | Subject OUUI (TES2) of current transaction. |
| Drb in Preferred Embodiment | SET OUUI and Matriarch | can be SET OUUI and Matriarch |

The Enabled Homogen processes for the CPam consists of copying the predetermined location address to a subject OU or copying the location address of a referent OU recorded as part of the process as pre-established by an enabling process. The EPS-DmRd for the Enabled Homogen-OL process comprise the HELA of the SET and when used the DRbs. The EPS-DmRd for the Enabled Homogen-CNP process comprise the Matriarch OUUI of the SET and when used the DRbs.

EXAMPLE 28

The operation of the ReliA-EH-CP process and a separate enabling process is illustrated by two transactions. The first uses the ReliAA-CP process, an enabling process previously described. The second is an Enabled Homogen-CP process—the HOP1OU process, where the Homogen Relationship is established as the default in the programming.

FIG. 7 illustrates of a bay (cabinet) of electronic equipment and some lower level components (not included in OURF or OLARF of FIG. 1 or 2). If the channel cards in the bay of ReliA Tel Corporation illustrated in FIG. 7 are to be recorded using the CPam at the location address depicted in Area 101, Site 51, Structure 1, Suite 2, and Bay 4, and the default HRPs H0, P, and 1, representing the HL, Referent Direction, and incrementation value respectively are established by programming for an Enabled Homogen-CP process. The default Enabled Homogen-CP process is, therefore, specifically an H0P1OU process. ReliA Tel Corporation allows a maximum of 3 HPRNs in the MBCPA and in the GBCPA of its ReliA CPAs. The two process are instantiated with the SFC. Furthermore, the ReliAA-CP process is instantiated to establish and maintain a Matriarch OUUI in an EPS-DmRd to support enabled CPam processes. Assume for now that only the CPam is employed in the instantiation of the invention from an a priori non enabled state.

The transactions to record OU 5923 in the frame, OU 5901, and its subsequent Contiguous Sister, OU_6010, would be recorded using the ReliAA-CP and HOP1OU processes with the SFC with TES entries for the two transactions as: 5923/5901/01/01/6010/5923.

The first transaction comprising the TES entries 5923/5901/01/01, is determined to be a ReliAA-CP process as previously described. The HPRNs in the TES are followed by an OUUI for the successive transaction, so the first transaction so the TES is closed for the first transaction. It records the Matriarch, OU 5901, and the SET, OU 5923, in the EPS-DmRd.

With the first transaction closed and updated the second transaction is evaluated. TES1 of the second transaction is validated as an OUUI. The first entry of the TES is evaluated as equal to the DRbs, the Matriarch and SET OUUI. OUUI 60110 fails both of these test so the enabled session continues. The Matriarch in the ETD Determinants Record is interrogated to determine if an EPS-CP is established. An OUUI is recorded for the Matriarch field so further evaluation of the alternative sub-process is narrowed down to the Enabled Homogen processes. The program deems that an OU in the default Homogen Relationship, H0P1OU, as been recorded as a referent by the user.

OU 5923 is, therefore, processed as an H0P1OU reference for the subject OU 6010. The Enabled Homogen-CP process requires two TES entries, so the transaction is closed automatically with the second entry. With the relational referent established by the enabled Homogen processes as an H0P1OU, the address of OU 6010 is computed by referating the HPRN of the lowest hierarchical level of the GBCPA of the referenced OU. Because the referent was defined to be Preceding, and the incrementation value is positive 1, the value of 1 is added to the HPRN in the last field of the referenced OUs MBCPA. The MBCPA for the referenced OU is 01/01, therefore the referated MBCPA for the subject OU is

01/02. The Matriarch OUUI in the EPS-DmRd, 5901, is used as the Guardian OUUI of the ReliA CPA of the subject OU. The location address for the subject OU 6010 is, therefore, recorded on the OURF as: 5901/01/02.

With the EPS established the present invention can continue for OUs 5930, 5931, and 6003, using the successive H0P1OUs as the reference OU. If, alternatively, the H1S1OU process was established as the Homogen process, the reference to 5901 in the second transaction would, by a similar process, establish the ReliA CPA for the subject OU as 5901/00/02. Assuming this is an illogical MBCPA, the Homogen-CP process should, as previously described, abort the transaction.

The Enabled Homogen-CP process is more broadly distinguished by the first TES-ADE entry, TES-ADE1, being a referencing descendant of the Matriarch.

The ReliAA-CP-Homogen processes (Ancestor-HkP1OU process and Ancestor-HkS1OU process)

The present invention is capable of extending the Homogen-CP process to simplify the ReliA Ancestor-Component Positioning Manual process (or ReliAA-CP-Manual). The simplified alternative sub-process of the ReliA process is referred to herein as the ReliA Ancestor Component Positioning Homogen processes(ReliAA-CP-Homogen process). The ReliAA-CP-Manual process is simplified by allowing the OUUI of a Homogen referent to be recorded in lieu of recording a GBCPA/MBCPA manually. The GBCPA of the subject OU is determined by referation from the Homogen referent. The TES of the ReliAA-CP-Homogen process comprises the Subject OUUI, Ancestor referent OUUI, and the Homogen Referent. The TES is fixed length so the TES can close automatically for both the SFC and SLC.

EXAMPLE 29

OU 6010 in Example 28 and illustrated in FIG. 7 for ReliA Tel Corporation could be recorded using the ReliAA-CP-Manual process with the SFC by recording 6010/5901/01/02. The same transaction can be recorded using the ReliAA-CP-Homogen processes(enabled for an H0P1OU, a preceding Sister) by recording the subject OUUI, the Guardian referent, and the H0P1OU for the SFC as follows: 6010/5901/5923. The ReliA CPA of the referenced Homogen is referated as described for the Enabled Homogen-CP processes to establish the ReliA CPA for the subject OU. Because the ReliAA-CP-Homogen processes was enabled for the H0P1OU, the ReliA CPA for the subject OU is constructed as 5901/01/02. The referation for a ReliAA-CP-Homogen processes depends on the specific Homogen relationship enabled (i.e. the HRPs enabled).

The distinguishing TES-ADE of the ReliAA-CP Manual process, relative to the ReliAA-CP-Homogen process is the HRPN rather than the OUUI in the TES-FPDE.

The ReliAA-CP-Manual process and the ReliAA-CP-Homogen processes are both non a priori enabled ReliA primary sub-processes. When both alternative sub-processes are included in an embodiment of this invention, a ReliAA-CP process as part of the ReliA Integrated Evaluation Process enables the Homogen processes when the OUUI is recorded in lieu of a HRPN in the TES-ADE2 of a ReliAA-CP process. And, conversely, a ReliAA-CP process enables the ReliAA-CP-Manual process when a HRPN is recorded in lieu of an OUUI in the TES-ADE1 of a ReliAA-CP process. In both cases the HRPN or the Homogen provided in the TES determine the position of the subject OU within Ancestor/Matriarch.

In Example 28 the location address entry was evaluated as an Ancestor-MBCPA relational address. However, in the extended process of the present invention, if the format of the TES-ADE2 (TES3 with the SFC) fails as a HRPN, the element is evaluated as an OUUI. If its format passes this test, the address is interpreted as a Homogen referent. That address may then be used to compute the location address of the subject OU.

EXAMPLE 30

The transaction to record OU 6010 in Example 29 and for ReliA Tel Corporation is evaluated from a non a priori enabled process state initially in accordance with the ReliAA-CP-Manual process. Thus, the subject OUUI, TES1, and the Matriarch referent's UUI, TES2 in this case, must be validated. To serve as an enabling transaction for successive transaction process must record the Matriarch's UUI in the EPS Determinant Record. The remaining entry, OU 5923, is tested, as in the ReliAA-CNP process, to determine if the entry is a two digit HPRN as required by ReliA Tel Corporation. If this test fails, file entry is evaluated as a valid OUUI. The entry of 5923 passes as a valid OUUI, so the entry is interpreted as a Homogen referent to indicate that the process being employed is a ReliAA-CP-Homogen process. If the HRPs of the H0P1OU process are enabled, the ReliAA-CP-H0P1OU process is indicated. The remaining steps of the ReliA process for this transaction validate the transaction in accordance with the indicated sub-process and close the transaction once filly validated. The MBCPA of the Homogen referent is determined from the OUR of the OU on the OURF. The Matriarch OUUI, the MBCPA of the Homogen referent, and the established Relationship Parameters for the indicated process are used to establish the ReliA CPA of 5901/01/02 for the subject OU, 6010.

In the preferred embodiment the Guardian of the Homogen referent is compared to the Matriarch OUUI, stored in memory, to determine if the two OUUIs are equivalent. If the two OUUIs are not the same a spurious OU was referenced as the Homogen or the Homogen referent was previously recorded incorrectly on the OUR.

The ReliA CPA of the subject OU is computed as follows: The HPRNs recorded starting with TES3, 01/01 are stored in memory as the MBCPA. The value of one unit is added to the HPRN of the lowest HL of the MBCPA stored in memory to establish the MBCPA/GBCPA of the subject OU as 01/02. The Matriarch OUUI established in the ETD Determinants Record is the Guardian of the subject OU ReliA CPA. The ReliA CPA of the subject OU 6901, therefore, comprises the OUUI and MBCPA stored in the ETD Determinants Record as the Matriarch and the MBCPA stored in memory 5901/01/02.

With the ReliA CPA established, the CP addressing methodology can construct and display a complete HCLA at any time for the subject OU as well as the ReliA NLAD.

When the ReliAA-CP process determines that TES-ADE2 of the TES is an OUUI, it is interpreted as the OUUI of a contiguous Homogen that is more specifically defined by the enabling process, by the program evaluating an indicated ReliAA-CP-Homogen process, or user enabling as part of the sub-process. Thus, if the HkP1OU is enabled the Homogen referent OUUI is interpreted as the OUUI of HkP1OU if the HkP1OU process is enabled, an OUUI of HkS1OU if the HkS1OU process is enabled, The indicated ReliAA-CP-Homogen process will in general for referenced Homogen will be the ReliAA-CP-HkP1OU process when the HkP1OU process is being used, the ReliAA-CPHkS1OU process when HkS1OU process is being. For contiguous Homogens, the location address of the subject OU may be recorded on the OUR by adding one to the HPRN in the appropriate hierarchical level of the MBCPA of the Homogen referent.

The present invention can extend the four contiguous Homogen processes described above to their non-contiguous counterparts. In general, an HkPnOU [k=0, 1, 2, ..., m−1 and n=1, 2, ..., m−1, where m is an integer and represents the maximum number of OU positions of the Parent OU of the Homogens at the MBL of the Homogens described by k, where k0 corresponds to MBLz, k1 corresponds to MBLz−1, and ky corresponds to MBLz−1, where z equals the MHR and MBLz is the lowest MBL in a Matriarch-Subject Lineage (MSL)[6], and y equals MHR−1 (MBLy being the second lowest MBL in the MSL), and where n is a value representing the preceding position in the Parent at k+1; and an HkSnOU (k=0, 1, 2, ..., z−1 and n=1, 2, ..., m, where m and k are as just described for preceding referents and n is a value represent the succeeding position in the Parent at k+1. When a basic Homogen-CP process determines that TES-ADE2 is an OUUI, the OUUI may be interpreted as the UUI of an HkPnOU, if the HkPnOU process is enabled, HkSnOU if the HkSnOU process is enabled. Then, the indicated ReliAA-CP-Homogen process for a referenced Homogen will be a ReliAA-CP-HkPnOU process when the HkPnOU process is being used, a ReliAA-CP-HOSnOU process when the HkSnOU process is being used. The location address of the subject OU for the basic Enabled Homogen-CP processes and the ReliAA-CP-Homogen processes is recorded on the OUR by increment the HRPN in the appropriate MBL of the MBCPA of the Homogen referent.

[6] The Matriarch, the set of successive referencing Descendants that represent the intermediate tracked Ancestors (MDAs), and the subject OU defined by a Matriarch and a subject OU.

Using this process, the present invention can implement any Homogen relationship desired by the user. This can be used, for example, to simplify address collection for related OUs. Since all OUs in any hierarchical system are related by one of the relationships implemented in the present invention, the capability of the present invention in this regard is unlimited.

Transaction Direction

The OUPs of the subject OUs of successive transactions can increase or decrease relative to the SLT. The increase or decrease in the OUP of the subject OUs of successive transactions as the Transaction Direction (TD). The Preceding referent direction and Subsequent referent direction can be established as relative to the TD, and TD can be defined as Forward or Backward. The Forward TD is the direction of successive transactions in which the defined OUPs increase: the HRPNS in the MBCPA of the subject OU increase in value at least the Parent of subject OU of. The Backward TD is defined as the direction of successive transactions in which the defined OUPs decrease: the HRPNs in the MBCPA of the subject OU decrease in value in at least the Parent of the subject OU. The TD can be established by an enabling process for an EPS. Preceding is the direction of decreasing OUPs when the TD is Forward or increasing OUPs, when the TD is Backward. Subsequent is the direction of increasing OUPs when the TD is or of decreasing OUPs when the TD is Backward.

When a consistent TD within an EPS is established and a transaction with a subject OUP is computed that is inconsistent with that TD the inconsistency can effect abortion of the transaction or it can be treated as enabling different sub-process. The latter case allows a reference to a Homogen that would violate the TD, based on a default Homogen relationship established for the EPS, to enable an alternative Homogen sub-process. To establish a consistent TD, when a Forward TD is established for an EPS or specific MBLs in the Matriarchy thereof, only a Preceding referent would be allowed, but when a Backward TD is likewise established only a Subsequent referent is allowed.

The next OU generally means where a Forward TD is established the Sister OU that is to the fight, below, or behind the SLT within a Parent OU. Said direction relationships presume a Forward TD sequence. For subject OUs stored in three dimensional arrays (e.g. drawers within a frame, slots or bins within the drawers, and front to back places within the slots or bins), next relative to the places means the Sister in the place immediately behind the SLT. Next relative to the drawers means the Sister drawer immediately below the subject drawer of the last transaction. Next is more specifically defined as immediately, subsequent relative to the SLT for the TD for the MBL in which the advancement is occurring. The application of next for an OU and a OUP vary slightly. A next OU is an immediately, subsequent OU at a specified MBL. A next OUP is a subsequent OUP defined by adding the incrementation value established by a current or previous process to the HRPN at the MBL for the SLT.

The hierarchy of the subject OU was previously designated as I based on the complete HCLA. Sometimes the level of a hierarchy needs to designated relative to an Ancestor reverent. Relative to an Ancestor referent the lowest hierarchy of a referencing OU is designated as z. The immediately higher hierarchy level or Parent hierarchy level is designated y. The next higher hierarchy level up is x. The HRPN of the lowest hierarchy of an ABL is ABLz-HRPN, and an HRPN at ABLy is ABCHLy-HRPN, and at ABLx is ABLx-HRPN.

Cousin Relationships

The Cousin Relational Referencing processes provide a simple method of determining and recording a referent for OUs that do not have a previous adjacent Sister but do have a Cousin in a corresponding position. The HRPN of the lowest hierarchy of the MBCPA, MBLz-HRPN, of a subject OU will be the same as that of a first Cousin, contiguous or non-contiguous, as long as the position of the referenced Cousin within its Parent OU is the same as the position of the subject OU within its Parent OU (i.e. the positions are aligned when both Parents have a common Ancestor). As applicable, MBLy-HRPN, the HRPN of the second lowest MBL of a subject OU, will be 1 greater than that of an aligned H1P1OU and 1 less than that of an aligned H1S1OU. Similarly, MBLx, the HRPN of a third lowest hierarchy of a subject OU, will be 1 greater or 1 less than that of an aligned second Cousin. Thus, if an aligned H1P2OU is referenced, the MBCPA of the first Cousin increased by 2 for MBLy-HRPN of the referent first Cousin's MBCPA is the address of the subject OU.

Process for Automatically Recording Location Addresses: The ReliA Enabled Homogen AutoReferation Processes Introduction Under certain conditions the recording of a Homogen Reference or other location address determinate to establish the location address of a subject OU is unnecessary. Only the UUI of the subject OU must be recorded. Because only a single TES entry is required, such process is very labor efficient relative to the other ReliA primary sub-processes. Entry of OUUIs by a bar-code reader allows these transactions to be recorded extremely fast. The general condition for such process is that an enabling process transaction has already established a complete location address for a Homogen OU pursuant to the appropriate AM required. Thus once EPS-OL or EPS-CNP has been established, the location address of the subject OU can be simply established without recording a relational reference, an HCLA or any other form of location address. Where ESP-CP has been established, an additional requirement is that the SLT of each transaction be in a pre-established Homogen relationship with the current subject OU. With this requirement meet a CP addresses can be simply established without recording a relational reference, an HCLA or any other form of location address.

The only user entry required to record a SBFTT under these processes for a simple physical inventory or transfer transaction is the subject OU's UUI or a series of UUIs for a series of tracked OUs. While the OLam and CNP allow the recording of any Sister OU, such process for CPam requires the recording of successive subject OUs whose position correspond to the enabled HRPs. The most likely relation parameter being consecutive, contiguous (i.e. H0P1OU). These automatic Homogen referating enabled processes are termed ReliA Enabled Homogen AutoReferation processes (ReliA-EHA processes).

For processes supporting AMs where the position within an entity is not allowed or required (OL and CNP) the location address established in the EPS-DmRd for the EPS can be automatically applied to its Sisters from the EPS-DmRd. Thus, the ReliA-EHA-OL and -CNP can referate any sister in the Parent entity other than the SET. For the CPam where the position within a Guardian OU is required the MBCPA of the SLT can be automatically incremented to referate the MBCPA of the subject OU based on the predefined Homogen Relationship Parameters. The ReliA-EHA-CP process can reference to any position in the Parent of the SET other than the SET although the position of every OU may not be computable due to the existence of vacant locations.
ReliA Enabled Homogen AutoReferation Origin Locating Process (ReliA-EHA-OL Process)

The instantiation of the ReliA-EHA process for the OLam the ReliA Enabled Homogen AutoReferation Origin Locating process (ReliA-EHA-OL process), requiring the UBOLA of a Sister OU be established in the EPS-DmRd for the EPS-OL. In the preferred embodiment an enabling process (e.g. the non a priori enabled Universe-OLManual process establishes the UBOLA of the SET and thereby establishes an EPS-OL). EPS-OLcan be disabled by Fixed Command. In the preferred embodiment the OUUI of the SET for the EPS-OLis established as a DRb to facilitate disabling the EPS. A non-DRb OUUI reference recorded by the user when EPS-OL has been established triggers the ReliA-EHA-CP process. This process in the preferred embodiment maintains the EPS-OL for the next transaction.

The ReliA-EHA-OL process validates the subject OU of the transaction and copies the UBOLA pre-established by the SET to the Origin Location Address Record in the OLARF of the subject OU. In the preferred embodiment, it leaves the EPS for the OLam established.
ReliA Enabled Homogen AutoReferation Component Non-Positioning Process (ReliA-EHA-CNP Process)

The instantiation of the ReliA EHA process for the CNPam is the ReliA Enabled Homogen AutoReferation Component Non-Positioning process (ReliA-EHA-CP process) requiring that the OUUI of a Matriarch/Guardian of a Sister OU be established in the ESP Determinants Record for the EPS-CNP. In the preferred embodiment an enabling process (e.g. the non a priori enabled ReliAA-CNP process established the Matriarch and thereby an EPS-CNP. Any related non-Homogen OU can be established as a DRb. In the preferred embodiment the SET as well as the Matriarch are established as DRbs. A non DRb OUUI recorded by the user when EPS-CNP has been established triggers the ReliA-EHA-CP process for the transaction. This process in the preferred embodiment maintains the EPS-CNP for the next transaction.
_ReliA Enabled Homogen AutoReferation Component Positioning Process (ReliA-EHA-CP Process)

The instantiation of the ReliA EHA process for the CPam is the ReliA Enabled Homogen AutoReferation Component Positioning process (ReliA-EHA-CP process). The ReliA-EHA-CP process determines a location address from the user recording of only the subject OU's unique identifier. This process is particularly noteworthy for the ReliA CPam processes because the address established by the ReliA-EHA-CP process by definition must include the position of the subject OU within the referenced Ancestor.he ReliA-EHA-CP process is particularly effective relative to the other ReliA-CP process and is as efficient as the ReliA-EHA-OL and -CNP processes. Where an enabling process has established a ReliA CPA and EPS for the enabled ReliA-EHA-CP process based on H0P1OUs for contiguous, preceding Sisters, a commonly occurring relationship when performing an inventory or a maintenance transaction of in-service OUs, the successive OU can recorded by the ReliA-EHA-CP process by recording only the UUI of the subsequent contiguous Sister OU. The ReliA-EHA-CP process is not, however, limited to Sister OUs. Next OUs can be more generally defined as HkP1OUs. Thus, first or even second Cousins can be automatic referent OUs.

EXAMPLE 31

If an OU at ReliA CPA 60222/04/01/01 is recorded and ReliA-EHA-CP is enabled for H1P1OUs, the OU of the next transaction will be recorded with a ReliA CPA of 60222/04/02/01. If another OU is recorded in a successive transaction in the same manner without an intervening disabling of the enabled process it will be recorded with a ReliA CPA of 60222/04/03/01. Thus, consecutive first Cousins are recorded.

The Homogen-CP process described to this point have suggested that the measure of the OUs correspond to the measure of the OUP in which they might reasonably be installed. The ReliA-EHA-CP process is not, however, limited to incrementation by 1. Where OUPs are fixed within a Parent but an OU can occupy more than one OUP the incrementation value can be extended to multiple of OUP incrementation units to correspond to OUPs occupied by the OU. Thus if an OU occupies two OUPs the HRP can be established with an incrementation value of 2, so the successive OUs occupying two OUPs will to recorded in the consecutive available positions. If the measure of any successive OUs relative to the measure of the OUPs may not correspond, the CPam cannot be used unless the incrementation value in the Relation Parameter is established by a measure of the individual subject OUs or a measure of the subject OU's Item from its Item Master record, so that the Item Master file can drive the incrementation value.

Note that for the ReliA-EHA-CP process to be employed by the user the MBCPA of the SLT, whether from an enabling or enabled process, must be preestablished. Thus, for the user to employ the ReliA-EHA-CP process at will within an EPS-CP the MBCPA of the successive subject OUs of each transaction in the EPS-CP, including the SET, must be maintain for the subsequent transaction. The MBCPA of the SET can be established in the EPS-DmRd and subsequent transactions can update the MBCPA in that record to support the ReliA-EHA-CP process.

In the preferred embodiment an enabling process (e.g. the non a priori enabled ReliAA-CP process establishes the MatiA CPA). Any related OU in a common relationship or positron that is not a Homogen can be used as a DRb. In the preferred embodiment the Matriarch OU as well as the SET are established as DRbs. When an EPS-CP has been established and a subject OU that is not a Disabling subject OUUI is recorded by the user the ReliA Integrated Evaluation process triggers the application of the ReliA-EHA-CP process for the transaction. The process referates the ReliA CPA from the CPA/GBCPA based on the established HRPs, and then updates the records of the subject OU on the OLARF and OURF. In the preferred embodiment the process also updates the MBCPA in the EPS-DmRd to maintain the EPS-CP for the next transaction, otherwise the EPS-CP must be closed by the process. If a disabling process is not provided the ReliA-EHA-CP process must be disabled automatically. A Fixed Command can be used as a disabling process, or if instantiated in an embodiment of this invention, the user can disable the EPS-CP by referencing one of the preestablished DRbs.

Enabling the ReliA-EHA-CP Processes with Alternative Enabling Methodologies and with Alternative ReliA-EH-CP Processes Included in the Instantiation ReliA-EHA-CP-Increment process requires that a ReliA CPA, with an HCPA, be stored in memory or otherwise pre-established by the SLT as a reference point for the current transaction. In addition a Homogen relationship must be established by the enabling process or by the ReliA-EHA-CP-Increment itself Where a Homogen relationship is not defined by the enabling process as to hierarchy level, Referent Direction, or incrementation value, default values for these parameters can be established in the enabled Homogen relating as a basis for adjusting the HRPN at the hierarchy level so established. These Homogen relationship parameter requirements are in addition to a reference point ReliA CPA, or referencing Descendant OU, as just described, from which the reference point ReliA CPA can be derived. When these relation parameters and the reference point ReliA CPA are established, directly or indirectly, the next OUUI recorded can be interpreted as the appropriate Homogen relation, rather than as an Ancestor referent or other form of TES entry, and the relation used to determine the ReliA CPA of the subject OU.

The ReliA-EHA-CP process may be enabled automatically by any process that establishes or maintains the EPS-DmRd for EPS-CP and the MBCPA of each transaction. Thus the ReliA-EHA-CP process may be enabled by another ReliA-EH-CP process, as well as the ESP-CP enabling process.

If the ReliA-EHfR-CP-process is eanbled without enabling other alternative enabled Homogen proceses the ReliA-EHfR-CP-process does not have to be differentated from other Enabled Homogen processes described in this invention. If this is the case the ReliA-EHA-CP process can then be enabled by reference in the ReliA-EHfR-CP process to the SLT so as to differentiate the ReliA-EHfR-CP and ReliA-EHA-CP process. In this differentiation methodology the ReliA-EHA-CP becomes a second level of enabling. The SET of the ReliA-EHA-CP process, or with the SFC a less restrictive listing of the Previous Homogen Subject OU of the process, can be established as the DRb(s) within a second level EPS-DmRd for EPS-CP-EHA, or the second level EPS-CP-EHA can be disabled by Fixed Command. Such a EPS-CP-EHA disabling can leave the EPS-CP enabled. The EPS-CP and EPS-CP-EHA can be disabled simultaneously by the disabling procedures established for the EPS-CP. The SLT Referent enabling process for the ReliA-EHA-CP process requires two transactions using two successive processes to effect the ReliA-EHA-CP process. Accordingly, the third OU of a series will be the first unit to have its address determined automatically.

Differentiation of the ReliA-EHfR-CP process, or more generally the ReliA-EHR-CP procees presented later, and the ReliA-EHA-CP process can be differented without a two level enabling process. ReliA-EHfR-CP process has to entries in the TES. The ReliA-EHA-CP process has only one. The ReliA-EHfR-CP process (as well as other ReliA-EHR processes relative to the ReliA-EHA-CP process are distinguished by a Homogen referent in the TES. By the processes defined so far a Homogen referent in the TES of alternative ReLiA sub-processes cannot be distinguished from a reference to the subject OUUI.

Recognizing a subject OU is necessary to distinguish two or more successive TES entries for a single transaction for a ReliA-EHR-CP-process from a like number of successvie subject OUUIs of the same number of successive tranactions using ReliA-EHA process, becasue the non-previous subject OUUI functions as the dilimiter of the ADEs in successive TESs (in the absence a distinguishing parameter of OMA SBFTT to function as a dilimiter of the successive TES) in the variable length TES of the alternative ReliA-EH-CP processes the user can employ to recoord successive transactions within the EPS-CP.

The subject OUUI of a current transaction may have just moved from a ReliA CPA of record that makes it a Homogen of the position it is move to, for which the determination of the ReliA CPA is the objective to the current transaction. Maintenance of accurate location address is the basis for referating from the location address of a relational references to establish the an accurate location address of the subect OU. Maintenace of accurate location addresses relies on (1) recording all tranactions as they occur (so an OU cannot be a referent for itsself.) or (2) reestablishing the location address of potential referents for successive transactions before they are used as referents in successive transctions. Establishing currently the location address of potential OU references, whether they are the subject of a current tranaction being recorded for the first time or OUs previouly recorded as being in the current location, recording or recording the location address insures an accurate location address for referation without repetiton of location address errors. The progrogressive recording of succesive transactins in a single TD and consistnetly using either the Previous or Subsequent Referation Directions facilitates the use of currently recorded OU as referents for the OUs of subsequent tranactions. Sound practice would therefore support the use of a single TD and the Previous RD within an Ancestor OU so the location address of subsequent tranactions is based on currently recorded tranactions. To the extent this practice is used a prevous referent will have more accurate location address than a subsequent referent. This is practice is embodied in the ReliA-EHR processes by limiting the deferent direction in the HRP to previous so that the UUI of an OU recorded in the TES of a sub-process can be recognized as a Homogn referent as opposed to the UUI of the subject OU of the tranaction. Therefore a prevous Homogen OUUI is recognized as a Homogen referent and a non-previous OUUI is recognized the subject OU.

In the preferred embodiment of the present invention the ReliA-EHA-CP process is enabled directly by enabling the EPS-CP. Other ReliA-EH-CP processes are distinguished from the EHA-CP process by a reference to a preceding Homogen. Thus, any reference to a non-preceding Homogen referent is interpreted as the subject OU of a ReliA-EHA-CP process transaction. Enabling ReliA-EHA-CP directly with the enabling of the EPS-CP allows the second OU of a series to be recorded automatically.

The alternative ReliA-EHR-CP processes are distinguished from each other by the number of Homogen referents recorded as well a the positional relationship between any successive Homogn referents recorded in the TES or the SLT.(more specifically: The ReliA-EHA-CP and ReliA-EHR are differentiated by the length of the TES and the relational position of the first Homogen referent, if any, relative to the SLT and the relationship of other Hogomen referents in the TES to the first Homogen referent,). The cut-off of the count of Homogen referents recorded for a particular tranaction by a particular sub-process is the TES Closure Entry. When an alterntive ReliA EH-CP process is instantiated with the subject OUUI in TES1 for the process, the external TES Closure Entry for the ReliA-sub-process can be supplied by the subject OUUI of the subseqent tranaction if not by a distinguishing entry requried by the SBFTT of the OMA, but only to the extent the equivalently enabled EH-CP processes use the SFC as well when a distinguishing entry is not provided by SBFTT of the OMA. Accordingly, consistent instantiation of of the subject first or subject last in the TES of at least the ReiA-EH processes will minimize the manual TES Closure requirements on the user.

Disabling

The ReliA-EHA-CP processes when used with alternative ReliA-EH-CP processes can be disabled by establishing related non-Homogens as DRbs or by a Fixed Command process. If a disabling process is not provided the EPS-CP should be disabled by the first enabled transaction. When certain other EPS enabled processes are included in the alternative primary sub-process of an instantiation of this invention, references to some of the Homogen positions enable special subprocesses. If a Homogen DRb is established as DRb may, therefore be referenced as a relational reference by a primary sub-process. This risk is mitigated somewhat, especially when using the SFC, by recognizing a DRb only after the completion of the TES of the primary sub-process transaction. Erroneous disablings can also be mitigated by using DRb combinations. The preferred embodiment uses the SET as well as the Matriarch as DRbs as well as Fixed Command to effect disabling of the EPS-CP. In the preferred embodiment the disabling of the EPS enabled processes is generally limited to a reference to the SET or the EPS Matriarch, or entry of a preestablished Fixed Command.

Parent Advancement Function (PA Function)

Introduction

When the ReliA-EHA-CP process is employed to automatically advance the position of a subject OU, the advancement is limited to positions within the Parent of the SET, for the user to advance processing to positions in a successive PHL Homogen, the user must disable the EPS and reenabled an EPS in the successive PHL Homogen.

A process referred to as the Parent Advancement function (PA function) allows the user under certain conditions to automatically advance the recorded MBCPA of a successive subject OU to a predetermined Homogen position in a subsequent or preceding PHL Homogen of the SLT.—such as to the Beginning of Parent Object Unit Position in the next PHL Homogen within a common Guardian (e.g. where MBL3 has 8 OUPs 03/02/09 is replaced by 03/03/01). In a similar manner, the subject's OUP can be advanced automatically to the first position of a Grandparent (e.g. where MBL3 has 8 OUPs 03/08/09 is replaced by 04/01/01). Thus the PA function allows the user to avoid having to disable and reenabled an EPS 64 times for a Great-Grandparent with 8 OUPs in each MBL.

The first OUP in a Parent is sometimes referred to herein as the Beginning of Parent Object Unit Position (BPOUP). The BPOUP is the first OUP physically available for an OU within a Parent OU. The PA function can be enabled to advance the subject OU to a position Forward from the BPOUP. Such a position enabled relative to the BPOUP is sometimes termed herein as the Enabled Advanced Subject Position (EASP).

EXAMPLE 32

If the SLT 00321 is recorded as being in 66666/03/02/08. With the EASP established as 3, and then OU 00329 is recorded, the PA function will record OU 00329 in 66666/03/03/03.

In contrast to the BPOUP, the last OUP of a Parent OU is sometimes referred to herein as the End of Parent Object Unit Position (EPOUP or EPP).

The OUP for the advancement process is not confined, however, to positions exceeding the EPP. A trigger OUP can be a position before the EPP (e.g. the second to the last position from the EPP). The enabling OUP trigger can be represented as the Enabled Advancement Trigger Position (EATP), a position within a Parent relative to the EPPN with Forward TD, or relative to the BPOUPN with Reverse TD.

EXAMPLE 33

An extreme case of Parent Advancement occurs if the Enabled Advancement Trigger Position is enabled as the Beginning of Parent Object Unit Position and the Enabled Advanced Subject Position is enabled as with the BPOUP as well. If OU 00321 is recorded as being in 66666/03/02/01, ReliAI is enabled as described, and then OU 00329 is recorded, the Parent Advancement function will record OU 00329 in 66666/04/02/01. A successive entry of OU 00330 will record OU 00330 in 66666/05/02/01. A value for a particular EPP will be expressed as an End of Parent Object Unit Position Number (EPOUPN or more simply EPPN).

Intra-Parent and Inter-Parent Transaction Directions

The TD that is applied to successive subject Homogens can be in one direction while the TD that is applied to their PHI, Homogens can be in the opposite direction. Successive transactions of Sister OUs of the SET recorded within their common Parent are termed successive Intra-Parent Transactions. Successive transactions of Cousin OUs of the SET recorded within successive PHL Homogens of the SET are termed successive Inter-Parent Transactions.

EXAMPLE 34

With a Forward Intra-Parent TD subsequent OUs in tray positions of shelf 3 of OU 66666 would be recorded positions 03/01, 03/02, ... , 03/08. With Backward Intra-Parent TD subsequent OUs in all tray positions would be recorded as 03/08, 03/07, ... , 03/01.

A Backward TD recording capability of successive Homogens with a Forward TD recording capability for PHL Homogens is important if a user records successive Intra Parent transactions while working behind an Ancestor OU with increasing OUP numbers that run on the front from left to right, from the lowest to the highest position within a Parent, and the user wants Parent Advancement to occur in a Forward TD, because the user wants to continue to record transactions in successive PHL Homogens with increasing OUP numbers that run from top to bottom.

EXAMPLE 35

If Backward TD was used in both tray and shelf positions of OU 66666, subsequent shelf positions would be recorded as 08, 07, ... , 01 as successive PHL Homogen Advancement occurred while successive trays are recorded. Thus Backward Intra-Parent TD and Forward InterParent TD subsequent OUs in tray positions of shelf 3 of OU 66666 would be recorded in positions 03/08, 03/07, . . . , 03/01 and with Parent Advancement subsequent OUs in tray positions would be recorded in 04/08, 04/07, . . . , 04/01.

The Backward-Forward TD is the direction of successive transactions in which the Intra-Parent TD for GBLZ, is Backward and the Inter-Parent TD, for GBLY, is Forward. Thus where successive GBLZ-HRPN Backward-Forward TD would support a recording of successive subject OUs from the left to the right and top to bottom from the back of an Ancestor OU in which the successive OUPs increased from left to right and top to bottom from the perspective of the front of the Ancestor OU. A TD for each MBL within a Matriarch-Subject Lineage (MSL) can be established in the same manner in which the EPPN for each MBL within a MSL is established. Backward-Forward TD can be established as automatic when the user enables Backward TD.

The EPPN for each potential hierarchy level of an OU can be pre-established on the OUR for each OU. As the EPPN for an OU will be the same for all OUs with a particular Item ID, the EPPN can be established and maintained more simply in a normalized form on the IMRF. A particular OU or Item may have more than one EPP. An Item that can be used only as a Parent to tracked Component Items, and not as a Grandparent to tracked Component Items, will have only one EPP. An Item that can be used as a Grandparent to tracked Component Items will have two EPPNS, one for Descendants at the 1st HL, and one for Descendants at the 2nd HL An Item that cannot be a Parent to tracked Component Items cannot have an EPPN. The number of EPPNS required for a particular Item in the preferred embodiment is controlled by the Lowest Allowed Tracked Component Hierarchy Level (LATCH) of that item, the lowest hierarchy level at which referencing tracked Components of an OU is allowed. If LATCHL is established as 3 for an Item three EPPNS are required to define the EPP for the successive Descendant HLs of the Item. The fields for the EPPNS for the successive Descendant HLs of an Item are designated as EHL1, EHL2, and EHL3. The EPPN value in these fields are designated as EHL1-EPPN, EHL2-EPPN, and EHL3-EPPN. If the EPPNS are not consistently maintained in the IMRF (or OURF) for all items requiring or allowing CPam for the tracked components of the Item (or OU), the user cannot use the process reliability from Item to Item.

EXAMPLE 36

The IMRF of the trays in BioSupply in Example 10 (where the trays are tracked), allows only one hierarchy level. The LATCHL, if employed, would be 1. The EPOUPNs for this Item would be EHL1-EPPN, 8; EHL2-EPPN, 0; and EHL3-EPPN, 0.

The EPP for OUs at a particular GBL of a Guardian are controlled by the EPPN recorded in the corresponding EHL.

When the PA function is included in an instantiation of this invention for sub-processes supporting the CPam, the PA function must compare the MBLZ-HRPN of the MBCPA computed for each transaction by the primary sub-process to the EATP for MBLZ. When the MBLZ-HRPN computed by the primary user process is less than or equal to the EATP, further test by the PA function can be bypassed. When the MBLZ-HRPN computed by the primary sub-process is greater, however, than the EATP, the subject OU is advanced to the Enabled Advanced Subject Position (EASP) in the next PHL Homogen position within the Guardian.

When the EASP for the EPS for the lowest level of the MBCPA is BPOUPN, 1, and the subject OU is advanced, the EASP is computed by setting MBLZ-HRPN at the lowest level of the MBCPA to 1 and adding 1 to the subsequent highest level of the MBCPA computed by the primary sub-process.

EXAMPLE 37

If in BioSupply MBL3-EATP=EHL3-EPPN on the IMRF, 8, and MBL3-EASP=EHL3-BPOUPN on the IMRF, 1, with TD=Forward for all MBLs of the cabinet item, represented by OU 66666. OU 00328 has just been recorded with a ReliA CPA of 66666/03/02/08, and the user records OU 00329 a ReliA-EH-CP processes. Therefore, it will record OU 00329 in 66666/03/02/09. The PA function compares MBL3-HRPN, 09, to EHL3-EATP, 08. The PA function finds that MBL3-HRPN, 09, exceeds the EHL3-EATP. The PA function then updates the MBCPA established by the primary process. It records the EHL3-EATP, 1, in the MBL3-HRPN of the MBCPA, and it adds 01 to the MBL2-HRPN.

When the MBL2-HRPN established by this process is less than the EHL2-EATP for the Matriarch Item, the PA function is complete, otherwise_the PA function must continue to evaluate the next higher MBL-EATP until the MBL-EATP is not exceeded by the MBL-HPRN at the MBL evaluated.

The process operates on two MBLs while successively advancing the operation of the process to the next MBL. The operation on the two MBLs constitutes one iteration of the process. Initially, the process evaluates the EATPat the Homogen level of all transactions of all CP processes initiating the PA function. If the EATPis exceeded, it adjusts the Parent of the Homogen MBA evaluated. The MBL evaluated is the Iteration Evaluation Hierarchy Level (IEHL) for the iteration. The MBL adjusted, when the EATPis exceeded in IEHL is termed herein as the Iteration Parent Hierarchy Level (IPHL). When the IPHL is adjusted in one iteration it must in turn be evaluated. Thus, when the IPHL is adjusted in a particular iteration the MBL becomes the IEHL, in the next successive iteration. The process stops evaluating successive hierarchies when the MBL-HRPN at the IEHL for the iteration does not exceed the EATP. If the IEHL is MBL1 there is no IPHL. Thus, when the IEHL is MBL1 and the EATP is exceeded, an error condition exists.

The PA function will advance the computed MBCPA of any subject OU established by any ReliA primary sub-process employing a CPam. The process is inappropriate, however, for use with the ReliAA-CP-Manual process where the user is manually recording the MBCPA. The PA function is not a primary sub-process itself, but it must be initiated by a primary sub-process (i.e. by the ReliA primary sub-process employing a CPam).

EXAMPLE 38

If tracked Arthropods are the only tracked components of the cabinet at BioSupply and the Arthropods are tracked at GBL3 of the cabinets, an EPPN for GBL1 and GBL2 as well as GBL3 must be maintained.

In the preferred embodiment the LATCHL must be pre-established for all Items requiring the CPam for the tracked components of the Item. Thus, if the LATCHL is 3, a non null and non zero EPPN is required for EHL1, EHL2, and EHL3.

EXAMPLE 39

If the trays are tracked but the shelves are not tracked, the LATCHL of the cabinet will be 2 and the EPPN for EHL1 will be 8, for EHL2 will be 8, and for EHL3 will be 0. EHL3 will be 0 or null, because, LATCHL of the cabinet was established as being only 2. The Arthropods, at MBL3, in this case must be referenced to the tracked trays. The LATCHL of the tray is 1 and its EPPNs for EHL1 will be 8, EHL2 will be 0, and EHL3 will be 0. Thus EHL1-EPPN of the tray corresponds to GBL3 of the cabinet, because the tray itself is at GBL2 of the cabinet.

The EATP and EASP for each MBL of the MBCPA and the PHL incrementation value can be established by the EPS-CP enabling process in the EPS-DmRd or be established from the IMR for Parent Items (LATCHL>0). Alternatively, these parameters can be established within the first PA initiated for an EPS. If the parameters are to be established within the PA function, the process can prompt the user for the EATP and the EASP.

Enabled Homogen Processes in Support of Referation Process: The ReliA Enabled Homogen Referation Component Positioning Cousin Aligned Process (ReliAR-CP-pC-Aligned Process)

Introduction

The ReliA-EHA-CP process can be employed for a successive subject OU only when the position of the subject OU is in the position described by the HRP to the position of the SLT or when the EPA process has been enabled and the subject OU is in EASP and the SLT was in the EATP. For the user to record a subject in a subsequent position that is not in one of these two positions the user must disable the EPS and reenable an EPS for the subsequent subject OU. Under certain conditions this limitation can be avoided. A process termed the ReliA Enabled Homogen Referation Component Positioning Cousin Aligned process (Cousin Aligned process), allows the user to establish the position of the subject OU in a non-successive position relative to the SLT, without disabling the EPS, by referencing a Cousin of the SLT that is aligned with the subject OU and recording the subject OUUI. When the Cousin referent is a preceding aligned Cousin the Cousin Aligned process is termed the ReliA-EHR-CP-pC-Aligned process or simply the pC-Aligned process. When the Cousin referent is a succeeding aligned Cousin the Cousin Aligned process is termed the ReliA-EHR-CP-sC-Aligned process or simply the sC-Aligned process.

The pC-Aligned process allows the user to use a variety of Homogen relationships to establish the position of the subject OU. The process, however, restricts the relationships employed to Cousin relationships. Only a Cousin referent can be aligned with a Sister OU to establish the position of the subject OU within the Parent of the SLT. Thus, where a reference to an OU within the Matriarchy established by the EPS is a Cousin of the SLT, the Cousin OU reference can serve to enable the pC-Aligned process and establish the position of the subject OU.

EXAMPLE 40

If OU 00341, in the first position, place 1, of the fourth tray of the third shelf of the cabinet, OU 66666, in BioSupply has just been recorded with a MatiACPA of 66666/03/04/01, and the user endeavors to record as a subsequent OU OUUI 00343 in the second position after the SLT—after a vacant position—the ReliA-EH-CP processes as previously described (ReliA-EHA-CP) will record OU 00343 in the next position at the MBLZ of the MBCPA. Therefore, it will record OU 00343 in 66666/03/04/02—the vacant position. The position can be recorded only by the ReliAA-CP process of the alternative sub-process presented so far. Use of the ReliAA-CP process requires disabling of the established EPS.

With the ReliA-EHR-CP-pC-Aligned process, however, the user can reference OU 00333, a 1st cousin of the SLT in 66666/03/03/03 and OU 00343, the subject OU. The ReliA Integrated Evaluation process can recognize that an EPS has been established and that the relational reference is a Cousin of the SLT so as to indicate/enable the pC-Aligned process. Where the pC-Aligned process has been enabled for H1P1OU relationships, the pC-Aligned process can, therefore, compute the MBCPA of the subject OU as having the MBCPA of the H1P1OU reference adjusted to increment the second to the HPRN in the second to the lowest MBL of its MBCPA. Thus, it will compute an MBCPA of 03/04/03.

If the pC-Aligned process is pre-enabled for just one Cousin relationship and an OU is not in the position that is defined by the enabled relationship the pC-Aligned process cannot be used. If alternative Cousin relationships are allowed/pre-enabled so that alternative Cousin OUs can be referenced, the specific Cousin relationship employed must be enabled (before or after reference).

A number of aligned Cousins can be accepted as being equivalent Homogen relations to a subject OU. References to H1P1OU, H1P2OU, . . . , H1PnOU, to H2P1OU, H2P2OU, . . . ,H2PnOU, and to all HkPnOU references except HOPnOU are termed preceding Cousins Aligned (pC-Aligned) referables relative to the subject OU. Similarly, references all HkSnOU references except HOSnOU are termed succeeding Cousin Aligned referables. A reference to any pC-Aligned can be accepted as an equivalent reference relative to the subject OU. Similarly, a reference to any sC-Aligned can be accepted as an equivalent reference to the subject OU. The MBLZ-HRPN of an aligned cousin determines the MBLZ-HRPN of the subject OU. When the aligned cousins in these sets are accepted as equivalent the MBLy-HPRN cannot be defined by a first Cousin when more than one PHL Homogen is included in the Matriarchy, and the MBLx cannot be defined by a second Cousin when more than one Grand-Parent Homogen Level (GPHL) is included in the Matriarchy. The HRPNs in MBLs of the MBCPA of the subject OU that are not derived from the Cousin referent must be derived from another defined OU or position.

When multiple Cousin relationships are accepted as equivalent the domain of the subject OU has to be limited so the OUP of the subject OU can be uniquely established. If the Forward TD is established the subject OU of successive transactions will often be subsequent OUPs within the Parent of the SLT. The domain of the subject OU can, therefore, be restricted to subsequent positions within the Parent of the by imposing the HRPNs of all but the lowest MBLs of the MBCPA of the SLT on the MBCPA of the Cousin referenced.

EXAMPLE 41

If the ReliA EHR-CP-pC-Aligned process is used with the subject OU domain restricted to the Parent of the SLT, and the user references OU 00333, a 1st cousin of the SLT in 66666/03/03/03 and the user references OU 00343, the subject OU, the pC-Aligned process will referate the MBCPA of the subject OU as having the MBCPA of the SLT adjusted to use the MBLZ-HPRN of the relational reference. Thus, it will compute an MBCPA of 03/04/03.

The Cousin referent used and the reset obtained in Example 41 are the same as the reference used and the result obtained by Example 40 The domain restriction allows the user to reference any Cousin of the SLT within the Origin that is aligned with the subject OU to record the address for the subject OU with more flexibility. Enabling a specific HkSnOU or HkPnOU relationship is not necessary.

When a TD is enabled for an EPS using the CPam the computed OUP of all successive transactions should advance from the SET and SLT in the enabled TD. If the computed MBCPA of a transaction does not represent an advancement in TD from the SLT the transaction should be aborted or the domain of the subject OU to the MBCPA for the transaction in the subsequent PHL Homogen (as in the PA function but without restriction on MBLZ-HRPN) from the SLT. In effect the allowed domain for the subject OU needs to be reduced in the Parent of the SLT to include only those OUPs that are subsequent to the SLT for the TD. To allow the MBCPA for the transaction to be recorded in the next PHL Homogen that represents an advancement from the SLT, the allowed domain for subject OU relative to the SLT needs to be expanded into the subsequent PHL Homogen. The allowed domain in the subsequent PHL Homogen should include the OUPs in the Parent of the SLT that are excluded by the advancement requirement. When an advancement requirement is imposed, the allowed domain for the subject OU, therefore, is the OUPs in the Parent of the SLT that succeed the SLT and the successive OUPs in the next PHL Homogen of the SLT through the Aligned Cousin OUP of the SLT.

Thus where the Forward TD is employed at MBLZ and y a reference to a first Cousin whose position at GBLZ-HRPN is greater than that of the SLT can be recorded in the aligned position within the Parent of the SLT (i.e. with GBLZ-HRPN equal to that of the referenced OU to represent the aligned position, and GBLY-HRPN as equal to that of the SLT). Under the same conditions a reference to a Cousin whose position at GBLZ-HRPN is less than, or, as elected, even less than or equal to, that of the SLT is recorded in the aligned position in the next following Parent to that of the SLT (i.e. with GBLZ-HRPN as equal to that of the referenced OU to represent the aligned position, but records GBLY-HRPN by incrementing by one the SLT to advance the MBCPA of the subject OU to the same or aligned position in the next following Parent OU). Conversely, when a Backward TD is employed at MBLZ and y, a reference to a Cousin whose position at GBLZ-HRPN is less than that of the SLT is recorded in the aligned position within the Parent of the SLT. Under the same conditions a reference to a Cousin whose position, HRPN, at MBL2 is greater than, or even greater than or equal to, that of the SLT is recorded in the aligned position in the next succeeding PHL Homogen to that of the SLT.

The Cousin Aligned process comprise said processes in which some HRPNs of a Cousin referent and some HRPNs of a SLT are mapped to their corresponding MBL in the MBCPA of the subject OUP are termed the Cousin Aligned processes. When the preceding Cousin reference precedes the MBLZ-HRPN of the SLT a the Preceding Cousin Aligned process is a pC-Aligned-Preceeding Sister or pC-Aligned-pS pC-Aligned-pS process. When the preceding Cousin Aligned reference is subsequent to the GBLZ-HRPN of the SLT the Cousin Aligned process is a pc-Aligned- Subsequent Sister process, or pC-Aligned-sS process. Comprable preceeding or succeding sister process can be defined for a succeeding Cousin Aligned.

EXAMPLE 42

With the Cousin Aligned process enabled by recording an enabling transaction with subject OU 4028 in the telecommunication bay of FIG. 7, FirstTel Corporation uses only following direction and preceding references. The ReliA CPA of the SLT, OU 4028, is 5901/03/01. The OU is at UBL8. This UBL represents the hierarhcy of the Homogen subject OU to be recorded will be expressed, however, as z,i.e. UBLZ representing the hierarhcy of the Homogen subjectj OU to be recorded. Relative to the Matriarch the same UBLZ is defined as MBLZ and the second lowest UBL will be expressed as UBLY. The user employng the pC-Aligned-sS process can chose either OUs 5934 or 6010 to record the subject OU 5978. If the user chooses the closest OU of the two, OU 5934. The ReliA CPA of Cousin OU 5934 is 5901/02/02. The SLT and the subject are at HL z, and their Parentthe shelf, is at level y. The lowest HPRN in the MBCPA of this address is, therefore, at HLz. It is termed MBLZ-HPRN. Similarly, the HPRN of the second lowest HL is termed MBLy-HPRN. In this case MBLZ-HPRN, 02, of the Cousin referent exceeds MBLZ -HPRN of the SLT of 01. Therefore, the MBCPA of ReliA CPA of the subject OU, OU 5979, consists of MBLy-HPRN from the SLT, 03, and MBLZ -HPRN from the referenced Cousin, OU 5934, 02. The MBCPA of the subject OU is 03/02 and the ReliA CPA is 5901/03/02. The same result would have been obtained by using OU 6010 as a Cousin referent.

Alternatively, references to OUs with certain cousin relationships can be accepted as enablers of an alternative result. A reference to a preceding or succeeding 2nd Cousin to the SLT can be used as a preceding or succeeding Cousng Alinged referable to effect recording of the MBCPA for the subject OU as for the 2nd Cousin processes described, or used as an enabler of a different Homogen relational or an ordinal position to a BPOUPN or EPOUPN. In the latter case, a preceeding 2nd Cousin with a MBLy-HPRN equal to or less than the MBLy-HPRN of the SLT for forward TD could enable advancement to a 2nd Cousin position as a Homogen relation or or an ordinal position to a BPOUPN or EPOUPN subsequent in a 2nd Cousin subsequent to the SLT. A reference to a preceding 2nd Cousin in this circumstance can be used to effect recording of the MBCPA for the subject OU in the BPOUP of the next GHL Homogen of the SLT to serve an alternative method of BPOUP advancement. A preceeding 2nd Cousin with a MBLy-HPRN greater than the MBLy-HPRN of the SLT for forward TD could effect advancedment to the BPOUPN of a subsequnet 2nd Cousin. In this case the, MBLy-HRPN of the subject OU is set equal to MBLy-HPRN of the Cousin referent when the TD at MBLy is Forward. Similarly, a reference to a subsequent 2nd Cousin to the SLT for a Backward endabled TD can be used to effect recording of comprable preceeding OUPs for the subject OU.

For a Forward enabled TD, the preferred embodiment accepts (1) a reference to a 2nd Cousin with MBLy-HPRN less than that of the SLT as a determinant of MBLZ-HPRN only for the subject OU, (2) a reference to a 2nd Cousin with MBLy-HPRN equal to that of the SLT as an enabler of BPOUP advancement, and (3) a reference to a 2nd Cousin with MBLy-HPRN greater than that of the SLT establishes MBLy -HPRN for the MBCPA of the subject OU as equal to MBLy -HPRN of the 2nd Cousin referent and establishes MBLZ-HPRN as equal to the BPOUPN.

Once an EPS-CP is enabled the pC-Aligned process is distinguished by the inclusion of both a previous Cousin OUUI and a non-previous OUUI in the TES of the transaction. ReliA Enabled Homogen Referation Component Positioning SLT Skip Process (ReliA-EHR-CP-SLT-Skip Process)

The ReliA-EHA-CP process can be employed only when the subject OUP is in the subsequent Homogen relationship position defined by the preestablished HRPs for said process relative to the SLT. The ReliA-EHR-CP-pC-Aligned process adds additional referential positioning options, but Aligned Cousin referents are not always available. When the Matriarch OU is the Parent of the SET there will be no Cousins. The probability of having Aligned Cousin referents for any particular OU increases only as the number of PHL Homogens increases within a Matriarchy.

ReliA Enabled Homogen Referation Component Positioning Skip (ReliA-EHR-CP-Skip processes or Skip processes) allow the user to record a skip count value or a referential skip count tally so as to establish the number of OUPs that need to be skipped. These processes referate the address of a subject OU based on an established Homogen OU's, a Skip Referent's MBCPA and a pre-enabled or process enabled direction for the skip. The Homogen OUs used as the Skip Referent (SR) in these processes can be pre-enabled or user enabled within the process. The Skip Direction (SD) for the skip established in these processes can also be pre-established for the process or established within the process by the user. If the SR and the SD are pre-enabled, the user records a skip count tally to establish the number of successive OUPs, (vacant or occupied as preestablished) that are to be skipped. The ReliA Enabled Homogen Referation Component Positioning SLT Skip process (ReliA-EHR-CP-SLT-Skip process or simply SLT-Skip process) pre-enables the a prevous sister OU as the Skip Referent and establishes the TD as the SD. If there is only one previous sister it will be be the SLT, so the SLT is most convienient prevous Sister to designate as the Skip Referent. The SLT-Skip process is enabled from within an EPS-CP by referencing a preceding Sister. Once the SLT-Skip process is enabled the user successively records the OUUI of a different Homogen to establish a tally from which the component position of the subject OU can be established. Once the skip count is recorded or the skip count tally is completed the subject OUUI (with SLC) or other TES Closure Entry (with SFC) must be recorded to identify the conclusion of the skip count tally where used and the TES of current transaction.

EXAMPLE 43

If OU 00111, 00112, 00113, 00114 have been recorded in the first through fourth position, of the first tray of the first shelf of the cabinet, OU 66666, in Arthropod Corporation, and OU 00117 is to be recorded in the 7the position of the same tray. Where OU 00114 is the SLT with a Matriarch and MBCPA of 66666/01/01/04, the user can reference OU 00112 to enable ReliA-EHR-CP-SLT-Skip. Where the position incrementation tally is to represent the number of successive positions, the subject OU is from the SLT, the position incrementation tally to record the skip is 3. The user therefore can reference OU 00112, 00111, and 00113 to increment position incrementation tally up to 3. When the TES is closed the SLT-Skip process, therefore, adds 3 to the MBCHL3-HRPN, 04, in the MBCPA of the SLT to establish for OU 00117 the Matriarch and MBCPA of 66666/01/01/07. The numberic value of the Skip Count to be recorded or tallied to effect a particular Referation for the Skip processes will depend on whether the numeric value of Skip Count to be recorded is to represent (1) the number of positions after the Skip Referent to be skipped, which would exclude the position of the subject OU, or (2) the number of successive OUPs to be added to the OUP of the Skip Referent, which would include the position of the subject OU. When the SC represents the number of positions to be skipped the SC is termed a Position Skip Count (PSC). When the Skip Count represents the number of positions to be added to the positoin of the Skip Referent the SC is termed a Position Incrementation Count (PIC). A PIC will thereore be greater than PSC by the value of 1. The specific count methodology to be used must, therefore, be pro-enabled. The PSC and PIC methods are collectively termed the Skip Count (SC). When referential SC Talliances are used to record the SC the SC is termed the Skip Count Tally (SCT). The reference to the enabling OU for the Skip processes as well as the subject OU (with SLC) can be included in the SCT. However, both the enabling OU reference and the subject OU reference cannot be included in the SCT unless the value of 2 is to be excluded as a possible SCT. If the SLT and is precluded from being used as a SLT-Skip process enableing referent the ReliA-EHR-CP-SLT-Skip process cannot be used when the there are no other previous Sisters of the SLT.

A more flexible Skip process than the SLT-Skip process in which the user establishes both the Skip Referent and SD is termed the ReliA Enabled Homogen Referation Component Positioning Cousin Skip process (or simply Cousin Skip process). Where a preceding cousin referent methodology is employed the process is a ReliA Enabled Homogen Referation Preceding Cousin Skip process (ReliA-EHR-CP-pC-Skip process or simply pC-Skip process). A succeeding cousin RD methodology could also be employed but like all succeeding referent procesess relative to the preceed RD is impractical. The Cousin Skip processes allow the user to reference a Cousin to establish a Skip Referent and then establish the SD by recording the one or two Skip Talliances in the SD relative to the Skip Referent. The referenced OU(s) that establishes the SD is(are) termed the Skip Direction Referent(s) (SDR or SDRs).

A subsequent Homogen referent, whether a Skip Talliance or not, that represents a change in MBLx-HRPN, MBLy-HRPN, or MBLz-HRPN can establish SD within the Parent at MBLx, MBLy, or MBLz. If an instantiation of the invention is to allow a change in more than one MBL and the SDR references also serve as Talliances the Tally recorded in the process of recording the SDR references may exceed the desired Tally. Alternatively, a change in MBLz-HRPN, or MBLy-HPRN and MBLz-HRPN for a Talliance relative to the Skip Referent can be ignored. Thus a Talliance recorded with a change in MBLz-HRPN or MBLy-HPRN and MBLz-HRPN could count as a Talliance but not as a SDR, so only the SCTs effecting a net change in MBLz-HPRN among the successive references effect a change in MBLz of the Subject OU.

Where only change in MBLx-HPRN from the SR is accepted as a SCT while any Cousin can be a Skip Referent under this process the domain of the subejct OU has to be enabled so the OUP of the subject OU can be uniquely established as in the ReliA-EHR-CP Cousin Aligned process where a number of fixed Cousin relationships are pre-enabled as equivalent relationships. The domain allowed for the subject and the referation of the subject OU based on the SLT and the MBLx-HPRN established by the Cousn Skip Process can be the same that described for the ReliA-EHR-CP-Aligned Cousin process.

As described in the ReliA-EHR-CP Cousin Aligned process, a 2nd Cousin Skip Referent can be enabled as a different process from that enabled by reference to a 1st Cousin. And as in the ReliA-EHR-CP Cousin Aligned process, reference to a 2nd Cousin Skip Referent with MBLy-HRPN greater than MBLy-HRPN of the SLT can be enabled as a different process from that enabled by reference to a MBLy-HRPN less than MBLy-HRPN of the SLT.

Both Skip processes in the interest of the most reliable location addresses shoud consistently one Referent Direction. Once an EPS-CP is enabled, the ReliA-EHR-CP-SLT-Skip process is distinguished by the inclusion of both a previous Sister and a non-previous OUUI in the TES of a transaction. Once an EPS is enabled the ReliA-EHR-CP-pC-Skip process is distinguished by the inclusion of both a previous Cousin and a previous Homogen as well as a non-previous OUUI in the TES of a transaction.

The Skip processes can be embodied so either the subject OU or the previous Sister or the previous Cousin referent can be recorded first in the TES of the process. Like the other ReliA-EH-CP processes, the position of the subject OU entry in the TES of the Skip processes may, however, affect the operation or details of the process as well as other alternative sub-processes included in an embodiment of the invention. If one of the Skip processes and another alternative process that can be enabled within an EPS for the CPam are included in an embodiment of this invention and these are all individually embodied to collect the subject OU last, the Skip processes can be automatically closed once a non-previous OUUI in the TES is validated. If, however, other alternative subprocesses that can be enabled within an EPS for the CPam are included in an embodiment of this invention and these are embodied to use a non-previous OUUI in TES1, the Skip processes must hold each transaction open until a TES Closure Entry is entered or recorded. User errors will be significantly reduced if a consistent convention is used for the position of the subject OUUI entry in the TES.

Advancement of the subject OUP to a subsequent PHL Homogen should automatically initiate the PA function for any change in MBLy or A relative to the SLT to eliminate an invalid MBCPA from being recorded.

The Matriarch Reference Methodology
Introduction

The CP processes described to this point for the tracking of OUs provide for automatic advancement of subject OU Positions (OUPs) from Parent to Parent, or even Grandparent to Grandparent as long as the successive Ancestors are non-tracked OUs. Thus, without disabling and reenabling an EPS the user has been limited to just recording successive transactions of the referencing Descendants of the Guardian of the SET. Under certain circumstances, the family of Homogen OUs included within the Guardian may be large enough to record the desired transactions without disabling and reenabling EPSs as the TD advances to successive subjects within successive PHL Homogens or GPHL Homogens. (e.g. when the Guardian OU is a Grandparent or Great Grandparent). If the Guardian OU is the Parent OU, however, automatic advancement of a subject OUP to the BPOUP, or more generally, the EASP, has not been possible because of the single level Guardian. A Parent Advancement capability is needed that would allow the user to advance the subject OUP beyond the family of Homogen OUs defined by a particular Guardian OU, said capabiltiy is termed the Matriarch Referent methodology (MR methodology).

The MR methodology is an extension of the previously described sub-processes that supports the automatic advancement of subject OUPs from Parent to Parent. The MR methodology allows the user to establish a higher level Ancestor referent than a Guardian, allows the intermediate tracked Ancestors (i.e. intermediate Guardians) to be ignored by the user, just as non tracked OUs are ignored in the previously described processes. The larger family of Homogens, therefore, allows the subject OUPs to be advanced over more distantly related tracked PHL or GPHL Homogens without disabling and reenabling an EPS to record a series of successive transactions for subject Ous over a series of Guardian Ous, greatly simplifying the recording of multiple Homogen transactions in multiple Guardians.

The higher level tracked tracked Ancestor allowed in the MR methodology is a special Ancestor in the lineage of a subject OU, a guardian of Guardians or a supra Guardian. A Guardian that is established by an enabling process for the purpose of being the Ancestor referent of the subject OU of succeeding transactions in an EPS was previously termed a Matriarch. A Matriarch is defined, more broadly under the MR methodology, as a Guardian or a higher level tracked Ancestor of the Guardian that is established by an enabling process for the purpose of being the Ancestor referent of the EPS. When a Matriarch is not the Guardian of a subject OU it is effectively the Guardian's Guardian or perhaps even the Guardian of the Guardian's Guardian.

EXAMPLE 44 75

In Example 10 the Guardian of OU 00881 was established as being in the tray OU 88888. The Guardian of OU 88888 was the shelf, OU 77777, and its Guardian was the cabinet, OU 66666. The Matriarch of OU 00881 can therefore be defined by the user in this case to be OU 66666, or OU 77777, or its own Guardian, OU 88888.

The GBCPA of a subject OU whose Matriarch is also its Guardian is still a GBCPA as well as a MBCPA. An MBCPA of a subject OU whose Matriarch is tracked Ancestor of the subject OU's Guardian is just an MBCPA (i.e. not a GBCPA).

EXAMPLE 45

The ReliA CPA of OU 00881 in Example 5 was 66666/08/08/01, where OU 66666 was the lowest level tracked Ancestor—there were no intermediate level tracked Ancestors. The ReliA CPA of OU 00881 in Example 10 became 88888/01, however, when the tray, OU 88888, was established as a tracked Ancestor. With the circumstances described in Example 10, OU 66666 can be established as the Matriarch and the MBCPA as 08/08/01. The Maria CPA of OU 00881 is, therefore, 66666/08/08/01, the same relational address as the ReliA CPA of OU 00881 when the shelves and trays were non tracked OUs.

When the MR methodology is used to define a Matriarch that is higher than the Guardian of the SET, the user uses the same basic ReliA process that would otherwise be used if the Descendant Guardians had not been defined as tracked Ous allowing the user to use the same primary user process for EPSs based on a Matriarch that is a tracked Ancestor of a Guaridan as EPSs based just a Guardian. The programmed processes to support allowing a user ignore the intermediate tracked Ancesstors while maintaining a normalized location address, a ReliA CPA, with a strickly Guardian Based Component Position Address are of course different. The application of this and the MR methodology in general is illustrated by the following example:

EXAMPLE 46

The tracking of the trays that are pulled out and moved around from time to time to transport the arthropods would greatly facilitate the tracking of their components. Recording the transfer of a tray records the transfer of all of its Descendant OUs. With the trays established as tracked OUs, inventory of the arthropods in the cabinet would become more tedious. If BioSupply, having established the trays as tracked OUs, wants to do a physical inventory of the arthropods, without the MR methodology, the inventory takers would have to enable an enabling process to establish each tray as a Matriarch, record the OUUIs of the successive arthropods in the tray, and then disable the EPS after recording the last arthropod in the tray. To inventory the arthropods in one cabinet, an EPS would have to be enabled and disabled 64 times.

With the MR methodology, the inventory takers would enable an enabling process only for the first arthropod to be recorded in the cabinet. Once the enabling transaction for the first arthropod is recorded, the intermediate tracked trays can be ignored; the intermediate tracked trays can be treated as untracked trays; so the inventory taker can then use the same processes they would employ to record the same transactions if OU 66666 were in fact the Guardian.

More precisely, if the OUUI of the arthropod on the fist shelf, first tray, and first place is 00101 and its MBCPA is 01/01/01 the inventory taker could record, using the ReliAA-CP-Manual process, the enabling transaction as 00101/66666/01/01/01 to enable the EPS. The inventory taker records the Arthropods in the remainder of the tray as before, but does not disable the ESP at the end of the tray. While still enabled, the inventory taker continues to the first arthropod in the second tray. The inventory taker continues recording in the same manner the successive arthropods in the second tray and on through the successive trays of the first shelf. The inventory taker then continues, without disabling or enabling to record the arthropod on the second shelf, and remaining shelves. Once the last arthropod is recorded the inventory taker can disable the EPS by referencing the Matriarch again.

The relationship between a MatiA CPA and a ReliA CPA is further illustrated by the following example:

EXAMPLE 47

Assume the following relative to a subject OU identified as C: If M is a tracked Great Grandparent OU, A is a tracked Grandparent OU in Component Position 04 of M, B is a tracked Parent OU in Component Position 05 of A, and C is the subject OU in Component Position 06 of B. The ReliA CPA of C is B/06. The MBCPA of C, however, is M/04/05/06. (a) If A is designated the Matriarch, the ReliA CPA of C is still B/06, but the MBCPA of C becomes A/05/06. (b) If M is again designated the Matriarch, as first postulated, but B is a non-tracked Parent OU, the ReliA CPA of C becomes A/05/06, but the MBCPA of C is still M/04/05/06. (c) If A and B are both nontracked OUs, the MBCPA Of C is still M/04/05/06, but this same Relational and Hierarchical CPA, M/04/05/06, is also the ReliA CPA of C.

The option allowed to the user by the MR methodology to extend the Ancestor referent from just a Guardian to a higher level Ancestor is limited only by the ability of the user to identify the higher level Ancestor of an OU and the position determinant of the subject OU within the higher level Ancestor. To maintain a fully normalized location address on the OURF, however, the Guardian referent included in the ReliA CPA of the same OU must remain the lowest tracked Ancestor of a subject OU.

EXAMPLE 48

The Matriarch of OU 00881, in Example 10 and 44 where The Matriarch of OU 00881 can therefore be defined by the user to be OU 66666, or OU 77777, or its own Guardian, OU 88888 and the Maria CPA can be established as 66666/08/08/01, 777777/08/01, or 88888/01 for the respective possible Matriarchs. The ReliA CPA that the ReliA Ancestor process must record in each case, however, must be its ReliA CPA, 88888/01, if the OURF is to be normalized.

By allowing automatic advancement of the subject OUP from Guardian to Guardian, and an Ancestor referent that is more distantly related to the subject OU than its Guardian, the MR methodology requires that the alternative ReliA sub-processes supporting the CPam be modified to convert the MatiA CPA established by the ReliA sub-process for the subject of each transaction to a ReliA CPA of successive Homogen OUs as the subject OUP of successive tranactions is advanced potentially from Guardian to Guardian, as well as from non-tracked Parent to Parent within the defined Matriarch. Previously, with the Matriarch fixed as the Guardian, the Matriarch of the EPS could be automatically recorded as the Guardian of all subject OUs recorded in the EPS. When the subject OUP is allowed to advance from Guardian to Guardian OU, without reestablishing the EPS, the Guardian referent to be included in the ReliA CPA of the subject OUs must be updated. Previously, the MBCPA established relative to the Matriarch could be recorded as the GBCPA of the ReliA CPA of each successive transaction. When the MBCPA computed for the subject OU of each successive transaction is allowed to be based upon a more distantly related tracked Ancestor than its Guardian, the GBCPA of the subject OU relative to its Guardian must be computed for each transaction. Finally, advances from Guardian to Guardian may include concurrent changes in an intermediate tracked Ancestor of the Guardian in the Matriarch-Guradian Lineage (MGL). As a change in a Guardian or a Guardian's Guardian can effect a change in the controlling EPPN at each HL of the Matriarchy the MSL must be reevaluated and updated as necessary with each change in the Guardian.

Because the Matriarch cannot be assumed to be the Guardian, the lineage of the Matriarch and the subject OU must be established. To establish the lineage of the Matriarch and the subject OU, all intermediate tracked Ancestors between the Matriarch and the subject OU must be identified. Once the lineage is established the lowest tracked Ancestor in the lineage is established as the Guardian OU. The intermediate tracked Ancestors are more precisely defined as tracked Descendants of the Matriarch that are Ancestors of the subject OU. These intermediate tracked Ancestors are termed Matriarch-Descendant Ancestors (MDAs). In general, however, the existence of MDAs will not be known initially. The potential MDAs in the MSL are termed Unreferenced Tracked Matriarch-Descendant Ancestors (URTAs). The process that identifies the MDAs and the Guardian is the Unreferenced Tracked Matriarch-Descendant Ancestor Identification function (URTA ID function). With the MDAs identified their associated parameters can be used by the ReliA-CP processes to validate the current transaction and generally successive transactions as well. The URTA ID function constructs the MSL in an array consisting of, at a minimum, the OUUI and ReliA CPA of record for each tracked OU in the MSL. The MBL of each MDA supports computing the GrDHR of each MDA and facilitates construction of the GBCPA Of the subject OU. The lowest MDA with the highest MBL is established as the Guardian of the subject OU. The lowest MDA with the highest MBL is established as the Guardian of the subject OU.

The ReliAA-CP processes that support the MR methodology are termed ReliAM-CP processes. When the MR methodology is included in an instantiation of this invention, the URTA ID function must be initiated by the ReliAM CP processes.

EXAMPLE 49

(a) If OU 88811 is recorded already as the first tray on the first shelf, and if the shelves are untracked OUs, the ReliAA-CP-Manual process using OU 66666 as the Matriarch referent would initiate the URTA ID function to construct the following partial table:

| OUUI | MBL | Guardian OUUI | GBL1 | GBL2 | GBL3 |
|------|-----|---------------|------|------|------|
| 66666 | 0 | | | | |
| 88811 | 2 | 66666 | 01 | 01 | |

The subject OU has the Guardian and GBCPA, ReliA CPA, of the Matriarch and MBCPA provided by the ReliAA provided by the ReliAA-CP processes. Matriarch OU 66666 is at MBL0, the tray, MDA 88811, is at MBL2. (b) Example 50: If, however, the shelves were tracked OUs, and the first shelf had an OUUI of 77711 the URTA ID function would construct the following partial table:

| OUUI | MBL | Guardian OUUI | GBL1 | GBL2 | GBL3 |
|------|-----|---------------|------|------|------|
| 66666 | 0 | | | | |
| 77711 | 1 | 66666 | 01 | | |
| 88811 | 2 | 77711 | 01 | | |

Thus Matriarch OU 66666 is at MBL0, the shelf, MDA 77711, is at MBL1, and the tray, MDA 88811, is at MBL2. Once the MDAs are identified the lowest, last MDA so identified is the Guardian Once the Guardian is identified, the GBCPA of the subject OU relative to the Guardian must be constructed to complete the ReliA CPA of the subject OU. The process that constructs the GBCPA of each subject OU relative to its Guardian, so as to complete the construction of the ReliA CPA of the subject OU, is termed the Guardian and MBCPA to ReliA CPA Conversion function. Said Conversion fucntion constructs the GBCPA from the MBCPA or a portion thereof based on the MBL of the Guardian and the MHR.

Finally, provisions must be made for reevaluating URTAs as the subject OUP is advanced from Parent to PHL Homogen in order to reestablish the Guardian OU and the MDAs in general when the subject OUP advances to a successive PHL Homogen. If the extended PA function advances the subject OUP to a successive PHL Homogen in a position outside the Guardian of the SLT, the MSL should be reestablished by initiating the URTA ID function to recompute the MSL for the subject OU based on the MBCPA computed for it.

The foundation for the MR methodology is the MatiA CPA. If the primary processes are to use potentially an MBCPA of its Homogens as a basis for computing the MBCPA of successive subject OUs, the MBCPA of the Homogens needs to be maintained for this purpose. The permanent maintenance of a second location address for a OU would in effect be a denormalization of the OURF. If an OU is moved relative to its Guardian, it is moved with respect to any pre-established Matriarch. But a Matriarch, for a set of OUs to be recorded in an EPS, is a function of the user's definition of the Matriarch for the EPS. One OU could be referenced to its Great Grandparent as its Matriarch with two URTAs, and a Homogen of the same OU could be referenced to its Grandparent with only one URTA. Any pre-established Matriarch referent is, therefore, fairly useless.

EXAMPLE 51

OU 00881 could have a Matriarch of OU 66666 based on a transaction in one EPS, and its Sister, previously transferred, could have a Matriarch of 90458 based on a transaction in another EPS.

The preferred embodiment, therefore, establishes and maintains the MBCPA Of OUs only on a temporary basis. The MBCPAs are recorded in a temporary file only for a particular EPS In additon, in the preferred embodiment the temporary file is limited to the Homogen OUs recorded in the current EPS, thus having the disadvantage of limiting the Homogens that can be referenced, especially when just a few transactions have been recorded in an EPS. It has the advantage, however, that any Homogens being referenced have just been recorded and the location address established for these OUs are current and accurate if correctly recorded by the user. The MBCPA of all Homogens of a SET could be constructed in the temporary file as soon as an EPS-CP is established, or constructed as subsequent Homogen Ous referenced, so the Descendant Homogens of the Matriarch would not be limited to those recorded in a previous transaction of the EPS.

The preferred embodiment maintains the MBCPA of the SLT in memory and preserves the OUUI of the subject OU of each transaction and its MBCPA as finally established in a special file termed the Previous Homogen Subject Object Units (PHSOU) The PHSOU file is used to determine the MBCPA Of all Homogen referents within an EPS-CP.

The Unreferenced Tracked Matriarch-Descendant Ancestor Identification function (URTA ID function)

The primary objective of the URTA ID function is to identify and record, based on an established MatiA CPA, any URTAs of the subject OU. This function serves to identify the Guardian of the Subject OU so that the Guardian and the GBCPA, based upon it, which constitute the ReliA CPA can be constructed and recorded for the subject OU of successive transactions. The URTA ID function also serves, in the process of identifying the URTAs, to construct or complete the tracked lineage of the subject OU from the Matriarch down through the subject OU. This lineage of tracked OU and parameters thereon from the OURF serve to help validate the MBCPA established by the current and successive transactions within the Guardian.

The URTA ID function identifies the Guardian and more generally the lineage by matching the Ancestor referent and Hierarchical CPA established—as a MatiA CPA or as a ReliA CPA by the EPS enabling process or any ReliA sub-process used to record a subsequnt transaction in the EPS creating a PA—against the ReliA CPAs on the OURF.

If the Matriarch referent is the Guardian, the URTA ID function shall find either no lower level referencing Descendant of the Matriarch or a referencing Descendant of the Matriarch, as in Example 49 with a UUI equal to the subject OU's UUI. Thus, the subject OU is at its ReliA CPA of record and has not been transferred.

When the Matriarch referent is not the Guardian of the Subject OU the intermediate tracked Ancestor(s) in the MSL can be indentified in an URTA ID function by a bottom up or a top down construction of the MSL. A bottom up apporach iterativly uses the MBCPA and highter level HPRNs of the MBCPA to identify OURs with a GBCPA equal to the MBCPA or the hiegher level HPRN of the so truncated MBCPA. With such an OUR is identified the subject OUUI of the OUR so identified and the its tracked Ancestors are compared by the URTA ID function to the Matriarch's OUUI. If the Matriarch OU is not found in the lingeage of the of the OU of the identified OUR, the process is continued untill a tracked MDA is identified. This involves a fairly extensive search of the OURR and a fairly inefficient search of an index on the GBCPA is not maintained for this function. The top down approach (PICK ONE of these two bolds) likewise iterativley contracts the MBCPA/ABCPA as well, but constructs a ReliA CPA from the Matriarch, or its lowest identified tracked MDA in the MSL, and the ABCPA and then searchs for an OU on the OURF with the constructed ReliA CPA, with both Guardian and GBCPA. If a record cannot be found on the OURF with the constructed ReliA CPA, the process truncates the GBCPA in the constructed ReliA CPA and tries again until either an OU with the constructed ReliA CPA is found or the GrDHR of the GBCPA for the ReliA CPA would be zero if reduced any further. If a tracked referencing Descendant of the MDA is found, and it is not the subject OU itself, it repeats the whole process with the newly identified MDA.

Alternatively, URTAs can be identified by testing successive referencing Descendants of the Matriarch for a congruent GBCPA with the MBCPA. When such a referencing Descendant is identified the identified MDA is used as the referent for a repeat of the first test to identify any additional URTAs. Any additional URTAs can be identified by testing successive referencing Descendants of the last identified MDA for a congruent GBCPA With the HRPNs of lower order HLs of the MBCPA not included in the GBCPA of any previously identified MDAs. This requires testing potentially all referencing Descendants of the Matriarch and testing potentially all referencing Descendants of all MDA in the MSL.

The top down URTA ID function used in the preferred embodiment identifies any successive referencing Descendants by constructing a test ReliA CPA with only plausible GBCPAs from the MBCPA and searching for successive referencing Descendants as the Guradina of the Test ReliA CPAs. Thus, file URTA ID function used in the preferred embodiment evaluates only successive referencing Descendants in the MSL, which will be much faster when the OURF includes an index by ReliA CPA.

If the Matriarcy referent and MBCPA provided and the records are complete, the URTA ID function will identify a lower level referencing Descendant of the Matriarch that is potentially the Guardian. When no further MDA are found, last successive referencing Descendant found is assumed to be and is specifically identified as the Guardian.

When a referencing Descendant is found, the function establishes the Descendant OU's ReliA CPA of record and certain other parameters in a temporary table or file. The ReliA CPAs serve as a reference for successive steps in this function and subsequent tasks in the process employed in the current and subsequent transactions.

The HLs of Descendants within the Matriarch are termed Matriarch Based Component Hierarchy Levels (MBLs). The MBLs of the OU in the MSL are described relative to the Matriarch. The MBL of the Matriarch is designated as MBL0, the MBL of the next hierarchy is MBL1, etc. The number of total hierarchies represented by a particular MSL lineage is an important measure in the URTA ID function. The Matriarch Hierarchical Reach (MHR) of a MatiA CPA for a subject OU is similarly measured and expressed as the GrDHR of a Guardian and GBCPA for a subject OU is measured and expressed. A MHR describes the number of HLs (generations) included in the MBCPA for a subject OU with a given Matriarch referent. The GrDHR of the traked OUs in the MSL is the difference between the MBL of the Guradian of a OU and the MBL of the OU.

(a) When an OU in MSL is not tracked, the OU will not be included in a listing of the OUs in the MSL established by the URTA ID functoin.

EXAMPLE 52

If the shelves in BioSupply are not tracked, the MSL of OU 66666-OU 00321 is as follows:

| OUUI | MBL | Item Descripton | ReliA CPA |
|---|---|---|---|
| 66666 | 0 | Cabinet | |
| 88320 | 2 | Tray | 66666/03/02 |
| 00321 | 3 | Arthropod | 88320/01 |

(a) Based on this information the cabinet and Matriarch, OU 666666, is at MBL0; the tray, OU 88320 is at MBL2, and the Arthropod, OU 00321 is at MBL3. The shelf is at MBL1, but, as a nontracked OU is not included in the MSL defined lineage of tacked Ous. (b) The MHR of the MSL of OU 66666-OU 00321 this example is the total number of HRPNs in all the MBCPA of the subject OU. So the MHR is 3. (c) The GrDHR of the tray, OU 88320, can betermined by the difference between the MBL of its Guardian, OU 66666, 0, and the MBL of the tray, 2. So the GrDHR of the tray is 2. The MBL of the subject OU will not be initially known. The MBL of the subject OU is computed as MHR minus the sum of the GrDHR of the Ancestors in the MSL. So the GrDHR of the subject OU is 3−2=1.

The maximum GrDHR for a specified. OUObject Unit can be any value up to the maximum set for a given OMA. The MHR of a MBCPA for a specified Matriarch can be any value up to the maximum set for an instantiation of this invention. The maximum MHR allowed in the preferred embodiment is 3, the same as the maximum for the GrDHR.

Unlike the normalized ReliA CPA which cannot include the HRPNs of its tracked Ancestors, the higher order HRPNs of an MBCPA can include the HRPNs of MDAs in the MSL. The MBCPA of an Guardian OU is congruent with the ReliA CPA of the referencing Descendant of the Guradian OU.

EXAMPLE 53

Continuing with Example OU 00321 has the MatiA CPA of 66666/03/02/01. Tray OU, 88320, having a ReliA CPA of 66566/03/02 is congrous with the MatiA CPA of 66666/03/0210, because the Guardian of the tray equals the Matriarch and because GBL1-HPRN and GBL2-HPRN of the trays GBCPA equals MBL1-HPRN and MBL1-HPRN of the MBCPA. Furthermore, Antropod OU, 00320, having a ReliA CPA of 88320/01 is congrous with MatiA CPA of 66666/03/02/01 because its Guardian, OU 88320, is the congruent with the MatiA CPA of the tray OU (OU 88320 is the equivalent of Guardian 66666 and MBL1-HPRN, 03, and MBL1-HPRN, 02 in the MatiA CPA) and GBL1-HPRN, 03, describing the positon of the Anthropod at MBL3 equals the MBL3-HPRNof the MatiA CPA.

An MDA of a subject OU correctly recorded on the OURF can be identified by the top down method of the URTA ID function by finding OURs on the OURF in which the Guardian referent in the ReliA CPA corresponds to the Matriarch of the subject OU of the transaction and a portion of the GBCPA corresponds to the MBCPA of the same OU.

EXAMPLE 54

The Guardian of OU 00321 in Example 52 can be identified by constructing a ReliA CPA which consists of the MatiA CPA except for MBL3. The resulting ReliA CPA, 66666/03/02 corresponds to the ReliA CPA of the tray, OU 88320. Conversely, if the Guardian of record of OU 00321 were the shelf, OU 77300, at MBL1 and the tray was not tracked, the ReliA CPA constructed in the initial proposition of this examle would not be a valid ReliA CPA. The shelf Guardian can be identified by constructing a ReliA CPA which consists of the MatiA CPA except for MBL2 and MBL3.

Thus, where an unreferenced Guardian is a referencing Descendant of the Matriarch, the Guardian can be identified by successively retracting the MHR, dropping the HRPNs in the lowest MBL of the MBCPA by 1 in each iteration of the test.

In two special cases the Matriarch is the Guardian of a subject OU and the MBCPA is the GBCPA of the subject OU. If the subject OU has not been transferred, the MBCPA will be the GBCPA of record, so the relational address described by the MatiA CPA will correspond to the ReliA CPA of record for the subject OU. This would be verification of the ReliA CPA without retraction of the MHR of the MBCPA. If the subject OU's current location address has not been previously recorded, an OUR will not be found with a trial ReliA CPA, termed a Test ReliA CPA. Therefore, when a referencing Descendant is not found with Matriach and Just MBL1-HPRN of the Matriarch is accepted as the Guardian and the MBCPA is accepted as the GBCPA of the ReliA CPA of the subject OU.

When a referencing Descendant of the Matriarch is identified, a successive referencing Descendant of the lowest, last identified, tracked Ancestor can be identified in a similar manner. A successive URTA can be identified by finding OURs on the OUR; in which the Guardian referent in the ReliA CPA corresponds to the lowest, last identified MDA of the subject OU of the transaction and a portion of the GBCPA corresponds to the MBCPA of the same OU.

EXAMPLE 55

Assume the circumstances described in the converse of Example 54 where the shelves are tracked OUs. The MatiA CPA of OU 00321 is 66666/03/02/01. The following Test ReliA CPAs are consecutively constructed by retracting the MHR of the MBCPA by 1 from the lowest level in each iteration: 66666/03/02/01, 66666/03/02, and 66666/03. The first two Test ReliA CPAs are invalid, because there are no OUs on the OURF with this ReliA CPA. The last ReliA CPA identifies the shelf OU 77300. The GBCPA of the MDA identified is 03 corresponding to MBL1 of the MBCPA. Said GBCPA represents the position of the lowest, last MDA identified.

The GBCPA of the referencing Descendant of the MDA(s) identified that were originally included as the higher level HRPNs of the MBCPA identify the position of the last MDA identified Thus, they cannot describe the position of any lower Descendants relative to the last MDA identified. Therefore, the higher order MBLs of the original MBCPA down through the MBLs of the last identified MDA should be excluded from the GBCPA of Test ReliA CPAs used to identify any successive MDAs.

The ReliA CPA of a consecutive MDA in the MSL will use as a Guardian referent the OUUI of the lowest, last MDA identified. A potential, consecutive URTA in the MSL can be identified, therefore, by constructin of a Test ReliA CPA comprisiing the lowest, last MDA identified and an iterativley established GBCPA by successively reducing the MHR of the original MBCPA with each iteration. The iteratively establihsed GBCPA of the Test ReliA CPA is constructed With a reduced GrDHR by dropping the HRPNs of the lowest MBL(s) of the original MBCPA by 1 in each iteration of the test.

EXAMPLE 56

Continuing with Example 55, where the shelf, OU 77300, in MBL1-03 of the cabinet has been identified as the referencing Descendant of the Matriarch in the MBL1 of the the original MBCPA. The MBL1-HPRN comprising the GBCPA of the lowest, last identified MDA, is omitted from the origianl MBCPA in constructing the GBCPA of any successive Test ReliA CPAs. The following Test ReliA CPAs 77300/02/01 and 77300/02 are consecutively constructed by retracting the MHR of the remaining MBCPA by 1 from the lowest MBL in each iteration. The first ReliA CPA is invalid. The last ReliA CPA identifies the tray, OU 88320.

As an MDA was found, an additional lower MDA is possible. The same analysis process is used. The Test ReliA CPA is therefore 88320/01. Assuming that the subject OU has not been recorded in this position already, the Test ReliA CPA will fail. Thus a successive MDA is not identified.

When a successive referencing Descendant is not identified, the lowest, last MDA identified will be specifically identified as the Guardian of the subject OU for the subsequent tasks in the MR methodology. With each referencing Descendant identified, the potential exists that the Descendant is the subject OU. This can be tested in each case. When an identified referencing Descendant is the subject OU, the last MDA likewise identified is the Guardian of the subject OU.

Central to the URTA ID function is the reconciliation of MHR of the Matriarch and Subject OUs. The unreconciled MHR at any point is termed the Unidentified Matriarch-Descendant Ancestor Hierarchical Reach (UMDAHR). If none of the Descendants have been identified, the UMDAHR is equal to the MHR. As the URTA ID function identifies the first Descendant of the Descendant-Ancestors, the UMDAHR is decreased by the GrDHR of each successively identified referencing Descendant.

The complement of the UMDAHR relative to the MHR is the Identified Matriarch-Descendant Ancestor Hierarchical Reach (IMDAHR), thus, equals MHR minus UMDAHR. More directly IMDAHR is the sum of the GrDHRs of the identified, MDA. As the objective of the URTA ID function is to identify URTAs in the MSL of the subject, the the IMDAHR needs to be maximized, or UMDAHR minimized, of the MHR for the MBCPA. IMDAHR plus the value of 1 represents the highest MBL of the MBCPA to be included. In other words, the IMDAHR at any one point represents the number of HRPNs in the MBCPA that describe the GBCPA of the previously identified MDA, if any, of the MSL. If no MDAs have been identified the first MBL of the MBCPA to be included in the Test ReliA CPA is MBL1.

End of Parent Determination Function

The PA function uses the EPPNs established for the Guardian. When the Matriarch is a Guardian the EPPNs at each MBL of the MSL are determined directly by the Guardian OU or Item. As am nomalized IMR is more reliable and effiecient to maintian the Item will be represented as the soruce of the EPPNs at each hierarhcy of the MSL. When MDAs are included in the MSL, however, each tracked Ancestor in the MSL will contribute some EPPNs established for the Item to the EPPNs that will control the PA function.

EXAMPLE 57

In the cabinet in Example 52 the trays were always tracked and the shelves were never tracked. The LRTCHL and the LATCHL of the cabinet would both be 2, and the EHL-EPPNs for the cabinet would be 8, 8, and 0 respectively. The LRTCHL and the LATCHL of the trays would both be 1, and the EHL-EPPNs for the trays would be 8, 0, and, 0 respectively. The controlling EPPNs of the MSL would be as follows: MBL1-EPPN would be 8 from EHL1-EPPN of the cabinet, MBL2-EPPN would be 8 from EHL2-EPPN of the cabinet, and MBL3-EPPN would be 8 from EHL1-EPPN of the tray.

The process described here to establish the appropriate controlling EPPNs in an EPS-CP for each MBL of a MSL, where MDAs are included in the MSL, is termed the End of Parent Determination function (EPD function). These EPPNs established by the EPD function support validation of the HRPNs recorded for the MBCPA and for the PA function.

When all Items in the Universe of an instantiation of this invention restrict LRTCHL and LATCHL to being equal, so no variance is allowed in the MBL at which referencing Descendants can be installed the controlling EPPNs for each MBL of the MSL can be established fairly simply. EPPN Each successive tracked MDA in the MSL will proveid a number of successive controlling EPPNs equal to LRTCHL and LATCHL..

When, however, an Ancestor has LATCHL that is lower (greater) that its LRTCHL, it allows referencing Descendants to the Ancestor to be installed at different hierarchies of the Ancestor. In this case some established EPPNs of the of Ancestor may forfeit control to the EPPNs of the occupying component. A forfeit of control will occur when a referencing Descendant is installed at a GBL of the Guardian OU higher than the LATCHL of its Guradian Item. Thus, the EPPN of all MBLs occupied by the referencing Descendant occurring above the level of LATCHL of its Guardian will control over the EPPN of the Guardian. If a referencing Descendant is installed at two MBLs higher than the LATCHL of the Ancestor, the EPPNs of the referencing Descendant or its referencing Descendants will control over the EPPNs of the two lowest hierarchies of the Guardian for which a referencing Descendant is allowed by the Guardian. When the MR methodology is employed in an instantiation of this invention and the LRTCHL and LATCHL are allowed to be different in the Universe of OUs tracked by an the instantiation of this invention the EPD function must determine the controlling EPPN for each MBL of the MSL.

A set of memory variables is required to store the controlling EPPNs for reference by the succeeding steps of primary sub-processes of the current transactions as well as successive transactions within the Parent of the SET. The preferred embodiment stores the controlling EPPNs in a one dimensional array with three rows for each hierarchy allowed in the maximum MHR of the preferred embodiment. These are termed MBL1-EPPN, MBL2-EPPN, . . . , MBLm-EPPN, where m represents the maximum MBLs allowed in an instantiation of the ML.

EXAMPLE 58

In Example 5757 the trays in Example 5757 were always tracked and the shelves were never tracked. The LRTCHL and the LATCHL of the cabinet were both 2. Under different circumstances the LRTCHL and LATCHL of the same cabinet could be different, however. If large arthropods are stored in large tracked drawers that fit in the same cabinets in place of shelves, and the cabinets are no longer used for preserved arthropods, the LRTCHL and the LATCHL of the cabinet will both be just 1 and the EHL-EPPNs for the cabinet will be 8; 0, and, 0 respectively. Assume the LRTCHL and LATCHL of the drawer is 2 and the EHL-EPPNs for the drawers will be 4, 0, and 0. If, however, the shelves and the drawers are used interchangeably, the LATCHL of the cabinet must provide for the lowest allowed tracked item, the trays. In this case the LRTCHL of the cabinet will remain as 1, but the LATCHL of the cabinet must be 2. The EHL-EPPNs for the cabinet will, therefore, be 8, 8, and 0 respectively. The EHL1-EPPN of the cabinet provides for shelves or drawers and the EHL2-EPPN provides for the trays when the shelves are used.

The controlling EPPNs for an MBCPA for the small arthropods for MBL1-EPPN is 08 from EHL1-EPPN of the cabinet, for MBL2-EPPN is 08 from EHL2-EPPN of the cabinet, and for MBL3-EPPN is 08 from EHL1-EPPN of the trays. The controlling EPPNs for an MBCPA for the large arthropods for MBL1-EPPN is 08 from EHL1-EPPN of the cabinet, and for MBL2-EPPN is 04 from EHL1-EPPN of the drawer. EHL2-EPPN of the cabinet is not used. When the drawers are used at MBL1-EPPN, the EPPNs of the drawer control for the lower cabinet based HLs. Thus, EHL1-EPPN of the drawer controls for EHL2-EPPN of the cabinet.

EPP The EPD function evaluates each successive tracked MDA in the MSL to determine the GrDHR of the MDA. As each unit of the GrDHR of a tracked OU in the MSL represents a MBL of the EPS that must have an associated EPPN, the GrDHR of each MDA establishes the number of successive EPPNs from its Guradian that need to be copied to MBL-EPPN for the ESP. Thus, if the first MDA has a GrDHR of 2, while the Matriarch Item has a LATCHL of 3, only the EHL1-EPPN and EHL1-EPPN from the Matriarch should be copied to memory variables for the controllng EPPN of each MBL in the EPS. These would be MBL1-EPPNs and MBL2-EPPN for the EPS. The EPPNs in each case are copied from the Matriarch and successive MDAs until a number of EPPNs equal to the MHR for the MatiA CPA been copied The GRdHR for each MDA can be determined from the ReliA CPA on its OUR. In the preferred embodiment the ReliA CPA of record for each MDA and its MBL was recorded by the URTA ID function in an array termed Reference (Ref). In the preferred embodiment the GrDHR is computed by subtracting the MBL of each referencing Descendant from the MBL of its Guardian. The GrDHR of each tracked MDA of the subject OU is the MHR minus the MBL of the lowest MDA in the MSL.

Guardian and MBCPA to ReliA CPA Conversion Function

The use of a MatiA CPA by the MR methodology to record a location address provides a user, in many cases, a broader choice of relational references than would be available if the Ancestor referent and ABCPA were restricted to a Guardian and a GBCPA. Because the Matriarch and MBCPA is not necessarily the Guardian and GBCPA of the subject OU, however, the Guardian and GBCPA must be constructed in order to record the ReliA CPA for the subject OU of each transaction.

EXAMPLE 59

Assume that the Arthropod, OU 00329, in the first place in the third tray of the third shelf of OU 66666 of BioSupply has been established with a MatiA CPA of 66666/03/03/01. The Guardian OU and the GBCPA of the subject OU are not determinable from this information alone. If 60 the Arthropod, OU 00329, in the same position of OU 66666 has been established with a MatiA CPA of 88830/01. The Matriarch is the Guardian of OU 00329 and the MBCPA is, therefore, the GBCPA, but this cannot be determined from this information.

If the Guardian and the MBL of the Guardian in the MSL is established, the GBCPA can be constructed from all or part of the MBCPA. Simply described, the GBCPA will consist of successive HRPNs in the MBCPA starting with the HRPN in the first MBL of the MBCPA that is greater than the MBL of the Guardian.

EXAMPLE 61

Continuing with Example 59109105101 Example, assume that OU 88830, a tray, being the lowest level MDA in the MSL has been identified as the Guardian OU of OU 00329. Assume further that OU 88830 is at MBL2 of the MSL described. The HPRNs, 03 and 03, in the first and second MBLs of the MBL describe the position of the Ancestors at MBL1 and MBL2. The remaining HPRN, 01, in the third MBL of the MBCPA describes the position of the subject OU relative to its Guardian. Thus, the ReliA CPA of the subject OU is 88830/01.

62

EXAMPLE 63

The process used to construct the ReliA CPA from the Matriarch referent and the MBCPA established in the MR methodology is the Guardian and MBCPA to ReliA CPA Conversion function. This function in general requires that all Ancestors in the MSL have been identified in the descending hierarchical level and that the MBCPA of the subject OU relative to the Matriarch has been identified.

The Guardian and MBCPA to ReliA CPA Conversion function establishes the ReliA CPA in two major steps: (1) establish the Guardian and its MBL, and (2) establish the GBCPA. The Guardian will be the lowest, last MDA identified by the URTA ID function. The MBL of the Guardian will be the sum of the GTDHR of each MDA in the MSL. In the preferred embodiment, the MBL of each Ancestor in the MSL is established by the URTA ID function. The GBCPA of the subject OU comprises of a portion, or all, of successive HRPNs in the MBCPA of the subject OU. The range of the MBL-HPRNs included in the GBCPA is determined by the GTDHR of the subject OU. The beginning of the range, the highest MBL in the MBCPA established for the subect OU, termed $MBL_{max}$ is the MBL of the lowest, last MDA identified in the MSL plus 1. The end of the range in the MBCPA, $MBL_{min}$ is the MHR.

EXAMPLE 64

Assume now that the shelves in Example 59109105101 Example Example Example are tracked; the shelf is identified as OU 77300. The MatiA CPA of 00329 is 66666/03/03/01. The Ancestors in the MSL are:

| OUUI  | MBL | ReliA CPA |
|-------|-----|-----------|
| 66666 | 0   |           |
| 77300 | 1   | 66666/03  |
| 88830 | 2   | 77300/03  |

The lowest MDA in the MSL is OU 88830 at MBL2, so it is the Guardian. Therefore, $MBL_{max}$=MBL2. There are three HPRNs in the MBCPA, so the MHR of the MSL/MBCPA is 3, so $MBL_{min}$=3, the MHR. The HPRN(s) in the MBCPA consisting of MBL3 through MBL3, or 01, is (are) therefore copied to GBL1 through GBL1 of the GBCPA. The beginning and end of the range copied are equal because, in this case, $MBL_{max}$ and $MBL_{min}$ are equal. The ReliA CPA of OU 00329 is, therefore, 88830/01.

The ReliA Matriarch Component Positioning Descendant Processes (ReliAM-CP-Descendant Processes)

When the MR methodology is incorporated in an instantiation of this invention and the Matriarch is at a higher level Ancestor than the Guardian of a subject OU the ReliAA-CP processes must be modified so as to determine the HRPNs comprising the GBCPA of any additional, higher level tracked Ancestors that should be included as higher level HPRNs in the MBCPA for the transaction. When the ReliAA-CP processes are modified to accommodate the MR methodology they are termed the ReliA Matriarch Component Positioning processes (ReliAM-CP processes). The ReliAA and ReliAM processes are also referred to collectively as the Ancestor processes.

In the ReliAA-CP-Manual process the ABCPA must be recorded manually. Assuming the higher level tracked Ancestor(s) have already been recorded, the GBCPA and the HRPNs thereof of the higher level tracked Ancestors should already be established on the OURF.

EXAMPLE 65

Assume that OU 00322 is in the second place of the second tray on the third shelf of cabinet OU 66666 as in Example 64114110106, and that both the shelves and trays are tracked. The Ancestors and their ReliA CPA recorded on the OURF are as follows:

| OUUI  | MBL | Item ID | ReliA CPA |
|-------|-----|---------|-----------|
| 66666 | 0   | FR      |           |
| 77300 | 1   | SL      | 66666/03  |
| 88320 | 2   | TR      | 77300/02  |

If the user employs the ReliAA-CP-Manual process with a non-Guardian Matriarch, to record the transaction and establish a Family, an Ancestor referent and its Descendants, as broad as possible to minimize disabling and reenabling, the user will reference OUUI 66666 and manually enter the MBCPA of 03/02/02.

If the ReliAA-CP-Manual process was employed without a higher level Ancestor—with just the Guardian—the user will reference OUUI 88320 and manually enter the GBCPA of just 01. To avoid recording additional HPRNs when using the MR methodology and a higher level Matriarch is referenced, a reference to the MDAs can be used to obtain the GBCPA of these Ancestors from the OURF to provide the HRPNs of these Ancestors.

66 In the ReliAA-CP-Homogen processes HRPNs are not collected, but a Homogen referent, when a Guardian Ancestor is the Matriarch will not be a referencing Descendant of the Matriarch referent.

EXAMPLE 67

If in Example 65115111107, OU 00321 has been recorded in its position in the adjacent first place position of the same shelf and Matriarch, and the user wants to record OU 00322, the Ancestor-HOP1OU process, referencing OU 00321, cannot be used because OU 00321 is not a referencing Descendant of OU 66666.

A reference to the MDAs can, however, be used in a manner similar to that described for the ReliAM-CP process which included referencing the MDAs, as well as the manual recording of the HPRNs, to establish the lineage between the Homogen referent and the Matriarch.

The ReliA sub-processes used to record the MDAs in the ReliAM-CP processes are collectively termed herein as the ReliA Matriarch Component Positioning Descendant processes (ReliAM-CP-Descendant processes). The ReliAM-CP-Descendant processes allow the user to use a more distant tracked Ancestor of the subject OU than its Guardian OU. They can be used only when the MR methodology is incorporated in an instantiation of this invention. There are two ReliAM-CP-Descendant processes. The ReliAM-CP-Descendant-Manual process (ReliAM-CP-DM process) supports the recording of MDAs in the ReliAA-CP-Manual process. The ReliAM-CP-Descendant-Manual process (ReliAM-CP-DH processes) supports the recording of MDAs in the ReliAA-CP-Homogen processes. These two processes allow successive MDA referents to progressively define (successively refine) the HieraRelational position of the subject at each successively lower MBL of the Matriarchy, and they allow the user to record a CP address with a maximum of flexibility to respond to the relations available or record the position manually when there is none.

The ReliAM-CP-Descendant-Manual process is recorded by referencing the Matriarch, and then successively lower tracked MDA and finally the GBCPA of the subject OU relative to the lowest, last Matriarch-Descendant referenced. The sub-process allows the user at any point to record in lieu of referencing the remaining MDA to record the remaining HieraRelational positions manually in order to establish the lowest level HieraRelational positions of the subject. The subject OU can be recorded first or last. Recording the subject OU first requires an external TES Closure Entry if the maximum MHR is not realized by the successive MDAs and HPRNs recorded.

EXAMPLE 68

References to OU 77300 and 88320 in lieu of their HPRNs, 03 and 02, can be used to provide their positions within their respective Parents. The transaction to record the transaction- Example 66116112108 with the SFC is, therefore, 00322/ 66666/77300/88320/02. 69 The same transaction can also be recorded, substituting the GBCPA/HPRN(S) Of lower level Ancestors for their OUUI. Thus the same transaction can be recorded as 00322/66666/77300/02/02 or as 00322/66666/ 03/02/02.

Finally, as long as successive MDAs references have been recorded these processes allow the user to record a Sister referent to establish the lowest level HPRN of the subject OU. The ReliAM-CP-DH processes is recorded by referencing the Matriarch, and then successively lower tracked MDA(s) and finally the Homogen. Where the SFC is used the subject OU is recorded first, then the Matriarch, the MDAs, and, finally, the Homogen.

EXAMPLE 70

The transaction to record the transaction suggested with the SFC is, therefore, 00322/66666/77300/88320/00321.

The ReliAM-CP-Descendant-processes does not require the referencing of MDAs in the MSL, even though they exist. A GBCPA of and URTA can be is substituted in the manual process or the reference to an MDA by recording of its GBCPA and any lower level HPRN that describe the position of the subject OU. both a reference to an MDA and its GBCPA Can be skipped if a subsequent descendant Ancestor in the MSL is recorded. When the Guardian of a subsequent OUUI recorded is a non referencing OUUI its Guardian must be a Descendant of the lowest, last Ancestor referent recorded. The URTA, if any, can be identified by the URTA ID function added to the successive MDAs in the MSL. The users side of the ReliAA-CP-Manual process for a Guardian Matriarch is the same as the user's side of the ReliAM-CP-Descendant-Manual process for the transaction (i.e. record the Ancestor and successive HRPNs of the ABCPA). The users side of the ReliAA-CP-Descendant Manual processes for a non-Guardian Ancestor Matriarch is different from ReliAA-CP-Manual process for a Guardian Matriarch in that an at least one descendant OU of the Matriarch in the redefined HRP relative to the subject OU must be recorded.

EXAMPLE 71

The transaction to record the transaction suggested with the SFC could be cut to, 00322/66666/00321, where the URTA are identified by the URTA ID function.

Whether or not the ReliA Ancestor process can be used for a particular transaction is controlled by the CAI for the Ancestor referent. When the MR methodology is instantiated the Matriarch and all MDA should have a true CAI.

Because the MR methodology allows multiple generations of Guardians, each of which is controlled independently by a CPRI, a combination of CP and CNP AMs may be represented in the Guardians included in a MSL. If a combination of CP and CNP AMs was included, the mbcpas determined by the ReliAM-CP process could not be reliably established for the subject OU. When a Guardian Ancestor Matriarch is included in an EPS, the preferred embodiment prevents mixed AMs within the Guardians of the MSL and their Homogens at each MBL when an indicator termed the Mixed Generation Components Allowed Indicator (MGCAI) is true, for the Matriarch, otherwise mixed AMs are allowed with the AM dictated by the CPRI of each specific MDA The recording of the MDAs in conjunction with the ReliAM-CP-Descendant Homogen process serve to confirm the lineage, and therefore the address, of the subject OU recorded.

The Ancestor Descendant procedure evaluates the TES-FPDE (TES3 with the SFC) as an OUUI or a valid HRPN for GBL1. If TES-FPDE is an OUUI a ReliAM-CP-Descendant process is indicated. The OUUI is evaluated as a referencing Descendant of the last referenced OU. If the OUUI is a referencing Descendant a ReliAM-CP-Descendant process is indicated. If TES-FPDE is not an OUUI valid HRPN for MBL1/GBL1 the ReliAM-CP-Descendant-Manual process is indicated but a or an GBCPA that represents the position of the lowest, last Ancestor referent recorded and the concluding elements of the TES. If TES-FPDE is a valid HRPN for MBL1/GBL1 the ReliAM-CP-Descendant process is indicated (with out a Descendant being referenced).

When a ReliAM-CP-Descendant process that is not already, the successive TES entries are similarly evaluated as an OUUI or a valid HRPN for GBL1 of an GBCPA. Successive entries, up to a maximum, of referencing Descendant of the last referenced OU, are accepted until the MHR established by the referencing Descendants or HRPNs equals the maximum MHR allowed for the instantiation of the invention. If the last entry within this maximum is an OUUI for a referencing descendant the last OUUI entry is interpreted as a Homogen referent indicating the ReliAM-CP-DH process. A successive OUUI entry that is not a referencing Descendant is interpreted as TES1 of the next transaction. In this case the last referencing Descendant is interpreted as a Homogen referent. A concluding Homogen referent in either case indicates the ReliAM-CP-DH process. If any of the successive TES entries are evaluated as a valid HRPN the ReliAM-CP-DM process is indicated.

When an MDA is provided by the ReliAM-CP-Descendant processes, the HRPNs of the GBCPA of the MDA are added to the next available fields for HRPNs in the MBCPA. When an HRPN is added manually it is added to the MBCPA in the same manner. When a Homogen referent is provided, its Guardian is validated against the last Ancestor referent provided. When so validated, the HRPNs of the gbcpa of the Homogen referent are added in the same manner to the mbcpa so constructed. The mbcpa of the subject OU is referated from the said constructed mbcpa and the relation parameters established for the ReliAM-CP-DH process. The process following construction of the mbcpa includes initiating the URTA ID function and EPD function, as described for the ReliAM-CP-Manual process.

Referencing OUs in a Relationship of Record to Establish a Referent:

The ReliA Quick Processes (ReliAQ Processes)

The enabling ReliA sub-proceses, the Ancestor/Matriarch processes and the Universe-OL-Manual processes can be relative tedious for the user to record. The Ancestor/Matriarch processes require that a tracked Ancestor be referenced as a basis for establishing the Matriarch for an EPS. The UUI of a tracked Ancestor OU is not, however, always readily available or accessible. Moreover, when the ReliAA-CP-Manual process is used an MBCPA must be recorded as part of the enabling process if an OU in a predetermined Homogen relationship with the subject OU does not exist or its UUI cannot be determined. When a Universe-OL-Manual process is used the UBOLA of the Origin OU must be recorded manually.

Certain commonly occurring conditions support the use of an enabling process that allow a reference to one or more OUs in predefined, qualified positional relationships to serve as the basis for establishing and EPS without referencing an Ancestor or recording the UBOLA manually. Such processes determine the location address of a referent OU (subject OU) in the process from the location address of record on the OURF for the referent. The referent for which the location address is determined by the process is termed a Determinant Referant(DmR). Because the location address is supplied by the OUR for the DmR it can not record a transfer for the DmR or other referent of the process. Importantly, it can establish an EPS for the AM of the DmR very efficiently for the user as well as validate the location address of the DmR to support maintenance of the location address accuracy on the OURF and OLARF and taking of physical inventories of the tracked OUs.
7273

The process of referencing an OU, an addressor, to establish the location address of the referenced is at the core of the ReliAA-CNP process and storing that location address for a co-process, such that the other co-process of said reference point determining co-process can use a reference to another OU (an addressee) to establish the location address of the addressee OU by copying the location address established from the addressor OU to the location address of the addressee OU. (ReliA-EHA-OL and ReliA-EHA-CNP processes). Variations of the addressee co-process are to copy the location of the Address plus the Addressor determinant[8] in the location address of the Addressor (ReliAA-CNP process). Another variation is using the location address of the addressor OU as the basis for referation with established relationship parameters a different location address (ReliA-EHR-CP process). Finally there are combinations of multiple co-processes (ReliAA-CP-Homogen process using multiple Addressor referents).

[8] Espressed for a non-normalized location address. A referant to a an OU trakced with a normalized location address is the normalized address of the referent, but the referent is linked to its successive Guardians to establish the address of the referant.

Processes that establish an EPS with one OU referent, a determinant referent, or more related referents in presestablished relational or ordinal Homogen relationships between the referents and other Homogens of the referant or in preestablished lineage relationship with the referents are termed are termed herein as the ReliA Quick processes (ReliAQ processes). The ordianl Homogen relationships . . . Because the ReliAQ process can establish all the parameters to establish a HCLA the ReliAQ processes are non a priori enabled sub-processes of the ReliA process. They can establish an EPS for all three AMs. The qualified ReliAQ processes supporting these AMs are sometimes represented by including the -OL, -CNP, or -CP suffix after ReliAQ. determinantor comprising positional Homogen or Lineage related OUs of the determinant in one or more preestablished positional relationship(s) of the DmR with other referents or in an preestablished ordinal relationship with a non-referenced Homogen so as to validate the location address of the determinant referent with the OUs in location addresses that conform to the required relationship.

Processes that establish an EPS with one OU referent, a determinant referent, or more related referents comprising Homogen or Lineage related OUs of the determinant in one or more preestablished positional relationship(s) of the DmR with other referents or in an preestablished ordinal relationship with a non-referenced Homogen so as to validate the location address of the determinant referent with the OUs in location addresses that conform to the required relationship. In general, a ReliAQ process affords an easier method of establishing an EPS than the alternative enabling processes. Recording a Sister Origin OU's UUI with the ReliAQ-OL process will generally be easier than recording its UBOLA with the Universe-OL-Manual process.

EXAMPLE 74

Where service trucks are classified as Origin OUs of a service department, referencing a Sister truck's UUI will normally be much easier than recording its UBOLA manually or even from a template.

Similarly, recording a Homogen, Component OU's UUI with the ReliAQ-CNP process will generally be easier than recording an Ancestor OU's UUI with the ReliAA-CNP process. A Component, Homogen OU will often be fairly homogenous with the subject OU and its UUI will generally be close to the subject OU, while the UUI of its lowest tracked Ancestor may be some distance away and not readily referenced.

EXAMPLE 75

Referencing a PC printer, as a Sister OU for a PC, will normally be very easy. Its lowest tracked Ancestor, however, may be the building and its UUI will often not be readily available, so a ReliAA process could not be readily used.

The ReliAQ process can be used only in those situations in which the prerequisite tracked OUs have already been installed and recorded. If the prerequisite number of tracked OUs are not present in a qualifying relationship already and recorded on the their OURs or the relationship of recorded for the OUs do not correspond with their actual location address an alternative enabling processes must be used.

In a most basic case of the ReliAQ processes a reference to only a single OU that is at its address of record can serve to establish an EPS. This most basic enabling process, however, would permit a single mis-recorded referent to effect the mis-recording of the location address of all the subject OUs in the subsequent transactions in the EPS. The collection of two or more OU referents in a preestablished positional relationship, however, can reduce the risk of starting with an incorrect location address by at least half, because the process can require that the location address of record of the additonal referents be in the preestablished relationship. The risk can be further reduced for the ReliAQ-CP process by imposing the additional requirement that one, if not two or more, of the referents be in a preestablished ordinal position or Homogen relationship with the first or last OU or OUP in a parent (same or different for each referent).

When multiple referents are required in an instantiation of this sub-process of the invention as non a priori enabled sub-processes of the ReliA process for an AM can be distinguished from other non a priori enabled sub-processes.

EXAMPLE 76(a)

Assume in a case where the shelves are not tracked, BioSupply instantiates the ReliAQ-CP process with a single referent requirement with no relational requirement on the DmR of the process, evaluates each transaction as a ReliAQ-CP process before evaluating the tranaction as an ReliAM-CP or Universe-OL process, and uses the MR methodology establishing the Matriarch as the 2nd tracked Ancestor above the DmR. Recording the TES of 00111/ from a non a priori enabled state, where OU 00111 is recorded on the OURF with a ReliA CPA of 66666/01/01/01 would be interpreted as the subject OU of a ReliAM or Universe-OL process. If, however, the ReliAQ-process is established with the requriement that the DR be in the FOUP the same entry would be interpreted as the DmR of a ReliAQ process and enable an EPS-CP with the Matriarch of OU 66666. The entry of a subject OUUI in the FOUP will, however, always be interpreted the same, so the ReliAM or Universe-OL could not be used to record a transaction where the subject OU was in the FOUP.

EXAMPLE 76(b)

Alternatively, assume the same assumptions as in Example 76126 except Bio-Supply instantiates the ReliAQ-CP process with a two Homogen referents requirement, where the Matriarch is the common tracked Ancestor of the two referent(s), as well as having the same FOUP requirement for the DR. Recording the TES of 00111/00611, where OU 00611 is recorded on the OURF with a ReliA CPA of 66666/06/01/01 would also enable an EPS-CP with the Matriarch of OU 66666 and 00111 established as the SET and SLT. If, however, the TES of 00111/66666/01/01/02 were recorded the transaction would be interpreted as a ReliAM-CP-Manual process to transfer OU 00111 to MatiB CPA 66666/01/01/02.

If a ReliAQ process, as a non a priori enabled process, is included in an instantiation of this invention with other non a priori enabled process it must be distinguished from the other non a priori enabled process included. In the most basic case described, where only single referent is required for the ReliAQ process, the single entry TES process cannot be distinguished from the non a priori enabled ReliAA process. Instantiation of the ReliAQ processes to require one or more referents be in a preestablished relationship between the referents or, in the case of the ReliAQ-CP processes, one of the referents and an ordinal position relationship with the FOUP or the LOUP allow the ReliAQ processes to be generally distinguished from the other non a priori enabled process. In the case of the ReliAQ-CP processes, requiring more than one relationship requirement increases the reliability of the ReliAQ-CP processes identifying relationships that are current with respect to the complete lineage and HCLA of the referents [i.e. distinguish between the referents with correct location addresses and referents with incorrect location addresses that happen to meet the relationship requirement(s)] as well as support the distinguishment of the ReliAQ process from the other non a priori enabled ReliA sub-processes.

CHANGE for prior into of DR: When the ReliAQ process is used as a sub-process in an instantiation of the ReliA process to enable an EPS, the referent, or one of the referents where the process is instantiated with a multiple referent requirement, must be established as a referent that will be the SET of the EPS enabled by the respective processes and be the SLT of the next transaction recorded in the EPS. Therefore, where more than one referent is required in an instantiation of a ReliAQ process and this process is to be an enabling process of the ReliA-EH processes, one referent must be designated in the process as the Homogen of subject OUs of subsequent transactions to be recorded in the EPS. The referent designated to be the SET, SLT, and Homogen of the next subject OU in the EPS in said instantiation is termed the DmR of the ReliAQ process. If one or more referents in the instantiation is art Ancestor of other referents the lowest Descendant OU of the referents should be the DmR. The DmR can be distinguished by its ordinal position in the TES of the ReliAQ process, or in the ReliAQ-CP processes when the ReliAQ-CP process is not used to establish TD the DmR can be distinguished by its OUP relative to the OUP of other referents in the TES of the process.

In general the order of the referents in the TIES is not important. When CPam is required inclusion of a reference to a Homogen OU of the first referent in the ReliAQ process allows the TD to be established by the user without a Fixed Command. The TD for subsequent transactions can be established by the relationship of the OUP of the first referent in the TES to the OUP to the second or subsequent referent in the TES. For example, if, the OUP of the second referent is subsequent to the first referent the TD can be enabled as Forward TD, and if the OUP of the second referent precedes the first referent the TD can be enabled as Backward TD.

Moreover, to function as an enabling process the ReliAQ processes must establish the UBOLA or the Matriarch of the Determinant Referent. If two or more Component referents are used where one of the referents in the required relationship is an Ancestor of the other referent(s), said Ancestor referent can be established as the Matriarch of the EPS.

In a ReliAQ process supporting the OLam where a single Origin OU referent requirement is instantiated for the invention the UBOLA of the referent is established in the EPS-DmRd to establish an EPS-OL for subsequent OUs recorded in the EPS. If a two or more Origin OU referent requirement is instantiated and all referents have a common UBOLA that UBOLA is likewise established for an EPS-OL.

In a ReliAQ process supporting the CNPam where a single Component OU referent requirement is instantiated for the process and a Component OU is referenced with a Guardian OU requiring the CNPam for its Components, the Guardian of the referent is established as the Matriarch in the EPS-DmRd to establish an EPS-CNP. If a two or more referent requirement is instantiated and all the Component referents have a common Guardian OU or the Guardian OU of the other referent(s) is a referent in the process that Guardian is likewise established as the Matriarch for an EPS-CNP.

In a ReliAQ process supporting the CPam where a single Component OU referent requirement is instantiated for the process and a Component OU is referenced with a Guardian OU requiring the CPam for its Components and all other relationship requirements of the referent are meet, the Guardian of the referent is established as the Matriarch in the EPS-DmRd to establish an EPS-CP. If a two or more referent requirements is instantiated and all the Component referents have a common Guardian OU or one of the referents is the Guardian OU of the other referent(s) and all other requirements of the referents are meet the Guardian is likewise established as the Matriarch for an EPS-CP. In a ReliAQ process supporting the CPam where a single Component OU referent requirement and the MR methodology are instantiated and all other requirements of the process are meet for establishing an EPS-CP, the Matriarch can be established to be a tracked Ancestor of the referent's Guardian at a specified number of Ancestor Guardian(s) from the referent. Where under the same conditions more that one referent is required and all the Component referents have a common tracked Ancestor or one of the referents is a tracked Ancestor of the other referent(s) and all other requirements of the referents are meet the tracked Ancestor of the other referent(s) is likewise established as the Matriarch for an EPS-CP. In each case the MHR of the Matriarch cannot exceed the maximum MHR allowed for the instantiation.

The ReliAQ process cannot record a transfer unless the process is extended as the Ancestor-CP process was extended with Homogen processes in the ReliAA-CP-Homogen process, but such an extension of the ReliAQ in the aggregate would be no different than using a ReliA-EHA process to record the location address of the Homogen in the HkPnOU or HkSnOU position of the DmR of the ReliAQ process. The Homogen reference in Ancestor-CP-Homogen process completes the establishment of the position of the subject OU in the Matriarchy in lieu of establishing the AB-CPA/MBCPA manually. The ReliAQ processes alone establishes the position completely as required by the CPRI of the Matriarch and establishes all parameters required for the EPS-DmRd and the EPS for the AM so dictated. Recording the transfer of a subsequent OU after the completing the enabling process, by either enabling process, is therefore accomplished by a ReliA-EH processes.

If the ReliAQ-CP process is be extended to include a Homogen process or manual collection of a relevant MBCPA the subject OU referent of such a process must be in addition to the referents used to establish the position. In the most basic case of an extended ReliAQ-CP process a single referent ReliAQ process is combined with a subject OU in the TES of the extended process establishing an enabling Homogen process.

ReliA Integrated Evaluation Process

An important characteristic of the ReliA process is its ability to accept a number of alternative sub-processes while maintaining a consistent AM as required by the Ancestors of each subject OU.

Because the ReliA process is a set of integrated sub-processes, initiated without overt indication by the user of the specific processes being employed, the ReliA process must determine what sub-process is being used for a transaction as well as to validate the transaction. The objective of the ReliA Integrated Evaluation Process is to identify the specific ReliA sub-process used by the user for a particular transaction. This evaluation process determines the process being used for a particular transaction by evaluation of the type and order of the information in these entries with existing data in memory or stored on the permanent files on the entries, as well as EPS indicators. Therefore, the nature of the evaluation of an entry in a TES is often dictated in whole or part by the type of TES elements that preceded it.

Each successive element in the TES narrows the range of TES elements allowed in the successive elements of the TES for a valid ReliA sub-process It is the structure of the ReliA Integrated Evaluation process that dictates the order of the TES elements so the s specific ReliA sub-processes can be used interchangeably and still be identified.

Order and Methodology of Analysis

Many permutations of the ReliA Integrated Evaluation process can be described. The combination of processes that should be employed can be influenced by: (1) The type and mix of objects in the operating environment; (2) The nature of maintenance required, and the role of existing objects in influencing the acquisition of additional objects in an object system; (3) The degree of control desired by management to meet operating requirements; and (4) The degree of risk to be assumed by management for errors.

The structure of the ReliA Integrated ]Evaluation process for a particular embodiment is dictated by a number of variables that interact with each other. The enabled and the non-EPS enabled processes comprise the following variables: (1) The specific non-EPS enabled processes to be included; (2) The characteristic elements of the non-EPS enabled processes included; (3) The order of the characteristic elements in the non-EPS enabled processes included; (4) The AMs that will be supported; and (5) The number of transactions that are likely to be processed under each of the AMs.

The ReliAA/ReliAM processes are logically last, as the other more highly qualified processes will be identified first by their relatively mare unique TES and restrictive qualifications. Enabled processes are predefined. As such, they will normally be evaluated first to avoid confusion of their TESs with those of the non-EPS enabled processes.

DETAILED DESCRIPTION OF THE PREFERRED EMBODIMENT

Major Assumptions

Figure 18:
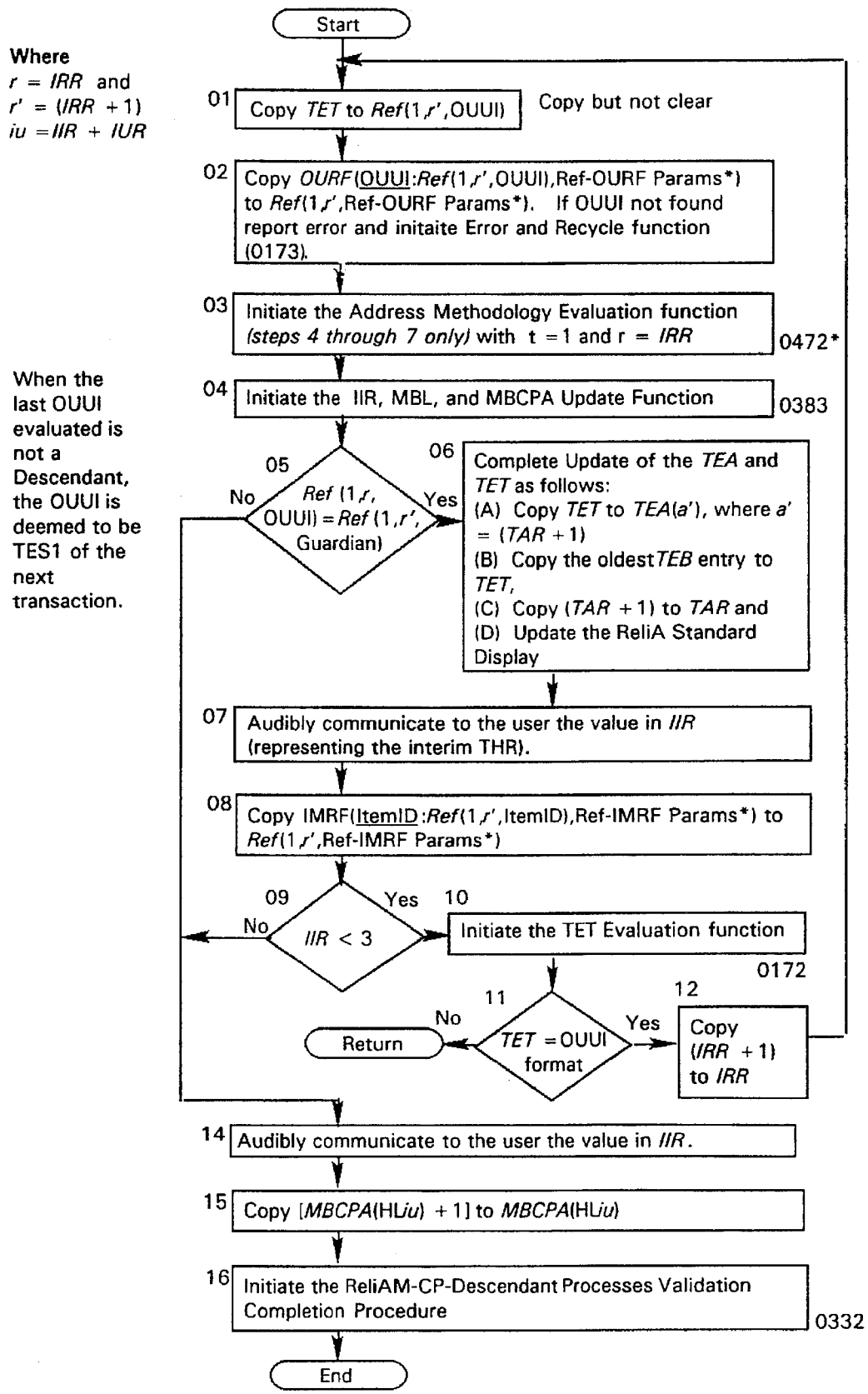

The major assumptions made for the preferred embodiment are the subject order convention in the TES, the Transition HL, the maximum GrDHR, and the MHR. SFC is adopted. The SFC in the integrated, alternative sub-processes is more complex than the SLC, because with the SFC the sub-processes loses the use of their own subject OU as the TES Closure Entry. The Transition HL is established as UBL4. The maximum GrDHR and the MHR are both established as 3. An OUUI has more than 4 characters. An HRPN has less than three character. An HEDC has 4 characters.

The preferred embodiment of the ReliA process is described as a procedure initiated by an OMA. The validation procedure for each primary sub-process of the ReliA process also provides for a temporary return to the OMA after the TES required by the sub-process for each transaction is validated so additional parameters required by the OMA SBFT can be collected by the OMA. Certain restrictions are imposed on the format of the additional parameters that can be collected, as described below. The preferred embodiment uses Normalized location addresses and normalized Item parameters.

TD is forward for all HLs of a Matriarchy. An integrated sub-process for establishing transaction as Forward or Backward is shown in the ReliAQ Evaluation procedure (1300). TDs for multiple GBLs and MBLs can be established and controlled as described for the EPPN. Once the TD is established for the HLs of the Matriarchy, the inequality used in each evaluation that compares HRPNs then becomes a function of the TD for the HL being evaluated. Referation as to preceding or subsequent at each HL is then based on the TD for the HL. The EATP and EASP are established as the EPPN and BPPN respectively. They can also be established and controlled for multiple hierarchies in a MSL as shown for the EPPN. TD, EATP, and EASP can be established by Fixed Commands relative to an EPS or particular Ancestors within a Matriarchy. Parent Advancement with the Backward TD is from the EATP relative to the BPPN and from the EASP relative to the EPPN.

Organization of Presentation

The procedures and key supporting functions that support the ReliA process and its subprocesses are illustrated by flowcharts and described. These are grouped as follows:

| | |
|---|---|
| 0100 | The ReliA General Evaluation procedure (GE procedure) and general and user support functions |
| 0200 | The Universe validation procedure |
| 0300 | The ReliAM evaluation and validation procedures |
| 0400 | Validation Control functions |
| 0500 | The Unreferenced Tracked Matriarch-Descendant Ancestor Identification function (URTA ID function) |
| 0600 | End of Parent Determination function (EPD function) |
| 0700 | Enabling Processes Completion procedures |
| 0800 | Transaction Update and Close procedures (procedures) |
| 1000 | The ReliA-EH evaluation and validation procedures |
| 1300 | The ReliAQ evaluation and validation procedures, and the |
| Appendix A | Data Dictionary |

Functions that are specific to a particular group of procedures are included with the procedures they directly support. All procedures and functions have four digit numbers. Many are described by a flowchart. Certain functions are described in narrative form only. These functions have an asterisk after the four digit number. Within each procedure/function, the individual steps are further labeled with a two digit number. Within the related process/function descriptions these steps are referenced by the two digit number. When, however, a reference is made to a step in a process or function that is outside the related process/function, the four digit number for the procedure/function is used with a hyphen and the two digit step number.

The Data Dictionary describes the structure of the files/tables and arrays and their data elements and other memory variables (MVs) used in the description of the preferred embodiment.

Conventions Used and Assumptions Made in Flowcharts

In the flowcharts and the material that follow, the names and abbreviations of tables or files are italicized. Addresses are formatted as follows: The names of tiers, rows, and fields of a file are shown in parenthesis after the file name. When applicable, the name of the field for a table or file that serves as the applicable key to the record/row being referenced by the address is shown within the parenthesis before the row and field names for the address. The key will be underlined and followed by a colon.

In some cases a single letter is used on the flowchart to represent a register so as to preserve room in the flowchart icons. These are presented on the flowchart. A single apostrophe (') after a register name or an abbreviation indicates the current register value increased by the value of one is used rather than the register value itself. A double apostrophe ('') after the register name or abbreviation indicates that the register value is similarly decreased by the value of one. In the indicators, true is indicated by 1, and false is indicated by 0 or null A "start or stop" icon with Return means return processing to the indicating procedure or function, while End means the end of the procedure or function (processing has initiated another procedure or function).

General User Support Processes and Requirements

The ReliA Standard Display

The ReliA process requires for most sub-processes only a single transaction entry display for trained users. A transaction entry display is not essential, but certainly helpful to the user, to confirm the entries recorded and the address computed as well as help the user to relocate the SLT and current subject OU if the transaction processing is interrupted. The transaction entry display also helps the user to keep track of key OUs that support disabling of the EPS and reversal transactions. The location address should be displayed in a consistent manner that allows the user to readily determine the address of any OU consistent with the AM of the subject OU and its tracked Ancestors, if any. The display must also provide for the consistent display of the program messages.

Subsets of these methodologies and processes can be used to establish a more structured process that can be supported with a more structured data entry screen. User interfaces for such structured processes are well established in the art and are not further addressed in this document. The user display for ReliA transaction processing should comprise (1) TES Display, (2) Subject and tracked Ancestor OU Descriptors and their unique location address, (3) DRbs, and (4) message display area.

The TES should always be displayed to the user during the recording of transactions to allow the user to review the entries already entered. The TES display should be the data in the TEA. The TEA display is termed the TES display for simplicity of understanding.

A description and a location address for the subject OU of each transaction and some of its lower level tracked Ancestors, including the Origin OU, need to be displayed to facilitate the user's identification of the subject OU for the transaction and allow the user to verify its location address as computed by the ReliA process. Retaining the display of this information after each transaction is complete, moreover, helps the user to readily identify the SLT if the user's transaction processing is interrupted. The OU Descriptors include UUI, Item ID, and Item Descriptions. Prominent display of the subject OU Descriptors and their unique location addresses relative to their Ancestor OUs or entities is important even if the display of the tracked Ancestor OU Descriptors or their unique location addresses relative to their Ancestor OUs is not possible. This information for tracked Ancestors can be presented on a secondary screen.

The preferred embodiment described supports the consistent display of the following for the Subject and tracked Ancestor OU Descriptors and their unique location addresses to support OUs with OL, CNP, or CP addressing methodologies. The data elements potentially displayed by the preferred embodiment are as follows:

1) The Origin OU, and its OU Descriptors and UBOLA comprising UBL1-HEDC, UBL2-HEDC, UBL3-HEDC, and UBL4-HEDCS;
2) Matriarch OU Descriptors;
3) 1st MDA, if any referencing the Matriarch, OU Descriptors and the MDA's GBCPA comprising GBL1-HRPN and GBL2-HRPN as long as the MHR is two or less;
4) 2nd MDA, if any referencing the 1st MDA, OU Descriptors and the MDA's GBCPA comprising GBL1-HRPN and GBL2-HRPN as long as the MHR is two or less;
5) Subject OUs Descriptors and its GBCPA comprising GBL1-HRPN, GBL2-HRPN, and GBL3-HRPN as long as the MHR is three or less;

The MBCPA of the Subject OU will be represented in the successive HRPNs included in items (3), (4), and (5) listed here.

The OU Descriptors and location address of the DRbs need to be displayed to assist the user in reidentifying these OUs when wanting to disable an EPS. The DRbs that are used depend on the AM and sub-process employed. The potential DRbs used in the preferred embodiment are the SET and a Homogen referent used with the SET in the enabling process transaction, as well as the Matriarch already disabled. The preferred embodiment supports the display of the following DRbs: (1) Subject of the Enabling Transaction (SET) OU Descriptors and its UBOLA or MBCPA; (2) Relational reference of the Enabling EPS Transaction OU Descriptors and its MBCPA if applicable.

All messages should be displayed on a message display area until a new transaction is started or the error is resolved. The display of messages is controlled by the process. The message display area should provide adequate room to display most error and advise messages without scrolling.

The ReliA Standard Display comprises a primary display and secondary screen(s) that the user can toggle into and out of for tracked Ancestor OU Descriptors and their unique location address that cannot be displayed on the primary display screen. The primary and any secondary screens will be referred to as the ReliA Standard Display.

Secondary ReliA sub-processes: Correcting Entries and Transactions, and Exiting from ReliA Processes Eliminating extraneous entries, aborting or reversing transactions, and disabling EPS enabled sub-processes are recurring functions in all ReliA processes. Said functions can be performed by menus or menu and screen functions that are well established in the art. The ReliA processes support these user support functions with TES signaling by which the user can reference certain related OUUIs to indicate the intended change in the normal ReliA sub-processes.

Entry of a Fixed Command, Command X, exits ReliA Processing and clears all MVs

The ReliA Integrated Evaluation process supports the entry of the UUI of a Disabling Referable (DRb) as a user TES signal or entry through a Fixed Command in accordance with prior art. The DRbs used in the preferred embodiment include (1) the Matriarch of the EPS, and (2) the SET and the Homogen referent, if any, employed in the enabling EPS transaction. The specific DRbs that can be used depend on the AM used by the primary sub-process as well as the specific sub-process used in some cases.

When the same OUUI is entered in two or more successive TES entries, the duplicate OUUI(s) is (are) eliminated. Successive OUUI elimination is controlled by the Transaction Entry Test (TET) Evaluation function (0172).

The ReliA Integrated Evaluation process and the ReliA sub-processes support user TES signaling to abort or reverse transactions. A Transaction Abort is a user initiated killing of the transaction in process—before completion of the TES. A Transaction Reversal is a user initiated killing of a completed translation. The primary sub-processes recognize an out-of-sequence entry of the subject OUUI of the current transaction or the SLT as a signal to abort or reverse the recorded transaction.

Recording, after completing a transaction but before a new transaction starts, the UUI of the subject OU of the SLT, reverses the just completed transaction. This is true except for the ReliA-EHR-CP process where recording the subject OU of the transaction would be interpreted as a successive OUUI entry and be eliminated. A ReliA-EHA-CP process transaction can also be reversed by a user Fixed Command. User TES signaling in the ReliA-EHA-CP process is accomplished only by disabling the EPS first. To use TES signaling for the Transaction Reversal process the user must (1) disable the process and (2) reference the OUUI of the just completed transaction to reverse that transaction. The EPS must then be reinstated. The Transaction Reversal process is controlled by the ReliA General Evaluation procedure (0100 also termed GE procedure).

Recording the OUUI of the subject OU of a current transaction or the second previous TES entry aborts the current transaction in the preferred embodiment. Recording the subject OU works, however, only as long as at least one TES entry has been recorded between the recording of the subject OUUI, as part of the regular TES, and the recording of a Transaction Abort Referable. Thus, the subject OU will not work as a Transaction Abortion Referable with any ReliA process in the preferred embodiment in which the TES is only one or two entries, such as ReliAM-OL, ReliAM-CNP, ReliAQ, ReliA-EHA-OL, ReliA-EHA-CNP, ReliA-EHA-CP, and ReliA-EHR-CP-pC-Aligned processes. It works with the ReliAM-CP, ReliA-EHR-CP-SLT-Skip, and ReliA-EHR-CP-pC-Skip processes.

Alternatively, before entering the last entry of the TES, the Matriarch can be used in the preferred embodiment as a Transaction Abort Referable. Once a transaction is completed, referencing the Matriarch or the SET disables the EPS. The Transaction Abortion process is controlled by the TET Evaluation function (0172). The Transaction Abortion process will not work, therefore, for the ReliA-EHA process requiting only a single entry for the TES of these processes.

General Transaction Processing Steps

The ReliA process determines the process being used by the user for each transaction, identifies the subject OU and establishes an address for it, in general as follows:

1) Initialization: Initialization refreshes the display of the ReliA standard display if ReliA MVs are already defined from a previous initialization; otherwise, initialization defines MVs and opens necessary files.

2) Indicated Process Evaluation: The ReliA Integrated Evaluation process is used to determine and initiate the indicated process.

3) Transaction Validation: The transaction is validated by the indicated process and the address of the current transaction computed.

3) Enabled Process Session Memory Variables (EPS-MVs) Set Up or Update: If the transaction employs an EPS enabling process (the location address has been established as a determinant for a subsequent transaction), the EPS is turned on for the addressing methodology of the SET. If the transaction is a CP process, the EPS-MVS will consist primarily of a MatiA CPA. Additionally, when the MR, methodology is employed MDAs, if any, for the MSL of the current transaction will be established. If the transaction is not a CP process, the EPS-MVS will consist primarily of a Matriarch/Guardian referent or a UBOLA. If the current transaction is an EPS enabled process and a CP process and the transaction results in a change in the MDAs of the MSL of the SLT, the MDAs in the EPS-MVS will be updated.

5) Transaction Completion, Update and Close: Supports display and user initiated abortion of the last completed transaction. It also returns processing to the General Process Evaluation procedure so the process can start over for a new transaction.

General Requirements

The TES of a particular sub-process is a primary determinant of the sub-process being employed by the user for a particular transaction. OUUI and the HEDCs used for UBL1 and the HRPNs used for GBL1 and MBL1 must be distinguishable by the ReliA process. The preferred embodiment distinguishes these based on the length of field.

Recognizing the End and Closing the TES for a Transaction

There is no need for an overt indication by the user of the end of the TES entries for most ReliA sub-processes. The beginning of the TES for one transaction just follows the end of the TES of the last recorded transaction. While a SBFTT may require additional parameters that can be used as TES Closure Entries only external to the transaction automatic in the preferred embodiment are an OUUI entry for TES1 of the next transaction recorded, including entry of the OUUI of the DRb. When an automatic TES Closure Entry is not provided the TES Closure must be closed manually by a Fixed Command recorded by the user. This Fixed Command is designated as Command C in the flowcharts. If there is no TES Closure Entry of any kind validation of a current transaction be suspended until a TES Closure Entry is recorded.

Key data integrity requirements for the sub-processes included in the ReliA Integrated Process are as follows.

The following are required for all Item Master Records: (1) IMRs with LRTCHL>0 and MGCAI=false require that LRTCHL and LATCHL of the be equal; (2) IMRs with LRTCHL>0 require DHRn be a positive value for all values of n equal to or less than the LATCHL and that DHRn be null or zero for all values of n greater than the LATCHL.

The following are required for all OURs: (1) OURs are uniquely identified by the UUI/OUUI; (2) OURs without a Guardian referent, a null Guardian, require and allow one associated OLAR in the OLARF; (3) OURs with a Guardian referent have a Guardian Item with a CAI=true; (4) OURs with a Guardian referent have a Guardian Item with LRTCHL>0 require a value at HL1, with a valid HRPN format for GBL1 and that the number of successive values in HL2 and HL3 be equal to or greater than LRTCHL, equal to or less than LATCHL, and have a valid HRPN format for the HL. HLn: (5) OURs with a Guardian referent have a Guardian Item with LRTCHL>0 require the HRPN at HLn t be equal to or less than EHLn-EPPN of its Guardian Item, where n represents HL1 through HLz of the GBCPA of the OUR; and (6) ReliA CPAs have Relational Incongruity (caused by user mistakes or other forces) with all other ReliA CPA on the OURF.

Initialization of the ReliA General Evaluation Procedure

An initialization procedure must set up all MVs if not already open, set up the ReliA Standard Display, and initiate the GE procedure (0100). When the GE procedure (0100) is exited the MVs can be cleared.

0100—ReliA General Evaluation Procedure and the General and User Support Functions The issues relating to General User Support Functions comprising Exiting Transaction Processing, Disabling an Enabled Process Session, Successive OUUI Elimination, and Aborting and Reversing a Transaction were covered above under the subtitle, Correcting Entries, Transactions, and Exiting from ReliA Processes 0100—ReliA General Evaluation Procedure (GE Procedure)

The objective of the GE procedure (0100) is to identify the specific ReliA sub-process used by the user for a particular transaction or at least narrow the process being used down to a group of similar ReliA sub-processes. When a specific sub-process is not identified the called procedures from the GE procedure complete the specific ReliA sub-process identification as part of the ReliA Integrated Evaluation process. The GE procedure also identifies most of the ReliA secondary sub-processes by analyzing TES1 to qualify the start of a new transaction. After evaluation of TES1 the GE procedure (0100) serves primarily to distinguish between the non-EPS enabled processes.

After the TES1 evaluation and EPS enabled status evaluation GE procedure (0100) evaluates the most easily recognized sub-processes, then the ReliAQ process and finally the ReliAM processes. Within the sub-process groups, the OLam is evaluated first, then the CNPam, and finally the CPam.

Detailed Description

Qualify the start of a new transaction—Steps 01 through 17 as shown in FIG. 8–10: The qualification comprises (1) no recorded Fixed Command to exit ReliA; and (2) an entry recorded with an OUUI format. If no entry is recorded, the procedure effectively waits for an entry. If an invalid entry is recorded, the procedure reports the error, clears the entry and displays the options to the user and recycles to the beginning of the GE procedure (0100). If the OUUI of the SLT has been entered in TET or a Fixed Command has been recorded to effect reversal of the SLT the PV-TSMV's are cleared. If, however, PV-TEI is true the preserved EPS-MVS must be copied to the primary EPS-MVs [see EPS Preserve and Clear function (0772*] to reestablish the EPS-MV that were applicable to the last previous transaction, the last transaction recorded previous to the transaction reversed. To support subsequent referation by CPam processes the UUI and MBCPA, if applicable, of the subject of the last previous transaction is copied to the PV-TSMVS to support subsequent referation. If a Fixed Command is recorded to exit ReliA (Command X) all EPS indicators are cleared, and PV-TZI must be set to true if the PV-TSMVS are not cleared.

Steps 18 through 19 initialize a new transaction: 18 clears all G-TSMVs. 19 copies the OUUI entry in TET to the TEA(0) and initiates the update of the display of the TEA. 19 initializes the TAR to 0 to correspond to the array cell in which 19 copied TET.

Evaluate the EPS Indicators for Enabled Processing: Steps 20 through 25 evaluate the EPSI Indicators for the three addressing methodologies and direct processing to the related process or evaluation process. 20 evaluates EPSI-CNP, and initiates the ReliA-EHA-CNP Validation procedure (0320). 22 evaluate EPSI-CP and initiate the ReliA-EH-CP Processes Validation procedure (1030) if it is true. 24 evaluates EPSI-OL and initiates the ReliA-EHA-OL Validation procedure (1010). (Steps 27 to 32 not used)

Evaluate the format of TES2 as an UBL1-HEDC or other non-OUUI format as a basis for indicating the Universe-OL-Manual: 33 evaluates the TES2 entry recorded in the TET, as an OUUI format, as in 13. If the TES2 entry does not have an OUUI format, 33 directs processing to 34 to evaluate the entry as a UBL1-HEDC format. If the entry has a UBL1-HEDC format, the Universe-OL-Manual process is indicated and 34 initiates the Universe-OL-Manual Validation procedure (0200). If the entry does not have a UBL1-HEDC format, an error in TES2 is indicated. When the TES2 has an OUUI format 33 directs processing to 37. 37 concludes the individual evaluation of TES2. It updates TES2 in the TEA. from TET, increments the TAR, updates TET from TEB, and updates the display of the TEA.

Set up the OURF and related IMRF Parameters for TES1 and TES2 as a basis for evaluation of the subsequent processes: 38 through 41 serve as a set-up for evaluations of TES1 and TES2 for the ReliAQ and ReliAA/ReliAM process Evaluation procedures. 38 copies TES1 to the OUUI field of tier 0, row 0 of the Reference Array (Reference or Ref, a three dimensional array maintaining OURF and IMRF parameters on the Subject OU, the Matriarch, and MDAs for both the current transaction and the EPS) Ref[Ref(0,0,OUUI)] and copies TES2 to the same field and row in tier 1 of Ref. 39 initializes both TTR and TRR. 40 initiates the Reference Row 0 OURF and IMRF Update function (0173*) to record the OURF and IMRF parameters for OUUI recorded in tier t, where t equals TTR. 41 evaluates TTR. If the TTR is 0, 41 directs processing to 42 to reinitialize TTR to 1, and returns processing to 40. If TTR is not equal to 0, 41 directs processing to 43.

Evaluate the Homogen and Lineage Relationship of TES1 and TES2 as a basis for indicating the various ReliAQ processes: 43 initiates the ReliAQ Processes Evaluation procedure (1300) to evaluate for any of the ReliAQ processes. If the ReliAQ Processes Evaluation procedure (1300) does not find that a ReliAQ process is indicated, it returns processing to the GE procedure (0100). The GE procedure (0100), 44, then directs processing to the ReliAA/ReliAM Processes Evaluation procedure (0300), 44 to evaluate for any of the ReliAA/ReliAM processes.

General and User Support Functions

The General and User Support functions represent functions that directly support the ReliA General Evaluation procedure (0100) or comprise general user support processes.

0171*—Error and Recycle Function (E & R Function)

The objective of this function (0171*) is to provide a consistent user interface for reporting of errors identified by the process evaluation or validation procedures. This function (0171*) clears TEB and TET, copies true to TXI to control certain steps in the GE procedure (0100), and returns processing to the GE procedure (0100).

0172—TET Evaluation Function

The objective of this function (0172) as shown in FIG. 11 is to evaluate the next TES entry recorded in TET for Transaction Abort Signals and other general TES entry requirements as part of the evaluation of the TES. The function tests each successive TES entry for user initiated Transaction Abort Referables or a Fixed Command to abort the current transaction. The function also eliminates automatically any successive, duplicate OUUI entries. This function is generally initiated for every successive TES entry for an OUUI after the first TES entry. When an entry has not been recorded the function provides a consistent user interface for user options.

Step 01 initiates the Null TET Evaluation function (0181*) to diagnose recorded user Fixed Command function responses to abort the transaction. 02 evaluates the format of the entry in TET. This step can be used with this function only when called by validation procedures where a HRPN is not used in the TES of the process. 05 compares the TET entry to the last entry recorded in the TEA. The TET must then be updated from the TEB.

Step 07 compares the TET entry to the Matriarch OUUI. It is needed to identify in the ReliA EPS enabled processes the presence of one of the Transaction Abort Signals if recorded by the user. This step cannot be used when the function is initiated by a non-EPS enabled process because the Matriarch is not fully established by the ReliA enabling processes until the TES is complete. If the TET entry is equivalent to the EPS Matriarch OUUI, 07 directs processing to 08 to initiate the User Initiated Transaction Abort function (0182*) which confirms the Transaction Abortion process and provides instructions to the user. If the TET entry is not equivalent to the EPS Matriarch OUUI, 07 directs processing to 09.

Steps 09 and 10 control the universal ReliA Transaction Abort Signal. When the TAR is greater than one (i.e., two entries or more have been recorded in the TEA), 10 compares the TET entry to the second to the last TEA entry recorded. If TET and the second to the last TEA entry are equivalent, 10 directs processing to the User Initiated Transaction Abort function (0182*). When the tests of 59 or 10 fail, they direct processing to return to the initiating program.

0173*—Reference Row 0 OURF and IMRF Update Function

The objective of this function (0173*) is to validate the OUUI and Item ID of the subject or reference OU recorded in Ref Row 0 and establish in the same row the Reference-OURF Parameters (Ref-OURF Params*), where the * indicates a set of fields or columns as defined in the Data Dictionary) and the Ref-IMRF Parameters (Ref-IMRF Params*). This serves as a basis for continuation of the GE procedure (0100). The function copies the Reference-OURF Parameters from the OURF to Ref for row 0 in the designated tier, and then copies the Ref-IMRF Parameters from the IMRF to Ref, for row 0 in the designated tier.

0181*—Null TET Evaluation Function

The objective of this function (0181*) is to diagnose recorded user command function responses that may abort the transaction, initiate the User Initiated Transaction Abort function (0182*) if so indicated (Command A has been recorded), and provide a consistent user interface for advising the user of the process options when TET is null.

0182*—User initiated Transaction Abort Function

The objective of this function (0182*) is to confirm to the user the abortion of the transaction and provide instruction to the user on the user options available. The function clears TEB and TET, copies true to TXI to control certain steps in the GE procedure (0100), and returns processing to the GE procedure (0100).

02oo—Universe-OL-Manual Validation Procedure

The Universe-OL-Manual Validation procedure as shown in FIG. 12 supports the Universe-OL-Manual process, a ReliA primary sub-process. It is a manual process that serves to establish a UBOLA. The Universe-OL-Manual process and its validation procedure is presented here as an aid to integrating the prior art with the ReliA process. The Universe-OL-Manual process is the only method of establishing a UBOLA for Origin OUs where Sister OUs have not already been established at the UBOLA. It must therefore be employed for the first OU recorded at any one UBOLA. Because the Universe-OL-Manual process, however, represents prior art, the Universe-OL-Manual Validation procedure is only partially described here.

03oo—ReliAA/ReliAM Processes Evaluation and Validation Procedures

The ReliAA/ReliAM processes as shown in FIG. 13 are fundamental processes for the recording of a Guardian referent location address or a ReliA CPA with a Guardian referent and GBCPA for a Component OU. They are EPS enabling processes. They are also the default enabling sub-processes within the ReliA Integrated Evaluation process, as such they give the user virtually complete control to record the address of a subject OU. The ReliAM processes, supporting the CPam are differentiated from the more basic ReliAA-CP processes, by incorporation of the MR methodology. The ReliAA-CP, ReliAA-CP-Manual and ReliAA-CP-Homogen processes are instantiated in the preferred embodiment as the ReliAM-CP-Descendant processes. The ReliAA-CNP process requires a Matriarch that is limited to its Guardian referent and, therefore, retains the name of the more basic process, ReliAA. The ReliAA-CNP process requires that the user record the subject OU's UUI, in TES1, and then the OUUI of the subject OU's Guardian in TES2 as the location address for the subject Component OU.

The ReliAM-CP processes requires that the user record the subject OU's UUI, in TES1, the OUUI of the subject OU's Matriarch (within three generations of the subject OU) in TES2 as a relational reference for the subject, Component OU, and then establishes the MBCPA of the subject OU. Several alternative processes are provided to establish the MBCPA. Where referencing MDAs are included in the MSL, the OUUI of the first referencing MDA can be recorded in the TES3, and an OUUI of the referencing MDA, if any of the first can be recorded in TES4. Whether or not an MDA is included in the MSL the HRPNs of the HCPA of the subject relative to the lowest tracked Ancestor recorded in the TES is recorded next in the TES. If no MDAs were recorded the first HRPN would be recorded in TES3. If lowest tracked Ancestor in the MSL has been recorded the user can record the OUUI of the preceding Sister of the subject OU as the next TES entry rather than record the HCPA of the subject OU. Thus, if no MDAs exist in the MSL, so no MDA were referenced in the TES, the Sister reference would be recorded in TES3. The user would record the OUUI of the preceding Sister in TES4 if only one MDA existed and was recorded in TES3.

0300—ReliAA/ReliAM Processes Evaluation Procedure

This evaluation procedure is part of the ReliA Integrated Evaluation process. The ReliAA/ReliAM Processes are enabling, default processes for Component OUs. Note that the ReliAQ process will interpret a ReliAM process as a ReliAQ process under some circumstances. This is when the Ancestor referent recorded is already a tracked Ancestor of record for the subject OU. This occurs, because the ReliAQ Evaluation process identifies existing Lineage, as well as Homogen relationships, between the subject OU and the relational reference recorded for the current transaction. When an existing Subject-Ancestor relationship is identified that would otherwise indicate a ReliAQ-CP process, but the TES has an HRPN following the relational reference, the ReliAM-CP process is indicated by the ReliAQ-CP evaluation procedure to allow the user to record a new position within the Ancestor of record for the Subject OU.

The this procedure (0300) requires, for both the CP and CNP addressing methodologies, the Component Allowed Indicator (CAI) of the Matriarch to have a true condition so an OU cannot be recorded as a Component when net allowed based on the IMR, for the Matriarch. 01 evaluates this condition. When the condition is not met an error exists. 52 and 03 report the error to the user and initiate the E & R function (0171*) to abort the transaction and recycle the processing. The CP process requires a Component Positioning Required Indicator (CPRI) consisting of LRTCHL>0 for the Matriarch referent. This serves as a basis for ensuring consistent maintenance of the CPam and thereby to support the reliable use of the ReliA CP processes with descendants of the Matriarch referent Conversely, the Non-Positioning processes requires a CPRI consisting of LRTCHL=0.04 evaluates this condition. If LRTCHL>0, 04 directs processing to 05 to initiate the ReliAM-CP-Descendant Processes Validation Initiation procedure (0331). Otherwise, the ReliAA-CNP process is indicated, and 04 directs processing to 06 to initiate the ReliAA-CNP Validation procedure (0320).

0320—ReliAA-CNP Validation Procedure

This procedure as shown in FIG. 14 supports the final validation of the ReliAA-CNP process when indicated and initiated by the ReliAA/ReliAM Processes Evaluation procedure (0300).

The OURF and IMRF related parameters of the Subject, Matriarch, and certain Homogen referents are stored by the procedures of the preferred embodiment in an array termed Reference (also termed Ref). Ref has several tiers, rows, and columns/fields for individual parameters. The use of these rows, while simple in the case of the ReliAA-CNP process, is more complex in the other processes. Based on processing already completed in the GE procedure (0100), Ref(0,0, OUUI) stores TES1, the subject OU's UUI, and Ref(1,0, OUUI) stores TES2, the Guardian referent's OUUI. The OURF and IMRF related parameters have been established for both the subject and Matriarch in the associated columns of Ref. This completes validation of the process except for parameters required by the OMA. The remaining processing enables EPS-CNP, records the subject OUUI in the PHSOU stack, and records the transaction in the OURF and transaction history file of the OMA.

Step 01 sets up the required G-TSMV registers, TTR, and TGR. (Step 02 not used)

03 and 04 initiate the OMA Call function (9902*) to allow the OMA to collect additional transaction parameters required and return processing back to ReliA. The remaining steps set up the EPS and close the transaction. 05 initiates the EPS Preserve and Clear function (0774*) to preserve and clear any existing Guardian OU parameters recorded in tier 2 of Ref.

The remaining steps set up the EPS and close the transaction. 06 copies the row in Ref for the Guardian from tier 1 to tier 2 to establish the Guardian referent recorded in the current transaction as the Guardian referent to be recorded for any subsequent transactions under the EPS enabled by this process. 07 initiates the CNP Enabling Processes Completion procedure (0720). This function performs the enabling process steps common with ReliAQ-CNP for the CNP enabling processes. The Completion procedure (0720) also initiates the CNP TU & C procedure (0820) to complete the process steps for all CNP processes common to both the enabling and EPS enabled process.

0330—ReliAM-CP Processes Support Procedures

The ReliAM-CP Descendant Processes Validation Initiation procedure (0331) serves to initiate the evaluation and validation of three ReliAM-CP processes. (1) The ReliAM-CP-Manual process, (2) The ReliAM-CP-DM process, and (3) The ReliAM-CP-DH process.

The ReliAM-CP processes collectively allow the user to record a CP address with a maximum of flexibility to respond to the relations available or record the position manually when there are none. The processes allow successive MDA references to progressively define the HieraRelational Position of the subject at each successively lower HL. They also allow the user at any point to define the remaining HieraRelational Position manually to establish the lowest level HieraRelational Positions of the subject. Finally, as long as successive MDA references have been recorded, these processes allow the user to record a Sister referent to establish the lowest level HieraRelational Position of the subject OU.

This procedure evaluates TES3, TES-FPDE with the SFC, as an OUUI or a valid MBL1-HRPN to determine a referencing Descendant of the last referenced OU or an HCPA that represents the position of the last Ancestor referenced and the concluding elements of the TES. If TES3 is an OUUI, a ReliAM-CP-Descendant process is indicated. If TES3 is a valid MBL1-HRPN, the ReliAM-CP-DM process is indicated.

When a ReliAM-CP-Descendant process is indicated the successive TES entries are similarly evaluated as an OUUI or a valid MBL1 -HRPN of a HCPA. When the cumulative GrDHR total of the tracked referencing Descendants equals the maximum HR, the last OUUI entry is interpreted as a Homogen referent. A successive OUUI entry that is not a referencing Descendant is interpreted as TES1 of the next transaction. In this case, the last referencing Descendant is interpreted as a Homogen referent. A concluding Homogen referent in either case indicates the ReliAM-CP-DH process. If any of the successive TES entries are evaluated as a valid HRPN, the ReliAM-CP-DM process is indicated.

When an MDA is provided by the ReliAM-CP-Descendant process, the HRPNs of the HCPA of the MDA are added to the next available fields for HRPNs in the MBCPA. When an HRPN is added manually, it is added to the MBCPA in the same manner. Validated HRPNs of the HCPA of the Sister are added in the same manner to the MBCPA and the appropriate HL and incrementation value are used to adjust the MBCPA constructed.

When a MBCPA is established by manual entry of any part of the HCPA entry of HRPNs and the MHR is greater than 1, the HRPN(s) included in the MBCPA can represent the position of a tracked MDA. Because the GTDHR of the subject OU may be only 1, intermediate unreferenced MDAs (URTAs) may exist in the MSL established by the MBCPA. If, in the ReliAM-CP-Descendant process, one URTA exists it will be the Guardian of the subject OU. It must be identified to establish the ReliA CPA for the subject OU. Moreover, the End of Parent Determination function (0671) depends on all MDAs in an MSL having been identified. As the OUUI of any URTA is unknown until the existence and identity of any URTA is established, the identity of any MDAs is established from the MDAs. To exclude all tracked Ancestors of the position described by the MatiA CPA that are not in the MSL, the lineage is most simply constructed "top down" to identify any intermediate tracked Ancestors.

Once the MDAs of the subject OU, if any, are identified, the lowest tracked Ancestor OU is established as the subject's Guardian OU. The HRPNs of the lower MBLs or even all MBLs of the MBCPA, based on the MBL of the indicated Guardian, are then used to compute the GBCPA for the Guardian OU. The relational address, established by the Guardian OU and the GBCPA computed in this manner together, establishes the ReliA CPA for the subject OU.

The OURF and IMRF related parameters have also been established for both the subject and Matriarch by the processing already completed in the GE procedure (0100). These parameters for TES1, the subject OU, and TES2, the Matriarch referent, are stored in the first row of the first and second tiers respectively of Ref. Based on the ReliAM process Evaluation, the CPam is required by the Matriarch.

The Primary Steps in the ReliAM-CP-Manual Process comprise:(1) Establish the MBCPA: establish MHR and validate the HRPNs in the MBCPA; (2) Identify and validate any URTAs of the subject and components of the Matriarch;(3) Ensure that CP is allowed for all MDAs; (4) Establish the EPPNs for each MBL of the Matriarch and verify that all HRPNs are less or equal to the associated EPPN for the MBL; (5) Test that the MBCPA entered is complete based on the cumulative minimum and maximum for the GBCPAs of each MDA; and (6) Temporarily return processing to the OMA so any additional parameters can be collected as established by the OMA; (7) Turn on EPSI-CP; (8) Convert the MBCPA to a GBCPA for the lowest identified Ancestor so the ReliA CPA is established for the subject OU; (9) Record the subject OUUI and MBCPA in the PHSOU stack for future reference under the ReliA-EHA-CNP process and record the transaction on the OURF and transaction history files of the OMA.

Matriarch Referent Methodology and MSL Records Maintenance in Reference

The ReliAM process fills Ref from the top down—the first record (row 0) of the tier holds the Matriarch referent and any URTAs follow in lineage order in the second through the third row of Reference. The subject's Ancestors are established in the second tier (tier 1) by the ReliAM process.

Because of the inconsistency in maintenance of Ref, the Tier, Matriarch, Guardian, and Bearing Registers are used to maintain the location of the Matriarch and Guardian records in Ref and the relationship of the of the Matriarch and Guardian records to each other within Ref.

Subject and Reference Row Relationships
in Reference for the ReliAM-CP Processes

| Row | Tier 0 | Tier 1 |
|---|---|---|
| 0 | Subject | Matriarch referent |
| 1 | null | 1st generation Descendent of Matriarch, if any |
| 2 | null | 2nd generation Descendent of Matriarch, if any |
| 3 | null | null |

The range of potential Ancestors tracked by the Ref Record Registers is highlighted. The Matriarch is reached if the OUUI of the record is equal to the OUUI of the adjacent record.

0331—ReliAM-CP-Descendant Processes Validation Initiation Procedure

This procedure as shown in FIG. 15 initiates the validation of ReliAM-CP processes. When a manually entered HCPA is recorded, the procedure initiates validation of the HRPNs it comprises. This initiation procedure (0331) in this case initiates and validates the HCPA, as well as the MDAs in the MSL, and establishes the MBCPA. If the validation of referenced MDAs indicates a ReliAM-CP-DH process, the Referenced Tracked Descendant function (0373), initiated by the procedure for the indicated ReliAM-CP-Descendant process MBCPA, validates the Sister and establishes the MBCPA. The ReliAM-CP-Descendant Processes Validation Completion procedure (0332) executes the remaining Ancestor-CP validation tasks common to all three ReliAM-CP processes.

Detailed Description of Procedure (0331)

Step 01 sets up the TTR, TMR, TBR, IRR and IIR. 02 establishes for the Matriarch the MBL of 0. The MBL of successive Ancestors is established by the URTA ID function (0570). 03 initiates the TET Evaluation function (0172) to ensure that an entry has been recorded in TET or evaluate a user abort command or signal. 04 evaluates TET to determine if the entry in TET has an OUUI format. If the entry in TET has an OUUI format, a ReliAM-CP-Descendant process is indicated and 04 directs processing to 05 to initiate the Referenced Tracked Descendant function (0373). Otherwise, a ReliAM-CP-DM process (without a referenced MDA) is indicated and 04 directs processing to 06. 06 initiates THR with IIR for the MHR Tally function (0371).

07 initiates the MHR Tally function (0371) to calculate the MHR and validate the HRPNs in the MBCPA. 08 updates the MBCPA with the HRPNS manually entered and recorded by the MHR Tally function (0371) in TEA. The range of cells copied from the TEA will begin with those cells of the TEA after the MDA references in TEA, if any, so the range is incremented by the number of MDAs recorded as tracked by IRR. The end of the range is based upon this and the difference in THR less IIR as established for MDA references. The 09 evaluates the THR established by the MHR Tally function (0371) and directs processing to 10 to initiate the URTA ID function (0570) when the THR is greater than 1. 11 initiates TGR with the value in IRR, representing the last MDA identified by the URTA ID function (0570) and therefore the lowest tracked Ancestor of the subject OU of the transaction. 12 tests IRR for a value greater than its initialized value to determine if tracked MDAs are in the MSL. If so, 12 directs processing to 13 to initiate the AM Evaluation function (0472*), so all MDAs in the MSL can be validated as having a CPRI, a value for LRTCHL>1. Otherwise 12 directs processing to 14, as does 13.

14 initiates the LRTCHL and LATCHL Evaluation function (0473*) to verify that the MBCPA recorded meets the cumulative minimum and maximum HR allowed for the Matriarch and MDAs collectively.

15 initiates the ReliAM-CP-Descendant Processes Validation Completion procedure (0332) to execute the remaining steps in the validation of a TES for a ReliAM-CP-DM process or ReliAM-CP-Manual processes, identified in 04, that are in common with the ReliAM-CP-DH process.

0332—ReliAM-CP-Descendant Processes Validation Completion Procedure

This procedure (0332) as shown in FIG. 16 executes the remaining steps in the validation of the ReliAM-CP processes that are common among all three ReliAM-CP processes.

The first two steps in the procedure relate to the End of Parent Determination function (0671) (EPD function) that establishes the EPPN in EPOUPN for each MBL greater than the MBL for the row established by IRR. 01 and 02 initiate the EPD function (0671) and initiates IRR as TMR for it. (Step 03 not used) 04 initiates the OMA Call function (9902*) to temporarily return processing back to the OMA. The transaction at this point is fully validated. 05 confirms validation.

The remaining steps set up the EPS and close the transaction. 06 initiates the EPS Preserve and Clear function (0774*) to preserve any existing lineage and EPS related parameters needed to reinstate the existing EPS if the current transaction is subsequently aborted. 07 initializes EPSI-CP, an indicator in memory, as true to indicate that EPS-CP is established. 08 sets up the EPS Registers. 09 copies the MDAs from tier 1 to the primary EPS tier in Ref, tier 2. 10 initiates the CP Enabling Processes Completion procedure (0730) that performs the enabling process steps common to the CP enabling processes.

0371—MHR Tally Function

The objective of this function (0371) as shown in FIG. 17 is to establish or complete establishment of the MHR of the transaction and validate any HRPNs entered manually to record or complete the MBCPA for the transaction. The MHR tally function successively loops to validate each successive HRPN recorded. Each validated HRPN increments THR. Thus the MHR is accumulated by the THR.

Closing the loop is accomplished automatically by entering a valid OUUI or other TES Closure Entry at the end of the TES. The following user steps and process conditions define the methods established in the preferred embodiment for closing the MBCPA: (1) Entering Command C as a Fixed Command after the increase in the THR by the function equals or exceeds the LRTCHL of the lowest level tracked Ancestor established in Reference; (2) Entering an OUUI or a TES Closure Entry after the MHR tracked (THR+1) equals 3; (3) Recording an entry that does not qualify as an OUUI format after the MHR tracked by (THR+1) equals 3 and electing to kill the entry; (4) Entering an OUUI or a TES Closure Entry after the MHR tracked by (THR +1) equals or exceeds the Matriarch's LRTCHL.

An MBCPA should not be closed if GrDHR for the lowest tracked Ancestor in the MSL is less than the LRTCHL of that Ancestor. It is effective only when the Matriarch OU is the Guardian OU.

THR tracks the number of loops of the primary loop. It is incremented after a HRPN is validated. The MBL of the HRPN being evaluated is represented by (THR+1).

(Step 01 not used) 02 begins the primary loop. It evaluates a Fixed Command entry (Command C) to close the MBCPA. If a command to close the MBCPA has been entered, 02 directs processing to 03 to clear any Null Advise and to 04 to evaluate the cumulative GrDHR established by this function. If THR minus IIR, the initiating value by the function for THR, is equal to or greater than LRTCHL, 04 directs processing to 05 to return processing to the initiating program. If THR minus IIR is less than LRTCHL, an error exists. 04 in this case directs processing to 06 to initiate the HRPN Error function (0381* [for TES HCPA Short]) to resolve the GBCPA. The HRPN Error function (0381*) returns processing to 02 where the error is resolved.

Step 07 tests for excess HRPN entries in the TES. When the THR is greater than 2 (an MHR of 3), 07 directs processing to 08 to evaluate TET to determine if an additional, potential HRPN has been entered in the TES. A potential HRPN is interpreted as an entry that qualifies as an HRPN or does not qualify as an OUUI format. If TET is a valid OUUI format or other TES Closure Entry, 08 directs processing to 05 to return to the initiating program and continue with the current transaction. If TET is not a valid OUUI format or other valid TES Closure Entry, the entry is assumed to be an excess HRPN entry, and 08 directs processing to 09 to initiate the HRPN Error function (0381* [TES Excess]) to resolve the error. If the error is resolved, HRPN Error function returns processing back to this function (0371) which returns processing to 05 and the initiating procedure. When the THR is less than or equal to 2, 07 directs processing to 10 to continue on the primary loop.

Step 10 evaluates the HRPN format for the MBL represented by (THR+1). Where differences in the format of the HRPNs of the HLs of GBCPAs or MBCPAs are to be maintained, this evaluation is made against a mask for the HRPN at each MBL of an MBCPA. The mask is maintained in a format file by field name. The format of the HRPNs of some MBLs may have to be more general than its GBCPA counterpart. The valid format for a particular MBL is discussed later in the description of this function an in the Data Dictionary. If the HRPN is valid for the MBL, processing continues on the primary loop.

If the HRPN is not a valid format for the MBL represented by (THR+1), 11 evaluates TET for being null. If TET is null, 11 directs processing to 12 to advise the used on continuing with the transaction (steps 13, 14, and 15 not used). 12 directs processing back to 02. If the TET is not null, 11 directs processing to 16 to further evaluate TET. If the entry in TET does not have a valid OUUI format or another other TES Closure Entry as established by the user for the OMA, 16 directs processing to 17 to initiate the HRPN Error function (0381* [TES Other]) to resolve the error. The HRPN Error function returns processing to 02 if the error is potentially resolved. If the entry in TET is a valid OUUI format or another other TES Closure Entry as established by the user for the OMA, 16 directs processing to 18 to evaluate the cumulative GrDHR established by the function used in 04. If(THR-IIR)is equal to or greater than LRTCHL, 18 directs processing to 05 to return processing to the initiating program. If (THR-IIR) is less than LRT-CHL, an error exists. In this case 18 directs processing to 19 to initiate the HRPN Error function (0381*[TES GBCPA Short]) to resolve the incomplete MBCPA entry. The HRPN Error function (0381*) returns processing to 02 when the error is potentially resolved.

If the HRPN is a valid format for the MBL represented by (THR+1), 10 directs processing to complete the primary loop. 20 clears any Null Advise. 21 increments THR. 22 updates TET and TEA and directs processing to 02 to continue the loop. In all cases, when the validation is completed, the Null Advise is cleared if open.

0373—Referenced Tracked Descendant Function

This function as shown in FIG. 18 evaluates and validates MDAs in support of the ReliAM-CP-Descendant processes. In this capacity, it also evaluates the two extensions of the ReliAM-CP-Descendant processes: the ReliAM-CP-DH process and the ReliAM-CP-DM process.

The function evaluates successive entries to the TES to determine if the entry is an OUUI that represents a referencing Descendant OU of the last recorded tracked Ancestor or if the entry is an HRPN entry. As long as each successive TES entry is an OUUI and represents a referencing Descendant OU of the preceding entry, the evaluation steps are repeated until the THR established by the successive TES entries is 3 or greater, or the next entry is not such a Descendant. In either event, the ReliAM-CP-DH process is indicated. If a TES is an HRPN, the ReliAM-CP-DM process is indicated.

Step 01 copies the value in TET to the OUUI field in the next row in tier 1 of Ref to be validated as a Component of the preceding entry in the TES of the transaction. 02 establishes the Reference-OURF Parameters for the OUUI in the same row of Ref. 03 initiates the AM Evaluation function (0472*) to verify that the referenced Descendant allows Components and requires the CPam. 04 initiates the IIR, MBL, and MBCPA Update function (0383) to compute for the referenced Descendant its GrDHR and its MBL in the MSL, and starts or continues the construction of the MBCPA of the subject OU by copying the successive HRPN(s) of the HCPA of the referenced OU to the appropriate HLs of MBCPA. 05 compares the Guardian OUUI of the referenced OU to the Matriarch or the previously referenced OU in the TES. If the OUUI of the Guardian and Matriarch are equal, the OU is a Component of the later. In this case, 05 directs processing to 06 to update TEA and proceed with evaluation of any successive MDAs. If the Guardian and OUUI are not equal, the ReliAM-CP-DM process is indicated. In this case 05 directs processing to 14 to communicate the cumulative HR for the Descendants recorded and to initiate the ReliAM-CP Descendant Processes Validation Completion procedure (0332). Otherwise 05 directs processing to 06 to complete update of the TEA and TET. 07 confirms to the user that the OUUIs are being recorded as Descendants. 08 copies the IMRF parameters from the IMRF to Ref. 09 evaluates IIR for being less than 3. If the IIR is less than 3, further MDAs or a Sister OU can be referenced in TES, so 09 directs processing to 10 and 11 to evaluate continuing the validation and evaluation by the Referenced Tracked Descendant function. If the IIR is not less than 3, it is 3 because the IIR, MBL and MBCPA Update function (0383) previously, in 04 evaluated the cumulative HR for exceeding 3. When the cumulative HR is 3, the process is defined to interpret the last referenced tracked Descendant as a Sister, and that the transaction is being executed with the ReliAM-CP-DH process. Therefore, if the IIR is not less than 3, 09 directs processing to 14 as well. 10 and 11 evaluate the next TES entry. 10 initiates the TET Evaluation function (0172) to suspend processing if TET is null and abort the transaction if this has been signaled by the user. 11 evaluates the format of the entry in TET. If the entry is an OUUI format, 11 directs processing to 12 to increment IRR and return processing back to 01. If the TES is not an OUUI, 11 directs processing to the initiating procedure, the ReliAM-CP-Descendant Processes Validation Initiation procedure (0331), to evaluate the TES entry as a HRPN which would indicate that the transaction is being executed with the ReliAM-CP-DM process. When a referenced OU is not a referencing Descendant of the lowest, last recorded, tracked Ancestor in Ref, or the cumulative HR is less than 3, the function indicates the ReliAM-CP-DM process is being employed for the transaction. In this case, 14 audibly signals to the user the cumulative HR established for the MSL. 15 increments by one the HRPN of the lowest HL in the MBCPA to adjust the position of the subject to that of the next Sister position of the referenced Sister OU. 16 initiates the ReliAM-CP-Descendant Processes Validation Completion procedure (0332) to execute the remaining validation tasks of the ReliAM-CP-DH process shared with the ReliAM-CP-DM process.

**0381*—HRPN Error Function**

Significant processing has been invested in the analysis of the transaction at this point in the ReliA process. The Error processing controlled by the HRPN Error function (0381*) is directed at allowing the transaction to be recovered with minimal interaction from the user.

The objective is to provide to the user a method to resolve the error and save the processing time required to completely reprocess the transaction. If this requires the entry of new or additional data, the entry must pass through the Transaction Entry Buffer(TEB) to get to TET. Thus the TEB, as well as TET need to be cleared. An audio signal, as well as visual signal, should inform the user, by a reasonable response time for the user, before the TEB is cleared so the user can suspend TES entry and avoid the creation of extraneous entries in the TEB which may not relate to correcting the entry error.

When a Fixed Command to clear an erroneous entry, or a potentially qualified TES entry or both, as required, is made, this function (0381*) should return processing to the initiating function. If the user elects to abort the transaction, the E & R function (0171*) is initiated.

0383—The IIR, MBL, and MBCPA Update Function

This function (0383) as shown in FIG. 19 serves two primary objectives: (1) compute the GrDHR of the Guardian for the current MDA reference, and validate and record as the MBL the cumulative HR of the Guardian with the reference, and (2) start or continue the construction of the MBCPA of the subject OU by copying the successive HRPN(s) of the HCPA of the current MDA reference to the appropriate HLs of MBCPA. The current MDA reference is the OU represented by the row in Ref established by IRR plus 1 and tier TRR.

Steps 01 through 05 compute the GrDHR of the referenced Ancestor OU. A bottom up approach is used and the HRPNs are evaluated from the lowest to highest HL of the HCPA of the referenced Ancestor until an HRPN is found. 01 initializes the IUR as 3, the maximum GrDHR allowed in the preferred embodiment. 02 compares IUR to zero to determine if IUR is less than the minimum reach for the CPam. If IUR is greater than zero, 02 directs processing to 05 to continue the computation. If IUR is zero, 02 directs processing to 53 and 04 to initiate the E & R function (0171*) to report the error, its nature, and user options. 05 evaluates the field for the HL designated by IUR in the HCPA of the current MDA reference as identified by the row in Ref designated by IRR plus 1. If the field is null, 05 advances processing to 06 to decrement the IUR by one and then return processing back to 02. If the field is not null, 05 advances processing to 07 to continue the processing. 07 compares the cumulative HR for the current MDA reference, relative to the Matriarch, to the maximum GrDHR for the preferred embodiment. The cumulative HR is defined here as IIR established by the steps of the process previous to the current function plus IUR just established. If the maximum GrDHR is exceeded, 07 directs processing to 58 and 09 to initiate the E & R function (0171*) and to report the error, its nature, and user options. If the maximum reach has not been exceeded, 07 directs processing to 10. 10 copies the HRPN(s) in the HCPA of the current MDA reference to the next null field(s) in MBCPA. The range of HRPNs copied is established by IUR. The first HL field (or column) of the ReliA CPA copied is GBL1. The first HL field of the MBCPA copied is the MBL represented by IIR plus 1. 11 updates IIR by copying IIR plus IUR to IIR. 12 records the new value in IIR to MBL in the current MDA reference.

04oo—Validation Control Functions

0472* —The Address Methodology Evaluation Function (AM Methodology Evaluation)

This function evaluates the CAI and a CPRI of URTAs of the ReliAA-CP-Manual process. The CAI is a parameter of Object Items that controls whether or not tracked referencing Descendants will be allowed for the Item, so that OUs that cannot physically contain other tracked OUs cannot be used as Guardian referent of another OU. A CPRI is a parameter of Object Items that controls whether or not positioning will be required for referencing Descendants of the Item. A CPRI is indicated, more specifically, by LRTCHL>0.

If this AM evaluation function (0472*) was initiated by the ReliAA-CPprocess, the CAI and LRTCHL of the Matriarch, the Matriarch will have been already evaluated by the ReliAA/ReliAM Processes Evaluation procedure (0300). A true CAI for the Matriarch Item was the basis for indicating the ReliAA/ReliAM processes. This AM evaluation function (0472*) successively evaluates each tracked Ancestor recorded in Ref for a CAI=true and LATCHL>0. If either condition is not met an error exists and the E & R function (0171*) needs to be initiated.

0473*—The LRTCHL and LATCHL Evaluation Function

The objective of this LRTCHLLATCHL function (0473*) is to help ensure that an MBCPA manually recorded by the user includes enough HRPNs for the minimum GrDHR requirements of the Matriarch and all tracked MDAs in the MSL, and does not include HRPNs in excess of the maximum GrDHR of these MDAs. This LRTCHLLATCHL function (0473*) evaluates the MHR of the MBCPA entered against the cumulative LRTCHL and the cumulative LATCHL of the Matriarch and all MDAs.

Both the LRTCHL and LATCHL address the complicating aspects of Divians. A Divian is defined as a non tracked OU that divides another OU and can contain (i.e. CAI=true) another tracked OU. A Divicon is defined, in contrast with a Divian, as a tracked Parent OU that can contain another tracked OU. An example of a Divian is a shelf in a cabinet or a divider in a note book. When a Divian is used exclusively within a tracked Object Item all Components of the Divian will be at a HL that is below the HL of the Divian and therefore will be below the first HL of the Guardian Item. If the Guardian item has a capacity of two HLs for object units the LRTCHL and the LATCHL will both be 2. If, however, a referencing tracked OU of the same Guardian can also be recorded at the same level as the Divians, the LRTCHL and the LATCHL of the Guardian Item will be 1 and 2 respectively. The LRTCHL and the LATCHL will be the same for many items. They will be different, however, when a Divicon or a Divian is allowed. As the issue is to insure that the GBL (or MBL) recorded is complete, the HL of referencing Descendants is the issue. The application of LRTCHL and LATCHL to three cases involving various combinations of allowed and required Divicons and Divians is illustrated for a Guardian with two HL is as follows:

|  | Case. A:<br>Divians Not Allowed/<br>Divicons only are used | Case. B:<br>Divian Required/Divicon<br>are not allowed | Case. C:<br>Divians or Divicons are<br>Allowed |
|---|---|---|---|
| LATCHL: Lowest GBL Allowed for Guardian | 1 | 2 | 2 |
| LRTCHL: Lowest GBL Required for Guardian | 1 | 2 | 1 |

The process sums both the LRTCHL and LATCHL for the Matriarch and other Ancestors, if any, in Ref. If the sum of the LATCHLs is greater than the MHR, as represented by THR, the MBCPA contains excessive HRPNs, so the error must be resolved or the E & R function (0171*) be initiated. If, conversely, the sum of the LRTCHLs is less than the MHR, as represented by THR, the MBCPA is incomplete so the error is resolved likewise.

0500—The Unreferenced Tracked Matriarch-Descendant Ancestor Identification Function (URTA Identification function)

0570—The URTA Identification Function

This function (0570) as shown in FIG. 20 identifies unreferenced tracked Matriarch-Descendant Ancestors (URTAs) in a lineage established by a Matriarch OU and a subject OU based on the Matriarch OU's UUI and the MBCPA of the subject OU relative to the Matriarch OU. This is initiated by the ReliAM-CP-Descendant Processes Validation Initiation procedure (0331) to establish a complete lineage for the MSL in Ref. Additionally, as the ReliA-EH-CP processes compute a position for a subject OU that is in a position outside the Guardian of the SLT, these processes using the PA function to evaluate the change in the position, initiate this function (0570) to update in the MSL in Reffor the current subject OU.

The URTA ID function (0570) uses a top down search for URTAs. This function only attempts to identify URTAs of a MSL. The lowest level MDA identified by this function is established as the Guardian OU for the subject OU of the transaction indicated sub-process's validation procedure initiating this function (0570).

Central to this function (0570) is reconciliation of the MHR (THR). The MHR is a parameter of a MatiA CPA for a subject OU. The number of OUs in the MSL will be equal to or less than the MHR. Each HRPN in an MBCPA represents the position of a Descendant OU in the MSL of the subject OU, tracked or untracked, at each MBL of the Matriarch and subject OU within the Matriarch OU. A Descendant OU in the MSL of the subject OU is termed a Subject Ancestor-Descendant.

The crux of this function (0570) is to iteratively construct a ReliA CPA from the Matriarch, or its lowest identified tracked MDA, and its MBCPA and then search for an OU on the OURF with the constructed ReliA CPA repeating this process when an Matriarch or MDA is found in this manner. When the UMDAHR is 0 or no further referencing Descendants can be identified the IMDAHR is maximized. The GBCPA used in the successive iterations in the ReliA CPA is constructed with a trial GrDHR (set initially to equal MHR) and is successively reduced, dropping the HRPN of the lowest MBL of the MBCPA for the GBCPA of the constructed ReliA CPA. When an OU with the lowset identified tracked MDA is found or the GrDHR of the GBCPA for the constructed ReliA CPA would be zero the URTA ID function is complete. If a tracked referencing Descendant of the MDA is found, and it is not the subject OU itself, it repeats the whole process with the newly identified MDA.

The URTA ID function (0570) uses two loops, an outer and an inner loop. The outer loop establishes the OUUI of the Guardian of the ReliA CPA constructed by the process, tracks the row in Reference of the lowest tracked Ancestor in the MDA identified, and tracks the IMDAHR. The inner loop establishes the GBCPA of the ReliA CPA as well as tracking the GrDHR evaluated by each loop of the inner loop. The inner loop also closes the process when the GrDHR for the GBCPA for a new iteration would be 0. At the junction of the two loops, the process searches on the OURF for an OU with the ReliA CPA constructed in this manner.

Thus, the outer loop searches at successively lower level MBLs of the Matriarchy to identify MDAs based on the ReliA CPA constructed at the junction of the two loops. When an MDA is found the outer loop searches on the next lower MBL, for a referencing Descendant of the last MDA found. The IMDAHR established by the outer loop is identified as IMDAHRr, where r represents the Matriarch or the lower level tracked MDA last established as the Guardian for the constructed ReliA CPA. When only the Matriarch has been established as a tracked Ancestor in the MSL, IMDAHRr=0. When the first referencing Descendant is found the IMDAHR of the newly identified referencing Descendant is identified as IMDAHRr', where r' represents the newly identified referencing Descendant.

1) $\text{IMDAHRr'}=\text{IMDAHRr}+\text{GrDHRr'}$. (1)

When a referencing Descendant is found the IIR is established or reestablished as the MHR minus the number of times the ReliA CPA was evaluated by the inner loop since initiated by the outer loop. MHR minus the number of times the ReliA CPA was evaluated is tracked as TGrDHR.

The inner loop iteratively constructs the GBCPA of the ReliA-CPA based on the MBL, represented by IMDAHRr, as established by the outer loop. When only the Matriarch has been established as a tracked Ancestor in the MSL and a first test ReliA CPA is constructed, the GBCPA of the test ReliA CPA will be the MBCPA, and the initial GrDHR tested will be MHR. The GrDHR of the test ReliA CPA is termed the Test GrDHR Each successive iteration of the inner loop decrements the Test GrDHR. When a qualifying Descendant OU has not been identified for a value of Test GrDHR, where Test TGrDHR>0, either the unidentified MDA is not tracked or is tracked but not recorded on the OURF for the ReliA CPA which it occupies.

The URTA function is completed whenever (a) UMDAHRr'=0, as when all tracked descendants in the MSL are identified by the function, (i.e. the subject OU is in its ReliA CPA of record on the OURF), or (b) Test GrDHR=0.

When the Test GrDHR is successively decremented from UMDAHRr to 0, no referencing Descendants exist for the lowest, last identified tracked Ancestor in the MSL, and there are no congruent OUs in the position described by even MBLX-HRPN, the highest level MBL of the MBCPA. The decrementafion of the Test GrDHR is tracked by a counter, IHR.

The Test GrDHR is further defined as UMDAHRr-IHR, as IHR is incremented from 0 to UMDAHRr.

Per the definition of UMDAHR:

$$\text{UMDAHRr}=\text{MHR}-\text{IMDAHRr} \qquad (2)$$

Thus when a referencing Descendant is identified, the GrDHRr' of the newly identified referencing Descendant is identified as:

$$\text{GrDHRr'}=\text{UMDAHRr}-\text{IHR} \qquad (3)$$

Substituting (2) into (3)

$$\text{GrDHRr'}=\text{MHR}-\text{IMDAHRr}-\text{IHR} \qquad (4)$$

Substituting (4) into (1)

$$\text{IMDAHRr'}=\text{IMDAHRr}+(\text{MHR}-\text{IMDAHRr}-\text{IHR}) \qquad (5)$$

and simplifying $$\text{IMDAHRr'}=\text{MHR}-\text{IHR} \qquad (6)$$

The value IMDAHRr' can be used to establish the MBL of the newly identified referencing Descendant. The GBL of the newly identified referencing Descendant is defined by GrDHRr'.

Whenever by successive iterations of the inner loop the Test GrDHR is decremented to 0, all referencing Descendants in the MSL on record in the OURF have been identified even though UMDAHRr may not be reduced to zero.

When a referencing Descendant is identified and $$\text{UMDAHRr}-\text{IHR}=0 \qquad (7)$$

or $$\text{MHR}-\text{IMDAHRr}-\text{IHR}=0 \qquad (8)$$

all referencing Descendants in the MSL have been identified. The MHR has been reconciled and the complete MSL has been established as being on record on the OURF. The subject OU as well as all tracked MDAs have a ReliA CPA recorded on the OURF that is consistent with the MBCPA.

The inner and outer loops of the process serve to systematically retract the MBCPA from both the highest and lowest hierarchies of the MBCPA. The outer loop retracts the highest MBLs of the MBCPA only after a MDA has been identified. When the outer loop operates, the successive retraction of the GBCPA is retracted by dropping only the HRPNs of the highest HLs as described earlier. On successive loops of the outer loop, the HRPNs for the HLs of the MBCPA that were included in the GBCPA of the previously identified tracked MDAs are not included in the GBCPAs of the MDAs of those already identified, tracked MDAs. Similarly, the included GrDHR of the identified MDAs will not be included in the UMDAHR (see equation 1).

The highest GBL used in the GBCPA of test ReliA CPA on successive loops of the outer loop is IMDAHR plus 1. The highest GBL for a Component of a Guardian is represented as GBL1. Thus $$\text{GBL1}=\text{IMDAHR}+1 \qquad (9)$$

For GBLz, however, where z>1

$$\text{GBLz}=\text{GrDHRr'} \qquad (10)$$

substituting from equation (4)

$$GBLz = MHR - IMDAHRr - IHR \qquad (11)$$

For example, If a MatiA CPA is provided for an OU for an OU referencing the Matriarch, where GrDHR=1, (i.e. the minimum value fer GrDHR) and MHR=1, (i.e. the minimum value for MHR), and a referencing Descendant OU is not on record as being in the MSL of the subject OU, so IMDAHRr= 0, then, per equation (6), GBLz=1–0–IHR. The MatiA CPA in this case will comprise the Test ReliA CPA, so IHR will be 0. Therefore, GBLz=1.

The range of MBLs included in the GBCPA of a test ReliA CPA are thus defined by equation (9) and (11) as the value IMDAHRr+1 through the value MHR–IMDAHRr–IHR. The Data Dictionary for the preferred embodiment uses MV names that are different in some cases than the variable names used above. IMDAHRr is represented as IIR for the tracked Ancestor in Interim Row Register (IRR). These two registers are set by the initiating procedure or function.

In addition to these two registers the flowchain for the URTA ID function (0570) use THR to track MHR and IUR to represent IUR. So based on the registers equation (4) becomes $$GrDHRr' = THR - IIR - IUR \qquad (12)$$

equation (6) becomes $$IMADHRr' = THR - IUR \qquad (13)$$

equation (9) becomes $$GBL1 = IIR + 1 \qquad (14)$$

and, equation 1 becomes $$GBLz = THR - IIR - IUR \qquad (15)$$

Detailed Description of (0570)

Steps 02 through 05 construct a test ReliA CPA in TestR-CPA and search for an OU on the OURF with the test ReliA CPA. 02 starts the outer loop. It copies the OUUI for the Matriarch or a specified MDA, based on IRR, to TestR-CPA to establish the Guardian for the ReliA CPA to be constructed for the first MDA of the specified OUUI. The OUUI specified by IRR represents the lowest generation previously identified Ancestor as established by pervious loops of this function or by the initiating program. 03 starts the inner loop as well as continuing the outer loop. It copies a specified range of HRPNs of the MBCPA from MBCPA to TestR-CPA. The specified range of HRPNs of the MBCPA copied are the HRPNs for all MBL from the value (IIR+1), as per equation (14) where IIR represents the IMDAHR, to the value (THR–IIR–IUR), as per equation (15) where THR represents the MIR, IIR represents the IMDAHR, and IUR represents the IHR. 54 and 05 search for the ReliA CPA constructed in TestR-CPA on the OURF by ReliA CPA. If a record is found for the ReliA CPA, 04 copies the Reference OURF Parameters to the comparable fields in the next row of Ref. If a record is found for the ReliA CPA, 05 directs processing to 08. On the outer loop if a record is not found for the ReliA CPA, 05 directs processing on the inner loop to 06.

06 evaluates IUR representing IHR for the last step of the inner loop. When the (THR–IIR–IUR), representing GrDHR as per equation (15), exceeds 1, 06 directs processing to continue on the inner loop, 07 increments the TGrDHR, and processing is directed back to 03 to restart the inner loop.

Step 08 compares the OUUI of the record identified on the OURF and copied to Ref to the subject OUUI. If they are equal, the complete lineage of the Matriarch has been established and processing is directed to 09. If the two OUUIs are not equal, 09 evaluates IUR. If IUR is 0 the last row added to Ref represents the subject OU rather than the Guardian OU, so 10 clears the last row of Ref. This is the appropriate place to create an indicator, in memory that the transaction is a non transfer transaction if the OMA wants to distinguish between transfer and non transfer transactions. If the IUR is not 0, meaning the MHR has not been reconciled by the IMDAHR, even though the lineage has, an error exists: the subject OU is being recorded as being in a position where it would be an Ancestor of itself. 11 reports the error, and 12 initiates the E & R function (0171*) to abort the transaction.

If the two OUUI of the record identified on the OURF, and copied to Ref, and the subject OUUI were equal, but the MHR was not reconciled 13 through 16 validate the MDA identified and update the registers used to control the outer loop. 13 updates IIR with (THR—IUR), representing IMDAHRr' as per equation 13, for the MDA identified. As this value also represents the MBL of the MDA identified 13 also copies the same value to MBL for the row of Ref for the MDA identified. 14 initiates the MDA Validation function (0581*) to validate and support confirmation of the MDA identified. Once the MDA has been validated and confirmed, 15 updates IRR to represent the row in Ref of the MDA identified.

16 compares IIR, representing the IMDAHR of the MDA identified, to THR, representing the MHR. If IIR is less than THR, 16 directs processing to 17 to initialize IUR, representing TGrDHR, for the inner loop and directs process to 02 to start another loop of the outer loop. If IIR is equal to THR, 16 directs processing to the initiating program.

0581*—The MDA Validation Function

The objective of this function is to update the record in Ref for the referencing Descendant identified with the Ref-IMRF Parameters and, optionally, allow the user to confirm the MDA. The function initiates the Ancestor IMRF Update function (9901*), displays the URTA, and optionally requests the user to confirm the URTA identified. If the URTA is not confirmed, it must initiate the E & R function (0171*).

0600—End of Parent Determination Function (EPD function)

0671—End of Parent Determination Function (EPD Function)

The objective of this function as shown in FIG. 21 is to establish the EPPN for each HL of the MHR as established by the enabling ReliAA processes. These EPPNs in turn support the PA function in the ReliA-EH-CP processes.

The preferred embodiment uses the EPPNs maintained on the IMR to establish the EPPNs for the hierarchical levels of the Matriarchy in EPOUPN. Therefore, for all Items that require CPam for their referencing Descendants, the EPPN for each HL of the Item equal to or greater than LATCHL for the Item needs to be preestablished on the IMR for the Item in the IMRF. For the Matriarch and tracked MDA established in Ref for the MSL of a subject OU the EPPNs established on the IMR for these Ancestors are routinely copied to Ref by the that established the Ref-IMRF Parameters in Ref. The record in Ref of each tracked Ancestor thus reflects the EPPN of each HL of the Ancestor—each HL of the tracked Ancestor Item's maximum GrDHR as established by the LRTCHL for the Item. The key issue for the process with the IMR Method is to copy the appropriate EPPN for the Ancestors from Ref to EPOUPN; when the LATCHL exceeds the LRTCHL for an Ancestor this function (0671) must establish when EPPNs in the "optional" HLs of the tracked Ancestor are to be used In summary, the EPD function (0671) successively evaluates each row of Ref to determine the GrDHR of the Ancestor OU represented by the row. As each unit of the GrDHR of a subject OU represents a HL that must have an associated EPPN, the GrDHR of each Ancestor establishes the number of successive EPPNs for each Ancestor in Ref that needs to be copied to EPOUPN for the Ancestor. This process is continued for each row of Ref until an EPPN is determined for each HL of the MHR of the MBCPA for the transaction. The process uses two loops, an inner and an outer loop. The outer loop controls determination of the GrDHR for each row and advancement of processing to the next row of Ref, the next MDA, once an EPPN has been copied to EPOUPN for each unit of the GrDHR for the row. The inner loop controls the copying of the successive EPPNs for the HLs of the Ancestor OU. The inner loop copies the successive EPPNs until the number of EPPNs copied from the Ancestor record equal the GrDHR of the Ancestor.

Step 01 initializes the IRR with TMR to track the current row for the tier of Ref. 02 initializes TR2 as 1. TR2 tracks the number of EPPNs established in EPOUPN. 03 establishes the GrDHR for the row as the difference between the MBLs in MBL of the next and current rows of Ref. TR1 tracks the number of EPPNs within a row of Ref that are copied to EPOUPN. 04 initializes TR1 for the inner loop. 05 copies the EPPN recorded in column EHLv of the current row in tier t of Ref to row w of EPOUPN where v is equal to TR1 and w is equal to TR2. If 06 EPOUPN(w) is equal to 0 or null an error, 07 exists for EHLv in the IMR of the OU for the current row of Ref or the MBCPA was recorded incorrectly. 08 initiates the E & R function (0171*). If EPOUPN(w) is not equal to 0 or null, processing is directed to 09. 09 compares the GrDHR of the current row (tracked by TLR) to the number of EPPNs copied from the current row (tracked by TR1). If the HR exceeds the number of EPPNs copied, it directs processing to 10 and 11 to increment both TR1 and TR2 and return processing to 05 to copy the next EPPN, as established by TR1, to the next row in EPPN, as established by TR2. 12 evaluates the Interim Reference Row Register, IRR. If IRR is greater than 0, it directs processing to 13 and 14 to increment IRR and TR2 respectively, and return processing to 03 to start the outer loop for the next row. If IRR is equal to 0, the process is complete and processing is directed to return to the initiating program.

0700—Enabling Processes Completion Procedures

The objective of the Enabling Processes Completion procedures for each AM is to perform the enabling process steps common to the EPS Enabling processes for the AM, but not common to their EPS enabled processes. These procedures in turn initiate the TU & C procedure for the AM to complete the process steps common to both enabling and EPS enabled process transactions.

0710—OL Enabling Processes Completion Procedure 01 sets up EPSI-OL as true to effect the processing of subsequent transactions as shown in FIG. 22 as enabled OL process until EPSI-OL is cleared. 02 sets up the first cell of PV-Transaction EPS-New Indicator (PF-TEI) as true to identify for the PHSOU Clear or Replace Evaluation function (0772) [initiated by the OL TU & C procedure (0810)] that PHSOU needs to be cleared or replaced. 03 copies the OU Descriptors and the UBOLA for the subject OU of the enabling transaction, the SET to EPST-Subject to maintain the Descriptors and the UBOLA for the EPS. 04 initiates the OL TU & C procedure (0810) to complete the OLam transaction.

0720—CNP Enabling Processes Completion Procedure 01 sets up EPSI-CNP as true to effect the processing of subsequent transactions as shown in FIG. 22 as enabled CNP process until EPSI-CNP is cleared. 02 sets up EPS Guardian Row Register (EGR) as 0 because the Guardian OU for the CNP processes will always be recorded in row 0 of the current Lineage tier of Ref.

Step 03 sets up the first cell of PV-Transaction EPS-New Indicator (PV-TEI) as true to identify for the PHSOU Clear or Replace Evaluation function (0772) [initiated by the CNP TU & C procedure (0820)] that the PHSOU Stack needs to be cleared or replaced. 04 establishes the OU Descriptors for the subject OU of the enabling transaction, the SET to EPST-Subject to maintain the Descriptors. 05 initiates the EPS-Origin Identification function (0771*) to identify the UBOLA of the Origin OU and establish its OU Descriptors for the EPS-CNP, in EPS-Origin. 06 initiates the CNP TU & C procedure (0820) to complete the CNPam transaction.

0730—CP Enabling Processes Completion Procedure

The objective of the CP Enabling Processes Completion procedure (0730) as shown in FIG. 23 is to perform the enabling process steps common to the CP enabling processes, but not common to the CP EPS enabled processes.

Step 01 initiates PV-TEI as true to clear the PHSOU stack (PHSOU). 02 establishes the OU Descriptors and MBCPA for the subject OU as the SET to maintain these as a DRb for the EPS. 02a copies the subject OU's OU Descriptors in Ref to EPST-Subject. 02b copies the MBCPA to EPST-Subject. 03 copies the OU Descriptors for the reference used in the enabling transaction to EPST-Ref as well to establish the reference as a DRb for the EPS. 04 initiates the EPS-Origin Identification function (0771*) to identify the UBOLA of the Origin OU for the EPS and to establish the UBOLA and OU Descriptors for the Origin OU in EPS-Origin. This is displayed by the ReliA Standard Display as an aid to the user in determining or validating the general location of the Matriarch OU for the EPS. 04 initiates the CP TU & C procedure (0830) to complete the CP transaction.

0771*—EPS-Origin Identification Function

The objective of the EPS-Origin Identification function (0771*) is to establish Origin OU and its UBOLA and OU Descriptors for an EPS for the ReliA Standard Display. The Origin OU is identified by chaining up through successive Guardian referents from the Matriarch until the OUR of a Guardian does not have a Guardian referent. The UBOLA is provided by the OLARF for the Origin OU. When the Origin OU is identified, its OUUI and UBOLA are copied from the OLARF to EPS-Origin. The OU Descriptors for the Origin OU are provided by the IMR for the Item ID of the Origin OU. The OU Descriptors are copied to EPS-UBOLA as well.

0772*—PHSOU Clear or Replace Evaluation Function

The objective of this function (0772*) is to clear the PHSOU Stack when the PV-Transaction EPS New Indicator (PV-TEI) is true. The PF-TEI is initiated as true by the enabling processes [excludes the ReliA-EH-CP PA procedure (1060)] to effect clearing of the PHSOUs for a previous EPS. The function evaluates PV-TEI. When PV-TEI is true, it clears PHSOU and EPR is used to track the last row of the stack used.

0774*—EPS Preserve and Clear Function

The objective of this function (0774*) is to (1) preserve in memory a record of the Matriarch-Guardian Lineage (MGL), the parameters of each tracked Ancestor in that lineage, and the EPS indicators and registers, and (2) clear these MVs. These EPS Ancestors and associated parameters must be preserved and cleared prior to replacing them with new Ancestors and associated parameters for a new transaction employing an enabling process. These EPS Ancestors and associated parameters need to be preserved in memory so that the Ancestors in this lineage and the associated parameters can be recovered if the current transaction is aborted.

The ReliA sub-processes and procedures consistently update and query the MGL in the current EPS Matriarch-Guardian tier(tier 2, in Ref). The current EPS Matriarch-Guardian tier in Ref is also termed the primary EPS tier in Ref. The EPS Preserve and Clear Function, initiated by the validation or completion procedure for the EPS enabling process, copies the records of these Ancestors to the previous EPS Matriarch-Guardian tier (tier 3, in Ref) to preserve them when the current EPS Matriarch-Guardian tier is being replaced. In a similar manner, this function also copies the associated current EPS-MV indicators and registers in row 0 of each EPS-MV indicator and register to its previous EPS-MV indicators and registers in row 1 of the EPS-MV indicator and register to preserve them. When the current EPS-MV indicator and register Ancestors and associated parameters are preserved the function clears the current EPS Matriarch-Guardian tier and the current EPS-MV indicator and register indicators and registers and returns processing back to the initiating procedure.

When an enabling transaction is reversed, as identified by the GE procedure (0100), this procedure copies the preserved EPS-MV data back to the applicable current EPS-MV.

This function is initiated in general by the enabling processes only. The Completion procedure (1060) also updates of the MGL and associated EPS indicators and registers and performs a similar preservation function. The Completion procedure (1060) performs these tasks directly, however, because it does not clear the Lineage.

0800—Transaction Update and Close Procedures (TU & C Procedures)

A TU & C procedure concludes the processing of each validated transaction. Each transaction starts with the GE procedure (0100) and is then directed to one of the procedures that represent the core of the validation for the indicated ReliA sub-processes. In some cases, a completion procedure is used as well. A completion procedure in turn, based on its AM, initiates a TU & C procedure to consolidate the data needed for the ReliA Standard Display and to update the transaction on the permanent OMA files as appropriate for the transaction. The objective of each of the TU & C procedures is to perform the TU & C steps common to the ReliA subprocesses for each of the addressing methodologies.

The preferred embodiment of the ReliA process also provides that the data on each transaction be preserved in memory and displayed from the time the transaction is fully validated until the time the next transaction is fully validated. This allows the user to confirm that the just completed transaction has been processed correctly, or to allow the user to determine the last transaction completed if the user is interrupted in the completion of a current transaction. The TU & C procedure also supports the clearing or replacement of the PHSOU Stack as dictated by the validation procedure of an enabling process Maintenance of the Post-Validation Transaction Specific Memory Variables The pre-validation, or, general data on each transaction, termed General Transaction Specific Memory Variables (G-TSMVs) are captured in the special Post-Validation Transaction Specific Memory Variables (V-TSMVs) once a transaction is validated. When the next transaction is validated the PV-TSMVs from the previous transaction are used to record the previous transaction on the OURF and other permanent records of the OMA. After the PV-TSMVs are used to record the previous transaction, the PV-TSMVs are cleared and the same PV-TSMVs are used to record the G-TSMVs of the current transaction. The G-TSMVs. Thus the two steps in the TU & C procedures are: (1) Close the previous transaction from the PV-TSMVs. This is performed by the Previous Transaction Close function (0871); and (2) Update the G-TSMVs for the current transaction to the PV-TSMVs.

Thus, the last transaction completed by the user remains uncompleted in terms of updating the permanent files of the OMA, i.e., open, by the ReliA process until the next transaction is validated. When the user exits ReliA, the GE procedure (0100) completes the close of the suspended transaction in the PV-TSMVs by irdfiating the Previous Transaction Close function (0871). The G-TSMVs are cleared by the GE procedure (0100), once the start of a new transaction is validated.

0810, 0820, and 0830—Transaction Update and Close Procedure (TU & C Procedure)

The TU & C procedure for the three addressing methodologies as shown in FIG. 24–26 comprises: (1) OL TU & C procedure (0810); (2) CNP TU & C procedure (0820); and (3) CP TU & C procedure (0830). While the TU & C procedure for each AM is unique, the procedures are overall very similar described below:

Close and clear the PV-TSMVs for the previous transaction. 51 through 06 close the PV-TSMVs to the OMA permanent files and clear the PV-TSMVs for the previous transaction. 01 initiates for all addressing methodologies the Previous Transaction Close function (0871), the PV-TSMVs for the previous transaction in the OURF, the OLARF, if applicable, and other permanent records of the OMA if so established by the user. The Previous Transaction Close function (0871) provides for updating any previous transaction without regard to the AM of the process. 02 initiates for all addressing methodologies the PHSOU Clear or Replace Evaluation function (0772) to clear the PHSOU stack if PV-TEI is true as established by an Enabling Completion procedure for the previous transaction when the previous transaction was recorded by an EPS enabling processes. 03 initiates for all addressing methodologies the PHSOU Update function (0872*) to update for the previous transaction the UUI of the Subject OU for all addressing methodologies and update the MBCPA if the previous transaction was recorded with the CPam. (Steps 04 and 05 are not used.) 06 clears for all addressing methodologies the PV-TSMVs.

The remaining steps update the G-TSMVs to the PV-TSMVs so the current transaction can be suspended while the next transaction is validated. 07 and 08 in each AM establish an indicator to control updating of the UBOLA for the current transaction on OLARF. The preferred embodiment assumes that all transactions will be updated on the OURF, and that only those transactions in which the subject OU was, or is currently is, an Origin OU need be updated on the OLARF. 07 for the OLam establishes the Transaction Origin Register (PV-TOR) and is initiated as +1 (plus 1) to initiate the recording of an Origin subject OU. 07 for both the CNPam and CPam evaluates the Guardian of the subject OU in Ref to establish if the subject OU was previously recorded as an Origin OU. If the subject OU's Guardian was previously null the subject OU was previously recorded as an Origin OU. The record of the subject OU on the OLARF, needs to be cleared. If the Guardian OU of the subject OU is null, 07 for the CNP and CPam direct processing to 08 to establish PV-TOR as −1 (minus 1). (08 is not used in the OLam.)

09 in each AM copies the OU Descriptors for the subject OU to PV-Subject. 10 in each AM establishes the location address for the subject OU in PV-Subject. The location address for the OL and CNP addressing methodologies is established by the enabling process in the primary EPS tier of Ref. In the CPam the Guardian referent is established in Reference as well, but the component position address is established in MBCPA, but the GBCPA for the subject OU may be only a portion of the MBCPA. 10 initiates the Guardian and MBCPA to ReliA CPA Conversion function (0874) to copy the UUI of the Guardian referent established for the EPS to PV-Subject, construct the GBCPA, and copy the constructed GBCPA to PV-Subject. (11 and 12 are not used.)

13 displays the subject OU Descriptors and location address and associated tracked Ancestors and references from the EPS enabling transaction as follows for the AM of the current transaction:

There may be data in the PV-TSMVs when ReliA is initiated by the OMA because the ReliA General Evaluation procedure (0100) allows the PV-TSMVs to remain open even though it initiates closing the transaction the PV-TSMVs to the permanent files of the OMA before it return processing to the OMA. Whether there is, or is not, data stored in the PV-TSMVs, it is inappropriate to close, or attempt to close, the PV-TSMVs to the OMA permanent files with the initiation of Previous Transaction Close function (0871) for the first transaction processed by a TU & C procedure after ReliA is initiated. The normal updating of the PV-TSMVs to the OMA by this function (0871) is bypassed in this function by initiating in the initiating procedures of ReliA a PV-TSMV indicator to effect bypass updating of the transaction when indicated. The indicator that controls the updating of the

| Origin Locating addressing methodology | |
|---|---|
| Parameter | Table Name |
| Subject OU Descriptors | PV-Subject(OU Descriptors*) |
| Subject UBOLA | PV-Subject(UBOLA*) |
| SET - OU Descriptors | EPST-Subject(OU Descriptors* ) |

| Component Non-Positioning addressing methodology | |
|---|---|
| Parameter | Table Name |
| Subject's OU Descriptors | PV-Subject(OU Descriptors*) |
| Subject's Guardian referent | PV-Subject(Guardian) |
| Guardian referent (Matriarch) OU Descriptors and its Guardian referent | Reference (2,0, both OU Descriptors* and Guardian) |
| SET - OU Descriptors | EPST-Subject(OU Descriptors*) |
| Origin OU Descriptors and UBOLA | EPS-Origin(OU Descriptors* and UBOLA*) |

| Component Positioning addressing methodology | |
|---|---|
| Parameter | Table Name |
| Subject's OU Descriptors | PV-Subject(OU Descriptors*) |
| Subject's ReliA CPA | PV-Subject(ReliA CPA*) |
| Subject's MBCPA | PV-MBCPA(MBCPA*) |
| Guardian referent OU Descriptors and ReliA CPA | Reference[2,(TGR), both OU Descriptors* and ReliA CPA*] |
| 2nd level, if any in MSL of EPS, track Ancestor OU Descriptors and ReliA CPA | Reference[2,(TGR - TBR), both OU Descriptors* and ReliA CPA*] |
| 3nd level, if any in MSL of EPS, track Ancestor OU Descriptors and ReliA CPA | Reference {2,[TGR - (2* TBR)], both OU Descriptors* and ReliA CPA*} |
| Matriarch OU Descriptors and ReliA CPA | Reference (2,0 both OU Descriptors* and ReliA CPA*} |
| SET - OU Descriptors and MBCPA | EPST-Subject(both OU Descriptors* and MBCPA*) |
| Reference of the Enabling Transaction (RET) Descriptors and MBCPA | EPST-Ref(both OU Descriptors* and MBCPA*) |
| Origin OU Descriptors and UBOLA | EPS-Origin(OU Descriptors* and UBOLA*) |

Step 14 returns processing to the GE procedure (0100)

0871—Previous Transaction Close Function

The objective of the Previous Transaction Close function (0871) as shown in FIG. 27 is to provide a uniform process for closing the last completed user transaction to the permanent record files of the OMA. This includes only the OURF and OLARF in the preferred embodiment, but may include an OMA transaction history file and other files in an instantiation of this invention. The Previous Transaction Close function (0871) is a common function initiated by the TU & C procedures for each of the three addressing as well as the GE procedure (0100) when ReliA is exited by the user. Its role relative to the TU & C procedures is more fully described in the Introduction to the TU & C process.

Closing PV-TSMVs to the OMA permanent files is inappropriate when there is no previous transaction, as when ReliA is initiated by the OMA[1]. When there is no pervious transaction there may, or may not, be data in the PV-TSMVs.

permanent files of the OMA is the Post-Validation OMA Update Bypass Indicator (PV-TZI). This should be initiated as true when ReliA is initiated.

[1] When ReliA is called by the OMA at the start of an OMA transaction as opposed to OMA returning processing to ReliA per the Call OMA function.

In summary, the Previous Transaction Close function (0871) determines if closing the transaction to an OMA permanent file is appropriate and closes the transaction to the permanent files. In the preferred embodiment each transaction is assumed to update the OURF. When a transaction for an OU is recorded by an OLam process the OLARF is updated as well. When a transaction is recorded for a Component OU by a process employing the CNPam or CPam the subject OU may have been previously recorded as an Origin OU. Therefore, the OLAR for the subject OU needs to be cleared when the address of record for the subject OU does not include a Guardian. The Transaction Origin Register (PV-TOR) as established by the TU & C procedure initiates PV-TOR as +1 to indicate that an OLAR needs to be added or updated on the OLARF for the subject OU of the transaction, and initiated as −1 (minus 1) to indicate that the OLAR needs to be cleared from the OLARF when the subject OU is recorded as a Component OU.

Step 01 evaluates the Post-Validation OMA Update Bypass Indicator (PV-TZI). If PV-TZI is true, 01 directs processing directly to the initiating program bypassing recording of the PV-TSMVs in the OMA permanent files. Otherwise, 01 directs process to 03. (Step 02 is not used.) When closing of the previous transaction to the OMA permanent file is indicated 03 accesses the subject OU's record on the OURF by its OUUI and updates the OURF. 03a copies the ReliA CPA in PV-Subject to the OURF for the subject OU. 03b updates per OMA specifications any other parameters for the subject OU collected by the OMA for the transaction. 04 and 06 evaluate PV-TOR. If PV-TOR equals +1, 04 directs processing to 05 to record the UBOLA for the subject OU in an OLAR for the subject OU in the OLARF, creating an OLAR for the subject OU if the OLAR has not been previously established on the OLARF. If PV-TOR is not equal to +1, 04 directs processing to 06. If PV-TOR equals −1, 06 directs processing to 07 to clear the OLAR for the subject OU on the OLARF. If PV-TOR is not equal to −1, 06 directs processing to 08. 08 copies, if specified by rite OMA, the transaction to the OMA's transaction history file per OMA specifications. 09 returns processing to the initiating program.

0872*—The PHSOU Update Function

The objective of the PHSOU Update function (0872*) is to update, for all addressing methodologies, the PHSOU Stack with the UUI of Subject OU and the MBCPA of the previous transaction. The function copies OUUI from PV-Subject and, if applicable for the AM, the MBCPA from PV-MBCPA to the next unused row of the PHSOU Stack per the PHSOU Register (EPR) and updates EPR.

0874—Guardian and MBCPA to ReliA CPA Conversion Function

The objective of this function (0874) as shown in FIG. 28 is to construct for the CP TU & C procedure (0830) the ReliA CPA of the subject OU based on the Guardian of the EPS and the MBCPA of the subject OU.

The Guardian will be the lowest, last MDA identified by the URTA ID function.

As the GBCPA of the subject OU has not been established, the value of the GrDHR of the subject OU and the associated MBL-HRPNS can be derived from the MHR and the MBL of the Guardian. The GrDHR is expressed most directly as:

$$\text{GrDHR} = \text{MHR} - \text{Guardian MBL} \tag{G1}$$

The MHR is the total number of HRPNs in the MBCPA. The GBCPA of the subject OU comprises some of the HRPNs of the MBCPA. If more than one HRPN will be included in the GBCPA, they will be successive HRPNs in the MBCPA. The highest MBL (lowest MBL value) included, $$\text{MBL}_{max} \text{ from the MBCPA is } \text{MBLmax} = \text{MHR} - \text{GrDHR} + 1 \tag{G2}$$

Substituting for GrDRH from (G1)

$$\text{MBL}_{max} = \text{MHR} - (\text{MRH} - \text{Guradian MBL}) + 1 \tag{G3}$$

and simplifying $$\text{MBL}_{max} = \text{Guardian MBL} + 1 \tag{G4}$$

the Guardian MBL is the MBL of the lowest, last MDA identified in the MSL, so (G4) becomes $$\text{MBL}_{max} = \text{MBL of the lowest, last MDA identified in the MSL plus 1} \tag{G5}$$

The lowest MBL included (highest MBL value), $\text{MBL}_{min}$, from the MBCPA is $$\text{MBL}_{min} = \text{MHR} \tag{G6}$$

The highest GBL included in the GBCPA constructed is 1. The lowest GBL included in the GBCPA is GrDHR.

Step 01 copies the OUUI of the Guardian referent established for the EPS in the primary EPS tier of Ref to PV-Subject, construct the GBCPA, and copy the constructed GBCPA to PV-Subject. 02 using the difference between the MHR and the MBL of the Guardian of the subject OU computes the GrDHR for the subject OU and establishes the GrDHR in IIR. 03 copies the GBCPA of the subject OU from fields in MBCPA representing a specified range of MBLs to fields for the GBCPA in the ReliA CPA* in PV-Subject representing a specified range of GBLs. The first MBL of the specified range in MBCPA is represented as $\text{MBL}_{m'}$, where m' represents the MHR minus the GrDHR of the Subject OU plus 1 and the last MBL of the specified range in MBCPA is represented as $\text{MBL}_h$, where h represents the MHR. The first GBL of the specified range in the GBCPA in PV-Subject is GBL1 and the last GBL of the specified range in the GBCPA in PV-Subject is $\text{GBL}_i$, where i represents IIR.

1000—The ReliA-EH Processes Evaluation and Validation Procedures

The ReliA-EH processes are characterized by automatic or semi-automatic referation of the address of a subject OU. These processes require a preceding enabling process to establish a starting position for the succeeding transactions using the ReliA-EH process. In the ReliA-EH processes supporting the CPam, the HCPA of the subject OUs of successive transactions is incremented at one or more hierarchies relative to the SLT. In the ReliA-EH processes supporting the CNPam or the OLam, a position is not maintained, so the subject OUs of successive transactions are automatically copied to the address of each successive subject OU. In all tracked Ancestor referent processes, CNPam and CPam, the Guardian referent of the SET is automatically recorded as the Guardian of the location address recorded for the subjects of any successive transactions. Moreover, the steps performed by the user for all the ReliA-EHA processes are the same. The user simply records the UUI of the successive subject OUs.

1010—ReliA-EHA-OL Validation Procedure

This procedure (1010) as shown in FIG. 29 records the UBOLA for successive subject OUs once EPS-OL has been established with the UBOLA of a Preceding Sister OU. The UBOLA is established by one of the OL enabling processes: the Universe-OL-Manual process or the ReliAQ-OL process.

Steps 01 through 04 test for a DRb and complete Disabling of the EPS-OL when indicated. In the preferred embodiment the SET is the only DRb. The OUUI of the SET is stored in EPST-Subject. 05 through 09 of the validation procedure complete the validation of the current transaction. 05 copies TEA(0), the subject OUUI for the transaction, to tier 0, row 0, column OUUI of Ref. 56 and 07 initiate the TTR as 0 to direct the Reference Row 0 OURF and IMRF Update function (0173*), to complete the OURF and IMRF parameters for the subject OU recorded in tier 0. 08 initiates the OMA Call function (9902*) to temporarily return processing back to the OMA. The transaction at this point is fully validated. Step 09, completing the validation procedure, initiates the OL TU & C procedure (0810) to direct the remaining steps required to complete the ReliA-EHA-OL process.

A special audio communication of the validated transaction is not provided in the preferred embodiment, in general, for the ReliA-EH processes because it would be to tiring to users. The ReliA-EH processes will be used much more extensively than the enabling processes. Most transactions recorded by the ReliA-EH processes will be recorded very rapidly when a bar code reader is used. The OL TU & C procedure (0810) does display the ReliA Standard Display for the completed transaction. The ReliA-EH processes can confirm validation of transactions otherwise by reporting the exceptions.

1020—ReliA-EHA-CNP Validation Procedure

The ReliA-EHA-CNP Validation procedure (1020) as shown in FIG. 30 records the Guardian referent for successive subject OUs once the Guardian referent of a Sister OU has already been established by a CNP enabling process: the ReliAA-CNP process or the ReliAQ-CNP processes. The initial steps required for of the ReliA-EHA-CNP process were included in the GE procedure (0100). In summary, the procedure tests for a DRb and complete Disabling of the EPS-OL when indicated and then validates the recorded OUUI.

Steps 01 through 06 test for a DRb and complete Disabling of the EPS-CNP when indicated. In the preferred embodiment the SET and the Matriarch are the only DRbs. The OUUI of the SET is stored in EPST-Subject and the OUUI of the Matriarch is stored in the primary EPS tier, row 0, column OUUI of Ref. 07 of the procedure copies the OUUI recorded in TEA(0) by the GE procedure (0100) to the first tier and row of Ref, the standard subject OU row and tier for the subject OU in Ref. 58 and 09 copy 0 to the Transaction Reference Tier Register (TTR) and establish the OURF and IMRF parameters for the subject OU in Ref.

(10 through 14 not used)[2]

[2] The CNPam will record all Descendant OUs that reference a particular tracked Ancestor without respect to its actual hierarchy level relative to the Guardian.

15 and 16 initiate the completion of the transaction and the procedures required to close it. 15 initiates the OMA Call function (9902*) to return processing temporarily to the OMA to control the collection of any additional transaction parameters required by the OMA for the current transaction.

when the OUP of the MBCPA computed in 02 exceeds the EPPN of any of the Ancestors, tracked or nontracked, in the MSL of the SLT, and initiate update of the MSL in Reference when the EPPN at the highest level of an Ancestor is exceeded based on a Backward TD.

The preferred embodiment maintains only one TD. The ReliAQ-CP-CC-Backward process can thus establish a Backward TD for just the lowest HL of the Matriarchy and potentially apply the Backward TD to all hierarchies of a an established Matriarchy for an EPS-CP.

1030—ReliA-EH-CP Processes Evaluation Procedure

This procedure (1030) as shown in FIG. 31–32 supports the ReliA-EH-CP processes where the CPam is required. These ReliA-EH-CP Processes include the following processes: ReliA-EHA-CP process, the ReliA-EHR-CP-pC-Skip, the ReliA-EHR-CP-SLT-Skip process, and the ReliA-EHR-CP-pC-Skip process. These processes are supported by a PA function to advance the OUP of the subject OU to the first position of a subsequent PHL Homogen when the EPPN of the SLT is exceeded.

The ReliA-EHA-CP process is the easiest user process, followed by the -pC-Aligned process. The two skip processes are included as back-up processes for the situations where the first two cannot be used. The Skip processes are back-up processes because they have more complex TESs.

The GE procedure (0100) initiates this CP evaluation procedure (1030) when the EPS Determinants qualify EPS-as true for a new transaction. This procedure (1030) for the preferred embodiment proceeds through several logical steps. To generalize, determination of the processes being used is based on the number of TES references to OUs recorded in the PHSOU Stack and the relationship of the first relational reference to the SLT. The key logical steps in this evaluation procedure are as follows:

| Logical Steps. | | Finding After Execution of Related Process Step | |
|---|---|---|---|
| 1 | Compare TEST1 against the OUUI of the DRbs established by the Enabling process transaction. | Yes: | Disable the EPS indicator |
| | | No: | A transaction using a ReliA-EH-CP process is indicated. Continue. |
| 1 | Compare TES1 against the OUUI of the DRbs established by the Enabling process transaction | Yes: | Disable the EPS indicator. |
| | | No: | A transaction using a ReliA-EH-CP process is indicated. Continue. |
| 2 | TES2 a PHSOU. | No: | The ReliA-EHA-CP process is indicated. |
| | | Yes: | An -SLT-Skip or a preceding Cousin process is indicated. Continue. |
| 4 | TES3 a PHSOU | No: | The -pC-Aligned process is indicated. |
| | | Yes: | The -pC-Skip process is indicated. |

16 initiates the CNP TU & C procedure (0820) to complete the ReliA-CNP process.

ReliA-EH-CP Process Introduction and Overview

The ReliA-EH-CP processes basically follow the same major steps followed by the enabling processes. The major steps of the ReliA-EH-CP processes are: (1) Identify the indicated ReliA-EH-CP process; (2) Compute a preliminary MBCPA based on the PHSOU Reference or the SLT as per the indicated ReliA-EH-CP process; (3) Initiate PA function to compute an adjusted MBCPA if the EPPN of the SLT Parent Item is exceeded; (4) Convert the adjusted MBCPA to a ReliA CPA; and (5) Record the ReliA CPA in the permanent files of the OMA and the MBCPA of the Subject OU in the PHSOU Stack.

The significant exception in the ReliA-EH-CP processes relative to the enabling processes is the use of a function, 3 above, to evaluate the MBCPA computed and adjust the MBCPA Flowchart (1030) for the ReliA-EH-CP-Processes Evaluation procedure (1030) shows the evaluation process of user TES entries to determine which ReliA-EH-CP process is being used.

Steps 01 through 08 evaluate the TES for a DRb. 01 compares TES1 to the Matriarch. If TES1 corresponds to the Matriarch, 01 directs processing to 52, 03 and 04 to disable the EPS-CP and return processing to the GE procedure (0100). 02 sounds a distinctive disabling tone and displays a message that the EPS is disabled. 03 disables the EPS by clearing EPSI-CP. 04 initiates for recycling the processing: returning processing to the GE procedure (0100). If TES1 does not correspond to the Matriarch, 01 directs processing to 05 to compare TES1 to the Enabling Process Session Transaction (EPST) subject OU. If TES1 corresponds to the EPST subject OU, 05 directs processing to 56 and 07 to evaluate TES2. As TES2 will be in TET at this point, 06 initiates the TET Evaluation function (0172) to hold processing until an OUUI is recorded for TES2 and to allow the user to abort the transaction by a Fixed Command. 07 compares TES2 to the relational reference employed in the EPST. If TES2 corresponds to the EPST relational reference meaning both TES1 and TES2 were references to the DRbs, the SET and the Referent for the Enabling Transaction (RET), 07 directs processing to 52, 03 and 04 as well to disable the EPS. If TES1 does not correspond to the EPST subject OU, 05 directs processing to 58 to initiates the TET Evaluation function (0172). If a disabling Fixed Command has not been recorded there are no Disabling commands and if a valid OUUI has been recorded the TET Evaluation function (0172) will return processing to continue with the evaluation.

Steps 06 or 07 initiates the TET evaluation for TES2 and 09 compares TES2 in TET to the PHSOUs in PHSOU, with the ReliA-EHA-CP process indicated if TES2 is a non-PHSOU. Alternatively, TES1 in TEA(0) can be evaluated directly at this point as a non-PHSOU, with the ReliA-EHA-CP indicated if TES 1 is a non-PHSOU. The latter method corresponds to the appropriate process for the Subject Last Convention (SLC) and allows the transaction to be closed with evaluation of just TES1. The method shown, however, is consistent with the open transaction characteristic of the SFC for the other ReliA-EH-CP processes elected for the preferred embodiment. Thus, the evaluation process for the ReliA-EHA-CP process is adopted only for consistency purposes even though the open transaction can be avoided in this case where Subject First and Subject Last have synonymous TESs. If the ReliA-EH-CP process is indicated, 10 initiates the ReliA-EHA-CP Validation procedure (1031). If the SLC is used the TET Evaluation function (0172) is initiated at this point to evaluate TES2. If TES2 is a PHSOU a ReliA-EHR-CP process is indicated, and 09 directs processing to 11.

The remaining processes all use TES2, so 11 updates and displays TES2, evaluated by the TET Evaluation function (0172) at 06 or 08, to TEA(1), updates the TEB and updates TAR as 1. Steps 12, 13, and 14 test the EHR and evaluate the MBCPA of TES2 as a preceding Sister. 13 tests initially for a relational reference of a Sister OU when EHR is greater than 1. It compares the HRPNs of the MBCPA, except for the lowest MBL of the MBCPA, of the SLT to that of the relational reference recorded for TES2, now in TEA(1) for the SFC. If the relational reference is a preceding Sister OU of the SLT, the ReliA-EHR-CP-SLT-Skip process is indicated and the ReliA-EHR-CP-SLT-Skip Validation procedure (1033) is initiated. 12 validated that the EHR is greater than 1. The Preceding Cousin Referent processes otherwise indicated at this point are contra-indicated if the EHR is only 1. If the TES2 referent is not a preceding Sister when EHR is 1, there is an error; 15 initiates the E & R function (0171). Otherwise, if the referent is not a preceding Sister 13 directs processing to 17 and 18 to evaluate TES3. 17 initiates the TET Evaluation function (0172) to evaluate TES3 for the SFC, or TES2 for the SLC. 18 compares TES3, in TET, to the PHSOUs in PHSOU. If TES3 is a PHSOU the -pC-Aligned process is indicated, and 18 directs processing to 19 to initiate the ReliA-EHR-CP-pC-Aligned Validation procedure (1032). If TES3 is not a PHSOU the -pC-Skip process is indicated, and 18 directs processing to 20 to initiate the ReliA-EHR-CP-pC-Skip Validation procedure (1032).

1031—ReliA-EHA-CP Validation Procedure

User Process: Once EPS-CP is enabled, the user records the OUUI of successive contiguous OUs in the established TD relative to the SLT. In addition, after a transaction has been recorded for the Last OU in a Parent, a subject OU at the First OUP of the subsequent PHL Homogen of the SLT can be recorded This procedure (1031) as shown in FIG. 33 supports validation of a transaction indicated as the ReliA-EHA-CP process. This procedure provides for recording of a Sister OU in the subsequent, contiguous position of the SLT. It is the simplest ReliA-CP process. For an operating equipment system or a predominately full object system, it will normally be the dominant process.

Step 01 copies the MBCPA of the SLT recorded in PV-MBCPA to MBCPA. 02 establishes an incremented OUP, MBCPA, for the subject by adding the value of one to the HRPN of the MBL of the lowest HL of the MBCPA. The MBL of the lowest HL of the MBCPA is the MHR as represented by the EPS HR Register (EHR). 03 sets up the OUUI of the subject OU of the transaction in Ref(0,0,OUUI) as a basis for completion of the process by the ReliA-EH-CP General Completion procedure (1050). 04 initiates the ReliA-EH-CP General Completion procedure (1050) to complete the processes common to the primary ReliA-EH-CP processes, as well as those common to the CP processes in general.

If the SLC is used with the ReliA-EHA-CP process, some modifications need to be made in this procedure as well as in the GE procedure (0100). This is necessitated when the TET evaluation for TES2 does not precede the evaluation for a non-PHSOU, see 1030-12, which indicates the ReliA-EHA-CP process in the preferred embodiment. The preceding TET Evaluation function (0172) serves to eliminate duplicate entries of the OUUI of the subject OU of the transaction using the ReliA-EHA-CP process. If a duplicate is not eliminated in 1030-12, it must be eliminated in the GE procedure (0100) so any duplicate OUUIs of the subject OU of the transaction will not cause the just completed transaction to be aborted by TET Evaluation function (0172) initiated in 06. When the GE procedure (0100) would otherwise abort a transaction, it must skip the abortion when the last transaction used this procedure (1031). This can be indicated by an indicator created by this procedure (1031) and routinely cleared after evaluation for the indicator by the ReliA-EH-CP Processes Evaluation procedure (1030).

1032—ReliA-EHR-CP-pC-Aligned Validation Procedure

User Process:

The user records the ouui of an OU aligned with the subject of the transaction to establish the MBLy-HRPN or the MBLz-HRPN of the Aligned Subject The rest of the MBCPA is determined from the SLT.

A Ref to a preceding 1st Cousin records an MBCPA for the SLT adjusted by MBLz-HRPN of the Referenced OU—both MBLx and the MBLy-HRPNs will be established by the SLT's MBCPA. If, however, MBLz-HRPN computed in this manner is less than MBLz-HRPN of the SLT, MBLy-HRPN is incremented by 1. A Ref to a preceding 2nd Cousin at an MBLy-HRPN that is less than or equal to MBLy-HRPN of the SLT records the subject's MBCPA in the same manner as a Ref to a 1st Cousin.

A Ref, however, to a preceding 2nd Cousin at an MBLy-HRPN that is greater than the MBLy-HRPN of the SLT records an MBCPA with MBLx and MBLy equal to the SLT but the MBLz-HRPN of the MBCPA is recorded as 1, the BPP on the next shelf.

The aligned OU with the subject of the transaction is referred to as the Aligned Referent (AR). The AR must be a Nephew, recorded in the PHSOU Stack, of the current Parent.

Detailed Description for 1032

The Procedure 1032 is shown in FIG. 36.

Step 01 reestablishes the MBCPA of the SLT, recorded in PV-MBCPA, in MBCPA. 52 through 05 control the segregation of the AR into the two groups described just above. 52 and 03 evaluate the AR as being a 1st or 2nd Cousin. 03 compares the MBL1-HRPN of the MBCPA of the AR[3] to that of the SLT, recorded in MBCPA, to segregate references to 1st and 2nd Cousins of the SLT. If the MHR, as recorded in the EPS HR Register, EHR, is not greater than 2, this is a mute evaluation. 02 evaluates EHR. If, based on 02, the EHR is 2 or less, or, based on 03, the MBL1-HRPN of the MBCPA of the AR equals that of the SLT the relational reference is a Group 1 reference and these two evaluations direct processing to 05. If, however, the MBL1-HRPN of the MBCPA of the AR does not equal that of the SLT, 03 directs processing to 04. 04 compares MBL2-HRPN of the MBCPA of the AR[4] to that of the SLT. If the evaluated MBL2-HRPN of the AR by 04 is not greater than that of the SLT, the AR is also a Group 1 reference and 04 directs processing to 05. If the evaluated HRPN of MBL2 of the AR by 04 is, however, greater than that of the SLT, the AR is a Group 2 AR and 04 directs processing to 09.

[3] The ARD is recorded in TEA(1) with the SFC, but in TEA(0) with the SLC.
[4] ibid.

Group 1 Steps: 05 copies for Group 1 ARs the MBLz-HRPN of the AR, recorded in PHSOU as referenced per the OUUI in TEA(1)[5], to MBLz-HRPN of MBCPA to establish a preliminary MBCPA for the subject OU. (Step 06 not used.) As explained, recording the position of a Group 1 AR records the subject OU in the Parent of the SLT. But this permits the computed MBLz-HRPN of the Aligned subject to be recorded within any position within the Parent of the SLT. This can result in recording the position of the subject OU in the same position as the SLT or any of its just recorded Sister OUs. To avoid this situation, 07 compares the MBLz-HRPN of the MBCPA recorded in MBCPA, to that of the SLT. If MBLz-HRPN recorded in MBCPA is less than or equal to that of the SLT, 07 directs processing to 08 to increment the MBLy-HRPN in MBCPA by 1 to advance the subject OUP to the BPP of the subsequent, contiguous PHL Homogen. 08 directs processing to 12. If MBLz-HRPN recorded in MBCPA is greater than that of the SLT, 07 directs processing to 12.

[5] ibid.

Group 2 Steps: 09 copies for Group 2 ARs the MBLy-HRPN of the AR, recorded in PHSOU as referenced per the OUUI in TEA(1)[6], to MBLy-HRPN of MBCPA to establish a preliminary MBCPA for the subject OU. 10 copies 1 to MBLz-HRPN of MBCPA to establish the subject OU in the BPP of the subsequent, contiguous PHL Homogen. (11 not used.)

[6] ibid.

Step 12 copies the OUUI of the subject OU, recorded in TEA(0)[7], to the standard row and tier in Ref for the subject OU. 13 initiates the ReliA-EH-CP General Completion procedure (1050) to complete the processes common to the primary ReliA-EH-CP processes as well as those common to the CPam processes in general.

[7] The subject OU will be in TEA(1) when the SFC is used.

1033—ReliA-EHR-CP-SLT-Skip Validation Procedure (SLT-Skip Validation procedure)

This procedure (1033), as shown in FIG. 35, also referred to as the SLT-Skip Validation procedure (1033) supports the user ReliA-EHR-CP-SLT-Skip process. The ReliA-EHR-CP-SLT-Skip process is intended as a basis for recording the position of an OU subsequent to a vacant OUP where the ReliA-EHR-CP process or ReliA-EHR-CP-pC-Aligned process cannot be used by the user.

The User Process: The user initiates the process within EPS-CP by recording the OUUI of a Sister OU recorded in the PHSOU Stack. The OUs recorded in the manner are termed Skip Talliances. The user can continue to record Skip Talliances, in any direction, to establish the desired Skip Count Tally (SCT). While the first Skip Talliance must be a Sister OU recorded in the PHSOU Stack, successive Skip Talliances can be any OU recorded in the PHSOU Stack. The SLT, however, cannot be referenced, except to void the current transaction. The maximum SCT is established by the number of cells in TEA. After recording the SCT to correspond to the number of positions to be moved from the SLT, record the OUUI of the subject OU.

The ReliA-EHR-CP-SLT-Skip Validation procedure (1032) will record the MBLz-HRPN of the subject OU as being the MBLz-HRPN of the Skip Referent plus the SCT.

For example, if the OUP of the SR, the SLT in the case of the ReliA-EHR-CP-Skip process, is 2 and a SCT is 2, the subject OU will be recorded in OUP 4. If the OUP computed in this manner exceeds EPOUPN(HLz) of the SLT's Parent the EPPN will be subtracted from the resulting value for MBLz-HRPN and the MBLy-HRPN will be increased by the value of one. This wrapping of the position through successive PHL Homogens will continue until the maximum SCT is reached. A ReliA-EHR-CP-SLT-Skip process transaction can be aborted by referencing the SLT. After the subject OU is recorded successive transactions will revert to the general EPSI-CP state.

In summary, the process records the SLT automatically as the Skip Referent (SR) and counts the successive Skip Talliances to determines the MBCPA of the subject OU.

The ReliA-EHR-CP-SLT-Skip procedure uses a special screen to communicate in real time the status of the skip transaction. The TEA of course reflects the TES entries recorded, but the computed MBCPA is not displayed for the current transaction until the current transaction is fully validated. The user may also need to refer to the SR and the cumulative Skip Tally Count as an aid to completing the transaction. The Skip Process Standard Window is a supplemental window to the ReliA Standard Display. It is used in the validation procedures of both Skip processes: this procedure and the ReliA-EHR-CP-pC-Skip Validation procedure (1034), presented below. The Skip Process Standard Window comprises the OUP MBCPA, as per the MBCPA, the current OUP the Subject will be recorded if no further Skip Talliances are recorded, the SD as per the SDR, and the SCT as per the STR.

01 establishes the MBCPA of the SR as the MBCPA of the SLT, using the PV-MBCPA as the MBCPA of the SLT. 02 establishes for the Skip Direction Register (SDR) as EDR automatically. An SDR value of+1 indicates the SD is Forward. 03 evaluates the EPS TD Register (EDR). If the EDR is negative 04 directs processing to 04 to signal the user audibly that the SD is Backward. If SDR is positive, 03 directs processing to 05 to signal the user audibly that the SD is Forward. 06 initiates for the display of the Skip Process Standard Window. 07 communicates to the user visually that the ReliA-EHR-CP-SLT-Skip Process is indicated and provides direction for completing the transaction. 08 initiates the SCT function (1071) to tally the Skip Talliances, update the MBCPA for SCT recorded, and display the updated MBCPA. 09 initiates the ReliA-EH-CP General Completion procedure (1050) to complete the processes common to the primary ReliA-EH-CP processes as well as those common to the CPam processes in general.

1034—ReliA-EHR-CP-p,C-Skip Validation Procedure

This procedure (1034) as shown in FIG. 36 supports the user ReliA-EHR-CP-pC-Skip process, The ReliA-EHR-CP-pC-Skip process provides for recording of a Sister or Cousin OU in a position subsequent to the SLT. It is intended as the basis for recording the position of an OU subsequent to a vacant OUP where the ReliA-EHR-CP, ReliA-EHR-CP-pC-Aligned, or the ReliA-EHR-CP-SLT-Skip processes cannot be used.

In summary, the process records the first relational reference as the Skip Referent (SR), establishes the SD of the transaction based on the Skip Direction Referent (SDR), the next relational reference recorded, establishes an initial Skip Talliance for the same relational reference, counts the successive Skip Talliances and determines the position of the subject OU. Changes in the HRPN of the MBLy hierarchy are ignored in determining the SD.

User Process: In summary, (1) record a preceding cousin as a SR, (2) record successive preceding Cousin or Sister OUs in the PHSOU as Skip Talliances to establish the number of positions to be skipped the SCT for the transaction, and (3) record the subject OU, the subject OU of the transaction. The direction of the skip is determined by the direction of the first Skip Talllance relative to the SR. MBLX-HRPN.

The SR must be a 1st or 2nd Cousin, a non-Sister Homogen, of the SLT. The SR establishes the MBLz-HRPN of the subject OU. The MBLX-HRPN and MBLy-HRPN of the subject OU will be the same as the SLT. To minimize the Skip Talliances that must be recorded the SR should be close to the aligned position, MBLz-HRPN, of the Skip subject OUP, but still allow the user to move in the direction of the desired Skip to the first Skier Talliance.

The HRPN at either the MBLX or MBLz-HRPN of the MBCPA of the First Skip Talliance must be greater than or less than that or SR so as to establish the SD for the skip. If the MBLX-HRPN of the first Skip Talliance equals MBLX-HRPN of the SR, the MBLz-HRPN, i.e., the SR and the Skip Talliance/Direction Referant are 1st Cousins (MHR less than three), the first Skip Talliance must be greater or less than the MBLz-HRPN of the SR. If the MBLX-HRPN of the first Skip Talliance is greater or less than the MBLX-HRPN of the SR, the equality (or non equality) of the SR and first Skip Talliance at MBLz-HRPN does not matter. The SD will be established by the difference in the MBLX-HRPN of the SR and first Skip Talliance.

Continue recording Skip Talliances to establish the SCT for the transaction. Record the OUUI of any OUs recorded in the PHSOU stack; other than the SLT, in any direction to record a Skip Talliance. The total number of Skip Talliances recorded in this manner establishes the SCT. The maximum SCT is established by the number of cells in the TEA. After recording the SCT to correspond to the number of positions to be moved from the SR, record the OUUI of the subject OU.

The ReliA-EHR-CP-pC-Skip process will record the position of the subject OU as being MBLz-HRPN of the SR plus or minus the SCT as dictated by the SD established for the transaction. If the SCT exceeds the EPP or is less than one, the BPP has been reached. In either of these cases, the process will wrap the position into the subsequent, contiguous PHL Homogen. SkpA will be added to MBLz-HRPN of the MBCPA if the SD is Forward. If the resulting value exceeds the MBLz-EPOUPN of the SLT's Parent, the EPPN will be subtracted from the resulting value for MBLz-HRPN and the MBLy-HRPN will be increased by the value of one. This wrapping of the position through successive PHL Homogens will continue until the maximum SCT is reached. SkpA will be subtracted from MBLz-HRPN for the SR if the SD is −1 (negative 1) i.e., Backward. If the resulting value is less than the value of one, the EPOUPN (MBLz) of the SLT's Parent, will be added to the resulting value for MBLz-HRPN and the MBLy-HRPN will be increased by the value of one.

Step 01 establishes the MBCPA of the SR. It copies all but the lowest MBL of the MBCPA of the SLT, recorded in PV-MBCPA, to their corresponding MBLs in MBCPA, and copies the lowest MBL of the MBCPA of the SR in PHSOU, as identified by the OUUI in TEA(1)[8] to the corresponding MBL in MBCPA. 02 updates and displays TES3, the first Skip Talliance and the Skip Direction Referent (SDR) [TES3 was evaluated by the TET Evaluation function (0172) at 1030-17 of the ReliA-EH Processes Evaluation procedure (1030)] to TEA(2), updates the TEB and updates TAR as 2. 03 initiates the Skip Direction Determination function (1072) to determine the direction of the SDR relative to the SR and establish this in the Skip Direction Register (SDR). 04 initiates for the display of the Skip Processes Standard Window. 05 evaluates the SDR. If the SDR is −1, 05 directs processing to 06 to communicate by a distinctive audio signal and by display the SD is Backward. If the SDR is +1, 05 directs processing to 07 to communicate by a distinctive audio signal and by display the SD is Forward. Both 56 and 07 include a supplemental message to provide direction for completing the transaction. 08 initiates the SCT function (1071) to tally the Skip Talliances, update the MBCPA for SCT recorded, and display the updated MBCPA. 09 initiates the ReliA-EH-CP General Completion procedure (1050) to complete the processes common to the primary ReliA-EH-CP processes as well as those common to the CP processes in general.

[8] The SRD is recorded in TEA(1) with the SFC, but in TEA(0) with the SLC

1050—ReliA-EH-CP General Completion Procedure

The objective of this procedure (1050) as shown in FIG. 37 is to complete the transaction processing of the primary ReliA-EH-CP processes: ReliA-EHA-CP, ReliA-EHR-CP-SLT-Skip, ReliA-EHR-CP-pC-Skip, and ReliA-EHR-CP-pC-Skip. This procedure (1) provides for validation of the subject OUUI and establishes the OURF and IMRF parameters of the subject OU, (2) provides for the evaluation and further incrementation of the MBCPA when the MBCPA computed by the ReliA-EH-CP validation procedures is an OUP outside the Parent of the SLT, (3) temporarily returns processing to OMA, and (4) initiates completion of the transaction with the standard process steps common to all CP processes.

Step 01 establishes the Transaction Tier Register (TTR), a Transaction Specific Register, to support the Ref Row 0 OURF and IMRF Update function (0173*) initiated in the next step. 02 initiates Ref Row 0 OURF and IMRF Update function (0173*) to validate the subject OU and establish in Ref the OURF and IMRF Parameters needed to fully identify the subject OU. 03 initiates the ReliA-EH-CP-PA Completion procedure (1060) to validate the position of the subject OU computed by the primary process. The ReliA-EH-CP-PA Completion procedure (1060) advances, as appropriate, the HRPN in each MBL of the MBCPA to the BPP for each MBL in which the HRPN exceeds the EPPN for the MBL. The PA Completion procedure continues this as long as the Guardian of the MBCPA computed in this manner is the Matriarch or an MDA for the subject OU. If this completion procedure (1060) finds that the EPPN for a MBL is exceeded it will direct the processing that completes the transaction. 04 initiates the OMA Call function (9902*) which returns processing temporarily to the OMA to allow it to collect any additional parameters needed by the OMA to complete the SBFT that initiated the ReliA process. 05 initiates the CPTU & C procedure (0830) to perform those steps of the ReliA process common to all ReliA-CP sub-processes.

1060—ReliA-EH-CP-Parent Advancement Completion procedure (Including Parent Advancement Function, the procedure is also termed the PA Completion procedure)

The ReliA-EH-CP-PA Completion procedure as shown in FIG. 38–39 is a support procedure for the primary ReliA- EH-CP processes. The primary objective of the PA Completion procedure (1060) is to advance the position of the subject OU to the first position of the next PHL Homogen whenever a subject OU is otherwise recorded in a position that exceeds the EPPN of the Parent of record for the SLT. A supporting objective of the PA Completion procedure (1060) is to reestablish a complete MSL for the subject OU of the transaction and complete the ReliA-EH-CP transactions when the function advances the subject OU to a subsequent PHL Homogen. The function of advancement includes more than just advancing the subject OU to first position of the subsequent, contiguous PHL Homogen. The objective includes advancement of the subject OUP to the first OUP of all Ancestor OUs of the SLT for which their EPPN has been exceeded in the advancement, the OUP of each new Ancestor in the MSL of the subject OU. These objectives were previously described as the PA function. The ReliA-EH-CP-PA Completion procedure (1060) also supports the unique process completion of the enabled process that must be completed in most respects in a manner that closely corresponds to validation and completion steps used for the enabling processes for CPam.

The operation of the primary objective of PA function is illustrated by two successive transactions, described by Case A and Case B.

Case A, Non Parent Advancement

Case A represents a simple illustration of the PA function. It illustrates a part of the equipment system described for Case A of the URTA-CP function. In the case here, however, the equipment system is composed of only one suite, with Origin OUs of A1. The suite comprises two bays, each bay comprises two shelves and each shelf comprises two slots. The EPPN of each of these items is, therefore, 2. The system consists initially of components at the lowest hierarchy of the described system represented by OUs Q through S.

If B1 is used as the Matriarch, the MHR of B1 for Homogen Subjects Q, R, and S, is 2.

This is pictured as follows:

Illustration: Case A

| Slot | 1 | 2 | 1 | 2 |
|---|---|---|---|---|
| Suite 1 | A1 | | | |
| Bay: | | B1 | | B2 |
| Shelf 1 | C1 | Q | R | |
| Shelf 2 | C2 | S | | |

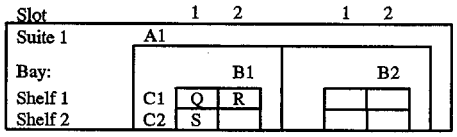

If a transaction to record Q has been completed and the TES to record the position of R has just been entered, Ref will reflect the Matriarch and MDA for Subject Q, the SLT as of the conclusion of the last transaction. The MBCPA will be for subject OU, R, at the conclusion of a ReliA-EH-CP process, such as ReliA-EHA-CP, but before initiating the PA function. Reference and MBCPA are illustrated as follows:

Reference, Case A

|  | Row | MBL | OUUI | Guardian | HL1 | HL2 | HL3 |
|---|---|---|---|---|---|---|---|
| Tier 2 | 0 | 0 | B1 | | | | |
|  | 1 | 1 | C1 | B1 | 01 | | |
|  |  |  |  |  |  |  |  |

MBCPA, Case A

| HL1 | HL2 | HL3 |
|---|---|---|
| 01 | 02 | |

The Lowest Generation Tracked Ancestor (LGTA) remains as the Guardian of the SLT, Q, at MBL1. There is no change in the MSL other than the subject OU itself, from that of the last transaction, so there is no need to update the MDAs.

Case B, Parent Advancement

If the transaction to record R has been completed and the TES to record the position of S has just been entered, Ref will still be the same as described for Case A. The MBCPA, however, for Subject R for the current transaction at the conclusion of a ReliA-EH-CP process, such as ReliA-EHA-CP OUP, but before initiating the PA function is as follows:

Reference, Case A

|  | Row | MBL | OUUI | Guardian | HL1 | HL2 | HL3 |
|---|---|---|---|---|---|---|---|
| Tier 2 | 0 | 0 | B1 | | | | |
|  | 1 | 1 | C1 | B1 | 01 | | |
|  |  |  |  |  |  |  |  |

MBCPA, Case A

| HL1 | HL2 | HL3 |
|---|---|---|
| 01 | 03 | |

The LGTA of the SLT in this case is the Matriarch B1. The Guardian of the SLT, C1 at MBL1 is displaced, so there is a requirement to renew the MDAs in Ref.

The operation of the primary objective of PA Completion procedure (1060) is further illustrated by Case C and Case D where advancement of the subject OUP occurs in multiple generations of Ancestors with a single transaction.

Case C, Advancement to the BPPN of Multiple Ancestors

Case C represents an extension of Case A and B above. In the case here, the equipment system described in Case A now has additional OUs, through U, with OU, U, installed in the second bay of A1. This is pictured as follows:

Illustration: Case C

| Slot | 1 | 2 | 1 | 2 |
|---|---|---|---|---|
| Suite 1 | A1 | | | |
| Bay: | | B1 | | B2 |
| Shelf 1 | C1 | Q | R | C3 | U |
| Shelf 2 | C2 | S | T | C4 | |

When the transaction for U is recorded, the initially computed MBCPA for U is 01/02/03. Recognizing that the EPPN at MBL3 has been exceeded would update the MBCPA to 01/03/01. This reflects the advance of the subject OUP to the next PHL Homogen at MBL2 within the Grandparent at MBL1 of the SLT. But there is no position for another Parent in the Grandparent of the SLT; the EPPN of MBL2 of the Matriarch is exceeded as well as the EPPN of MBL3 of the Matriarch. The PA function recognizes this and updates the MBCPA from 01/03/01 to 02/01/01, recording the advancement of the subject OUP into a new Grandparent, B2, as well as a subsequent PHL Homogen, C3.

Case D—All OUPs Completed

If there were additional OUs to fill up all positions in the two Bays of Case C, an additional advancement can occur at MBL3 again into the last Parent at MBL2, C4, but an additional advancement cannot occur at MBL2 again into a Parent at MBL1, because there are no additional OUPs at MBL1. If a subsequent transaction is recorded after completing the transaction for X in Case D, illustrated below, the PA function must not accept the transaction and the EPS should be disabled.

Illustration: Case D

| Slot | 1 | 2 | | 1 | 2 | |
|---|---|---|---|---|---|---|
| Suite 1 | A1 | | | | | |
| Bay: | | B1 | | | B2 | |
| Shelf 1 | C1 | Q | R | C3 | U | V |
| Shelf 2 | C2 | S | T | C4 | W | X |

Part 1—Recomputing the MBCPA

The recomputation of the MBCPA for the SLT for the subject OU, in the first part of the PA function, uses a loop to iteratively evaluate the EPPN of each successive Ancestor of the SLT. As long as an evaluated Ancestor's EPPN is exceeded, the OUP of its immediate Component, represented by the HRPN, is changed to 1, the HRPN of the Parent is increased by 1, and the processing on the loop continues until all HLs of the MBCPA are. Thus, the processing follows a bottom up evaluation process. The procedure uses the Interim UMDAHR Register, IUR, to iteratively evaluate the HRPNs at each MBL of the MBCPA. Note that the loop evaluates the HRPNs of the MBCPA and not subject or Ancestor OUs. The HRPNs represent only OUPs.

The MBLs of the Matriarchy are represented relative to the Matriarch at MBL0. The MBL of the OU being evaluated is, therefore, represented by the MHR, less the value given by the Interim UMDAHR Register (IUR). As the MHR is represented by the EPS HR Register, EHR, the MBL of the HRPN being evaluated is therefore (EUR–IUR). This is represented as $MBL_{hu}$, ($HL_{hu}$ in the Data Dictionary and flowchart) where hu=(EHR–IUR). The field of the next higher HL, representing the Parent of the OUP being evaluated, the Parent of the OUP at the MBL being evaluated is represented by $MBL_{hu}$, where hu"=(EHR–IUR–1).

The field/cell of EPOUPN that corresponds to the MBL of the OUP being evaluated is similarly represented as $MBL_{hu}$-EPPN. The fields of EPOUPN are established by the End of Parent Determination function (0671).

Step 01 initiates IUR as 0. 52 through 04 loop to successively evaluate the HLs of the MBCPA computed by the validation procedures for the ReliA-EH-CP processes. 02 compares the $MBL_{hu}$-HRPN of the MBCPA of the subject OU to the $MBL_{hu}$-EPPN in EPOUPN. If $MBL_{hu}$-HRPN of the MBCPA does not exceed $MBL_{hu}$-EPPN, 02 directs processing to 03 to increment (EHR–IUR) for the next higher MBL. 04 compares IUR to EHR to identify when MBL1 of the MBCPA has been evaluated. If MBL1 is reached without the EPPN being exceeded at any MBL, 04 directs processing to return to the initiating ReliA-EH-CP procedure. If on any iteration of the loop 02 $MBL_{hu}$-HRPN of the MBCPA exceeds $MBL_{hu}$-EPPN, 02 directs processing to 05 to initiate Parent advancement.

Step 05 through 12 evaluate the MBL being advanced to the EASP, advance the MBL to the EASP, increment the next HL, and reevaluate the incremented Parent position against its $MBL_{hu}$-EPPN. 05 compares the value in IUR to EHR to determine if the Parent of the HL of the MBCPA being advanced, to the EASP equals (lower HL than) MBL1. If (EHR–IUR), representing the MBL in the MBCPA being evaluated is 1, no further HLs of the MBCPA may be evaluated. If the MBL equals 1, therefore, an error exists. In this case 05 directs processing to 56, 07 and 08 which disable the EPS-CP, initiate the E & R function (0171*) and report the error. If the MBL is less than 1, 05 directs processing to 59 and 10 to update the MBCPA.

Steps 09 and 10 update the HRPNs for the HL of the OUP being evaluated and its Parent. 09 updates the $MBL_{hu}$-HRPN, to the BPP1. 10 increments the HRPN of the Parent of the OUP being advanced, $MBL_{hu}$-HRPN by 1. 11 and 12 increment the IUR and compare the HRPN of the next HL of the MBCPA, $MBL_{hu}$-HRPN after the HL incrementation to $MBL_{hu}$-EPPN as in 02. If the $MBL_{hu}$-HRPN, of MBCPA exceeds that of EPPN, 12 directs processing back to 04 to continue on the loop. If the $MBL_{hu}$-EPPN of MBCPA does not exceed that of EPPN, the fist part of the procedure supporting the primary objective of advancing of the subject OUP to the first OUP of each new Ancestor in the MSL is completed.

Whenever the Parent is advanced, whether by the primary process or by the PA function, the GrDHR of the SLT may be exceeded. If the GrDHR of the SLT is exceeded the MSL of the SLT must be reestablished for the MBCPA of the subject OU so all tracked Ancestors of the subject OU will be identified and established in Ref. 13 compares the highest MBL, $MBL_{hu}$, penetrated by the change in MBCPA to the MBL of the Guardian of the SLT. If the $MBL_{hu}$ penetrated by the change in MBCPA equals or exceeds the $MBL_{hu}$ of the Guardian of the SLT the MSL needs to be reestablished. Otherwise 13 directs processing to return to the initiating procedure.

Part 2—Renewal of the MSL

The renewal of the MSL follows fairly closely the process steps used by the validation and completion procedures used by the ReliAM-CP process with the same functional objective of establishing the MSL and enabling subsequent EPS processes. Part 2 initiates the renewal of the MSL in Ref, updates the MVs for the EPS potentially affected by the change in the MSL and other enabling process type steps, and initiates the transaction's update and close.

Steps 14 and 16 set up the necessary registers and initiate the URTA ID function (0570). 15 copies the rows of the primary EPS tier in Reference back to the second tier of Reference, so MSL in the primary EPS tier is preserved. 17 through 20 (step 19 is not used) follow many of the steps of the ReliAM-CP-Validation procedures (0331 and 0332) to establish the MDA in Reference and related EPPNs in EPPN. 21 through 22 communicate to the user the Parent advancement and the TD 24 to 27 follow many of the steps of the CP Enabling Processes Completion Procedure to complete the validation procedure for PA.

1071—Skip Count Tally Function (SCT Function)

Figure 40:
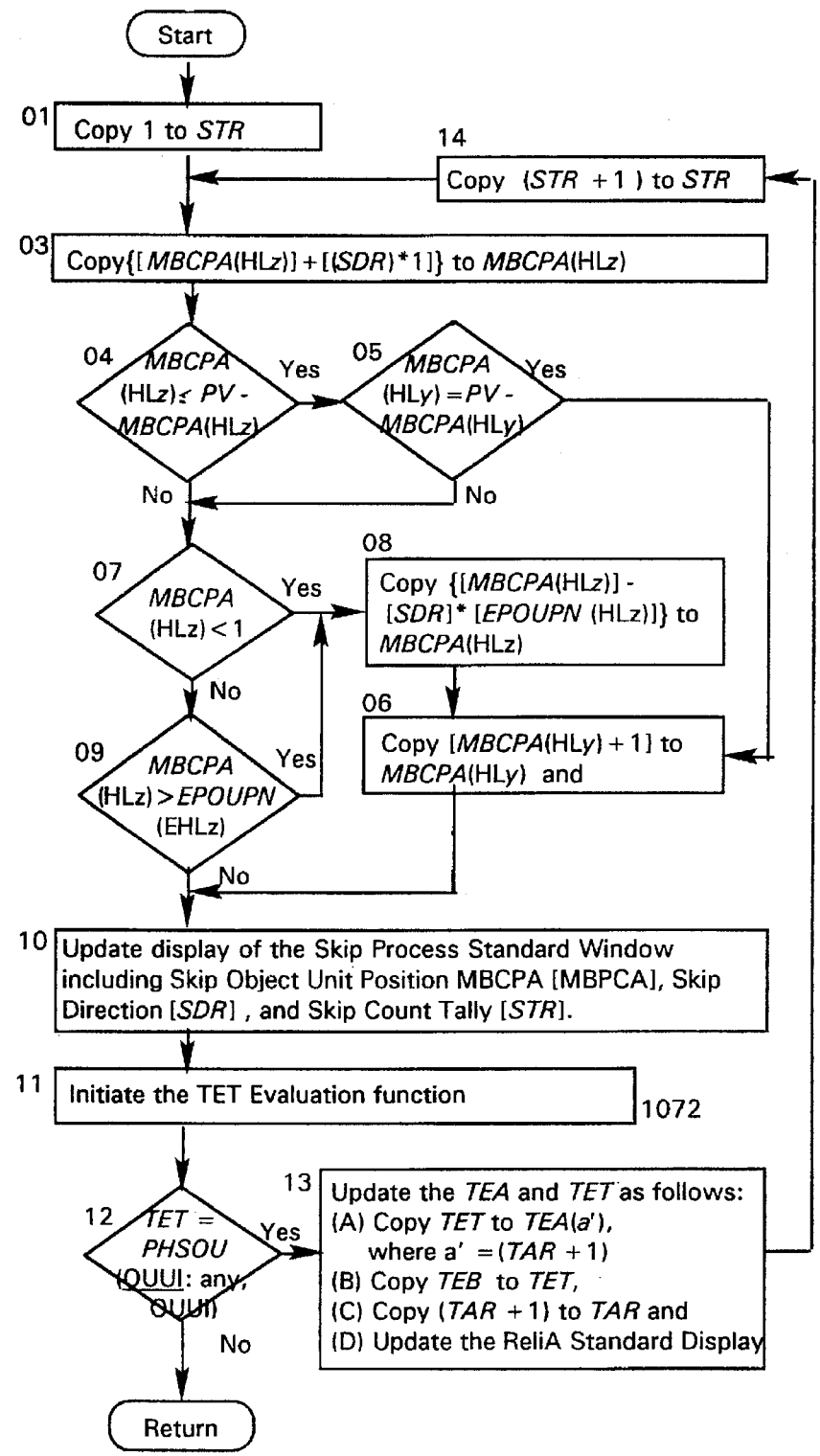

The objective of this function (1071) as shown in FIG. 40 is to tally the Skip Talliances and update the MBCPA of the SR based on each Skip Talliance recorded. This function (1071) supports both the ReliA-EHR-CP-SLT-Skip and the ReliA-EHR-CP-pC-Skip validation procedures. The Skip Tally will often just incremerit the Skip OUP MBCPA to a successive OUP within the same parent. When the Skip OUP is /an OUP other than this straight forward case, however, the Skip OUP MBCPA must be advanced into the subsequent PHL Homogen of the SLT. When the Skip OUP number exceeds the EPPN of the Parent, the SD is presumably positive so the Skip OUP needs to advance to the BPP of the subsequent, contiguous PHL Homogen. When the Skip OUP number is less than 1 the SD is presumably negative so the Skip OUP needs to advance to the EPP of the subsequent (based on a Backward TD), contiguous PHL Homogen. When the Skip OUP is that of a preceding Sister OUP of the SLT, the advancement is presumably into the next PHL Homogen of the SLT, as in the ReliA-EHR-pC-Aligned process so the Skip OUP MBCPA is advanced to the corresponding OUP of that PHL Homogen. Having a Skip OUP of a preceding Sister OUP of the SLT is not an issue with ReliA-EHR-CP-SLT-Skip process because the SD in this process can only be positive. In the ReliA-EHR-CP-pC-Skip process, however, the SD can be negative, so the Skip OUP MBCPA determined by this process can be for an OUP that is in a preceding Sister OUP of the SLT. This negates the unidirectional characteristic of ReliA transaction processing as it allows a current transaction to orphan a Sister OU just recorded.

Step 01 copies 1 to STR to initialize the register. (02 is not used.) 53 through 08 update the Skip OUP MBCPA based on the Skip Talliances recorded. 03 updates the Skip OUP MBCPA (adjusted MBCPA). It updates the lowest MBL of MBCPA by adding the value in SDR, +1 (plus 1) or −1 (negative 1) to the existing value in the lowest MBL of MBCPA. 54 thorough 05 test to determine if the Skip OUP MBCPA represents a preceding Sister OUP of the SLT so the Skip OUP MBCPA Can be referated to the corresponding position in the next PHL Homogen, to the SLT. 04 compares the HRPN of the lowest MBL of the adjusted MBCPA to the HRPN of the corresponding MBL of the MBCPA of the SLT, recorded in PV-MBCPA. If the HRPN of the lowest MBL of the adjusted MBCPA is less than or equal to the HRPN of the corresponding MBL of the SLT this indicates that potentially the Skip OUP MBCPA is an OUP of a previously recorded Sister of the SLT. To test this 04 directs processing to 05 to determine if the Parent of the Skip OUP MBCPA equals the Parent of the SLT. If the HRPN at the second lowest MBL of Skip OUP MBCPA equals the HRPN at the second lowest MBL of the SLT, the OUP is in a preceding Sister OUP. In this case 05 directs processing to 06 to increment the OUP to the same position in the subsequent, contiguous PHL Homogen. If, based on the evaluations at 54 and 05, the Skip OUP MBCPA is a preceding Sister OUP of the SLT this function (0171) directs processing to 06. If based on either of the evaluations at 54 and 05 the Skip OUP MBCPA is not a preceding Sister OUP of the SLT the function directs processing to 07. 06 increments the HRPN of the second lowest MBL of MBCPA to that of the next PHL Homogen and then directs processing to 10. 07 tests the HRPN of the lowest MBL of MBCPA. If the HRPN is less than 1, 07 directs processing to 08 to adjust the HRPN of the lowest MBL of MBCPA to the EPPN of the Parent of the SLT and then to 06. If the HRPN is 1 or greater 07 directs processing to 09 tests the HRPN of the lowest MBL of the MBCPA. If the HRPN is greater than the EPPN for the lowest MBL of the Parent of the SLT, 09 directs processing to 08 to adjust the HRPN of the lowest MBL of MBCPA to the EPP of the Parent of the SLT and then to 06. If the HRPN is less than or equal to the EPPN, 09 directs processing to 10 and updates display of the Skip Process Standard Window previously described. 11 through 12 evaluate the next entry of the TES to determine if it is a PHSOU and the function's steps should be repeated. 11 initiates the TET Evaluation function (0172) previously described. 12 compares the TES entry in TET to the OUUIs recorded in PHSOU. If TET is an OUUI recorded in PHSOU, 12 directs processing to 13 to update the TEA and TET as previously described, to 14 to increment STR back to 03 to repeat the function's loop. If TET is not an OUUI recorded in PHSOU, 12 directs processing to the initiating program.

1072—Skip Direction Determination Function

The objective of this function (1072) as shown in FIG. 41 is to determine the direction of the SDR relative to the SR of the ReliA-EHR-CP-Skip processes. Changes in direction between these two relational references along the axis of the highest and lowest MBL of the MBCPA only are recognized. Furthermore, changes in direction along axis of the highest MBL of the MBCPA are recognized only when the MHR is 3. Thus, changes in direction along the second lowest MBL of the MBCPA are not recognized. When the MHR is 3, a change in direction along the axis of the highest MBL of the MBCPA will dominate over a change in direction along the axis of the lowest MBL of the MBCPA.

In summary, the function tests, (1) where the MHR is 3, for (2) a change in the HRPN at the highest level of the MBL between the SR and the SDR. If there is a change, the direction indicated establishes the SD for the transaction. If there is no change at that level, or the MHR is less than 3, the function repeats the test on the HRPNs for the lowest level of the MBL of the two determinants.

Step 01 evaluates the MHR recorded in EHR. When the MHR is 3 the function compares the HRPN of the highest MBL of MBCPA, where MBCPA represents the SR, TES2[9], to the HRPN of the corresponding MBL of the MBCPA of the SDR, TES3[10], recorded in PHSOU as identified by TEA(2) [11] 02 tests for a Forward SD. When the HRPN of the highest MBL of the SR is less than the corresponding HRPN of the MBL of the SDR the skip referent is preceding, so 02 directs processing to 08 to set the SD to +1 (positive one). 03 tests for a Backward SD. When the HRPN of the highest MBL of the SR is greater than the corresponding HRPN of the MBL of the SDR the skip referent is subsequent, so 03 directs processing to 09 to set the SD to −1 (negative one). If there is no difference in the HRPN of the highest MBL of the MBCPAs for the SR and the SDR, 03 directs processing to 04. 04 tests for a positive SD at the lowest MBL of the two determinants. When the HRPN of the lowest MBL of the SR is less than the corresponding HRPN of the MBL of the SDR the skip is Forward, so 04 directs processing to 08 to set the SD to +1 (positive one). 05 tests for a negative SD at the lowest MBL. When the HRPN of the lowest MBL of the SR is greater than the corresponding HRPN of the MBL of the SDR the SD is Backward and 05 directs processing to 09 to set the SD to −1 (negative one). If there is no difference in the HRPN of the highest MBL of the MBCPAs for the SR and the SDR, 05 directs processing to 56 and 07 to initiate the E & R function (0171*) and report the error identified in 06. 08 establishes the SD as Forward by initializing the SD Register (SDR) as +1 (positive one). 09 establishes the SD as Backward by initializing the SDR as −1 (negative one). Both of these steps direct processing to 10 which returns processing to the initiating program.

[9] TES1 using the SLC
[10] TES2 using the SLC
[11] TEA(1) using the SLC

1300—ReliAQ Processes Evaluation and Validation Procedures

The ReliAQ processes are enabling and confirmation processes for the ReliA-EH processes. The ReliAQ processes in the preferred embodiment are all based on two user referents with a location address of record that meets the predefined relationship requirements. In the ReliAQ-OL process the two referents must be Homogen Origin OUs (i.e. have the same UBELA/UBOLA). In the ReliAQ-CNP processes the first referent must be a Component OU and the second referent must be either a Homogen OU (ReliAQ-CNP-CC) or the Guardian OU of the first referent.(ReliA-CNP-CG). The second referent defines the Guardian in both processes. The ReliAQ-CNP processes require the Guardian Item CAI be true and LATCHL=0 as a validation check. In the ReliAQ-CP processes the first referent must be the First Object Unit in its Parent (FOUP) or the Last Object Unit in its Parent (LOUP). The second referent can be any Homogen (ReliAQ-CP-CC) or a tracked Ancestor within three Hierarchy Levels the fist referent (ReliAQ-CP-CM). If the second referent is an Ancestor of the first it is the Matriarch referent. The second referent will define the Matriarch for both processes. If the second referent is a Homogen, the lowest common tracked Ancestor of the first and second referents will be the Matriarch referent for EPS-CP. The ReliAQ-CNP processes require Matriarch Item CAI be true and LRTHCL>0 as a validation check. When the relational and validation check requirements are meet as described for each ReliAQ process AM the ReliAQ process is enabled and the EPS is established for the AM. The first referent in all AMs of the ReliAQ processes is designated the SET and SLT for the EPS. The ReliAQ-CP-CC process can establish TD for the EPS-CP. If the first referent is a previous Homogen of the second referent the TD will be established as Forward. If the first referent is a subsequent Homogen of the second referent the TD will be established as Backward.

If the ReliAQ-CP-CM is validated and ate next TES entry is a GBL1-HRPN the ReliAM-CP-DM is indicated (1300) The ReliAQ Processes Evaluation procedure as shown in FIG. 42–43 evaluates directly or indirectly the TES for ReliAQ and associated processes to determine when a ReliAQ process is indicated. Once a ReliAQ process is indicated, the appropriate ReliAQ procedure is initiated to validate the indicated process and complete the transaction.

The preferred embodiment maintains only one TD. The ReliAQ-CP-CC-Backward process can thus establish a Backward TD for just the lowest HL of the Matriarchy and potentially apply the Backward TD to all hierarchies of a an established Matriarchy for an EPS-CPA restriction imposed on the Backward version of this process is that the Determinant Referent must be the Last OU in Parent. (LOUP) within its Parent OU and the Enabling Reference OU must be the First OU on Parent (FOUP) with its Parent OU. So the transaction recording starts with the last OU of a Parent and proceeds in the direction of the first OU of the Parent—the Enabling Reference OU.

The preferred embodiment initiates the ReliAM-CP-Descendant Processes Validation Initiation procedure (0331) when a Component-Ancestor relationship is identified. A ReliAM-CP-Descendant processes is indicated by the ReliAQ evaluation and validation procedures. When TES2, of a TES is identified as a tracked Ancestor (within three Parent generations) of TES1 of the TES.

ReliAQ-CP Processes Evaluation Procedure

The ReliAQ process uses the two TES entries that characterize the ReliAQ process and the OUR for their OUs and their Ancestors as a basis for identifying a specific ReliAQ process that may be executed by the user and initiates validation of any ReliAQ process indicated. The order of evaluation in this procedure (1300) should in general evaluate TES1 and TES2 for the most frequently occurring addressing methodologies first and the least occurring type last. This has to be tempered by the extra processing that is required for CPam OUs. Where CPam is not clearly dominating another type of AM, the CP evaluation should be deferred in the ReliAQ evaluation procedure.

The preferred embodiment for this procedure (1300) evaluates for the ReliAQ-OL processes, first then the ReliAQ-CNP processes, and finally the ReliAQ-CP processes. Accessing the Ancestor records for TES1 and TES2 is thus deferred until after the ReliAQ-OL and which can be identified without accessing the Ancestor records to identify the execution of these two processes.

In the preferred embodiment the determinate referent is recorded in TES1 and the second referent is recorded in TES2.

The ReliAQ-CP procedures require that successive generations oft racked Ancestors of at least the subject OU, if not the referent OU, be established in memory and evaluated to determine if TES2 is a tracked Ancestor of TES1, or if a common tracked Ancestor at the same lineage generation exists on the OURF for TES1 and TES2. This process is performed by the Common Ancestor and Generation Evaluation function (1371) also termed the CAGE function (1371) a key ReliAQ supporting process with a lineage completion role similar in part of the objective to the URTA ID function (0570) in the ReliAM process. If TES2 is a tracked Ancestor of TES1 a ReliAM-CPprocess, as explained, is indicated. If a common Ancestor at the same lineage generation is established, the ReliAQ Processes Evaluation procedure (1300) evaluates the relative OUP of TES1 and TES2. When TES1 is in the FOUP the ReliAQ-CP-CC-Forward process is indicated. When TES1 is in the LOUP of its Parent the ReliAQ-CP-CC-Backward process is indicated.

Detailed Description

ReliAQ-OL Evaluation: 01 and 02 evaluate the Guardian of TES1 and TES2 for a null Guardian, indicating the OUs for the OURs of TES1 and TES2 are Origin OUs. 03 copies the UBOLA in the OLARF for both TES1 and TES2 to row 1 of Reference, tier 1 and 2 respectively, with their OUUIs and Reference-OURF parameters previously established in the row$^{12}$. 04 compares the UBOLAs in Ref for TES1 and TES2. If the UBOLAs are equal the ReliAQ-OL process is indicated and the ReliAQ-OL Validation procedure (13 10) process is initiated. Otherwise the ReliAQ Processes Evaluation procedure (1300) is continued.

[12] ReliA General Evaluation Process

ReliAQ-CNP Evaluation 56 and 07 evaluate TES1 and TES2 for a null GBL1-HRPN indicating the OUs for the OURs of TES1 and TES2 are CNPam OUs. 08 compares the Guardian OUUI recorded on the OUR of both OUs as a basis for identifying the specific ReliAQ-CNP process. If the Guardian OUUIs are the same, with TES1 having a null GBL1-HRPN, the ReliAQ-CNP-CC process is indicated and the ReliAQ-CNP CNP Validation procedure (1320) is initiated. 09 evaluates TES2 a Guardian of TES1. When TES2 is a Guardian of TES1, with TES1 having a null GBL1 -HRPN, the ReliAQ-CNP-CG process is indicated and the ReliAQ-CNP CNP Validation procedure (1320) is likewise initiated. Otherwise the ReliAQ Processes Evaluation procedure (1300) is continued. The null condition requirement of evaluation 57 and 08 serve to limit the ReliAQ-CNP process to enabling OUs that are not addressed as CPam OUs.

Common Ancestor and Generation Evaluation: The remaining ReliAQ to be evaluated are the CPam processes. These processes allow for considerable diversity of relationships between TES1 and TES2. The ReliAQ-CP-CC processes allow the enabling OUs to be Sisters, 1st Cousins, or 2nd Cousins with a common tracked Ancestor (with 3 generations of the subject and its Homogen referents) with the MR methodology employed in the preferred embodiment. 11 initiates the CAGE function (1371) to establish in memory for the Ancestors of TES1 and TES2 the Ancestor OU's Reference-OURF Parameters (Ref-OURF Params*) and reviews these records to determine if TES2 is a tracked Ancestor of TES1 or if a common tracked Ancestor at the same lineage generation exists on the OURF for TES1 and TES2 within three generations of the subject OU. The CAGE function (1371) also evaluates for a ReliAM-CP processes and initiates, where indicated, the ReliAM-CP-Descendant Processes Validation Initiation procedure (0331). When a common Ancestor at the same generation is not found and a ReliAM-CP process is not indicated all ReliAQ and associated (ReliAM-CP processes) processes are contraindicated as ReliAQ Processes, so the CAGE function (1371) returns processing to the GE procedure (0100) to continue with the next step after initiation of this evaluation procedure (1300).

While a common Ancestor at the same generation has been identified at this point, so a ReliAQ-CP-CC process is indicated, this evaluation procedure (1300) continues to evaluate the relative position of the TES1 to determine if the FOUP or LOUP requirement for the ReliAQ-CP-CC processes has been met.

ReliAQ-CP-CC-Forward Evaluation: 14 through 19 test the relative position of TES1 for the FOUP within its Parent.

12 and 13 establish the OUUI and ReliA CPA of TES1 in TestR-CPA. 14 evaluates the HRPN of the lowest GBL, the GBL equal to the MHR for the transaction [represented by either QHR(0) or QHR(1) as established by the CAGE function (1371)]. If the HRPN is 1, TES1 is the FOUP and ReliAQ-CP-CC-Forward is indicated. Otherwise the ReliAQ-CP-CC-Forward Evaluation successively decrements the HRPN of the lowest GBL by 1 and compares the resulting ReliA CPA in TestR-CPA to the ReliA CPAs on the OURF, 16. If an OUR exists with this ReliA CPA the ReliAQ-CP-CC-Forward is contra indicated. If an OURF does not exist with this ReliA CPA and the HRPN of lowest GBL for the ReliA CPA is greater than 1, as evaluated by 17, the loop is continued with 15. If the HRPN of lowest GBL for the ReliA CPA is not greater than 1, the TES1 is the FOUP and ReliAQ-CP-CC-Forward is indicated. When the ReliAQ-CP-CC-Forward is indicated, 18 sets the TD Register, TDR, to 1, and 19 initiates ReliAQ-CP Completion. When ReliAQ-CP-CC-Forward is contra-indicated the ReliAQ Processes Evaluation procedure (1300) process continues to evaluate TES1 for the ReliAQ-CP-CC-Backward process.

The ReliAQ-CP-CC-Backward Evaluation: The Backward evaluation serves to test the relative position of TES1 as being in the LOUP within its Parent. It follows the general process of the ReliAQ-CP-CC-Forward Evaluation.

Other significant departures from the evaluation for FOUP is the test parameter used. The maximum test parameter for the LOUP, in 23 and 26 is the EPPN of the Parent rather than the BPP, 1, used by the ReliAQ-CP-CC-Forward process. The EPPN the Parent OUs in each Guardian is provided by the IMR for the Guardian. The Guardian can have a different EPPN at each HL. The EPPN for each MBL is represented on the IMRF by column EHL1 for each allowed GBL. The specific EHL1 needed for a particular subject OU is established by the GrDHR of the Subjects Guardian OU. 22 establishes in TLR the specific EHL1 need as the difference between the MBL of the subject OU and its Guardian OU. 23 establishes this parameter, the EPPN of the Guardian Item TES1, in TestEPN, by linking the OUUI of the Guardian of TES1, via the OUR of the Guardian to establish the Item ID of TES1's Guardian Item.[13] 24 evaluates the success of the query. If the EPPN is not found for EHL1 an error exists[14], processing cannot continue without the EPPN. 25 reports the error, and 26 initiates the E & R function (0171*) to abort the transaction and recycle.

[13] Address for the Guardian EHL1=IMRF(Item ID:Guardian Item ID, EHL1) where Guardian Item ID=OURF {OUUI:Guardian OUUI, Item ID} and where Guardian OUUI=[Ref(0,0, Guardian]
[14] Error is ostensibly on the IMRF, but all intermediate variables above can be in error as well.

Other departures from the evaluation for FOUP are as follows: the OUUI of TES1 was established in TestR-CPA by 12. The HRPN of the lowest GBL, however, was adjusted so 21 reestablishes this in TestR-CPA. While 15 decrements the HRPN of the lowest GBL to advance this HRPN to the FOUP, 24 increments this HRPN to advance it to the LOUP.

When the ReliAQ-CP-CC-Backward is indicated, 31 sets TDR, to 0, and 32 initiates ReliAQ-CP Validation procedure (1330). When ReliAQ-CP-CC-Backward is contra-indicated all ReliAQ process are contra-indicated, as the ReliAQ processes evaluations are sequenced in the preferred embodiment in this ReliAQ Processes Evaluation procedure (1300), so 29 directs processing to return to the GE procedure (0100) to continue with the GE procedure (1300).

1310—ReliAQ-OL Validation Procedure

The ReliAQ-OL process as shown in FIG. 44 is the ReliAQ process applied to the OLam. The initial steps of this process were included in the GE procedure (0100). There TES1 and TES2 were validated and their OURF and IMRF parameters were established in Ref in the first row of the first and second tiers respectively. The ReliAQ Processes Evaluation procedure (1300) found that TES1 and TES2 have a common UBOLA (or UBOLA) and established the common UBOLA in UBOLA. The transaction was validated for the ReliAQ-OL process when indicated by the ReliAQ Processes Evaluation procedure (1300).

Step 01 of the validation procedure initiates the OMA Call function (9902*) to temporarily return processing back to the OMA, so any additional parameters required by the OMA for the transaction can be collected. The transaction at this point is fully validated. 02 communicates to the user that the enabling transaction is fully validated. A distinctive audio signal should signal enabling of EPS-OL and confirm, therefore, a valid transaction. Visual confirmation should be used as a training aid to signal to the user that the location address for the transaction was based on the ReliAM-C-DM process.

03 initiates the EPS Preserve and Clear function (0774*) to preserve the EPS-MVs and lineage of the last previously validated transaction, if any. 04 sets up EPS-Q as true created by the ReliAQ-CNP process to control processing ha subsequent enabled CNP processes. 05 copies the OURF and IMRF parameters for the subject OU to the primary EPS tier of Reference to preserve these parameters for the EPS-OL. 06 initiates; the OL Enabling Processes Completion procedure (0710), shared with the Universe-OL-Manual process, to direct the remaining steps of the ReliAQ-OL process.

1320—ReliAQ-CNP Validation Procedure

The ReliAQ-CNP process as shown in FIG. 45 is the ReliAQ process applied to the CNPam. In the preferred embodiment of the ReliAQ-CNP process, the user records the OUUI of the subject OU for the transaction and a reference in TES1 and TES2, respectively. The user can use as a reference either the Guardian of the subject OU or a Homogen of the subject OU with a common Guardian of the subject OU. The common Guardian established for an EPS is termed a Matriarch.

The procedure described here for the validation of the ReliAQ-CNP process supports both the Component-Component and the Component-Guardian form of the ReliAQ-CNP process: ReliAQ-CNP Component-Component process (ReliAQ-CNP-CC process) and the ReliAQ-CNP Component-Guardian process (ReliAQ-CNP-CG process).

The initial steps of this process were included in the GE procedure (0100). There TES1 and TES2 were validated and their OURF and IMRF parameters were established in the first row of the first and second tiers respectively of Ref. The ReliAQ Proceseses Evaluation procedure (1300) found that TES1 and TES2 have either a common Guardian OUUI or that TES2 is the Guardian of TES1.

In summary, the validation procedure for this process performs three primary validations:. (1) Identify and validate a Guardian OU for the subject OU of the transaction; (2) Validate that components are allowed for the Guardian OU; and (3) Validate that Component Non-Positioning is required for the Matriarch OU.

Beyond the validations, the procedure initializes the EPS using the CNPam.

Steps 01 through 04 of this procedure identify and validate the Guardian-Matriarch OU. In both the ReliAQ-CNP-CC process and the ReliAQ-CNP-CG the OUUI of the Matriarch will always ways be the OUUI of the Guardian of the subject OU, recorded in row 0 of tier 0 of Ref. 01 copies the UUI of the Guardian OU, of TES1, in row 0 of tier 0 of Ref to the subject OUUI field in row 1 of tier 0 of Ref. 02 tests for the Component-Guardian form of the ReliAQ-CNP process. If the Guardian OU of the subject OU was referenced in TES2, 02 directs processing to 04 to copy the OURF and IMRF parameters already established in Ref to the second row of the subject lineage tier of Ref. Otherwise, 02 directs 03 to validate the OUUI of the Guardian and copy the Guardian OU's OURF and IMRF parameters from the OURF and the IMRF to the same row in Ref. (Step 05 is not used.) Step 06 verifies that components are allowed for the Guardian. 06 evaluates the Component Allowed Indicator (CAI) for the Guardian to verify that tracked components are allowed for the Guardian Item. If CAI is false, tracked referencing Descendants are not allowed, and 06 directs processing to 57 and 08 to initiate the E & R function (0171 *), report the nature of the error, and abort the transaction. Otherwise, 06 directs processing to 09. 09 verifies that CNP is allowed for the tracked referencing Descendants of the Guardian and evaluates LRTCHL to verify that CP is not allowed for the Guardian Item. If LRTCHL is greater than zero, the CNPam is not allowed, and the ReliAQ-CNP process, therefore, is not allowed, so 09 directs processing to 10 and 08 to initiate the E & R function (0171 *). (Steps 12 and 13 not used) 14 initiates the OMA Call function (9902*) to temporarily return processing back to the OMA to collect any additional parameters required for the transaction before the completion steps are initiated for the transaction. 15 communicates to the user audibly and visually that the TES entries and subsequent entries initiated by the OMA, if any, have been validated The remaining steps initialize the EPS using the CNPam. 16 initiates the EPS Preserve and Clear function (0774*) to preserve the previous Guardian OU parameters and clear the EPS tiers of Ref for the update Lineage. 17 initializes the Quick Enabling Process Indicator (EPS-Q) to suppress certain test in subsequent enabled transactions based on the more reliable record information that will generally be indicated by the ReliAQ enabling relative to ReliAA enabling. 18 transfers the Guardian OU's OURF and IRMF parameters from a G-TSMV tier of Ref, to the standard Guardian position in Ref for an EPS, to the primary EPS tier of Ref, row 0, of tier 2. 19 initiates the CNP Enabling Processes Completion procedure (0720) to perform the tasks common with the ReliAA-CNP process to complete the transaction.

1330—The ReliAQ-CP Validation Procedure

The objective of this procedure (1330) as shown in FIG. 46 is to validate a transaction recorded by ReliAQ-CP process as indicated by the ReliAQ Processes Evaluation procedure (1300), set up the necessary MVs, and after the transaction is fully validated establish an EPS-CP and close the transaction. The Quick CP processes in the preferred embodiment are comprised of: ReliAQ-CP-CC-Forward, and -CC-Backward.

Ref is completed for the G-TSMV tiers, tier 0 and tier 1 for the Guardian's of the two referents.

QRR(0) and QRR(1) are established as the Transaction Row References for tier 0 and 1 respectively. As the ReliAQ processes complete Ref from the bottom up, the Transaction Row Registers track for the ReliAQ processes the Matriarch Row rather than the Guardian Row.

Key Issue Relative to ReliAM-CP Processes:

The use of the tiers and rows of Ref when filled by this ReliAQ-CP Validation procedure (1330) is a significant departure from the use of the tiers and rows of Ref when filled by the procedure used for ReliAM-CP processes [see ReliAM-CP-Descendant Processes Validation Initiation procedure (0331)]. This procedure (1330), using the CAGE function (1371), completes the rows of Ref from the bottom up. Thus, the rows in Ref are inverted relative to their hierarchical level and to the order Ref is completed by the ReliAM-CP validation procedures using the URTA ID function (0570). Furthermore, only tier 0 represents the lineage of TES1, the subject OU, where as tier 1 represents the lineage of TES1, so all further Transaction Row References will use tier 0. After the applicable ReliAQ-CP process is fully validated the ReliAQ-CP process copies and inverts the rows of tier 0, excluding the Subject row, row 0, to tier 2 so subsequent usage of parameters for the Ancestors, in an EPS, will be consistent between this procedure and procedures used for ReliAM-CP processes.

These comments are true for the ReliAQ-CP Component-Ancestor process as well as the ReliAQ-CP Component-Component processes. While TES2, representing the Matriarch was initially recorded in row 0 of tier 1, it was subsequently established in the row equal to TTR of tier 0 before the ReliAQ-CP Component-Ancestor process was indicated. Thus, the Matriarch will be in the row equal to TTR of tier 0 regardless of which ReliAQ-CP process is used, so this validation procedure (1330) is a common procedure for both of the basic forms of the ReliAQ-CP process. This procedure (1330) also supports both the ReliAQ-CP-CC-Forward and -CC-Backward processes as the only differentiation of these two forms of the Component-Component basic ReliAQ-CP process was recorded in the TDR as +1 or −1 for Forward and Backward respectively. Where the FOUP or the LOUP was recorded for TES1, TES1 is the subject OU. Only the direction used for recording of subsequent transactions is different.

Some validations (validation functions) used in the preferred embodiment of the ReliAA/ReliAM processes as described for the ReliAM-CP validation procedures (0331 and 0332) are not used by ReliAQ-CP validation procedure to save processing time. These functions are represented in ReliAM-CP validation procedures by the LRTCHL and LATCHL Evaluation function (0473*), and the Addressing Methodology Evaluation function (0472*). The LRTCHL and LATCHL Evaluation function (0473*) validates the number of HRPNs in the MBCPA against a minimum and maximum HR for the tracked Ancestors in the MSL. The Addressing Methodology Evaluation function (0472*) validates that the Subject and Reference Row Relationships In Reference for the ReliAQ-CP Processes

| Row | Tier 0 | Tier 1 |
|---|---|---|
| 0 | Subject | Homogen or Matriarch referent |
| 1 | Subject Guardian | Homogen or Matriarch referent's Guardian |
| 2 | Subject's Guardian's Guardian | Homogen or Matriarch referent's Guardian's Guardian |
| 3 | Subject's Guardian's Guardian's Guardian | Homogen or Matriarch referent's Guardian's Guardian's Guardian |

CP is valid based on the Guardian established, or reestablished, by the transaction. The first two validation functions minimize errors that may be injected incorrectly by recording manually the MBCPA, an integral element of the ReliAM-CP-DM process. The applicability of the Addressing Methodology Evaluation function (0472\*) to ReliAQ-CP process is similar. Because the ReliAQ process indication is based on recorded OUs, the risk controlled by these validation functions are deemed minor risks for the ReliAQ-CP processes and the validation functions are not included in the preferred embodiment of the ReliAQ-CP processes.

Detailed Description

Step 01 sets up the transaction specific Registers: 01A sets the Transaction Tier Register, TTR to 0, because only tier 0 represents the lineage of TES1, the subject OU[15]. 01B sets the Transaction Matriarch Row Register, TMR, equal to QRR(0) to track the Matriarch Row[16]. 01C initiates the Transaction Guardian Row Register (TGR) as equal to 1, the second row of Reference—the subject is recorded in row 0. 01D sets the Transaction MHR Register, THR equal to QHR(0). 01E sets the Transaction Descent Bearing Register, TBR, to −1 (minus 1) to track the successive rows in Ref of hierarchical descent from the Matriarch row[17]. 02 initiates IRR as equal to TMR to initialize the row register needed for the End of Parent Determination function (0671) initiated next.

[15] This is a departure from the procedure used for the ReliAM-CP-Manual process where the lineage was established in tier 1 from the Matriarch recorded in row 0 as TES2.

[16] This is a departure from the procedure used for the ReliAM-CP processes where the TRR represents the Guardian Row.

[17] This is a departure from the procedure used for the ReliAM-CP processes. As the Quick process is bottom up the rows in Reference for tier 0, as well as tier 1 are inverted when compared to the ReliAM-CP processes.

Step 03 initiates the End of Parent Determination function (0671) to establish the EPPN for each HL of the MBCPA. This sets an ending position or capacity limit of each Parent in the MBCPA as a basis for validation of the MBCPA calculated for subsequent transactions and PA when the HR of the MBCPA allows it. 04 initiates the SBL to MBL Conversion function (1372\*) to convert HLs recorded in the MBL column of Ref established using a Subject Based Ancestor Hierarchy Level (SBL) reference system, based on the first row of tier 0, to a MBL reference system, based on the Matriarch now established in the last row of tier 0. 05 initiates the Ancestor IMRF Update function (9901\*) to validate the ItemID of the Ancestors in Ref above row 0 and complete the fields of these rows with the Reference-OURF Parameters[18]. With the validation of Item IDs of the track Ancestors in the MSL of the subject OU the TES of the ReliAQ-CP process is fully validated. The transaction in which it is used, however, is fully validated only after the OMA Call function (9902\*). 06 initiates the MBCPA Construction function (1373) to construct the MBCPA for the subject OU. This completes the G-TSMVs for the ReliAQ-CP process. 07 initiates the OMA Call function (9902\*) to return processing of the transaction to the OMA. With the return of processing by the OMA the transaction is fully validated. 08 evaluates the TDR, to determine whether the Forward or Backward form of ReliAQ-CP process has been established so that this can be communicated to the user. 59 and 10 communicate to the user that the TES entries and subsequent entries initiated for by the OMA, if any, have been validated. In addition to visual display as a learning aid to users, two unique audio tones communicate to a user not looking at the computer display the status of the TES. The first audio tone must signal that the transaction was validated as CP so the user will know to use the appropriate CPam processes in subsequent transactions under the EPS. The second tone depends on the value in TDR. 09 initiates for the second tone to signal Backward Direction Positioning (TDR=−1). 10 initiates for the second tone to signal Forward Direction Positioning (TDR=1).

[18] The Item IDs of TES1 and TES2 recorded in row 0 of tier 1 and 2 were previously validated and the Reference-OURF Parameters copied to these records.

The remaining process steps establish the EPS-MVs for the EPS-CP. 11 initiates the EPS Preserve and Clear Function (0774\*) to preserve the currently established EPS primary MVs to the secondary EPS-MVS and clear the primary EPS-MVs. 12 initiates the indicator for EPS-CP and the EPS-Q Indicator. 13 initiates the Matriarch-Guardian Tier Inversion function (1374\*) to copy and invert the order of the rows in tier 1, excluding row 0, to the primary EPS tier of Ref, tier 2. 14 sets up the EPS registers from their Transaction Specific counterparts. TGR=TMR −1 due to the inversion and omission of the Subject row in the Matriarch-Guardian Tier Inversion function (1374\*). 15 Initiates the CP Enabling Processes Completion procedure (0730). This procedure directs the steps common to all the CP Enabling processes and initiates the CP TU & C procedure (0830) to complete the process steps for all OMA transactions common to enabling and EPS enabled processes.

1371—Common Ancestor and Generation Evaluation Function (CAGE Function)

The object of this function (1371) as shown in FIG. 47 is to establish in memory and review the Ancestor records of TES1 and TES2 to determine if TES2 is a tracked Ancestor of TES1 or if a common tracked Ancestor at the same lineage generation relative to the OUs referenced in TES1 and TES2 exists on the OURF. This function (1371) is a key function in the evaluation and validation of ReliAQ processes. Its role relative to the ReliAQ-CP process is similar to the role of URTA in the ReliAA-CP-Manual and ReliAM-CP-DM processes. Both functions establish the MHR for the transaction and the EPS resulting from the fully validated transaction. In general both functions identify intermediate, unreferenced Ancestors of the subject OU. This CAGE function (1371) is different in that it establishes intermediate or unreferenced Ancestor records in the MSL by chaining up from the Guardian referents of the OUs referenced in TES1 and TES2. The URTA ID function (0570) uses a top down based on the MBCPA established for the subject OU. The CAGE function is also different in that when it is successfully completed, it validates, based on the OURF, a complete lineage of Matriarch, successive referencing Descendant OUs for the subject OU in its MSL. When the URTA ID function (0570) is successfully completed, it establishes a complete lineage for the Subject OU. Also the CAGE function can establish the Matriarch, as the common tracked ancestor of two Homogen references. The URTA ID function (0570) requires that the Matriarch be supplied.

If TES2 is a tracked Ancestor of TES1, the ReliAQ-CP-CAF process is indicated. If a common Ancestor at the same lineage generation is established, the ReliAQ Processes Evaluation procedure (1300) evaluates the Relative OUP of TES1 and TES2.

Summary: The CAGE function (1371) controls the filling of Ref. Basically, the CAGE function fills the rows of one tier until the cumulative HR of the last row of the tier filled equals or exceeds the cumulative HR of the last row of the other tier. When the cumulative HR of the last row filled of both tiers are equal, it compares the record OU's UUI. If the last row filled of both tiers are unequal, the CAGE function continues the alternative filling of the tiers in the same manner until the cumulative HR of the last row filled of both tiers are equal, the number of rows equal three, or the cumulative HR equals three. As each row in tier 0 is completed, the CAGE function also compares the OUUI of that row to TES2, recorded as the OUUI in row 0 of tier 1.

This function (1371) and two subsidiary functions together represent three loops: an outer and two inner loops. The outer loop is represented by the CAGE function itself. It evaluates the last rows completed for equality of the cumulative HR and the UUIs of the OU for the record and controls the tier that will be evaluated by the two subsidiary functions on the next loop. One of the inner loops is the Reference Row Fill and Evaluation function (1382). For the established tier, this function fills the next row with the parameters needed to evaluate that row, increments the row register, and if tier 0 is the established tier it evaluates for the ReliAQ-CP-CAF process. The other inner loop is the HR Evaluation function (1381). This function determines the GrDHR of each Ancestor in the lineage and the cumulative HR of all Ancestors in lineage for the TES entry recorded in OUUI of row 0 for the tier. The objective of this function (1371) is to evaluate the last rows filled and evaluated for equality of the cumulative HR and the UUIs of the OUs for the records and control the tier that will be evaluated by the two subsidiary functions on the next loop.

Registers used by the CAGE function: This function (1371) and its subsidiary functions use the following registers: TTR is used to establish the tier to be evaluated by the two subsidiary functions. Value for this function (1371) are limited to 0 and 1. QRR(0), QRR(1) are used to establish the last row filled and evaluated by the Reference Row Fill and Evaluation function (1382). There is a separate Row Register for each tier: QRR(0) for tier 0 and QRR(1) for tier 1. The Reference Row Register in the subsidiary functions established by TTR will also be shown as QRR(TTR) or QRR(t). QHR(0), QHR(1) are used to establish the cumulative HR with the last Ancestor evaluated by the HR Evaluation function (1381). There is a separate cumulative HR Register for each tier: QHR(0) for tier 0 and QHR(1) for tier 1. The cumulative HR Register in the subsidiary functions established by TTR will also be shown as QHR(TTR) or QHR(t).

Detailed Description of CAGE function: 01 initiates the memory registers used by the CAGE function. It also sets up the value of 0 for the MBL of both tiers of Reference to simplify the completion of the ReliAQ processes when indicated. Reference-OURF Parameters for row 0 of both tier 0 and 1 of Reference were completed by the GE procedure (0100). 02 initiates the HR Evaluation function (1381) to calculate the GrDHR of the Ancestor for the row and the cumulative HR of all Ancestors in the tier, QHR(TRR), as well as evaluate for the ReliAQ-CP-CAF process. 54 and 07 compare the two QHR registers. 54 through 10 control the evaluation of the GrDHR and OUUI for equality. As long as QHR for tier 0 exceeds QHR for tier 1 further processing will be initiated on tier 1. Otherwise, processing will be set on tier 0. The loop represented by the CAGE function (1371) will resume at 02.

The exceptions comprise: (1) When the two QHR registers are equal, evaluation 07, and the UUIs of the OUs for the rows determined by TRR for tier 0 and tier 1, evaluation 09, are equal, the common Ancestor at the same generation has been identified and this function (1371) is completed; (2) When the two OUUIs evaluated in 09 are unequal and the QHRs are greater than or equal to 3, a common tracked Ancestor at the same generation cannot be identified within the maximum GrDHR and MHR of 3 established for the preferred embodiment; and (3) In all cases where the QHR registers are unequal and QRR for the tier established by TTR is 3 or greater, evaluation 06, a common tracked Ancestor at the same generation cannot be identified within the maximum number of rows provided in Reference. (This is to be consistent with the maximum Guardian and MHR of 3 established for the preferred embodiment.)

In cases 2 and 3, the ReliAQ-CP process is contraindicated, so this function (1371) returns processing to the GE procedure (0100). When a common Ancestor at the same generation cannot be identified, 11 returns processing to the GE procedure (0100) to continue with the next step after initiating the ReliAQ Processes Evaluation procedure (1300). When a common Ancestor at the same generation is identified by 57 and 09, they direct processing back to the ReliAQ Processes Evaluation procedure (1300).

1372*—SBL to MBL Conversion Function

The objective of this function (1372*) is to convert a Subject Based Ancestor Hierarchy Level (SBL) to a Matriarch Based Component Hierarchy Level (MBL) based on the calculated Matriarch or the Matriarch referent provided by the user. The SBL used in the ReliAQ-CP process was established by the CAGE function (1371) based on the subject OU provided by the user. It is a bottom up Ancestor HL where as, the MBL is a top down component HL.

The Matriarch-Guardian Tier Inversion function (1374*) copies THR minus the existing SBL in MBL to the MBL for the Matriarch row and the successive referencing Descendent in each succeeding row of Ref.

1373—MBCPA Construction Function

The objective of this function (1373) as shown in FIG. 48 is to construct the MBCPA for the subject OU from the GBCPA of the subject and its tracked Ancestors recorded in Ref. The Matriarch-Guardian Tier Inversion function (1374*) computes the GrDHR for the each referencing Descendant of in the MSL in tier 0 of Reference and copies the GBCPA of the each referencing Descendant to the appropriate MBLs within the MBCPA. IRR is used to represent the current row of Reference being evaluated. The cumulative HR of the referencing Descendants previously evaluated by the function is represented by IIR. The GrDHR of the individual Descendant OUs is the MBL of an individual referencing Descendant's tracked Guardian minus the MBL of the individual referencing Descendent. The GrDHR of the individual tracked Descendants of the MSL is represented by TR1.

Step 01 initializes the register for the Interim IMDAHR, IIR. 02 initializes and the temporary row register, IRR as TMR−1 to start the construction of the MBCPA based on the GBCPA of the referencing Descendant of the Matriarch. 03 computes the GrDHR for the Descendant OU for the row represented by IRR. 04 copies the GBCPA of the current Descendant OU for the row to the specified range of MBLs of the MBCPA. The value of the range of MBLs included are represented by (IIR +1) to (IIR+TR1). This completes the processing for a individual Descendant for the current row represented by IRR. 05 accordingly updates the IMDAHR by adding the GrDHR to it. 06 evaluates IRR. If IRR is greater than 1, 06 directs processing to decrement to return to 03. If IRR is not greater than 1, 06 directs processing to 08. 08 tests IIR for equality with the Transaction HR, represented by THR. If the two registers are not equal an error exists. 09 reports the error and initiates E & R function (0171*). If the registers are equal the MBCPA construction is completed, and 11 returns processing to the initiating program.

1374*—Matriarch-Guardian Tier Inversion Function

The objective of this function (1374) is to copy and invert the order of the rows in tier 1 of Ref, excluding row 0, to tier 2. This establishes the order of the rows in tier 2 for an EPS so they are consistent with the order established by the ReliAA/ReliAM process. Simplifying subsequent access to the Ancestors and their parameters in the EPS. The function copies the Matriarch row, represented by TMR in tier 0 of Ref to row 0 of tier 2 and then successively copies the successive referencing MDAs in tier 0 to the next higher row in tier 2 until all rows of tier 0, except for the subject row, row 0, of tier 0 are copied in this manner to tier 2.

1381—The Hierarchical Reach Evaluation Function (HR Evaluation Function)

The objective of this function (1381) as shown in FIG. 49 is to determine the GrDHR of the Ancestor for the established tier and row and determine the cumulative HR of all Ancestors in lineage for the TES entry recorded inOUUI of row 0 for the tier. This evaluation function determines the GrDHR of the OU for the row by successively evaluating the fields for the HRPN s of the GBCPA for the Ancestor. The evaluation starts with the field for the lowest GBL, $3^{19}$, successively evaluating for a non-null field, in the next higher GBLs until a non-null field is found. The function uses TR1 to calculate the GrDHR of the individual referencing Descendants. TR1 is decremented from a starting value of 3, the value of the lowest GBL, as the fields for the HRPNs of successively higher GBLs are evaluated. The GrDHR of the Guardian/Ancestor is the value of TR1 when a non-null field is found.

[19] The lowest GBL of 3 is based on the maximum Guardian and Matriarch Hierarchical Reach of 3 established for the preferred embodiment.

Step 01 initializes TR1 as 3. 02 evaluates the TR1. If the TR1 becomes 0, the ReliAQ-CP processes are contra-indicated. Otherwise, 03 evaluates the HRPN field of the GBL established by TR1 for the ReliA CPA of the tier and row in Ref designated by TTR and QRR(t) respectively. If the HRPN field is null, 04 decrements TR1 and directs processing back to at 02, the start of the loop. If the HRPN field is not null, 05 copies TR1 plus the existing cumulative HR, represented by QHR(t), for the Ancestors in the tier to QHR(t). 06 evaluates the resulting value for QHR(t). If QHR(t) is greater than 3, the maximum HR for the preferred embodiment is exceeded and the ReliAQ-CP processes are contra-indicated. If QHR(t) is 3 or less, 07 returns processing to the initiating program.

1382—The Reference Row Fill and Evaluation Function

The objective of this function (1382) as shown in FIG. 50 is to fill the next row of the preestablished row and tier with the OUUI and Reference-OURF parameters needed to evaluate that row, increment the row register for the tier, and if tier 0 is the established tier evaluate the ReliAQ-CP-CAF process. The current tier, t, is preestablished as TTR The current row for the tier is preestablished as [BRR(t)].

The parameters needed for evaluation of the guardian of the OU recorded in QRR(t) are established as follows: 01 evaluates the Guardian referent in the tier and row established by TTR and QRR(t) respectively. If the Guardian referent is null, ReliAQ is contraindicated and processing is directed back to the GE procedure (0100). Otherwise, 04 copies the Guardian referent to the next row of Ref, [QRR(t) +1], as the OUUI of that row. 05 then copies the Reference-OURF Parameters on the OURF for the OUUI on that row on the same row. The next row is completed as 06 copies the cumulative HR represented by QHR(t) to MBL for the row. 07 then increments the Row Register, QHR(t). When the established tier by TTR is 0, 08 directs the processing to evaluate for the ReliAQ-CP-CAF process. 09 compares the OUUI of the newly completed row to the UUI of the OU for TES1 represented by OUUI in tier 0 and row 0 of Ref. If the OUUIs are equal the ReliAQ-CP-CAF process is indicated. If TTR is not equal to 0 or the two OUUIs evaluated by 09 are not equal, processing is returned by 12 to the CAGE function (1371). When the ReliAQ-CP-CAF process is indicated, 10 copies 1 to the TDR to establish the direction as forward. 11 then initiates the ReliAQ-CP Completion function.

**9901*—Ancestor IMRF Update Function**

The objective of this function is to complete the record of the tracked Ancestors in the MGL established in Ref with the Ref-IMRF Parameters, so the subject OU as well as the MBCPA entered or calculated for the current and any subsequent transactions can be efficiently validated. The Ref-IMRF Parameters are a set of IMR parameters, permanently maintained by Item ID on the IMRF for each Item ID. The Ref-IMRF Parameters is used extensively by the ReliA subprocesses to validate and control Subject, Homogen, or Ancestor relationships between OUs. The Ref-IMRF Parameters for the OUs in row 0, tier 0 or 1, of Ref were already established by the GE procedure (0100). This function (9901*) establishes Ref-IMRF Parameters for successive rows of the Matriarch-Guardian Tier of Ref with established Ancestors therein.

In summary, the Ancestor IMRF Update function (9901*) successively copies the Ref-IMRF Parameters from the IMRF to Ref, for the designated tier, for all Ancestor rows other than row 0. The function starts with row TTR and ends with completion of row 1. The direction of successive processing upward or downward through the lineage is not an issue. (0173*).

The Matriarch-Guardian tier is already established in TTR., and the highest row occupied by an Ancestor is established in the TRR. As the value in TTR needs to be preserved for subsequent processing 01 initializes a loop register, TR1, with the value in TTR. 52 and 03 evaluates and copies the Ref-IMRF Parameters from the IMRF for the Item ID of the tier and row represented by TTR and TR1 respectively to Ref-IMRF Parameters in the same tier and row. If the IMR for the Item ID is not found an error exists. In this case 52 and 03 directs processing to 54 and 05 to initiate the E & R function (0171*), report the error, and abort the transaction. Otherwise, 53 and 05 direct processing to 06 to evaluate the loop register. As long as the loop register is greater than 1, 06 directs processing to 07 to decrement the loop register and return processing back to 02. When the loop register is no longer greater than 1, i.e., the function has been completed for all rows down through row 1, 06 directs processing back to the initiating procedure.

**9902*—OMA Call Function**

The objective of this function (9902) is to interrogate an indicator maintained by the OMA that identifies when additional transaction parameters are to be collected to support procedure initiating the ReliA process. When such a flag is true, this function (9902*) returns processing to the OMA to collect the additional parameters required. If the OMA cannot validate the parameters it initiates the E & R Function (0171*).

Appendix A—Data Dictionary

Introduction

Certain Permanent File (Random Access) and MVs are required to support the preferred embodiment. The MVs are segregated into four classifications: Enabled Process Session Memory Variables (EPS-MVS); Independent Memory Variables; General Transaction Specific Memory Variables(G-TSMVs); and Post Validation Transaction Specific Memory Variables (PV-TSMVs).

EPS MVs store data that will be used by subsequent transactions—potentially through the entire EPS. TSMVs store data that will be used only for a specific transaction.

TSMVs are further divided into two groups: (a) pre-validation or general TSMVs or G-TSMVs and (b) Post Validation TSMVs or PV-TSMVs. The G-TSMVs store data which will be used only during the validation of the current transaction. They are cleared routinely as each transaction is validated. The PV-TSMVs store summarized data from the G-TSMVs which will be used to support the ReliA Standard Display and close the transaction to the OMA permanent records. Independent MVs are transaction related, but are not cleared routinely.

There is a special class of MVs, called registers, that are used to keep track of where data is stored or where the program is when a loop is involved. Registers fall in both the EPS-MV and PV-TSMV classifications. EPS Registers parameter are in general not cleared or changed until a new enabling process transaction is validated. Transaction specific registers support analysis of a the process used to record and validation of a specific transaction. Some of the Transaction Specific Registers, have EPS Register counterparts. Registers are identified by three letter titles ending in R. EPS Registers start with an E. Registers supporting a single transaction, transaction specific registers, start with a T, I or Q. Another broad class of MVs based on function are Indicators. Indicators are closely related to Registers. Indicators track the current or allowed status of a process or OU or Item. Indicators are identified by three letter tides ending in I.[21]

[21] Indicator Data Elements are either true or false. Format should be to true of false symbol used.

The Data Dictionary is divided into two parts. Part 1, Data Structure, provides a description of the MVs and the data structure of files and arrays used. Part 2, Data Element Format, describes the format of the data elements listed in Part 1. This file also includes the Standard Nomenclature and Icons used in flowcharts.

The flowcharts and related descriptions use certain names as row or column/field names that actually represent more than one individual row or column/field names. These column/field names that represent more than one individual row or column/field name are termed Column/Field Sets. Column/field Sets are used for frequently used sets of column/fields in an array. These sets are represented with an asterisk at the end of the name. The names of the individual columns/fields included a Column/Field Set are described by the array or file name with which they are used. These sets are as follows:

| | |
|---|---|
| ReliA CPA* | ReliA CPA |
| UBOLA* | Universe Based Origin Location Address |
| Ref-OURF Params* | Reference - OURF Parameters. |
| Ref-IMRF Params* | Reference - IMRF Parameters |
| MBCPA* | MBCPA |
| OU Descriptors* | OU Descriptors |

Independent Memory Variables

The Independent MVs are MVs that are transaction related, but they are not cleared as individual transactions are validated or closed. They support, except where the UBOLA or GBCPA must be entered manually, entry of the TES for successive transaction without a special user input to indicate that the TES of the transaction is completed. Independent MVs are cleared by the ReliA Processes whenever there is an error in an individual transaction.

TEB—Transaction Entry Buffer

A memory stack with an indefinite number of rows that holds the sequential user entries other than Fixed Command entries entered as command functions rather than relational or referable references or HEDCs or HRPNs from the key board or other input device. The ReliA process copies the oldest entry in TEB to TET only. As entry is copied to TET the entry in the TEB is cleared. Otherwise, the TEB is cleared only by the E & R function (0171) when a non recoverable error is identified, or by the HRPN Error function when an identified error is not recovered by a user option. The E & R function looks for new entries in the TEB as the basis for decisions made in that process.

Each entry in TEB represents a TES entry, a set of characters. Each TES entry is separated by a delimiter by the user whether input manually or with the aid of a bar code reader.

The ReliA process, used in the preferred embodiment, requires that the TEB accept TES entries for a transaction before all TES entries related to a previous transaction are cleared. Thus, if the first through nth TES entries in a transaction are referred to as TES1, TES2 ... TESn. then the TEB could comprise $TES2_a$, $TESn_a$, $TES1_b$, and $TES2_b$, at a particular point in time, where a represents transaction A TES entries and b represents transaction B TES entries. When $TES2_a$, is copied to TET and cleared TET could comprise $TESn_a$, $TES1_b$, and $TES2_b$, only as long as no additional TES entries have been recorded. If the user recorded TES1 to start a new transaction, transaction C, and again only $TES2_a$, had been cleared the TEB will consist of $TESn_a$, $TES1_b$, $TES2_b$, and $TES1_c$, where c represents the transaction C started.

The practical limit on the number of rows in the TEB will be a function of computer speed. The number of rows in the TEB should accommodate the maximum number of TES entries that will be recorded for a single transaction. This will normally be a ReliA-EH-CP-Skip process. The maximum number of Skip Count Talliances used in these processes will be a function of the EPPN of the Items in the user's environment.

The column/field is described as follows:

| Column Name | Full Data Element Name or Description | Format Name | Notes |
|---|---|---|---|
| TESn | TES number, where n is a function of a particular transaction rather than a row number in the TEB. | TES ENTRY | |

TET—Transaction Entry Test Memory Variable

TET is a single MV. It maintains the TES entry from the TEB that is being currently evaluated or will be evaluated next by the ReliA processes. It is updated automatically from the TEB as cleared by the ReliA evaluation and validation procedures.

| Row Name | Full Data Element Name or Description | Format Name | Notes |
|---|---|---|---|
| TET | Transaction Entry Test | TES ENTRY | |

General Transaction Specific Memory Variables (G-TSMV) T ansaction Indicators

The G-TSMV Indicators are individual MVs that maintain a record of key parameters of the current transaction.

| Column/Field Name | Full Data Element Name or Description |
|---|---|
| TXI | Transaction Error Indicator |

Registers

The registers associated with the G-TSMVs are MVs that maintain a record of the key parameters of individual transactions and support establishment and maintenance of the MSL in Ref for the Subject OU of each transaction. The EPS Registers are, in general, updated by the G-TSMV Registers. All of the G-TSMV Registers are individual MVs, except for the two registers associated with the ReliAQ Process: QHR and QRR. QHR and QRR are one dimensional arrays. They support the "simultaneous" common ancestor identification process in two different tiers that is characteristic of the ReliAQ-CP validation procedures.

| Register Name | Full Data Element Name or Description |
|---|---|
| IIR | Interim IMDAHR Register - Interim Identified Matriarch-Descendant Ancestor Hierarchical Reach Register. IIR tracks the cumulative HR of the Matriarch and Matriarch-Descendant Ancestors (MDAs) established in Reference as part of the MSL (MSL) of the MBCPA of the current transaction. |
| IRR | Interim Reference Row Register-IRR tracks the row in Reference being evaluated currently. |
| ISR | Interim Seconds Register (or Interim Time Register) - ISR tracks the elapsed time from the detection of an error, or other program identified event, for comparison to the maximum UNART anticipated for the user organization. |
| IUR | Interim UMDAHR Register - Interim Unidentified Matiarch-Descendant Ancestor Hierarchical Reach Register - IUR tracks the cumulative, or cumulative net, unreconciled HR of the MHR |
| QHR with QHR(1) and QHR(2) | Quick Hierarchical Reach Register (a one dimensional array, see comments below). QHR tracks the cumulative HR for the Ancestors of the Object Unit in row 0 of the specified tier in Reference. |
| QRR with QRR(1) and QRR(2) | Quick Row Register (a one dimensional array, see comments below) QRR tracks the row in Reference last evaluated for the specified tier in Reference |
| STR | Skip Count Tally Register - STR tracks the number of OUUIs recorded as a tally of the number of OUPs to be skipped to determine the OUP of the Subject OU by the ReliA-EH-CP Skip Processes. |
| SDR | Skip Direction Register - SDR tracks the direction of the skip OUPs: +1 is FORWARD DIRECTION, left to right, or top to bottom; and −1 is Backward Direction, Light to left, or bottom to top. SDR has no relation to EDR for consecutive transactions. |
| TAR | Transaction Entry Array Register - TAR tracks the number of the last validated TES entry recorded in the Transaction Entry Array for the current transaction. (Usage not consistently shown) |
| TBR | Descendant Descent Bearing Register. - TBR tracks the direction the MSL is recorded in Reference. +1 represents Matriarch in row 0 with Descendants in subsequent rows of the tier. Used in Reference by all processes other than ReliAQ. −1 represents an Object Unit in row 0 with Ancestors in subsequent rows of the tier. |
| TDR | Successive TD Register - TDR tracks the direction established by the transaction for successive transactions. +1 is FORWARD DIRECTION: left to fight, or top to bottom; and −1 is BACKWARD DIRECTION, or right to left, bottom to top. TDR for enabling processes updates the EPS TD Register (EDR). |
| TGR | Transaction Guardian Row Register - TGR tracks the row in Reference of the Guardian referent of the subject OU. In general TGR for enabling processes updates EPS Guardian Row Register (EGR). |
| THR | Transaction Cumulative Hierarchy Register/MHR Register) - THR tracks the cumulative evaluated HR of the transaction, which later becomes the MHR for the transaction. THR for EPS enabling processes updates the EPS Hierarchical Reach Register (EHR). |
| TLR | Transaction Lowest Generation Tracked Ancestor Register - TLR maintains the Lowest Generation Tracked Ancestor (LGTA) |
| TMR | Transaction Matriarch Register - TMR tracks the row in Reference of the Matriarch for EPS enabling process transactions |
| TR1 | Other Loop Count Register 1 - TR1 is used to count program loops. Its usage is not further generalized. |
| TR2 | Other Loop Count Register 2 - TR2 is used to count program loops. Its usage is not further generalized. |
| TRR | Transaction Reference Row Register - TRR tracks the last row of References established. TRR for enabling processes updates ERR. When Reference is completed for an Enabling Process transaction, it represents the Guardian Row in the ReliAA process and the Matiarch Row in the ReliAQ process. |
| TTR | Transaction Reference Tier Register - TTR tracks the tier in Reference of the Matriarch of the current transaction. |

QHR and QRR are both one dimensional arrays with two rows. The first row of both registers tracks the register parameter for the MSL in tier 0. The second row of both registers tracks the register parameter for the MSL in tier 1. A QHR or QRR address comprises the array name and the tier reference, t where t represents the Transaction Tier Register (TTR).

TEA—Transaction Entry Array

TEA is a one dimensional array[22] that records the valid TES entries recorded by the user for each transaction. The TEA should be displayed to the user as each entry in the TES is validated by the ReliA Process. This allows the user to review the recorded and validated entries made for the current transaction. Entries made by the user, but not yet validated are retained in the Transaction Entry Buffer (TEB). The most lengthy TESs occurs in the ReliA-EH-CP-Skip processes. The number of rows included in the TEA should allow the user to record Skip Count Tallies up to approximately the value of the greatest EPPN for the items in the user's environment. TEA is a one dimensional array. TEA and its rows are addressed by a combination of the file name and row number; row n is addressed as TES(n) where the array comprises rows addressed as follows:

| Row Name | Full Data Element Name or Description | Format Name | Notes |
|---|---|---|---|
| TESn | TES entry where n is the ordinal entry number and n is specified as starting with 1. | TES ENTRY | |

[22] The TEA closely parallels the TES. The TEA, however, represents edited or validated entries. The TES starts with the value 1, whereas the TEA starts with the value 0: TES1 equals TEA(0)

MBCPA—Matriarch Based Component Position Address Array

MBCPA maintains the MBCPA of the current transaction. MBCPA is a one dimensional array where the rows are addressed as follows:

| Row Name | Full Data Element Name or Description | Format Name | Notes |
|---|---|---|---|
| HL1 | MBL1-HRPN — 1 HieraRelational Position Number. The MBLn or MBLn is based on the Matriarch reference for the EPS or the current transaction if an enabling process. | MBL1-HRPN | |
| HL2 | MBL2-HRPN | MBL2-HRPN | |
| HL3 | MBL3-HRPN | MBL3-HRPN | |

[22] The TEA closely parallels the TES. The TEA, however, represents edited or validated entries. The TES starts with the value 1, whereas the TEA starts with the value 0: TES1 equals TEA(0)

| Row Name | Full Data Element Name or Description | Format Name | Notes |
|---|---|---|---|
| HL1 | MBLBCHL1-HRPN — Matriarch Based Component Hierarchy Level 1 HieraRelational Position Number. The MBLn or MBLn is based on the Matriarch reference for the EPS or the current transaction if an enabling process.[24] | MBLBCHL1-HRPN | |
| HL2 | MBLBCHL2-HRPN | MBLBCHL2-HRPN | |
| HL3 | MBLBCHL3-HRPN | MBLBCHL3-HRPN | |

When the entire MBCPA is acted upon in the program the MBCPA as a Component Position Address will be referenced to simply as MBCPA.

TestR-CPA—Test ReliA CPA Array

TestR-CPA is a one dimensional array where the rows are addressed by the ReliA CPA fields as follows:

| Row Name | Full Data Element Name or Description | Format Name | Notes |
|---|---|---|---|
| Guardian | Guardian referent | OUUI | (a) |
| HL1 | GBL1-HRPN. | GBL1-HRPN | (a) |
| HL2 | GBL2-HRPN | GBL2-HRPN | (a) |
| HL3 | GBL3-HRPN | GBL3-HRPN | (a) |
| Column/Field Set | | | |
| ReliA CPA* | ReliA CPA, the set of Column/Fields identified by (a) under notes | | |

TestEPN—Test EPOUPN Memory Variable

TestEPN is a single MV used by the ReliAQ Processes Evaluation procedure (1300) to test relative positions of TES1 and TES2 for First-Last and Last-First enabling.

| Data Element Name | Full Data Element Name or Description |
|---|---|
| TestEPN* | EPOUPN Test |

Post Validation Transaction Specific Memory Variables (PV-TSMVs)

The PV-TSMVs are MVs maintained, in general, just by the Transaction Update to support the Post Validation steps of the ReliA Processes. They are in contrast to G-TSMVs updated by the transaction evaluation and validation steps of the ReliA sub-processes. The PV-TSMVs along with some EPS-MVs support updating of the ReliA Standard Display, the OMA permanent record files, and support of the post transaction reversal process. The PV-TSMVs are cleared by the Transation Update and Close procedures separately from the clearing of the G-TSMVs cleared by the GE procedure (0100) once a new transaction is initiated.

| PV-Registers and Indicators | |
|---|---|
| Register Name | Full Data Element Name or Description |
| PV-TOR | Transaction Origin Register |
| PV-TZI | OMA Bypass Indicator |
| PV-TEI | Transaction EPS-New Indicator |

PV-Subject—Post Validation Transaction Subject OU Array

PV-Subject maintains file OU Descriptors and file UBOLA, Guardian referent, or ReliA CPA of file last validated transaction's Subject OU to help file user as needed validate processing of the transaction and to determine file SLT. PV-Subject is a one dimensional array comprising rows addressed as follows.

| Row Name | Full Data Element Name or Description | Format Name | Notes |
|---|---|---|---|
| OUUI | OUUI — or Object Unit Unique Identifier | OUUI | (e) |
| ItemID | Item Identifier or Item ID | ItemID | (e) |
| ItemDes | Item Description | ItemDes | (e) |
| Guardian | Guardian referent | OUUI | (a) |

| | | | |
|---|---|---|---|
| HL1 | GBL1-HRPN or UBL1-HEDC | mgDEo | (a),(b) |
| HL2 | GBL2-HRPN or UBL2-HEDC | mgDEo | (a),(b) |
| HL3 | GBL3-HRPN or UBL3-HEDC | mgDEo | (a),(b) |
| HL4 | UBL4-HEDC | UBL4-HEDC | (b) |
| Column/Field Set | | | |
| ReliA CPA* | ReliA CPA, the set of Column/Fields identified by (a) under notes | | |
| UBOLA* | UBOLA, the set of rows identified by (b) under notes | | |
| OU Descriptors* | OU Descriptors, the set of rows identified by (e) under notes | | |
| mgDEo equals the most general of the Data Element options | | | |

Enabled Process Session Memory Variables

The EPS-MVs other than those in Ref are presented in the flowcharts and, in general, in the narrative as Individual MVs rather than as two celled Arrays. The EPS-MVs, other than those in Reference, in order to support file transaction reversal function for enabling process transactions as well as enabled process transactions, are one dimensional arrays with two cells. Only file current, first cells, of these EPS-MVs are widely maintained by various procedures and functions supporting the enabling processes. The preserved second cells of these EPS-MVs are used only by the EPS Preserve and Clear function (0774*) which updates file second cells from the first cell of the array, and by the SLT reversal function in the GE procedure (0100) which updates the first cells from the second cells when an enabling process transaction is reversed. Because the second cells of the EPS Registers and Indicators are used infrequently, these registers and indicators are addressed and described in the flowcharts and narratives as individual MVs except when the second cell of the EPS Registers and Indicators are used.

EPS Indicators and Registers

EPS indicators and registers are individual memory arrays used to indicate specific states of the ReliA Processes or maintain a record of key parameters of the Enabled Process Sessions.

| Flag Name | Full Data Element Name or Description |
|---|---|
| EPSI-CP | Enabled Process Session Indicator — Component Positioning. true indicates the EPS is enabled. |
| EPSI-CNP | Enabled Process Session Indicator — Component Non-Positioning. |
| EPSI-OL | Enabled Process Session Indicator — Origin Locating |
| EPS-Q | EPS-Quick Enabled Process Indicator — true indicates the EPS was enabled by a ReliAQ-CP process. |
| EGR | EPS Guardian Row Register (from TRR for a ReliAM enabled EPS or 1 for a ReliAQ enabled EPS) |
| EHR | EPS Hierarchical Reach Register (from THR) |
| EDR | EPS TD Register (from TDR) |
| EPR | PHSOU Register, Tracks the last row of the PHSOU Stack.[25] |

PHSOU—PHSOU Stack

PHSOU maintains the OUUI of the subject OU of the previous transactions of the EPS. The PHSOU Stack also maintains for the MR methodology the MBCPAs of these PHSOUs to support the ReliA-EH-CP processes. The PHSOU Stack is cleared by the EPS enabling processes, ReliAA and ReliAQ, only PHSOU is a two dimensional array with an infinite number of rows (practical maximum is approximately 100 to 150 rows). The columns/fields in addition to the row number are identified as follows:

| Row Name | Full Data Element Name or Description | Format Name | Notes |
|---|---|---|---|
| OUUI | OUUI — Object Unit Unique Identifier | OUUI | |
| HL1 | MBL1-HRPN[26] | MBL1-HRPN | (d) |
| HL2 | MBL2-HRPN | MBL1-HRPN | (d) |
| HL3 | MBL3-HRPN | MBL1-HRPN | (d) |
| Column/Field Set | | | |
| MBCPA* | MBCPA, the set of rows identified by (d) under notes | | |

Key is OUUI as well as row number.

Reference or Ref—Reference Array

Ref maintains in memory both OURF and IMRF parameters of a number of key OUs of the current and last transaction. These key OUs include the Subject OU and MDAs.

Ref is a three dimensional array with four tiers and four rows. While Ref is classified as an EPS-MV, portions of it are updated and cleared with the G-TSMVs. Ref is never cleared completely by the ReliA process. Specific tiers and rows are associated with the EPS-MVs and G-TSMVs. The tiers and rows associated with maintenance of the EPS-MVs are in general maintained with the other EPS-MVs, and the tiers and rows associated with the G-TSMVs are maintained with the other G-TSMV maintenance. Tier 2's rows are associated with the EPS-MVs. They maintain parameters for the Matriarch and the MDAs of the last validated transaction. The rows in tier 2 start with the Matriarch in row 0, and continue with the succeeding MDAs of the Subject or SLT in the succeeding rows of the tier. Tier 0 and 1 rows are associated with the G-TSMVs. They maintain parameters for the Subject OU, Relational References provided by the user, the Matriarch, and MDAs of the current transaction. Row 0 of tier 0 is used consistently for the Subject OU of the current transaction. The remaining rows of tier 0 are used inconsistently. For all processes except the ReliAQ process the rows in tier 1 are like tier 2; they start with the Matriarch in row 0, and continue with the succeeding MDAs of the subject or SLT in the succeeding rows of the tier. The usage of the fourth row in each of the tiers is restricted to the ReliAQ-CP process.

A Ref address comprises a set of 3 ordered names. The first represents the tier number, the second represents the row number, and the third represents the columns or fields. The columns/fields in addition to the row number are identified as follows:

| Column Name | Full Data Element Name or Description | Format Name | Notes |
|---|---|---|---|
| MBL | In the ReliAQ Processes: SBL and later a MBL. In the ReliAA/ReliAM processes: the MBL | MBL | |
| OUUI | The UUI of the subject OU. OUUI: an Object Unit Unique Identifier | OUUI | (a),(b),(d) |
| Guardian | Guardian referent | OUUI | (a),(b) |
| HL1 | (1) GBL1-HRPN from/to the OURF or | xHL1 | (1): (a),(b) |
| | (2) UBL1-HEDC from/to the OLARF | | (2): (e) |
| HL2 | (1) GBL2-HRPN from/ | xHL2 | (1): (a),(b) |

| | | | | |
|---|---|---|---|---|
| | to the OURF or | | | |
| | (2) UBL2-HEDC from/ | | (2): (e) | |
| | to the OLARF | | | |
| HL3 | (1) GBL3-HRPN from/ | xHL3 | (1): (a),(b) | |
| | to the OURF or | | | |
| | (2) UBL3-HEDC from/ | | (2): (e) | |
| | to the OLARF | | | |
| HL4 | UBL4-HEDC from/to the OLARF | UBL4-HEDC | (e) | |
| ItemID | Item Identifier or Item ID | ItemID | (c),(d) | |
| ItemDes | Item Description | ItemDes | (c),(d) | |
| CAI | Components Allowed Indicator | Indicator | (c) | |
| MGCAI | Mixed Generation Components Allowed Indicator | Indicator | (c) | |
| EHL1 | EPOUPN-GBL1 — The EPOUPN for the GBL 1 of the Object Item | EPOUPN | (c) | |
| EHL2 | EPOUPN-GBL2 | EPOUPN | (c) | |
| EHL3 | EPOUPN-GBL3 | EPOUPN | (c) | |
| LRTCHL | Lowest Required Tracked Component Hierarchy Level. The minimum GrDHR | LRTCHL | (c) | |
| LATCHL | Lowest Allowed Tracked Component Hierarchy Level. The maximum GrDHR | LATCHL | (c) | |

Column/Field Sets

| | |
|---|---|
| ReliA CPA* | ReliA CPA, the set of rows identified by (a) under notes |
| Ref-OURF Params* | Reference — OURF Parameters, the set of rows identified by (b) under notes |
| Ref-IMRF Params* | Reference — IMRF Parameters, the set of rows identified by (c) under notes |
| OU Descriptors* | OU Descriptors, the set of rows identified by (d) under notes |
| UBOLA* | UBOLA, the set of rows identified by (e) under notes |

EPOUPN—EPOUPN Array

EPOUPN maintains the EPPN for each MBL of the MSL for the SET and its successors. The EPPN is updated by the End of Parent Determination function only. EPOUPN is a one dimensional array comprising rows addressed as follows:

| Row Name | Full Data Element Name or Description | Format Name | Notes |
|---|---|---|---|
| HL1 | MBL1-EPOUPN — The EPOUPN for the MBL 1 of the Matriarch for the Matriarch Based Component Position Address (MBCPA) | EPOUPN | |
| HL2 | MBL2-EPOUPN | EPOUPN | |
| HL3 | MBL3-EPOUPN | EPOUPN | |

An EPPN recorded in HL1 will correspond to MBL1 of the Matriarch. The remaining EPPNs recorded in EPOUPN will not necessarily correspond to a particular EPPN of the MDAs. The other EPPNs included in EPOUPN are established by EPD function (0671) as a function of the GrDHR of the MDA Items.

EPS-Origin—Enabled Process Session-UBOLA Array

The Enabled Process Session-Origin Array (EPS-Origin) maintains the UBOLA for the EPS. It is established by the EPS-Origin Identification function (0771) as called by the enabling processes EPS-Origin is a one dimensional array consisting of rows addressed as follows:

| Row Name | Full Data Element Name or Description | Format Name | Notes |
|---|---|---|---|
| OUUI | OUUI — Object Unit, Unique Unit Identifier (or Object Unit Unique Identifier) | OUUI | (e) |
| ItemID | Item Identifier or Item ID | ItemID | (e) |
| ItemDes | Item Description | ItemDes | (e) |
| HL1 | UBL1-HEDC — Universe Based Origin Hierarchy Level 1 Hierarchical Entity Division Code, or Universe Based Entity Hierarchy Level 1 Hierarchical Entity Division Code | UBL1-HEDC | (a) |
| HL2 | UBL2-HEDC | UBL2-HEDC | (a) |
| HL3 | UBL3-HEDC | UBL3-HEDC | (a) |
| HL4 | UBL4-HEDC | UBL4-HEDC | (a) |

Column/Field Set

| | |
|---|---|
| UBOLA* | Origin Location Address (UBOLA), the set of rows identified by (a) under notes |
| OU Descriptors* | OU Descriptors, the set of rows identified by (e) under notes |

EPST-Subject—Enabling Process Session Transaction Subject OU Array

EPST-Subject maintains the OU Descriptors for the EPST subject OU to help the user reidentify, as needed, this key OU of the EPS. The OUUI of this array is used in combination with another PHSOU to Reinstate an EPS by the ReliA-EH-CP-Reinstate Process. The OUUI of this array is also used to disable an EPS EPST-Subject is a one dimensional array consisting of rows addressed as follows:

| Row Name | Full Data Element Name or Description | Format Name | Notes |
|---|---|---|---|
| OUUI | OUUI — Object Unit Unique Identifier | OUUI | (e) |
| ItemID | Item Identifier or Item ID | ItemID | (e) |
| ItemDes | Item Description | ItemDes | (e) |
| HL1 | MBL1-HRPN or UBL1-HEDC[28] | MBL1-HRPN | (a),(d),(f) |
| HL2 | MBL2-HRPN or UBL2-HEDC | MBL2-HRPN | (a),(d),(f) |
| HL3 | MBL3-HRPN or UBL3-HEDC | MBL3-HRPN | (a),(d),(f) |
| HL4 | UBL4-HEDC | MBL3-HRPN | (a) |

Column/Field Set

| | |
|---|---|
| UBOLA* | Origin Location Address (UBOLA), the set of rows identified by (a) under notes |
| MBCPA* | Matriarch Based Component Position Address (MBCPA), the set of rows identified by (d) under notes |
| OU Descriptors* | OU Descriptors, the set of rows identified by (e) under notes |
| ReliA CPA* | ReliA CPA, the set of rows identified by (f) under notes |

EPST-Ref—Enabling Process Session Transaction Reference OU Array

EPST-Ref maintains the OU Descriptors and MBCPA for the reference other than the subject OU recorded as DRb to help the user re-identify, as needed, this key OU of the EPS-CP. The OUUI of this array is used in combination with another PHSOU to Reinstate an EPS by the ReliA-EH-CPReinstate Process. It is also used to disable an EPS. EPST-Ref is a one dimensional array comprising rows addressed as follows:

| Row Name | Full Data Element Name or Description | Format Name | Notes |
|---|---|---|---|
| OUUI | OUUI — Object Unit Unique Identifier | OUUI | (e) |
| ItemID | Item Identifier or Item ID | ItemID | (e) |
| ItemDes | Item Description | ItemDes | (e) |
| HL1 | MBL1-HRPN.[29] | MBL1-HRPN | (d) |
| HL2 | MBL2-HRPN | MBL2-HRPN | (d) |
| HL3 | MBL3-HRPN | MBL3-HRPN | (d) |

Column/Field Set

| | |
|---|---|
| MBCPA* | Matriarch Based Component Position Address (MBCPA), the set of rows identified by (d) under notes |
| OU Descriptors* | OU Descriptors, the set of rows identified by (e) under notes |

OMA Permanent Random Access Files Required

OLARF—Origin Location Address File

The OLARF is a permanent file maintained by the OMA to support the ReliA Process. The OLARF maintains the location address of all OUs that are classified as Origin OUs in the ReliA process. Each OU represented in the OLARF is also represented by a record on the OURF. The columns of the OLARF are as follows:

| Column Name | Full Data Element Name or Description | Format Name | Notes |
|---|---|---|---|
| OUUI | OUUI | OUUI | |
| HL1 | UBL1-HEDC | UBL1-HEDC | (e) |
| HL2 | UBL2-HEDC | UBL2-HEDC | (e) |
| HL3 | UBL3-HEDC | UBL3-HEDC | (e) |
| HL4 | UBL4-HEDC | UBL4-HEDC | (e) |

Column/Field Set

| | |
|---|---|
| UBOLA* | Universe Based Origin Location Address (UBOLA), the set of Column/Fields identified by (e) under notes |

Keys: (1) OUUI; and (2) UBOLA* comprising UBL1, UBL2, UBL3, and UBL4.

OURF—Object Unit Record File

The OURF is a permanent file maintained by the OMA. The OURF maintains a record of all tracked OUs in the user organization environment. It is a key file in the ReliA Process. This file provides the Reference-OURF Parameters used to validate OUs in the ReliA Process and to establish the position of components or other related OUs. The following represents the columns/fields required on the OURF to support the ReliA Process:

| Column Name | Full Data Element Name or Description | Format Name | Notes |
|---|---|---|---|
| OUUI | Record Object Unit, Unique Unit Identifier | OUUI | (b) |
| ItemID | Item Identifier | ItemID | (b) |
| Guardian | Guardian Referent | OUUI | (a)(b) |
| HL1 | GBL1-HRPN — Guardian Based Component Hierarchy Level 1 HieraRelational Position Number[30] | GBL1-HRPN | (a)(b) |
| HL2 | GBL2-HRPN | GBL2-HRPN | (a)(b) |
| HL3 | GBL3-HRPN | GBL3-HRPN | (a)(b) |
| AcctStat | OURF Accounting Status | AcctStat | (b) |

Column/Field Sets

| | |
|---|---|
| ReliA CPA* | ReliA CPA, the set of Column/Fields identified by (a) under notes |
| Ref-OURF Params* | Reference-OURF Parameters, the set of Column/Fields identified by (b) under notes |

Keys: (1) OUUI; and (2) ReliA CPA* comprising Guardian and HL1, HL2, and HL3 (GBL1-HRPN, GBL2-HRPN, and GBL3-HRPN).

IMRF—Item Master Record File

The IMRF is a permanent file maintained by the OMA to support the ReliA Process. The GBCPA maintains parameters of all items that are classified as tracked in the ReliA process, but are not parameters of individual OUs. This file provides the Ref-IMRF Parameters used to validate OUs in the ReliA Process and to display to the user the OU Descriptors[31] of the Subject OU and other key relatives of the Subject OU in each transaction. The columns/fields of the OLARF required for the ReliA Process are as follows:

| Column/field Name | Full Data Element Name or Description | Format Name | Notes |
|---|---|---|---|
| ItemID | Item Identifier or Item ID (note that the Item ID may comprise a Manufacturer ID as well as an Item Identifier itself when the manufacturer's Item Identifier is used by the user organization in the Item Identifier) | ItemID | (c) |
| ItemDes | Item Description | ItemDes | (c) |
| CAI | Components Allowed Indicator | CAI | (c) |
| MGCAI | Mixed Generation Components Allowed Indicator | MGCAI | (c) |
| EHL1 | EPOUPN-GBL1 | EPOUPN | (c) |
| EHL2 | EPOUPN-GBL2 | EPOUPN | (c) |
| EHL3 | EPOUPN-GBL3 | EPOUPN | (c) |
| LRTCHL | Lowest Required Tracked Component Hierarchy Level | LRTCHL | (c) |
| LATCHL | Lowest Allowed Tracked Component Hierarchy Level | LATCHL | (c) |

Column/Field Set

| | |
|---|---|
| Ref-IMRF Params* | Ref-IMRF Parameters, the set of Column/Fields identified by (c) under notes |

Key: (1) ItemID

[31] Excluding the OUUI OUs. The OUUI is not a Reference-IMRF Parameter.

USER File

The User File maintains user identification and preference parameters for each user of the ReliA Process. In addition to user identification parameters the column/field of the USER File is as follows:

| Column/ field Name | Full Data Element Name or Description | Format Name | Notes |
|---|---|---|---|
| UNART | User Normal Analysis and Response Time | Seconds Register | |

Format File

The ReliA Process must analyze the some entries recorded by the user in the course of the various ReliA processes to determine the data element entered. The entry a certain valid data element as opposed to the entry of certain other valid data elements will in many cases within the enabling process of the ReliA Process establish which of several ReliA sub-processes is being used by the user, (i.e., which ReliA process is indicated). In other cases the entries need to be validated to support the integrity of the data recorded for the transaction. In those cases where an entry cannot be validated against a table for complete correspondence of the entry to the data in the table, the validation of the data element must be based on the format of the entry. In some cases a format validation is used as a preliminary validation, and the entry is validated against a table later.

When the ReliA process calls for a format validation of entries a Format File must provide a template of the valid format of each data element requiting such validation. The key format evaluations in the preferred embodiment comprise the following:

| Data Element | Format Restrictions |
|---|---|
| HRPN (all MBLs and GBLs) | Less than 3 Numeric |
| HEDC (all UBLs) | 3 Alphanumeric |
| OUUI | Greater than 3 Alphanumeric |

The format of the data elements must be established by the user organization within the restriction imposed by the ReliA Process.

The following data elements comprise the key data elements that require validation: OUUI; UBL1-HEDC, and if different UBL2-HEDC, . . . , UBLm-HEDC; GBL1-HRPN and if different GBL2-HRPN, . . . , GBLm-HRPN; and MBL1-HRPN, and if different MBL2-HRPN . . . , MBLm-HRPN, where m in each case is the maximum HR established for the instantiation of this invention consistent with the Location Address Schema established by a user organization.

32

[33] The MBLX or MBLX is based on the Matriarch reference for the EPS or the current transaction if an enabling process.

UNART, User Normal Analysis and Response Time,

UNART is the established a timed limit in certain processes in the preferred embodiment, after which other default procedures are applied. Therefore, the UNART must accommodate the maximum time in seconds anticipated for the user organization.

| | Glossary |
|---|---|
| Aligned | The position of a kth Cousin OU within its kth generation Ancestor that corresponds to the position of a subject OU within its own kth generation Ancestor. |
| Aligned Referent Determinant (ARD) | An referenced Object Unit aligned with a subject OU. An Object Unit with a HRPN equaling that of the subject OU referenced to establish the HRPN of the referent as a HRPN of the subject OU. |
| Ancestor | A related entity that contains, holds or physically controls a subject OU at a higher hierarchical level than the subject OU. |
| ARD | Aligned Referent Determinant |
| Asset Tags | see Unique Unit Identifier |
| Backward Transaction Direction or Backward Direction | The direction in which the Object Unit Position of successive transactions will increase. |
| Beginning of Parent Object Unit Position (BPOUP) | The first Object Unit Position in the subsequent Parent. |
| Beginning of Parent Object Unit Position Number (BPOUPN) | The value of the first Object Unit Position in the subsequent Parent. |
| BPOUP | see Beginning of Parent Object Unit Position. |
| BPOUPN | see Beginning of Parent Object Unit Position Number |
| CAI | see Component Allowed Indicator. |
| CHL | see Component Hierarchy Level (also MBCHL and GBCHL). |
| CNP or CNPam | see Component Non-Positioning addressing methodology. |
| Component | A Descendant OU that is the highest level tracked Descendant of a referent Object Unit or a non-tracked Descendant OU of a referent Object Unit at a higher level than the highest level tracked referencing Descendant. |
| Component Allowed Indicator (CAI) | An indicator or parameter maintained on an IMR, or OUR (non-normalized form) that controls when an Object Unit uses a representative Object Unit of the Item, or the Object Unit itself (non-normalized form) as a referent. |
| Component Hierarchy Level (CHL) | The hierarchy level of a subject component Object Unit relative to an identified referent. |
| Component Non-Positioning addressing methodology (CNP or CNPam) | Recording or maintaining a Guardian referent as an Object Unit position referent without an HCPA. CNP addressing methodology as required and allowed by A CPRI of its Guardian referent. The methodology also indicates the process by which higher level tracked Ancestors are linked and the ReliA location address established or displayed. |
| Component Positioning addressing methodology (CP or CPam) | An addressing methodology used to record and maintain a ReliA CPA with an HCPA as required by A CPRI of its Guardian referent. The methodology also includes the process by which higher level tracked Ancestors are linked and the ReliA location |

Glossary

| | |
|---|---|
| | address is established or displayed. |
| Component Positioning Required Indicator(CPRI) | An indicator or parameter maintained on an IMR or OUR (non-normalized form), that controls when the CPam must be used to record a transfer of an Object Unit to a Component position within a representative Object Unit of the Item, or the Object Unit itself (non-normalized form). |
| Cousin | An Object Unit on the same hierarchical level as the subject OU that has a common ancestor but not a common parent, and cannot be a closer relative. |
| CP or CPam | see Component Positioning Addressing Methodology |
| CPRI | see Component Positioning Required Indicator. |
| DBMS | A data base management system. |
| Descendant | An Object Unit that is contained, held or physically controlled by a subject OU at a higher hierarchical level than the Object Unit. see Disabling Object Unit. |
| EASP | see Enabled Advancement Subject Position |
| EATP | see Enabled Advancement Trigger Position |
| EHL1, EHL2, . . . , EHLm where m is equal to GBCHLm for the instantiation | The EPOUPN for the GBCHLn of a tracked Item, where n $\leq$ m, or a representative Object Unit thereof as established by either (1) the IMR of the Item, (2) the EPOUPN for MBCHLn of a Matriarchy when the Matriarch is the Guardian of the subject OU, (3) the Matriarch referent methodology is employed restricting the LATCHL and the LRTCHL to being equal, or (4) the End of Parent Determination function is employed to allow for intermediate tracked Object Units at more than one hierarchy level in the Matriarchy established for the EPS. |
| Enabled Advancement Subject Position (EASP) | A position in which a subject OU will be recorded by the Parent Advancement function relative to the BPOUP. |
| Enabled Advancement Trigger Position (EATP) | The enabling trigger OUP for the advancement process of the Parent Advancement function when the computed position of the subject OU exceeds the last Object Unit Position of the established Parent. |
| Enabled Process Session (EPS) | A process state for a particular addressing methodology wherein a location address and possibly certain relational parameters have been established to enable certain alternative processes supporting the addressing methodology. |
| Enabled Process Session Indicator (EPSI) | An indicator employed to track efficiently when prerequisite conditions for an EPS for an addressing methodology have been meet for using enabled processes. |
| End of Parent Object Unit Position (EPOUP) | The last Object Unit Position within a specified Parent OU. |
| End of Parent Object Unit Position Number (EPOUPN) | A value for a the End of Parent Object Unit Position within a specified Parent or hierarchy level within a specified Ancestor referent. |
| Entity | Geo-political units or divisions of defined areas or space in which the position of the unit is not generally separable from the identity of the unit itself. |
| EPD function | The End of Parent Determination function |
| EPOUPN | see End of Parent Object Unit Position Number |
| EPS and EPS-OL, EPS-CNP, and EPS-CP | see Enabled Process Session. EPS-OL, EPS-CNP, and EPS-CP represent a EPS established for the specified addressing methodology. |
| EPSI and EPSI-OL, EPSI-CNP, and EPSI-CP | see Enabled Process Session Indicator. EPSI-OL, EPSI-CNP, and EPSI-CP represent a EPSI established for the specified addressing methodology. |
| Family | The Ancestor referent and its Descendants. |
| First Object Unit in Parent (FOUP) | The first Object Unit in a specified Parent |
| Fixed Command | A pre-established command that can be entered or recorded by a user with a reference to an OUUI to effect the command. It includes batch, key board, voice commands. |
| Forward Transaction Direction | The Transaction Direction in which the HRPN (OUP) of successive transactions at MBCHLz of the SLT will decrease. |
| FOUP | see First Object Unit in Parent. |
| GBCHL | see Guardian Based Component Hierarchy Level |
| GBCPA | see Guardian Based Component Position Address. |
| GP | see Grand Parent. |
| Grand Parent (GP) | An ancestor of a subject OU at the second hierarchical level above the subject OU. |
| GrDHR | see Guardian-referencing Descendant Hierarchical Reach |
| Guardian | The lowest tracked Ancestor OU of an Object Unit. |
| Guardian Based Component Hierarchy Level (GBCHL) | The hierarchy level of the subject OU relative to its Guardian OU. The Guardian is at GBCHL0. If the Guardian is the Parent of a subject OU the subject OU is at GBCHL1. The GBCHLs of successively lower hierarchy levels within a Guardian OUs or its successive generation Descendants are described as GBCHL1, GBCHL2, . . . , GBCHLm, where m describes the maximum number of hierarchy levels allowed. Where the Matriarch referent |

-continued

| Glossary | |
|---|---|
| | methodology is not employed, GBCHLn may also be described as MBCHLn, where n ≦ m. When the Matriarch referent methodology is employed a number of tracked Object Units may exist as intermediate tracked Ancestors in the Matriarch-Subject Lineage. In this case each such intermediate tracked Object, as well as the subject OU, will have a Guardian. A GBCHLn in this case will be relative to a specific tracked Descendant OU in the lineage and its Guardian OU. |
| Guardian Based Component Position Address (GBCPA) | A Hierarchical Component Position Address for an Object Unit and its Guardian. |
| Guardian referent location address | A normalized location address for Component OUs in which only a Guardian referent OUUI is maintained for the subject OU. The Guardian referent OUUI is the only location address element and required for a subject OU where the CNP addressing methodology is employed, therefore it is the Guardian referent location address. Where CNPam and CPam are included together in an instantiation of the invention the Guardian referent location address is stored as the Guardian OUUI in the ReliA CPA. |
| Guardian-referencing Descendant Hierarchical Reach (GrDHR) | The number of hierarchy levels an Object Unit and its Guardian are separated from each other. Where the hierarchy level of the Guardian is 0, the GrDHR equals the GBCHL of the referencing Descendant. |
| Guardian-Subject Lineage | The MBCHL of the Guardian is the sum of the Guardian-referencing Descendant Hierarchical Reach (GrDHR) of each MDA in the MSL. The GrDHR of an Object Unit is defined as the number of hierarchy levels included in the identified Guardian-Subject Lineage. |
| H1S1OU, H2S1OU | An H1S1OU is a reference to a first Cousin OU in the following position next to the subject OU at the same hierarchy level, an H2S1OU is a similarly situated second Cousin, etc. |
| HCLA | see Hierarchically Coded Location Address. |
| HCPA | see Hierarchical Component Position Address. |
| HDC | see Hierarchically Detached Component. |
| HEDC | see HieraEntity Division Code. |
| HELA | see Hierarchical Entity Location Address. |
| HieraEntity Division Code (HEDC) | Codes or names that generally describe the geo-political division of a Parent entity. HEDCs are assumed to be non-relational. |
| Hierarchical Component Position Address (HCPA) | A series of one or more HRPNs that describe a Hierarchically Coded Location Address of a subject OU relative to a referenced tracked Ancestor OU. The HCPA is the complete HCLA of a referenced tracked Ancestor not included in the complete HCLA of the subject Descendant |
| Hierarchical Entity Location Address (HELA) | A hierarchical coded Location Address made up of some HEDCs that describe the location address of an entity but are not necessarily ordinarily, or relationally related to its Homogen entities. |
| Hierarchically Coded Location Address (HCLA) | An address location schema where all elements of the address are hierarchically related to other elements of the address. The address elements are generally represented by codes - HEDC or HRPNs. |
| Hierarchically Detached Component (HDC) | A component that is more than one generation removed from its Guardian. |
| HieraRelation Position Number (HRPN) | An real number that describes ordinarily and relationally an HieraRelation Position. |
| HieraRelational Position | An Object Unit Position (OUP) relative to its Sister OUPs within a Parent OU. It describes successive Sister OUPs ordinarily and relationally relative the first (Beginning of Parent OUP) Sister OUP. |
| HL | Hierarchy Level |
| Homogen | Object Units on the same hierarchical level as a subject or specified Object Unit that share a common Ancestor. The common Ancestor is normally specified. |
| Homogen Aligned Cousin | The processes in which some HRPNs of a Cousin referent and some HRPNs of a SLT are mapped to their corresponding hierarchy level in the HCPA of the Subject OUP are sometimes termed herein as the Cousin Aligned process. |
| HRP | see HieraRelational Position |
| HRPN | see HieraRelational Position Number. |
| Identified Matriarch-Descendant-Ancestor Hierarchical Reach (IMDAHR) | The sum of the Guardian-referencing Descendant Hierarchical Reach of the Identified Matriarch-Descendant-Ancestor in the Matriarch-Subject Lineage. |
| IEHL | see Iteration Evaluation Hierarchy Level |
| IMDAHR | see Identified Matriarch-Descendant-Ancestor Hierarchical Reach |
| IMR | see Item Master Record. |
| IMRF | see Item Master Record File. |
| Incrementation value | The value, positive or negative, to be added to the HRPN at the appropriate hierarchy level of the Matriarchy as part of the referation of the MBCPA for a transaction to establish the MBCPA of the subject OU for a transaction prior to any |

-continued

| Glossary | |
|---|---|
| | adjustment that might be made to the HRPN by the Parent Advancement function. |
| IPHL | see Iteration Parent Hierarchy Level |
| Item | A set of like or very similar Object Units or a representation of such an object Unit. |
| Item Descriptors | Item Identifiers and descriptions for an Item included in Item Master Record Files. |
| Item ID | see Item Identifier. |
| Item Identifier (Item ID) | A unique identifier of an Item with a defined Universe of Items. |
| Item Master Record (IMR) | The normalized record of an item and associated parameters that are common to all occurrences of an Item. |
| Item Master Record File (IMRF) | A DBMS file of IMRs identified in the file by an Item ID. |
| Iteration Evaluation Hierarchy Level (IEHL) | The MBCHL of the SLT or an Ancestor thereof within the Matriarchy of the SLT that has not, or is being, currently evaluated to establish that the HRPN at the MBCHL of MBCPA computed for the subject OU does not exceed the EATP for MBCHL of the Matriarchy. The evaluation is controlled by the Parent Advancement function. |
| Iteration Parent Hierarchy Level (IPHL) | The next higher hierarchy within the Matriarchy of the SLT that becomes the Iteration Evaluation Hierarchy Level (IEHL) of the Matriarchy when the EATP of a the MBCHL of the SLT or higher level MBCHL at the current Iteration Evaluation Hierarchy Level (IPHL) is exceeded. |
| kth Generation Removed Homogen | A kth generation removed Ancestral Descendant Homogen. A 0th generation removed Homogen is a Sister; a 1st generation removed Homogen is a first Cousin. |
| Last Object Unit in Parent (LOUP) | The last Object Unit in a specified Parent. |
| LATCHL | see Lowest Allowed Tracked Component Hierarchy Level |
| LGA | see Lowest Generation Ancestor |
| LGTA | see Lowest Generation Tracked Ancestor |
| LOUP | see Last Object Unit in Parent |
| Lowest Allowed Tracked Component Hierarchy Level (LATCHL) | The a parameter that controls the lowest hierarchy relative to the Guardian Item or representative Object Unit at which a tracked Component can be recorded. |
| Lowest Generation Ancestor (LGA) | The lowest generation Ancestor OU, tracked or non tracked, within the specified Matriarch-Subject-Lineage. |
| Lowest Generation Tracked Ancestor (LGTA) | The lowest generation tracked Ancestor OU within the specified Matriarch-Subject-Lineage. |
| Matriarch | A tracked Ancestor OU used as a common Ancestor referent for subsequent transactions in an EPS. |
| Matriarch Based Component Hierarchy Level (MBCHL) | The hierarchy level of a Descendant OU in a Matriarchy relative to the Matriarch. When the Matriarch is restricted to being a Guardian of the subject OU and its Homogens, MBCHLn of such a Descendant will also equal GBCHLn of the Descendant unless the Matriarch referent methodology is employed. See Guardian Based Component Hierarchy Level (GBCHL) |
| Matriarch Based Component Position Address (MBCPA) | The HCPA of an Object Unit relative to a Matriarch referent, established by the user. When a Matriarch referent is also a Guardian of an Object Unit the MBCPA is also the GBCPA of the Object Unit. |
| Matriarch Hierarchical Reach | The number of hierarchy levels an Object Unit and its Matriarch OU are separated from each other. |
| Matriarch OU or Matriarch referent | (1) A tracked Ancestor OU used as a common Ancestor referent for subsequent transactions in an EPS for ReliA sub-processes employing the CNP and CP addressing methodologies.<br>(2) A tracked Ancestor OU of a subject OU that is referenced to establish that the subject OU is located within the referent. When the CPam is required for tracked Descendants in the Matriarchy the location address of the tracked Descendants must include an HCPA for the OUP of the subject OU relative to the Matriarch. When the Matriarch referent methodology is employed and the CPam is required for tracked Descendants in the Matriarchy the Matriarch may be a tracked Ancestor of the Guardian of the subject OU, otherwise the Matriarch must be the Guardian of the subject OU |
| Matriarch referent methodology | The measures employed in the ReliA process to allow a Matriarch referent to be a tracked Ancestor of a Guardian of a subject OU. This allows the Matriarch referent methodology allows the user to establish a higher level Ancestor referent than a Guardian and to allow for Parent Advancement beyond the Guardian of the Subject of the Enabling Transaction When this is done, the family of Homogens defined by the higher level tracked Ancestor becomes larger. |
| Matriarch-Descendant-Ancestor (MDA) | Descendants of a Matriarch referent of a subject OU that are also Ancestors of the subject OU. They are intermediate Object Unit is in the MSL between the Matriarch and the subject OU. |
| Matriarch-Subject Lineage | The successive Descendant OUs of the Matriarch down through |

-continued

| Glossary | |
|---|---|
| (MSL) | the subject OU. |
| Matriarchy | Descendants of a Matriarch in a MSL and their Homogens that are Descendants of the Matriarch. |
| MBCHL and MBCHL1, MBCHL2, ..., MBCHLm, where m is the maximum allowed. | see Matriarch Based Component Hierarchy Level and see Guardian Based Component Hierarchy Level (GBCHL) |
| MBCPA | see Matriarch Based Component Position Address |
| MDA | see Matriarch-Descendant-Ancestor |
| MGCAI | see Mixed Generation Components Allowed Indicator |
| MHR | see Matriarch Hierarchical Reach |
| Mixed Generation Components Allowed Indicator (MGCAI) | An indicator that controls use of a tracked Object Unit as a Matriarch referent that is not the Guardian OU. A non-Guardian Matriarch cannot be used when a MGCAI is on, or allowed, for the Matriarch. This is used to prevent mixing of the CP and CNP addressing methodologies within a Matriarchy. |
| MSL | see Matriarch-Subject Lineage |
| MV | Memory Variable |
| Next | Next means subsequent and contiguous. The application of the term for an Object Unit and a Object Unit Position vary slightly. A next Object Unit is an immediately, subsequent Object Unit at a specified hierarchy level. A next Object Unit Position (OUP) is a subsequent OUP defined by adding the incrementation value established by a current or previous process to the HRPN at the specified hierarchy level for the SLT. |
| Normalized Location Address | A location address in which the HCLA of the lowest tracked Ancestor OU of a subject OU is not included in the HCLA of the subject OU, but the OUUI of the lowest tracked Ancestor OU is included in the in the location address of the subject OU. Alternatively: A location address in which the OUUI of the lowest tracked Ancestor of an Object Unit replaces the HCPA of the Ancestor in the HCLA of the subject OU. |
| Normalized Process Location Address (NPLA) | The Normalized Location Address of a subject OU where the UBOLA is separate from the Hierarchical Component Position Address of the subject OU relative to its Guardian. |
| NPLA | see Normalized Process Location Address. |
| Object Management Application (OMA) | An encompassing software application for the management of Object Units that will call the ReliA process with each type of functional transaction initiated to support the identification of the Object Unit and establish its location address while allowing the OMA to collect additional parameters required. |
| Object Unit (OU) | An individual, tangible, measurable or observable Item and its components that has special characteristics, either assigned or internal to the object, that distinguish one occurrence of the Item from other occurrences |
| Object Unit Position (OUP) | The location address of an Object Unit, including the position of an Object Unit relative to its Sister OUs within its Parent and the position of its Ancestor relative to an Ancestor referent. |
| Object Unit Record (OUR) | A DBMS record containing the parameters of an Object Unit that are unique to the object unit. |
| Object Unit Record File (OURF) | A DBMS file of Object Unit Records for all tracked object units. |
| OL or OLam | see Origin Locating addressing methodology. |
| OLAR | see Origin Location Address Record |
| OLARF | see Origin Location Address Record File. |
| OMA | see Object Management Application. |
| OOU | see Origin Object Unit. |
| Origin Locating addressing methodology (OL or OLam) | An addressing methodology for Origin OUs. |
| Origin Location Address Record (OLAR) | The Universe Based Origin Location Address Record of an Origin Object Unit maintained on the Origin Location Address Record File. |
| Origin Location Address Record File (OLARF) | A DBMS file containing the Universe Based Origin Location Address of an Origin Object Unit. |
| Origin Object Unit (OOU) | The highest level tracked Ancestor of an Object Unit. An Object Unit without a tracked Ancestor Object Unit. |
| Origin OU | An Origin Object Unit from the perspective of Descendant OUs. |
| OU | see Object Unit. |
| OUP | see Object Unit Position |
| OUR | see Object Unit Record. |
| OURF | see Object Unit Record File. |
| OUUI | An Object Unit's Unique Unit Identifier. |
| PA function | The Parent Advancement function |
| Parent | A related Object Unit that contains, holds or physically controls a subject OU at a Hierarchical level immediately above the subject OU. |
| PHSOU | see Previous Homogen Subject Object Units |
| PHSOU stack | A stack maintained in memory by the preferred embodiment that maintains the OUUI of the subject OU, as well as its MBCPA when the CPam is requried by the Matriarch, of previous (and |

| | Glossary |
|---|---|
| | closed transactions in the Preferred Embodiment) transactions in the EPS. |
| Prevalidation | Process steps previous to completion of the validation steps for an indicated process. |
| Previous Homogen Subject Object Units (PHSOU) | The subject OUs of previously recorded (and closed in the Preferred Embodiment) Homogen transactions in an EPS |
| RCLA | see ReliA Complete Location Address. |
| Referation | Computation of the location address of a subject OU based on the known location of some referent OUs and an established relationship between each referent and the subject OU. |
| Referencing Descendant | A tracked Descendant Object Unit that references a subject Guardian OU as its Guardian. |
| Referent. | (1) An Object Unit or its location address whose UUI is recorded by a user or established automatically by a process for use as a determinant in the process to establish the location address of an other Object Unit or as part of a location address. |
| ReliA Complete Location Address (RCLA) | The location address of an Object Unit when the CP addressing methodology is employed for all tracked Ancestors of an Object Unit. |
| ReliA Component Position Address (ReliA CPA) | The unique portion of the Normalized Address of Descendant Object Units containing a Guardian referent and a Hierarchical Component Position Address based on the Guardian. The HCPA can be null for an Object Unit with a Guardian not allowing CPam. |
| ReliA CPA | see ReliA Component Position Address. |
| ReliA CPA Conversion function | The Guardian and MBCPA to ReliA CPA Conversion function |
| ReliA CPA conversion function | The Matriarch and MBCPA to ReliA CPA Conversion function |
| ReliA Partial Location Address (RPLA) | When the CNP addressing methodology is employed for an Object Unit or any of its tracked Ancestor OUs in its Origin-Subject Lineage. |
| ReliA-EH processes | ReliA Enabled Homogen processes: The Homogen relating processes, without restriction to addressing methodology, enabled by establishment of an EPS. |
| ReliA-EH processes | ReliA Enabled Homogen processes |
| ReliA-EH-CP processes | ReliA Enabled Homogen processes that support the CPam. |
| ReliA-EHA-CNP process | ReliA Enabled Homogen AutoReferation Component Non-Positioning process |
| ReliA-EHA-CP-Incremented process | ReliA Enabled Homogen AutoReferation Component Positioning Increment process |
| ReliA-EHA-OL process | ReliA Enabled Homogen AutoReferation Origin Locating process |
| ReliA-EHR processes | ReliA Enabled Homogen Referation processes |
| ReliA-EHR-CP-pC-Aligned process | ReliA Enabled Homogen Referation processes Component Positioning Cousin Aligned process |
| ReliA-EHR-CP-pC-Skip process | ReliA Enabled Homogen Referation processes Component Positioning Cousin Skip process |
| ReliA-EHR-CP-SLT-Skip process | ReliA Enabled Homogen Referation processes Component Positioning SLT Skip process |
| ReliAA-CNP process | ReliA Ancestor Component Non Positioning process |
| ReliAA-CP processes | ReliA Ancestor Component Positioning processes. |
| ReliAA-CP-Manual process | ReliA Ancestor Component Positioning process; An enabling process supporting CPam with manual entry of the HCPA |
| ReliAA/ReliAM processes | The ReliAM-CP process is an advanced version of the ReliAA-CP process. The ReliAM-CP processes includes the ReliAA-CP process as a sub-set of the ReliAA-CP process. The Guardian referent recorded in the ReliAA-CNP process is also termed a Matriarch as it is the common tracked Ancestor recorded for the subject OUs of subsequent transactions under the EPS established. Therefore, in the Preferred Embodiment the ReliAA processes are presented as ReliAM processes. |
| ReliAM-CP-Descendant Processes | ReliA Matriarch Component Positioning Descendant processes; Enabling CPam processes supporting entry of successive MDAs and either (1) manual entry of the HCPA, or (2) referencing of a Homogen. |
| ReliAM-CP-Descendant-Homogen process | ReliA Matriarch Component Positioning Descendant processes; Enabling CPam processes supporting entry of successive MDAs and referencing of a Homogen to establish the HCPA |
| ReliAM-CP-Descendant-Manual process | ReliA Matriarch Component Positioning Descendant processes; Enabling CPam processes supporting entry of successive MDAs and with manual entry of the HCPA |
| ReliAQ processes | ReliA Quick processes |
| RPLA | see ReliA Partial Location Address. |
| SDD | see Skip Direction Determinant |
| SET | see Subject of the Enabling Transaction. |
| Sister | An object unit on the same hierarchical level as a subject OU that shares a common Parent with the subject OU. |
| Skip Determinant | A Homogen OU of the SLT of a current transaction that determines, in whole or part with other Homogen OUs of the SLT, and a Skip Direction the Component Position of the subject OU of |

-continued

| | Glossary |
|---|---|
| | current transaction. When the Skip Determinant is established by a user reference the Skip Determinant is termed a Skip Referent Determinant. |
| Skip Direction | The direction of the Skip Relative to the Skip Determinant |
| Skip Direction Determinant (SDD) | A user referenced Homogen OU in the TES of a Skip process that establishes the Skip Direction |
| Skip Referent Determinant (SRD). | A Skip Determinant established by reference by the user. |
| Skip Talliances | |
| SLT | see Subject of the Last Transaction. |
| Specific Business Function Transaction | A set of parameters and rules for collection and recording the parameters to document information need for a reoccurring type of business transaction. |
| SRD | see Skip Referent Determinant |
| SSLT | The subject of the second to last transaction. |
| Subject First Convention | The consistent structuring of the Transaction Entry Schema requried for a primary sub-process so that the OUUI of the subject OU is recorded before the identifier(s), referents, HEDC, HRPN, etc., of the subject OU's location address being recorded by the transaction. The Subject First Convention is in contrast to the Subject Last Convention which places the recording of the Subject's OUUI last in the TES. |
| Subject Lineage | The successive lower Descendant from a specified referent to the subject OU. |
| Subject of the Enabling Transaction (SET) | The subject OU of the transaction used to enable a current EPS. |
| Subject of the Last Transaction (SLT) | The subject OU of the last transaction for which the complete TES has been entered. |
| Subsequent Referent Direction | The direction of a referent relative to the SLT relative to the Transaction Direction, which is defined as Forward or Backward |
| Supra-Transaction Hierarchical Level | An Origin OU located at a hierarchy level that is higher than the Transition Hierarchy Level. |
| Supra-Transition Origin OU | An Origin OU at a hierarchy level higher than the Transition Hierarchy Level. |
| Talliances | A series of entries in a Skip process recorded in the TES to tally the number of positions to be added or skipped from the specified Skip Determinant |
| TES | see Transaction Entry Schema. |
| TES Closure Entry | An entry recorded at or after the end of the Transaction Entry Schema of a current transaction that establishes attainment of a preestablished limit or distinguishing condition in the indicated process for the current condition such that the current transaction can be closed. |
| Test ReliA CPA | A ReliA CPA constructed, usually iteratively, to test for an occurrence of the ReliA CPA on the OURF. |
| Transaction Abort Reference | A tracked Object Unit related to the subject OU or the SLT that can be referenced by the user to indicate that the current transaction should be aborted. |
| Transaction Direction (TD) | The increase or decrease in the OUP of the subject OUs of successive transactions. A specified transaction Direction can be limited to on Intra-Parent transaction of the SET of the EPS, or be specified for successive Inter-Parent transactions of Homogen OU of the SET. A TD can be established as Forward or Backward within a specified Parent or hierarchy level within a Matriarchy. Thus combinations of different TDs can be specified for different hierarchies of a Matriarchy. |
| Transaction Entry Schema (TES) | The series of sequential entries that make up the OUUIs, HRPNs, and HEDCs required by an the enabled ReliA sub-process to identify a subject OU and its location address. |
| Transition Hierarchy Level | It is lowest hierarchy level and the number of hierarchy levels included in the UBOLA of an instantiation of this invention Transition Hierarchy Level must therefore provide sufficient hierarchy levels that it can fully describe the HEDCs of all Object Units that will normally or reasonably be recorded as an Origin OU. |
| UBOHL or UHL | see Universe Based Origin Hierarchy Level. |
| UBOLA | see Universe Based Origin Location Address. |
| UHL | see Universe Based Origin Hierarchy Level. |
| UMDAHR | see Unidentified Matriarch-Descendant-Ancestor Hierarchical Reach |
| Unidentified Matriarch-Descendant-Ancestor Hierarchical Reach (UMDAHR) | The Matriarch Hierarchical Reach not reconciled by the Guardian-referencing Descendant Hierarchical Reach of the identified tracked Matriarch-Descendant-Ancestor in the Matriarch-Subject Lineage; the MHR less IMDAHR. |
| Unique Unit Identifier (UUI) | A unique combination of letters and/or numbers affixed to an object unit that uniquely identifies the Object Unit within the Universe of all Object Units tracked by an organization. |
| Universe | The Ancestor of all entities, including Object Units, that will be |

| Glossary | |
|---|---|
| | represented by an instantiation of this invention. |
| Universe Based Origin Hierarchy Level (UBOHL) | The hierarchy level of an entity relative to the Universe. |
| Universe Based Origin Location Address (UBOLA) | A Universe based hierarchicallly coded location address for Origin OUs. |
| Unreferenced Tracked Matriarch-Descendant-Ancestors (URTA) | The unreferenced or potentially unreferenced tracked Matriarch-Descendant-Ancestor Object Units within the Matriarch-Subject Lineage a referenced Matriarch OU and a subject OU for a transaction. |
| URTA | see Unreferenced Tracked Matriarch-Descendant-Ancestor |
| URTA Identification function | The Unreferenced Tracked Matriarch-Descendant-Ancestor function |
| UUI | see Unique Unit Identifier. |

What is claimed is:

1. An integrated relational object unit identification and location addressing (ReliA) process including a number of sub-processes for tracking and configuration management and identification of any subject Object Unit (any individual, tangible, measurable or observable object and a number of Descendant generations thereof, the number of Descendants or Descendant generations selected from the group consisting of a number of Object Units contained, a number of Object Units held and a number of Object Units physically controlled by the subject Object Unit which exists at a higher hierarchy level than the number of Descendant Object Units) in a hierarchy (a hierarchical object system with "N" hierarchy levels, where "N" is a positive integer), said number of subprocesses performed by a computer system using information about Object Units' location addresses in relation to each other to facilitate integration of control over the hierarchy and to refer relationally to any location in the hierarchy, said process:

(a) tracking any subject Object Unit identified by a Unique Unit Identifier (referred to as Object Unit Unique Identifier, a unique combination of characters affixed to the subject Object Unit that uniquely identifies the subject Object Unit within a universe of other Object Units) at any hierarchy level, and, thus, tracking a number of Descendant tracked Object Units of the tracked subject Object Unit;

(b) identifying the location address, comprising a Normalized Address (a location address in which a Hierarchically Coded Location Address of tracked Ancestor Object Units is not included in the Hierarchically Coded Location Address of its Component Object Units, the location address of the Component Object Units being indicated by a reference to the lowest tracked Ancestor Object Unit of each Component Object Unit), of the subject Object Unit by referencing a number of physically related tracked Object Units within a number of physically related Ancestor Object Units (a number of related Object Units selected from the group consisting of a number of Object Units containing, a number of Object Units holding and a number of Object Units physically controlling the number of subject Object Units which exists at a lower hierarchy level than the number of Ancestor Object Units) of the subject Object Unit, with a number of intermediate tracked Ancestor Object Units existing between the subject Object Unit and referenced Ancestor Object Units and between the referenced Ancestor Object Units and an Origin Object Unit (an Object Unit without a tracked Ancestor Object Unit and as a highest hierarchy level tracked Ancestor of the subject Object Unit), to support descriptions of a location address not fully provided by hierarchical location address elements and their individual descriptions included within an Ancestor Object Unit Record (a Data Base Management System record containing parameters of an Object Unit, comprising an Ancestor, that are unique to the Object Unit); and (c) recording the hierarchical location address for the subject Object Unit relative to one of the related Object Units using a record (referred to as an Object Unit Record), and placing the parameters of the subject Object Unit in a file that is controlled by a series of steps performed by a computer; (ReliA Integrated Process).

2. An integrated relational object unit identification and location addressing (ReliA) process for identifying a subject Object Unit and computing a location address for the subject Object Unit, said location address comprising a Universe Based Origin Location Address (a Universe based hierarchically coded location address for Origin Object Units, highest hierarchy level tracked Ancestor of an Object Unit, said Object Unit with the highest hierarchy level tracked Ancestor determined as tracked Ancestor Object Unit) and furthermore, as required an Ancestor referent, and as required by the Ancestor referents a Hierarchical Component Position Address (a series of one or more HieraRelational Position Numbers that describe a Hierarchically Coded Location Address of a subject Object Unit relative to a tracked Ancestor Object Unit that is referenced, referred to as a referenced tracked Ancestor Object Unit, with a HieraRelational Position Number referring to a real number that describes ordinarily and relationally a HieraRelational Position and that describes the Object Unit's location in relation to Sisters of such Object Unit) for the Object Unit, such location address for the Object Unit when the referent requires component positioning referred to as Component Positioning addressing, and such location address for the Object Unit when the Ancestor referent requires non-positioning referred to as Component Non-Positioning addressing, the complete location address of a component:

(a) determining and initiating a number of other sub-processes by using an integrated evaluation process, said number of other sub-processes comprising sub-processes used hierarchically with respect to each other and with respect to the process, while maintaining a consistent addressing methodology within a common tracked Ancestor Object Unit, used in a number of current transactions for identifying the number of alternative sub-processes being utilized for each successive transaction, by a quantity and type of Transaction Entry Schema (or TES, a series of entries that a user must record to establish a unique identity for the subject Object Unit and a location address for the addressing methodology used) and a relationship of parameters in the entries with existing stored data, the integrated evaluation process comprising:
- (i) specific sub-processes to be included in an instantiation sub-process and characteristic elements of said specific sub-processes,
- (ii) a number of supported addressing methodologies comprising Universe Based Origin Location, Component Non-Positioning and Component Positioning addressing methodologies,
- (iii) a number of subject Object Units to be recorded as to their current location addresses, and
- (iv) an identification of any of the number of sub-processes determined in part by using a number of indicators on a number of tracked Ancestor Object Units that control the number of Descendant Object Unit generations that must be tracked by Component Positioning addressing methodologies;

(b) validating each transaction by the number of sub-processes and computing the location addresses for the subject Object Unit of each current transaction;

(c) establishing the location address, comprising a Normalized Address, of the subject Object Unit by collecting a number of successive position determinants that describe the position of the subject Object Unit hierarchically comprising a number of references to other Object Units for which a current location address has already been established, such a location address comprising hierarchical location address elements included within an Ancestor Object Unit Record and a reference to the tracked Ancestor Object Unit, and support descriptions of the hierarchical location address for the subject Object Unit;

(d) setting up and updating stored data and recording the location address as required by the addressing methodologies for the subject Object Unit; and (e) returning processing to the integrated evaluation process so that the process can restart for a number of subsequent transactions; (ReliA Integrated Process).

3. The ReliA Integrated Process as claimed in claim 2 wherein a comprehensive Hierarchically Coded Location Address within the limits of the addressing methodology required for each Object Unit in an Origin-Subject Lineage (or OSL, successive Descendant Object Units of the Origin Object Unit down through the subject Object Unit) can be constructed and displayed at any time for the subject Object Unit, and with descriptions for each hierarchical entity which when desired comprising the description of the HieraEntity Division Code (or HEDC, non-relational codes or names that generally describe geo-political division of a Parent entity, with a Parent selected from the group consisting of a related Object Unit that contains, a related Object Unit that holds and a related Object Unit that physically controls a subject Object Unit at a hierarchy level immediately above the subject Object Unit) in the Universe Based Origin Location Address and the Item Identifier (or ID, a unique identifier of an Item with a defined Universe of Items, with an Item selected from the group consisting of a set of similar Object Units and a representation of such an Object Unit, and with Universe being the Ancestor of all entities that will be represented by an instantiation of this process) of the Origin Object Unit and the tracked Descendants in a Matriarch-Subject Lineage (or MSL, successive Descendant Object Units of a Matriarch down through the subject Object Unit, with a Matriarch being a tracked Ancestor OU used as a common Ancestor referent for subsequent transactions) to supplement the Object Unit Unique Identifiers (or OUUI, a shortened form for an Object Unit's Unique Unit Identifier) of the Guardian references and positions within Guardian Object Units where required by the Guardian Object Units (lowest tracked Ancestor Object Unit of an Object Unit) or Item Matriarch Records of the Guardian Object Units as a user aid to verify a location address recorded; (Location Address).

4. The ReliA Integrated Process as claimed in claim 2 wherein tracked Object Units are identified using Object Unit Record Files (a Data Base Management System file of Object Unit Records for all tracked Object Units), said Object Unit Record Files comprising:
- (a) an Object Unit Unique Identifier for the subject Object Unit;
- (b) an Object Unit Unique Identifier for the subject Guardian Object Unit;
- (c) the subject Object Unit's Hierarchical Component Position Address relative to the Guardian Object Unit; and
- (d) a unique identifier that relates occurrences of similar Object Units (Item) for the subject Object Unit, assuming that the subject Object Unit needs to be identified as an item; (Structure/Files).

5. The ReliA Integrated Process as claimed in claim 2 wherein an Enabled Process Session (or EPS, a process state for a particular addressing methodology wherein a location address and a number of parameters have been established to enable some alternative processes supporting the addressing methodology) is created by some sub-processes such that the location address of subsequently recorded transactions of some other sub-processes can be computed by referation of the location address of a number of Homogens, whose location addresses have been previously established, without reestablishing a location address determinant for the Ancestor of said number of Homogens used for such referation, such sub-processes which can establish said Enabled Process Session being termed herein as EPS enabling sub-processes which:
- (a) establish the location address of the subject Object Unit of the transaction establishing the Enabled Process Session according to the addressing methodology supported by the primary EPS enabling sub-process as a determinant of the Enabled Process Session such that the establishment of such location address and its addressing methodology can be identified by the ReliA Integrated Process in subsequent transactions as a determinant that an Enabled Process Session for a particular addressing methodology has been established and such that a subsequent transaction will be processed as a non-EPS enabling sub-process for the address methodology; and
- (b) establish a sub-process for disabling of the Enabled Process Session comprising clearing some of the determinants of the Enabled Process Session and clearing any record of OUUI established as Disabling Object Units to effect such disabling.

6. The ReliA Integrated Process as claimed in claim 5 that disables an established Enabled Process Session by recognition of a Transaction Entry Schema (or TES, a series of sequential entries comprising OUUIs and HEDCs required by an enabled ReliA sub-process to identify a subject OU and its location address) comprising some OUUIs of Object Units related to the Subject of the Enabling Transaction (Disabling Object Units), such process:

(a) establishing a number of OUUIs in memory as Disabling Object Units in conjunction with establishment of the Enabled Process Session; and (b) identifying, by the ReliA Integrated Evaluation process, a TES comprising some of OUUIs of the Disabling OUs.

7. The ReliA Integrated Process as claimed in claim 2 that allows for identification of a user signal to reverse a number of transactions for which the Transaction Entry Schema of the sub-process used to record the number of transactions has been completed, such sub-processes allowing transactions recorded by both EPS enabling and EPS enabled processes and by any of the addressing methodologies to be reversed, such sub-processes, however, being applicable only to the last non-reversed transaction recorded, the indicating signal of such sub-processes comprising the recording of the OUUI of a Subject of the Last Transaction (or SLT, a subject Object Unit of the last transaction for which the complete TES has been entered) recorded which has not been so reversed, the sub-processes signaled by the recording of such a qualified OUUI being distinguished and identified automatically by the ReliA Integrated Process by recognition of the OUUI of the Subject of the Last Transaction recorded which has not been so reversed except where:

(a) successive similar OUUIs are automatically eliminated;

(b) the OUUI of the subject of the transaction is recorded last in the TES of a sub-process used to record the last transaction; and (c) the transaction is the last transaction recorded.

8. The ReliA Integrated Process as claimed in claim 2 in which qualifying entries of several Object Unit Unique Identifiers (OUUI) recorded for a transaction are deemed to represent a subject Object Unit and the tracked Ancestor Object Unit (Matriarch) of such subject Object Unit and, when required by the Matriarch for a number of successive generations of the Descendants of the Matriarch, including the subject Object Unit, additional qualifying entries are deemed to be position determinants of the subject Object Unit relative to the Matriarch, requirement for position determinants for the Matriarch's Descendant Object Units referred to as the Component Positioning address methodology, where a sub-process is distinguished from other non-enabled sub-processes by including an Object Unit Unique Identifier as the first element of the location address of the subject Object Unit in the Transaction Entry Schema, with an order convention of the subject Object Unit and location address being necessary for distinguishing said sub-process from other sub-processes automatically, said sub-process:

(a) validating the OUUIs of the subject Object Units and Ancestor Object Units and, where the Component Positioning address methodology is required, validating position determinants;

(b) referating, where the Component Positioning addressing methodology is required for the transaction and a position determinant of the location address is a Homogen of the subject OU, a Matriarch Based Component Position Address for the subject Object Unit; and (c) computing, where the Component Positioning addressing methodology is required for the transaction, a Component Position Address (or CPA, a Guardian referent and a Hierarchical Component Position Address for the subject Object Unit relative to its Guardian).

(ReliAA Process).

9. The ReliAA Process as claimed in claim 8 which uses a sub-process wherein position determinants are not allowed for the location address of the subject Object Unit relative to the Matriarch and the Homogen Object Units of said subject Object Unit, such non-allowance of position determinants for the Matriarch's Descendant Object Units referred to as Component Non-Positioning addressing methodology, the Component Non-Positioning addressing methodology being established by a number of parameters associated with the Matriarch referent, such sub-process distinguished from other ReliAA/ReliAM sub-processes by the number of parameters associated with the Matriarch referent, the Matriarch referent deemed to be the lowest tracked Ancestor of the subject Object Unit (Guardian referent), with the location address being established by the sub-process comprising the Matriarch referent; (ReliAA-CNP Process).

10. The ReliAA Process as claimed in claim 8 wherein the Matriarch requires Component Positioning addressing methodology, a number of the transaction position determinants are HieraRelational Position Numbers comprising a Matriarch Based Component Position Address (or MBCPA, a unique Hierarchically Coded Location Address of the subject Object Unit relative to the Matriarch referent and the Homogens of the subject Object Unit), where the Matriarch Based Component Position Address of the subject Object Unit is recorded by the user by successively entering the HieraReiational Position Numbers of each successive Descendant Object Unit relative to its Parent Object Unit until the Matriarch Based Component Position Address of the subject Object Unit is recorded in the memory, such process being distinguished by the entry of a valid HieraRelational Position Number for the highest hierarchy level of such Matriarch Based Component Position Address in the second entry of the location address of the Transaction Entry Schema, with the Transaction Entry Schema being closed by a TES Closure Entry that records the maximum number of HRPNs allowed for the instantiation of said process; (ReliAA-CP-Manual Process).

11. The ReliAA-CP Process as claimed in claim 10 whereby a tracked OU is referenced and recorded in lieu of recording the HCPA of the subject relative to the Matriarch, such referenced OU being deemed to be a Homogen in a specified relationship as established for the process, such process being distinguished by the OUUI being a referenced Descendant of the Matriarch (such referent being a Homogen referent) identified in the Transaction Entry Schema and the next entry being a TES Closure Entry (a user transaction entry recorded as a TES entry or a Fixed Command at or after the end of a Transaction Entry Schema for a current transaction that allows a sub-process to establish that entry of the Transaction Entry Schema of the current transaction has been completed), and such TES Closure Entry attains with the HCPA of the Homogen referent a cumulative number of hierarchy levels equal to a maximum allowed for an instantiation of the invention, the MBCPA of the subject OU comprising the HCPAs of the Homogen as established for the instantiation of such process; (ReliAA-CP-Homogen processes).

12. The ReliAA Process as claimed in claim 8 wherein a methodology in which an Ancestor referent established by an enabling sub-process supporting Component location addresses can be the tracked Ancestor of a number of lower hierarchy level tracked Ancestors of the subject Object Unit (a Matriarch Referent Methodology), the Matriarch Referent Methodology allowing the user to establish a higher hierarchy level Ancestor reference than the Guardian Object Unit for recording the location address of the subject Object Unit and ignoring irrelevant intermediate tracked Object Units, said methodology:

(a) establishing a record of the Ancestor referent established for an enabled process session and the number of tracked Ancestors in such Matriarch lineage by using a number of records in an array in memory;

(b)
- (i) identifying and recording in memory a record of the successive intermediate tracked Ancestors of the subject Object Unit that are also Descendants of the established Matriarch and congruent with a Matriarch Based Component Position Address established by various sub-processes, and
- (ii) completing the lineage, to the extent that the tracked Ancestors of the subject Object Unit have been previously recorded, of the subject Object Unit from the Matriarch down through the lowest tracked Ancestor (Guardian) of the subject Object Unit, (Matriarch-Subject Lineage MSL), by using a function iteratively searching for Unreferenced Tracked Matriarch-Descendant-Ancestors (URTAs) on an Object Unit Record File with a constructed ReliA Component Position Address, said Component Position Address comprising the lowest tracked Ancestor identified in the Matriarch-Subject Lineage and a Hierarchical Component Position Address comprising some of the HieraRelational Position Numbers in the Matriarch Based Component Position Address, and repeating the function until no additional Descendants of the Matriarch can be identified in the Matriarch-Subject Lineage described by the Matriarch Based Component Position Address (URTA Identification Function);

(c) identifying the lowest tracked Ancestor on record as the Guardian of the subject Object Unit; and (d) establishing the ReliA CPA of the subject Object Unit by using a conversion function, such conversion function:
- (i) establishing the Guardian Object Unit and the Matriarch Based Component Hierarchy Level of the Guardian Object Unit, and
- (ii) converting the MBCPA to a Guardian Based Component Position Address for the subject Object Unit (ReliA CPA Conversion function); (ReliAM Process).

13. The ReliAM Process as claimed in claim 12 providing a top down search for the URTA wherein the Hierarchical Component Position Address of the ReliA Component Position Address constructed comprises the HieraRelational Position Numbers in hierarchies of the Matriarch-Subject Lineage below the lowest tracked Ancestor in the Matriarch-Subject Lineage identified, and the Hierarchical Component Position Address of such ReliA Component Position Address further constructed to iteratively exclude the lowest hierarchy level HieraRelational Position Numbers until all HieraRelational Position Numbers which relate to the HieraRelational Position Numbers of tracked Ancestors already identified are excluded; (URTA Identification function -ReliAM Process version).

14. The ReliAM Process as claimed in claim 12 wherein the Matriarch requires Component Positioning addressing methodology, a number of the transaction position determinants being HieraRelational Position Numbers comprising a Matriarch Based Component Position Address (a unique Hierarchically Coded Location Address of the subject Object Unit relative to the Matriarch referent and the Homogens of the subject Object Unit), the Matriarch Based Component Position Address of the subject being recorded by the user by successively entering the HieraRelational Position Numbers of each successive Descendant Object Unit relative to its Parent Object Unit until the Matriarch Based Component Position Address of the subject Object Unit is recorded in the memory, such process being distinguished by the entry of a valid HieraRelational Position Number for the highest hierarchy level of such Matriarch Based Component Position Address in the second entry of the location address of the Transaction Entry Schema, with the Transaction Entry Schema being closed by a TES Closure entry that records the maximum number of HRPNs allowed for the instantiation; (ReliAM-CP-Manual Process).

15. The ReliAM-CP-Manual Process as claimed in claim 14 wherein the Matriarch Referent Methodology is supported whereby a number of successively lower tracked Matriarch-Descendant-Ancestors in the Matriarch-Subject Lineage is recorded by the user in lieu of recording the HieraRelational Position Numbers for the Hierarchical Component Position Address for the number of tracked Matriarch-Descendant-Ancestors recorded, thus requiring the user to establish the lowest hierarchy level HieraRelational Positions of the subject by other sub-processes, such sub-processes as claimed herewith distinguished by the entry in the Transaction Entry Schema of an Object Unit Unique Identifier for the second entry of the location address in the Transaction Entry Schema of a referencing Descendant of record for the lowest tracked Ancestor previously referenced in the Transaction Entry Schema, and the entry of successive Matriarch-Descendants further distinguished by the entry of successive Object Unit Unique Identifiers as long as the cumulative number of hierarchy levels included in the Hierarchical Component Position Address of the Matriarch-Descendant's address is one less than the maximum allowed for an instantiation of the process; (ReliAM-CP-Descendant Process).

16. The ReliAM-CP-Manual Process as claimed in claim 14 whereby the OUUI in a specified Homogen relationship is deemed to have been referenced in lieu of recording the HCPA of the subject relative to the lowest tracked Ancestor identified in the Transaction Entry Schema, such process being distinguished by the OUUI being a referenced Descendant of the lowest tracked Ancestor (such Ancestor also being a Homogen referent) identified in the Transaction Entry Schema and the next entry being a TES Closure Entry (an entry selected from the group consisting of entries recorded at the end of a Transaction Entry Schema and entries recorded after the end of a Transaction Entry Schema, allowing a sub-process to establish a stage selected from the group consisting of completion of the Transaction Entry Schema of a current transaction, attainment of a preestablished limit and attainment of a distinguishing condition in the indicated process for the current condition such that the current transaction can be closed), and where such TES Closure Entry is an OUUI, a non-referencing Descendant of the Homogen referent, and where such TES Closure Entry establishes a cumulative number of hierarchy levels in the Hierarchical Component Position Address of the Homogen referent equal to the maximum allowed for an instantiation of the process, the MBCPA of the subject OU comprising successively the number of HCPAs of the number of referencing Descendants, including MDAs and the Homogen referent, adjusted by the Homogen referation process as established for the instantiation; (ReliAM-CP-Descendant-Homogen Process).

17. The ReliA Integrated Process as claimed in claim 2 wherein an enabled Homogen process for automatic determination of the location address for the subject Object Unit is based on a particular addressing methodology, such process further:

(a) establishing a number of parameters in a number of memory variables by requiring a preceding enabling process, said number of parameters establishing the recording of a qualified location address for the addressing methodology and identifying the location address as a referent (Homogen referent) location address for a number of succeeding transactions in an Enabled Process Session (or EPS, a process state of the ReliA Integrated process and related to a particular addressing methodology wherein subsequent transactions are automatically indicated as a ReliA sub-process requiring the EPS for the addressing methodology), such EPS distinguished by a number of parameters in a number of memory variables, said number of parameters allowing the ReliA Integrated Evaluation Process in a subsequent transaction to automatically determine that all necessary parameters have been established for a number of ReliA sub-processes requiring an EPS for the addressing methodology, said number of ReliA sub-processes requiring the EPS for a particular addressing methodology being termed Enabled Homogen processes, the necessary parameters for an EPS comprising a qualified location address for the addressing methodology of the EPS when multiple addressing methodologies of the ReliA Integrated Process automatically determine that all necessary parameters have been established comprising an indicator for an addressing methodology that establishes that all necessary parameters have been established for the number of ReliA sub-processes requiring an EPS for the addressing methodology;

(b) allowing the user to effect disabling of such Enabled Process Session;

(c) evaluating the number of parameters in the number of memory variables that establish an EPS for a particular addressing methodology to determine that an EPS has been established and initiating the Enabled Homogen process for the addressing methodology;

(d) evaluating an indication, as established by the sub-process in step (b), that allows the user to disable an EPS, comprising evaluating entry of a number of Disabling Object Units, where a sub-process is included in an instantiation of this process that establishes Disabling Object Units in conjunction with establishing an EPS, that the EPS must be disabled;

(e) requiring the entry of a valid Object Unit's Unique Unit Identifier that is, when the Component Positioning addressing methodology is employed, recorded in a position subsequent, based on the Transaction Direction established for the EPS, to the Subject of the Last Transaction (the subject Object Unit of the last transaction for which the complete Transaction Entry Schema has been entered); and (f) referating the location address of the subject Object Unit by incrementing, by values comprising zero and negative units, the Hierarchically Coded Location Address of the Subject of the Last Transaction and a number of other referenced Homogen Object Units, at a number of appropriate hierarchy levels relative to the Subject of the Last Transaction to establish the Hierarchically Coded Location Address of each successively recorded subject Object Unit; (ReliA-EH Process).

18. The ReliA-EH Process as claimed in claim 17 whereby disabling of the Enabled Process Session in step (b) comprises evaluation of a number of references to a number of preestablished, related OUs (Disabling Object Unit), such process further:

(a) establishing an EPS to establish the OUUI of a number of Object Units related to the Subject of the Enabling Transaction for the EPS by requiring a number of processes for an addressing methodology included in an instantiation of the process, the EPS comprising the SET and the Matriarch, in a number of memory variables, such Object Units related to the Subject of the Enabling Transaction for the EPS representing related number of Object Units that are unlikely to be recorded as successive entries in a Transaction Entry Schema for the Enabled Homogen processes that require such EPS in subsequent transactions in an EPS other than to effect this disabling process;

(b) establishing, for each addressing methodology employed in an instantiation of this process, a number of Transaction Entry Schemata requiring the entry of a number of OUUIs of the Disabling Object Units, so as to generally preclude inadvertent entry by the user of the number of TESs of this process as a process determining part of the TES of other Enabled Homogen processes; and (c) determining if the number of successive entries, individually and in combination, in the TES of subsequent transactions correspond to the TES of the OUUIs of the Disabling OUs by evaluating a number of successive entries in the TES of subsequent transactions within the EPS against the OUUIs of the Disabling Object Units; (Disabling OU process).

19. The ReliA-EH Process as claimed in claim 17 wherein an Origin Locating addressing methodology is used, such process further:

(a) establishing a qualified Universe Based Origin Location Address by requiring the preceding enabling process, based upon the instantiation of the process, and identifying the location address as the referent location address for a number of succeeding transactions in an Enabled Process Session for the Origin Locating addressing methodology;

(b) establishing the OUUI of the subject Object Unit of the transaction by requiring the entry of a valid OUUI, other than any of the OUUIs which reverse a number of previous transactions and any OUUIs of a Disabling OU which constitute the TES for a Disabling sub-process for the Origin Locating addressing methodology; and (c) referating the location address of the subject OU by copying the Universe Based Origin Location Address pre-established by the enabling transaction to the Universe Based Origin Location Address of the subject Object Unit;

such that the Universe Based Origin Location Address of the subject Object Unit can be established, by entry of the UUI of the subject OU only, without requiring the user to record any other form of location address determinant and without recording a reference to a related Object Unit except to disable the process; (ReliA-EHA-OL Process).

20. The ReliA-EH process as claimed in claim 17 wherein a Component Non-Positioning addressing methodology is used, such process further:

(a) establishing as Guardian-Matriarch (a tracked Object Unit used as a common location address for subsequent transactions in an Enabled Process Session) a valid Object Unit Unique Identifier of an Object Unit requiring the Component Non-Positioning addressing methodology for referencing Descendants of the Object Unit and establishing the location address as the common referent location address for a number of succeeding transactions in an Enabled Process Session for the Component Non-Positioning addressing methodology by requiring the EPS enabling process;

(b) establishing the OUUI of the subject Object Unit of the transaction by requiring the entry of a valid OUUI, other than any of the OUUIs which reverse a number of previous transactions and any OUUI of a Disabling OU which constitute the TES for a Disabling process for the Component Non-Positioning addressing methodology; and (c) referating the location address of the subject OU by copying the Object Unit Unique Identifier of the Guardian-Matriarch Object Unit pre-established by the enabling transaction as the common referent location address for a number of succeeding transactions in an Enabled Process Session as the Guardian referent of the subject Object Unit;

such that Guardian referent location address of the subject Object Unit can be established without requiring the user to record any form of location address determinant and without recording a reference to a related Object Unit except to disable the process, by the entry of only a UUI for the subject OU of the transaction; (ReliA-EHA-CNP Process).

21. The ReliA-EH Process as claimed in claim 17 wherein a Component Positioning addressing methodology is used, such process further:

(a) (i) establishing as Matriarch (a tracked Object Unit used as a common Ancestor referent for subject Object Units in any subsequent transactions recorded in the Enabled Process Session) a valid Object Unit Unique Identifier of an Object Unit requiring the Component Positioning addressing methodology for a number of successive tracked referencing Descendants of the Object Unit, (ii) establishing the Matriarch and its location address as the common referent Object Unit and location address for a number of succeeding transactions in the EPS for the Component Non-Positioning addressing methodology, and, (iii) establishing the Matriarch Based Component Position Address (MBCPA, a Hierarchically Coded Component Position Address based on the Matriarch for the EPS) for the Subject of the Enabling Transaction in a number of memory variables as the MBCPA of the Subject of the Last Transaction for the EPS by requiring the EPS enabling process;

(b) reestablishing the MBCPA of the subject of a current transaction in the number of memory variables established for the MBCPA of the Subject of the Last Transaction for the EPS;

(c) referating the MBCPA of the subject OU by incrementing a number of HRPNs of the MBCPA of the SLT by a value of a real number and where preceding (preceding defined as relative to a transaction direction preestablished for the hierarchy levels included in the MBCPA) Homogen referents of the SLT are recorded as part of the TES of a current transaction by incrementing a number of HRPNs of the MBCPA of the SLT by a value of a real number based on the relationship of a number of the additional Homogens referenced in the TES of the current transaction; and (d) computing, where the Matriarch of the EPS is an Ancestor of the Guardian (the lowest tracked Ancestor of an Object Unit) of a subject OU, the Guardian Based Component Position Address (GBCPA, a Hierarchical Component Position Address of an Object Unit based on the Guardian of an Object Unit) in order to establish the Guardian and the Guardian Based Component Position Address as required for the Component Positioning addressing methodology; (ReliA-EH-CP Process).

22. The ReliA-EH-CP Process as claimed in claim 21 where the Component Positioning addressing methodology is required for evaluating the computed position by primary sub-processes against a preestablished maximum position value (Enabled Subject Advancement Position) based on an End of Parent Object Unit Position Number (EPOUPN) for the Parent Object Unit of the subject OU of the last transaction and for recomputing, when the HRPN at the lowest hierarchy level of the MBCPA computed by the primary sub-process exceeds the preestablished EPOUPN for the lowest hierarchy level of the MBCPA, a new MBCPA for the subject Object Unit in a predefined HRPN in a subsequent Aunt (a sister or cousin of the Parent of the Subject of the Last Transaction) at the hierarchy level in which the EPOUPN was exceeded and incrementing the HRPN the next higher hierarchy level by a predetermined value, such sub-process continuing said process of evaluating and recomputing the MBCPA of the subject Object Unit at successively higher hierarchy levels of the MBCPA as long as the incremented HRPN at each succeeding hierarchy level of the MBCPA evaluated by said process exceeds the EPOUPN at each hierarchy level of the MBCPA, as long as the EPOUPN of the highest hierarchy level of the MSL is not exceeded, until the incremented HRPN at the next hierarchy level does not exceed the EPOUPN at each hierarchy level, any recomputed MBCPA by said process comprising the MBCPA of the subject OU used to complete the normal steps of the primary sub-process, said process preestablishing by a separate process the End of Parent Object Unit Position (End of Parent Determination function) for all hierarchy levels of a Matriarchy established by an Enabled Process Session, such Parent Advancement sub-process additionally, whenever (i) a Matriarch Referencing Methodology is employed, and (ii) the number of successive Parent Advancements made by said process for a particular subject OU within a Guardian in the MSL equals the number of HRPNs included in the HCPA of its referencing Descendants (the Guardian Hierarchical Reach of the Guardian-referencing Descendant), reinitiating the URTA identification function to reestablish the tracked Matriarch-Descendant Ancestors in the Matriarch-Subject Lineage for the subject OU; (Parent Advancement Function).

23. The End of Parent Determination Function as claimed in claim 22 whereby the End of Parent Object Unit Position (EPOUP) within a number of Items (Guardian Items) is preestablished in the Item Master Records for descendant Object Units at a number of hierarchy levels within said Guardian Items, said Guardian Items comprising items requiring the Component Positioning addressing methodology for referencing tracked Descendants of such items and for which the application of said process is desired for prospective referencing tracked Descendants of Object Units representing said Guardian Items, said number of hierarchy levels in each Guardian Item including potential hierarchy levels of the Guardian Items down to and including the lowest hierarchy level (Lowest Allowed Tracked Component Hierarchy Level) at which a referencing tracked Descendant of each Guardian Item may be established within an Object Unit representing each Guardian Item, such function establishing the EPOUPN of each hierarchy level of the Matriarch of an EPS, where the Matriarch Object Unit is the Guardian of the subject of the Enabling Transaction, by copying an EPOUPN for a number of successive hierarchy levels of the Guardian Item to a number of memory variables established by the enabling process of the EPS and representing the EPOUPNs for the successive hierarchies of the Matriarchy, said number of successive hierarchy levels and memory variables being the Matriarch Hierarchical Reach (the number of hierarchy levels included in the Matriarchy, excluding the hierarchy level of the Matriarch OU) established by the EPS; (End of Parent Determination Function).

24. The End of Parent Determination Function as claimed in claim 23 additionally:
(a) identifying a record of the Ancestor referent established for an Enabled Process Session and the number of tracked Ancestors in such Matriarch lineage by using a number of records in an array in memory;
(b)
  (i) identifying and recording in memory a record of intermediate tracked Ancestors of the subject Object Unit that are Descendants of the Matriarch selected from the group consisting of referenced Matriarchs and established Matriarchs and congruent with the Matriarch Based Component Position Address established by the various sub-processes, and
  (ii) completing the lineage of the subject Object Unit from the Matriarch down through the subject Object Unit to the extent that the tracked Ancestors of the subject Object Unit have been previously recorded, by using a function comprising iteratively searching for URTAs on the Object Unit Record File with a constructed ReliA Component Position Address, comprising the lowest tracked Ancestor identified in the Matriarch-Subject Lineage and a Hierarchical Component Position Address comprising some of the HieraRelational Position Numbers in the Matriarch Based Component Position Address, and repeating the function until no additional Descendants of the Matriarch can be identified in the Matriarch-Subject Lineage described by the Matriarch Based Component Position Address; (URTA Identification Function)
(c) identifying the lowest tracked ancestor on record as the Guardian of the subject Object Unit;
(d) by using a conversion function:
  (i) establishing the Guardian Object Unit and its Matriarch Based Component Hierarchy Level, and
  (ii) establishing the Guardian Based Component Position Address, such conversion function requiring that all Ancestor Object Units in the Matriarch-Subject Lineage be identified in the descending hierarchical level and that the Matriarch Based Component Position Address of the subject Object Unit relative to the Matriarch be identified; (ReliA CPA Conversion function)
(e) establishing the parameters of the subject Object Unit on the Object Unit Record File and on an Item Master Record File (a record file which normalizes the common parameters that relate to the Item Identifiers of Object Units); and
(f) conveying the Matriarch and the Matriarch Based Component Position Address to Guardian Based Component Position Address for the ReliA Component Position Address (Transaction Update and Close Function); (End of Parent Determination Function with Matriarch Referent Methodology).

25. The ReliA-EH-CP Process as claimed in claim 21 wherein the MBCPA of the subject OU is referated by incrementing an HRPN of the MBCPA of the SLT by a value of a real number where the referation determinants for the process, the hierarchy level of the HRPN incremented and the incrementation value and sign of the real number are established for the process to establish the Homogen relationship of the subject OU relative to the SLT, the number of successive positions the subject OU is from the SLT, and the transaction direction for the hierarchy level,
such ReliA-EH-CP Process being distinguished from other ReliA-EH-CP processes by entry of an UUI in the first entry of the TES for an OU that is not previous to the SLT, and where other Enabled Homogen processes are included in an instantiation in which a non-previous OUUI is also recorded first in the TES, the process being further distinguished by a TES Closure Entry following entry of the non-previous OUUI, and
such that the ReliA-EH-CP Process records the Matriarch referent and MBCPA and the Guardian referent and GBCPA of the subject Object Unit by the entry of only a UUI for the subject OU of the transaction without requiring the user to record any other form of location address determinant, except when the referation determinants are not preestablished for the process, and without recording a reference to a related Object Unit, except to disable the process; (ReliA Integrated Process).

26. The ReliA-EH-CP Process as claimed in claim 21 wherein the MBCPA of the subject OU is established by referation of the SLT and a Cousin referent, recorded by the user, to establish a HRPN for each hierarchy level of the MBCPA of the subject Object Unit based upon a HRPN at a hierarchy level selected from the group consisting of the hierarchy level of the MBCPA of a Cousin referent, the hierarchy level of the SLT, and the hierarchy level of an Enabled Advanced Subject Position (EASP, a default HRPN representing an ordinal position within an Ancestor Object Unit (also described as a hierarchy level of the MBCPA) relative to the position selected from the group consisting of the first position and the last position therein) established as a resultant for said process, the specific HRPN established at each hierarchy level of the MBCPA of the subject OU being determined by Cousin relationship (1st Cousin, 2nd Cousin, ..., nth Cousin, where n=N−1) of the Cousin referent to the SLT and the relationship of the HRPNs of the Cousin referent at a number of hierarchy levels of the MBCPA of the Cousin referent to the HRPNs of the SLT at the corresponding hierarchy levels of the MBCPA of the SLT, and when an HRPN first computed by the foregoing would establish an MBCPA that would not be subsequent to the MBCPA of the SLT, based on the transaction direction (a process determinant) established for the hierarchy level of the MBCPA, the HRPNs at a number of higher hierarchy levels of the MBCPA are incremented by a value of a real number based on the transaction direction established for the hierarchy level of the MBCPA (or Matriarch-Subject Lineage) and a value, comprising a sign, based on process determinants established for the hierarchy level of the MBCPA; said hierarchy level of the MBCPA amplified once as established by the process and, to establish an MBCPA for the subject OU that is subsequent to the MBCPA of the SLT, said claimed process:

(a) distinguishing the ReliA-EH-CP process from other ReliA-EH-CP processes by entering an UUI in the TES for an Object Unit that is a Cousin of the SET, a Descendant of the Matriarch for the EPS, and in a position Previous (previously defined at each hierarchy level in a Matriarchy, as the direction opposite to the transaction direction established for the Matriarchy) and where other ReliA-EH-CP processes are included in an instantiation of this process in which more than one similarly qualified OUUI is also recorded in the TES of process, the claimed process further being distinguished by the recording of a single similarly qualified OUUI prior to a TES Closure Entry; and (b) recording the Matriarch referent, MBCPA, the Guardian referent and GBCPA of the subject Object Unit by the ReliA-EH Process by the entry of a UUI for the subject OU of the transaction and an appropriate Cousin referent based on the referation determinants established for the process without requiring the user to record any other form of location address determinant (comprising process determinants), except the referation determinants when the referation determinants are not preestablished for the process, and without recording a reference to a related Object Unit other than the single Cousin referent, except to disable the process; (ReliA-EHR-CP-pC Aligned and equivalent variations).

27. The ReliA-EH-CP Process as claimed in claim 21 wherein the MBCPA of the subject OU is established by referation of the MBCPA of the SLT, such referation comprising:

(a) incrementing the HRPN at a hierarchy level of the MBCPA of the SLT, as established by a process determinant, by a value, based upon a Skip Count recorded by the user, and by a sign of a real number consistent for the transaction direction established as a referation determinant for the process;

(b) when, limit positions (a maximum and minimum HRPN, also termed BPOUPN and EPOUPN, each being a maximum and a minimum limit position depending on transaction direction) are established for the hierarchy level for HRPN s at the hierarchy level, the process further:

(i) evaluating the HRPN so computed in step (a) of this process against the limit position (HRPN) established for the hierarchy level, and (ii) incrementing, when the HRPN so computed in step (a) exceeds the applicable limit position for the transaction direction for the hierarchy level of the MBCPA of the SLT established in step (a) by a value as established by a process determinant for the next higher hierarchy level of the MBCPA of the SLT, to establish an MBCPA for the subject OU that is subsequent to the MBCPA of the SLT, and reinitiating incrementation of the HRPN at the hierarchy level of the MBCPA of the SLT established in step (a) from the opposite limit position by a value that is based upon the difference between the Skip Count and the absolute value of the incrementation allowed from the SLT and the limit position in (i) such that the Object Unit Position established for the subject OU will be in the subsequent position in the subsequent Aunt, based on all established transaction directions for the hierarchy level of the SLT and its Parent, from the SLT that would be established if the consecutive Object Units' position numbers normally described by HRPNs were assigned without a break at the end of the Parent and subsequent Aunts of the SLT;

(c) distinguishing such ReliA-EH-CP process from other ReliA-EH-CP processes by the entry of an UUI in the TES for an Object Unit that is a preceding Sister of the SLT, and where other ReliA-EH-CP processes are included in an instantiation of this invention in which more than similarly qualified OUUIs are also recorded in the TES of the claimed process, such claimed process being further distinguished by the recording of a single similarly qualified OUUI prior to a TES Closure Entry; and (d) recording the Matriarch referent, MBCPA, the Guardian referent and GBCPA of the subject Object Unit by the ReliA-EH Process by the entry of a UUI for the subject OU of the transaction and an appropriate Homogen referent based on the referation determinants established for the claimed process without requiring the user to record any other form of location address determinant, comprising process determinants, except the referation determinants when the referation determinants are not preestablished for the process, and without recording a reference to a related Object Unit other than the single Homogen referent, except to disable the process, (ReliA Enabled Homogen Referation Component Positioning SLT Skip Process—ReliA-EHR-CP-SLT-Skip).

28. The ReliA-EHR-CP-SLT-Skip Process as claimed in claim 27 wherein the Skip Count based upon references selected from the group consisting of Sister references included in talliances and Sister references excluded from talliances, tallying number of Skip Talliances (successive references to the UUI of Homogens of the SLT/SET), such process being enabled within the ReliA-EHA-CP-SLT-Skip Process and distinguished from other ReliA-EH-CP processes by the entry in the TES of the claimed process a Preceding Homogen in addition to the preceding Sister reference that enables and distinguishes the ReliA-EHR-CP-SLT-Skip Process, the conclusion of the Skip Talliances being identified by the entry of a TES Closure entry, (ReliA-EHR-CP-SLT-Skip with Skip Talliances).

29. The ReliA-EH-CP Process as claimed in claim 21 wherein the MBCPA of the subject OU is established by referation of the MBCPA of a referenced preceding Cousin and the SLT, such referation:

(a) incrementing the HRPN at a hierarchy level of the MBCPA of the referenced Cousin, as established by a process determinant as the process base hierarchy level, by a value, based upon a Skip Count recorded by the user, and by a sign of a real number as established by a process determinant as the HRPN at the corresponding hierarchy level of the MBCPA of the subject OU;

(b) establishing the HRPN at the next higher hierarchy level from the process base hierarchy level of the MBCPA of the SLT as the HRPN at the corresponding hierarchy level of the MBCPA of the subject OU; and (c) when, limit positions (a maximum and minimum HRPN, also termed BPOUPN and EPOUPN, each being a maximum and a minimum limit position depending on transaction direction) are established for the hierarchy level for HRPNs at the process base hierarchy level established in step (a), the process further:

(i) evaluating the HRPN at the process base hierarchy level as computed in step (a) of said process against the limit position (HRPN) established for the process base hierarchy level, and (ii) incrementing, when the HRPN at the process base hierarchy level as computed in step (a) exceeds the applicable limit position for the transaction direction for the process base hierarchy level of the MBCPA of the SLT as established in step (a), the HRPN at the next higher hierarchy level to the process base hierarchy level, initially established in step (b) by a value as established by a process determinant for the next higher hierarchy level to the process base hierarchy level of the MBCPA of the SLT, to establish an MBCPA for the subject OU that is subsequent to the MBCPA of the SLT, and reinitiate incrementation of the HRPN at the process base hierarchy level of the MBCPA of the SLT established in step (a) from the opposite limit position by a value that is based upon the difference between the Skip Count and the absolute value of the maximum incrementation allowed from the SLT and the limit position in (i) such that the Object Unit Position established for the subject OU will be in the subsequent position in the subsequent Aunt from the SLT, based on the established transaction directions for the hierarchy level of the SLT and its Parent, that would be established if the consecutive object unit position numbers normally described by HRPNs were assigned without a break at the end of the Parent and subsequent Aunts of the SLT, wherein the ReliA-EH-CP process is distinguished from other ReliA-EH-CP processes by the entry of an UUI in the TES for an Object Unit that is a preceding Cousin, and an additional process determinant, that does not qualify as a TES Closure Entry, comprising a Skip Count and a reference to a second Cousin of the SLT in the TES of the process, and the ReliA-EH process records the Matriarch referent, MBCPA, the Guardian referent and GBCPA of the subject Object Unit by the entry of only a UUI for the subject OU of the transaction, an appropriate preceding Cousin referent, based on the referation determinants established for the process, and a Skip Count without requiring the user to record any other form of location address or referation determinant to establish the location address of the subject OU, except the referation determinants when the referation determinants are not preestablished for the process, and without recording a reference to a related Object Unit other than the single Homogen referent, except to disable the process; (ReliA Enabled Homogen Referation Component Positioning SLT Skip Process—ReliA-EHR-CP-SLT-Skip).

30. The ReliA-EHR-CP-pC-Skip Process as claimed in claim 29 wherein the Skip Count is based upon a tally of the number of Skip Talliances (successive references to the UUI of Homogens of the SLT/SET), such process being enabled within the ReliA-EHR-CP-pC-Skip process and distinguished from other ReliA-EH-CP processes by entering in the TES of the ReliA-EHR-CP-pC-Skip Process a Preceding Homogen in addition to the preceding Cousin reference that enables and distinguishes the ReliA-EHR-CP-pC-Skip Process, the conclusion of the Skip Talliances being identified by entering a TES Closure Entry; (ReliA-EHR-CP-pC-Skip Process with Skip Talliances).

31. The ReliA-EHR-CP-pC-Skip Process as claimed in claim 29 wherein the Skip Direction (the direction of the subject OU relative to the Cousin referent being along the axis of the increasing and decreasing position numbers for the hierarchy level) is determined by the direction of subsequent referenced Cousin relative to the Cousin referent recorded to effect the ReliA-EHR-CP-pC-Skip process, such subsequent referenced Cousin for establishing the Skip Direction qualifying as the additional process determinant required for the ReliA-EHR-CP-pC-Skip Process, and, when Skip Talliances are used to establish a Skip Count in the ReliA-EHR-CP-pC-Skip Process, such subsequent referenced Cousin qualifying as a Skip Talliance, such process being enabled within the ReliA-EHR-CP-pC-Skip process and distinguished from other ReliA-EH-CP processes by entering in the TES the ReliA-EHR-CP-pC-Skip Process by a second Preceding Cousin in addition to the preceding Cousin reference that enables and distinguishes the ReliA-EHR-CP-pC-Skip Process; (ReliA-EffR-CP-pC-Skip with Skip Direction).

32. The ReliA Integrated Process as claimed in claim 2, further comprising a sub-process (known as the ReliAQ or the Quick process) for establishing with some validation the current location address of a tracked Object Unit based on entry of a Unique Unit Identifier of the Object Unit, such validation based on recording in the Transaction Entry Schema of the transaction a number of successive referents in a number of relationships comprising Homogen and lineage relationships between the number of referents and the subject Object Unit, Homogen and lineage relationships between the number of Homogens and lineage relationships, and Homogen and lineage relationships in combination with an ordinal position of such referent relative to a number of predefined positions in related Object Units, such that the process can confirm the current location address on record for the tracked subject Object Unit and enable other processes such that as few as one Unique Unit Identifier of related Object Unit as well as the subject Object Unit need to be recorded by the user to reasonably confirm the location address of a subject Object Unit, and where desired, establish an Enabled Process Session with the addressing methodology of the subject Object Unit and establish the Matriarch for the EPS based on a common Ancestor entity for the subject Object Unit and at least some of the referents recorded in the TES, the ReliAQ Process:

(a) preestablishing by an order in the TES the subject Object Unit of the transaction;

(b) validating that a qualified relationship between the number of references recorded in the Transaction Entry Schema exists as a means of enabling the process by using alternative relationships between Object Units without need for an enabling sub-process and having a number of tracked Homogen Object Units already recorded in order;

(c) including a reference to the subject Object Unit in the Transaction Entry Schema of the process that is a distinct, separate entry in the Transaction Entry Schema from the entry of the determinant referents of the process; and (d) establishing one of the process referents and its ordinal position in the Transaction Entry Schema of the process as the determinant referent, and establishing location of the subject Object Unit by using locating elements selected from the group consisting of:

a. a set of Homogen relationship parameters between the determinant referent and the subject Object Unit, and b. the unique HieraRelational Position Numbers of the subject Object Units Matriarch Based Component Position Address relative to the determinant referent's Matriarch Based Component Position Address; (ReliAQ or Quick Processes).

33. The ReliA Integrated Process as claimed in claim 2, further comprising a sub-process (known as the ReliAQ or the Quick process) for establishing with some validation the current location address of a tracked Object Unit based on entry of a Unique Unit Identifier of the Object Unit, such validation based on recording in the Transaction Entry Schema of the transaction a number of successive referents in a number of relationships comprising Homogen and lineage relationships between the number of referents and the subject Object Unit, Homogen and lineage relationships between the number of Homogens and lineage relationships, and Homogen and lineage relationships in combination with an ordinal position of such referent relative to a number of predefined positions in related Object Units, such that the process can confirm the current location address on record for the tracked subject Object Unit and enable other processes such that as few as one Unique Unit Identifier of related Object Unit as well as the subject Object Unit need to be recorded by the user to reasonably confirm the location address of a subject Object Unit, and, where desired, establish an Enabled Process Session with the addressing methodology of the subject Object Unit and establish the Matriarch for the EPS based on an Object Unit referenced in the Transaction Entry Schema that is a tracked Ancestor of record for another Object Unit recorded in the Transaction Entry Schema, the subject Object Unit being the Descendant Object Unit of another Object Unit recorded in the TES and further identified, where a number of Descendant Object Units of the Matriarch are included in the Transaction Entry Schema of an instantiation, based upon the order in which the Descendants are recorded in the Transaction Entry Schema of the process.

34. The ReliAQ Process as claimed in claim 32 wherein the Matriarch requires an application of the Component Positioning addressing methodology such that the Matriarch can be the tracked Ancestor of a number of lower hierarchy level tracked Ancestors of the subject Object Unit (a Matriarch Referent Methodology), the Matriarch Referent Methodology allowing the user to establish the Matriarch as a higher hierarchy level Ancestor reference than the Guardian Object Unit for establishing the location address of the subject Object Unit and ignoring irrelevant intermediate tracked Object Units, said methodology:

(a) identifying a common tracked Ancestor for the number of referents by
  (i) using a number of records in a number of arrays in memory to establish a record of the Guardian of a number of successive Guardians of a number of Object Units referenced in the Transaction Entry Schema, and
  (ii) comparing the successive Guardians in the lineage of the number of Object Units in the Transaction Entry Schema to the other Descendants likewise identified to identify any common tracked Ancestor of the Object Units referenced in the Transaction Entry Schema;

(b) establishing the common Ancestor as the Matriarch referent for the subject Object Unit;

(c) constructing the MBCPA of the subject Object Unit from the successive HRPNs that constitute the GBCPAs of the successive referencing Descendants of the Matriarch;

(d) identifying the lowest tracked Ancestor on record as the Guardian of the subject Object Unit; and (e) establishing the ReliA CPA of the subject OU by using a conversion function, such function:
  (i) establishing the Guardian Object Unit and the Matriarch Based Component Hierarchy Level of the Guardian Object Unit, and
  (ii) converting the MBCPA to a Guardian Based Component Position Address for the Subject Object Unit; (ReliAQ-CP Process with MRM).

35. The ReliAQ Process as claimed in claim 32 wherein the Component Positioning addressing methodology is required and wherein the Transaction Direction is established by a number of memory variables as a process determinant for successive transactions in an Enabled Process Session for the Component Positioning addressing methodology, said claimed process, requiring a number of referenced Object Units in the Transaction Entry Schema of the ReliAQ that are Homogens, comparing the MBCPA of a first Homogen referent in a pre-established ordinal position in the TES of the ReliAQ process to the MBCPA of a second Homogen referent in a different preestablished ordinal position in the TES to establish when the first Homogen determinant precedes the second Homogen determinant and establish the Transaction Direction based on an established relationship for the HRPNs that comprises each hierarchy level of the MBCPA of the two Homogen determinants; (ReliAQ Process with Transaction Direction).

* * * * *